FIG.27 DECODER-TRANSLATOR CONN. & REGISTER CHECK
AUTOMATIC TEST CCT.

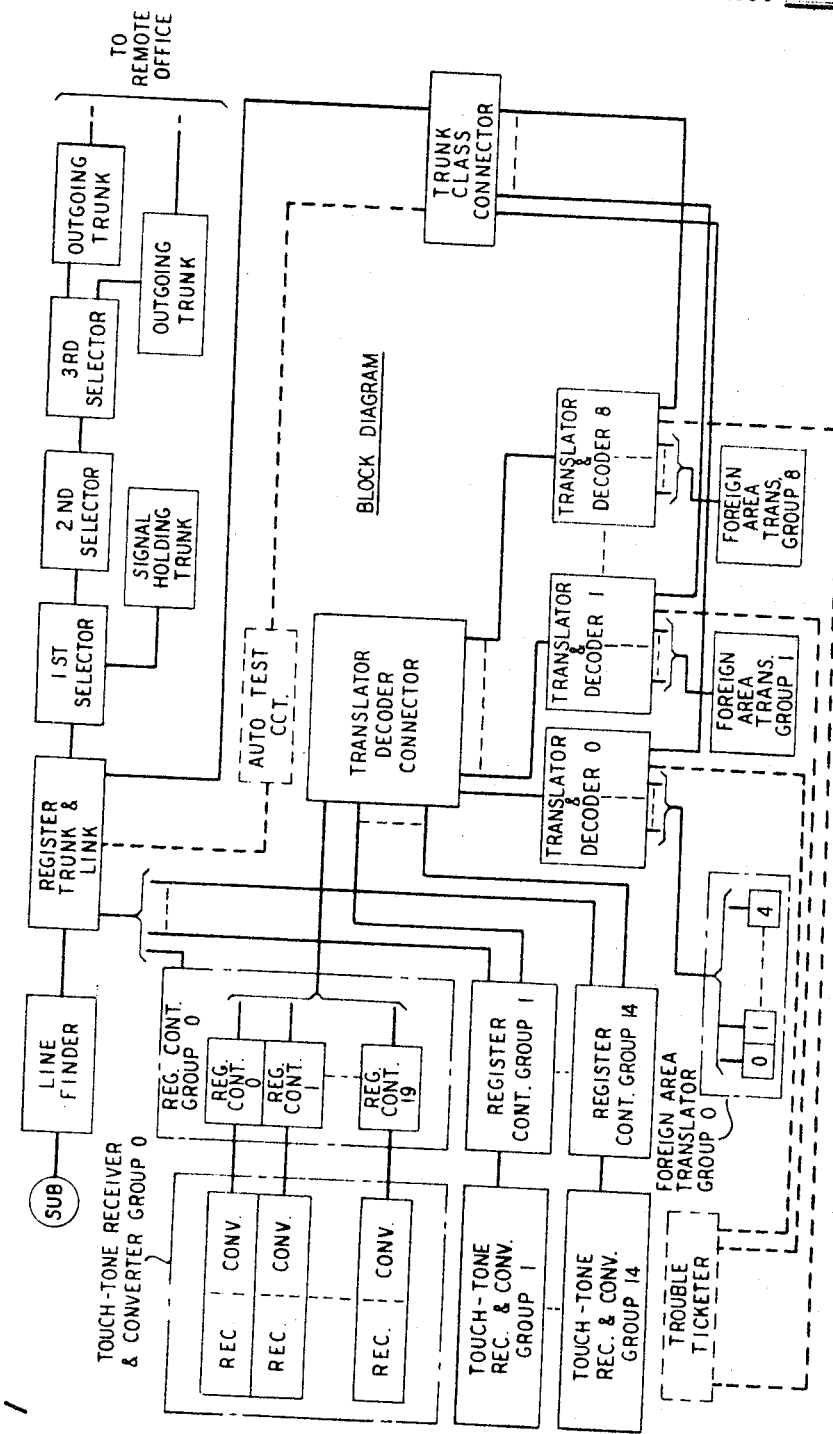

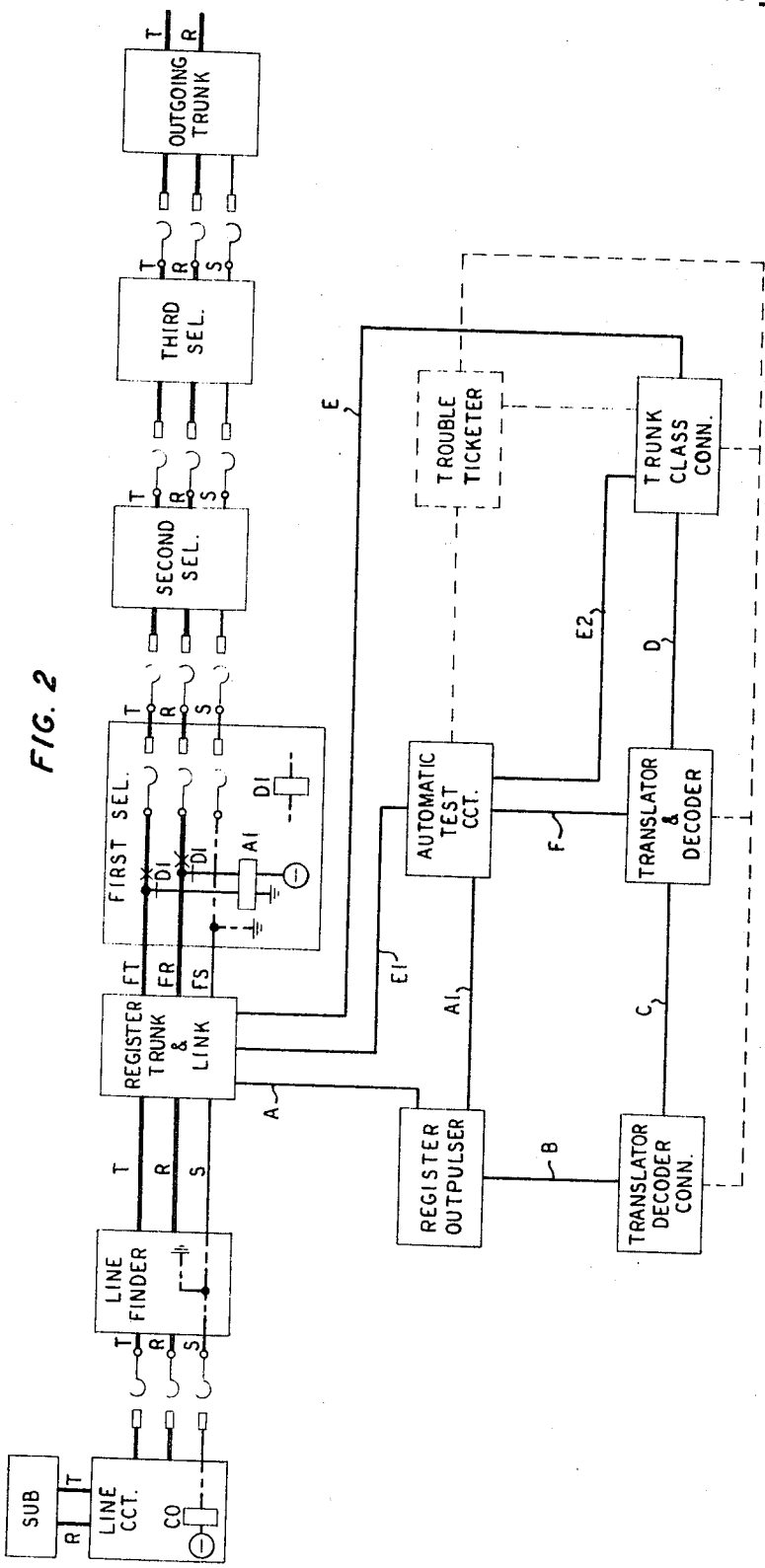

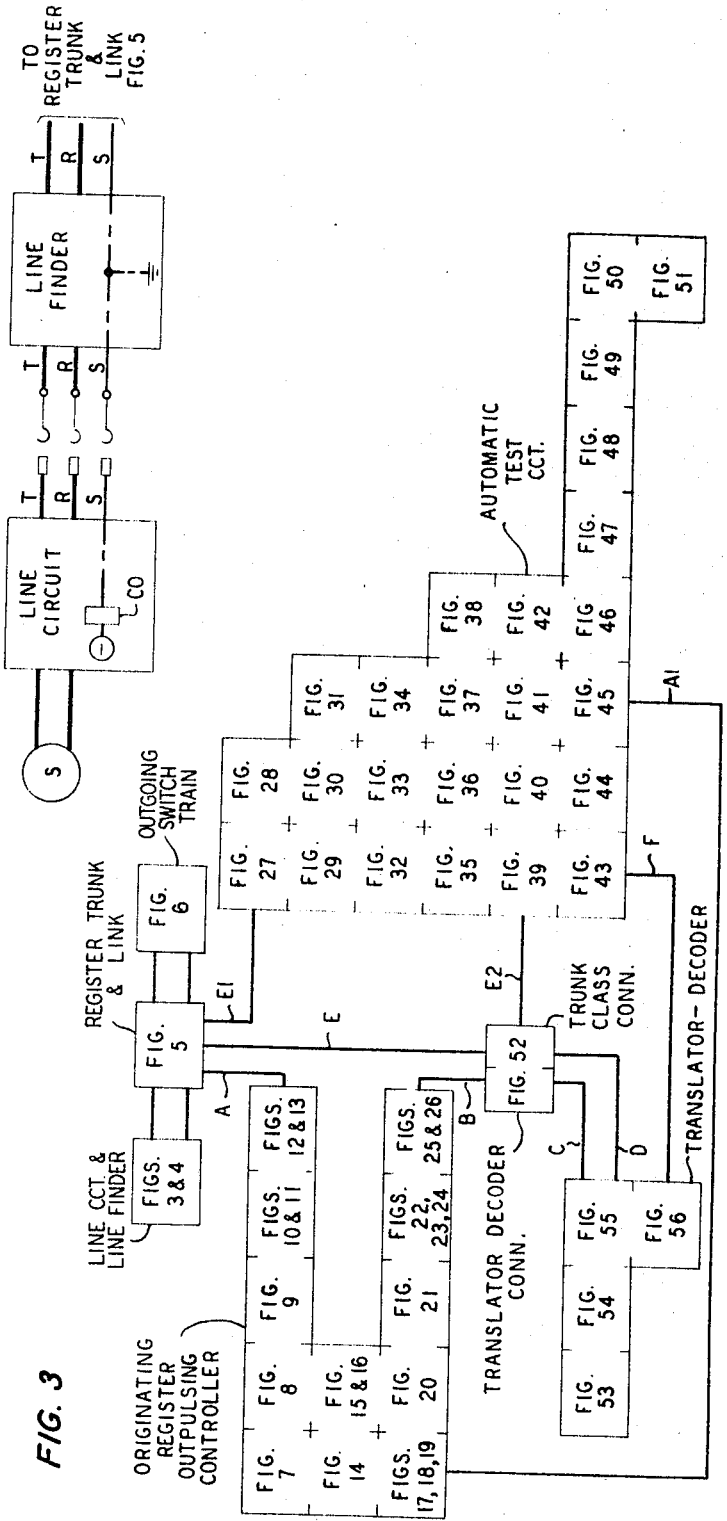

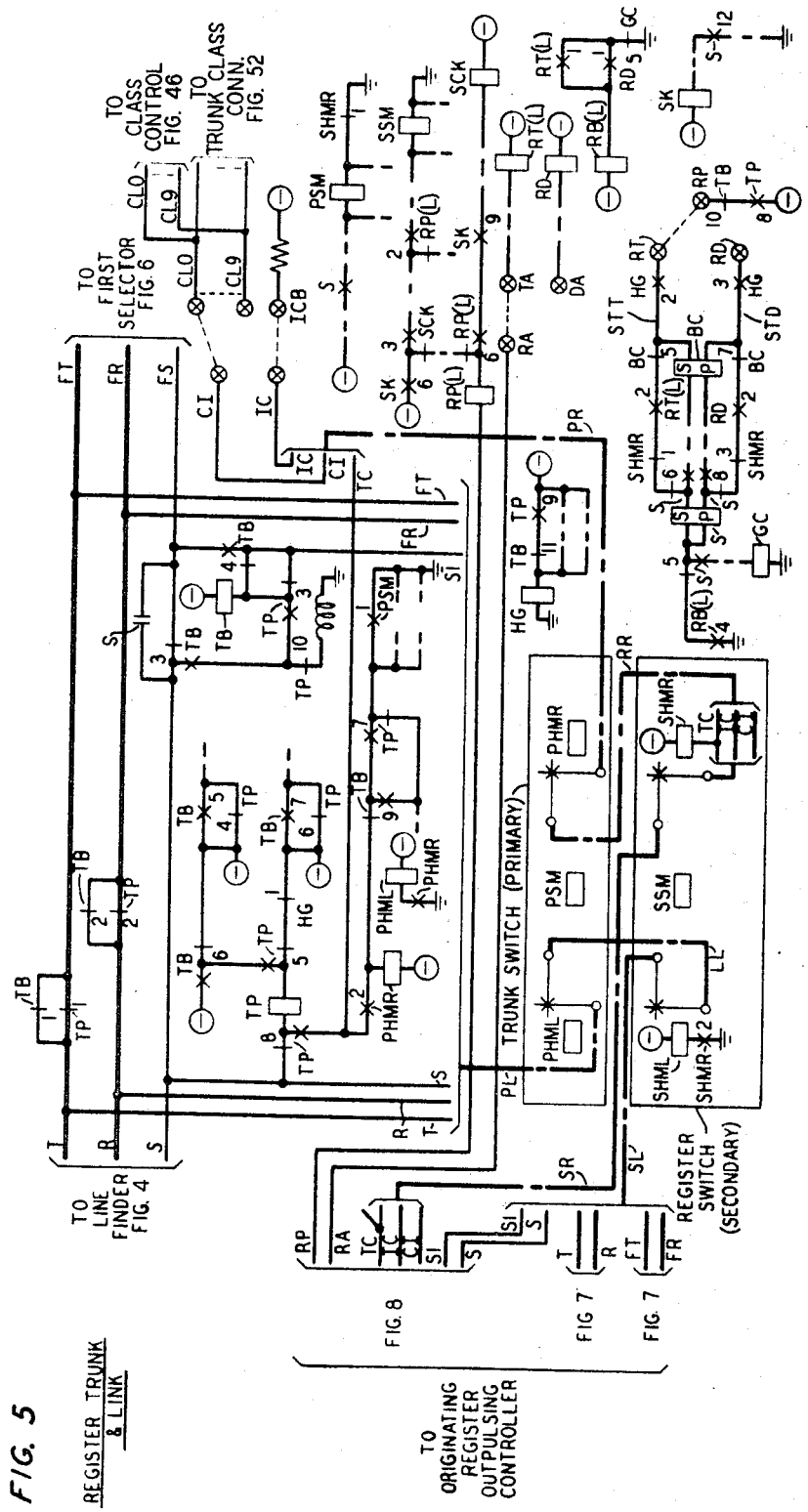

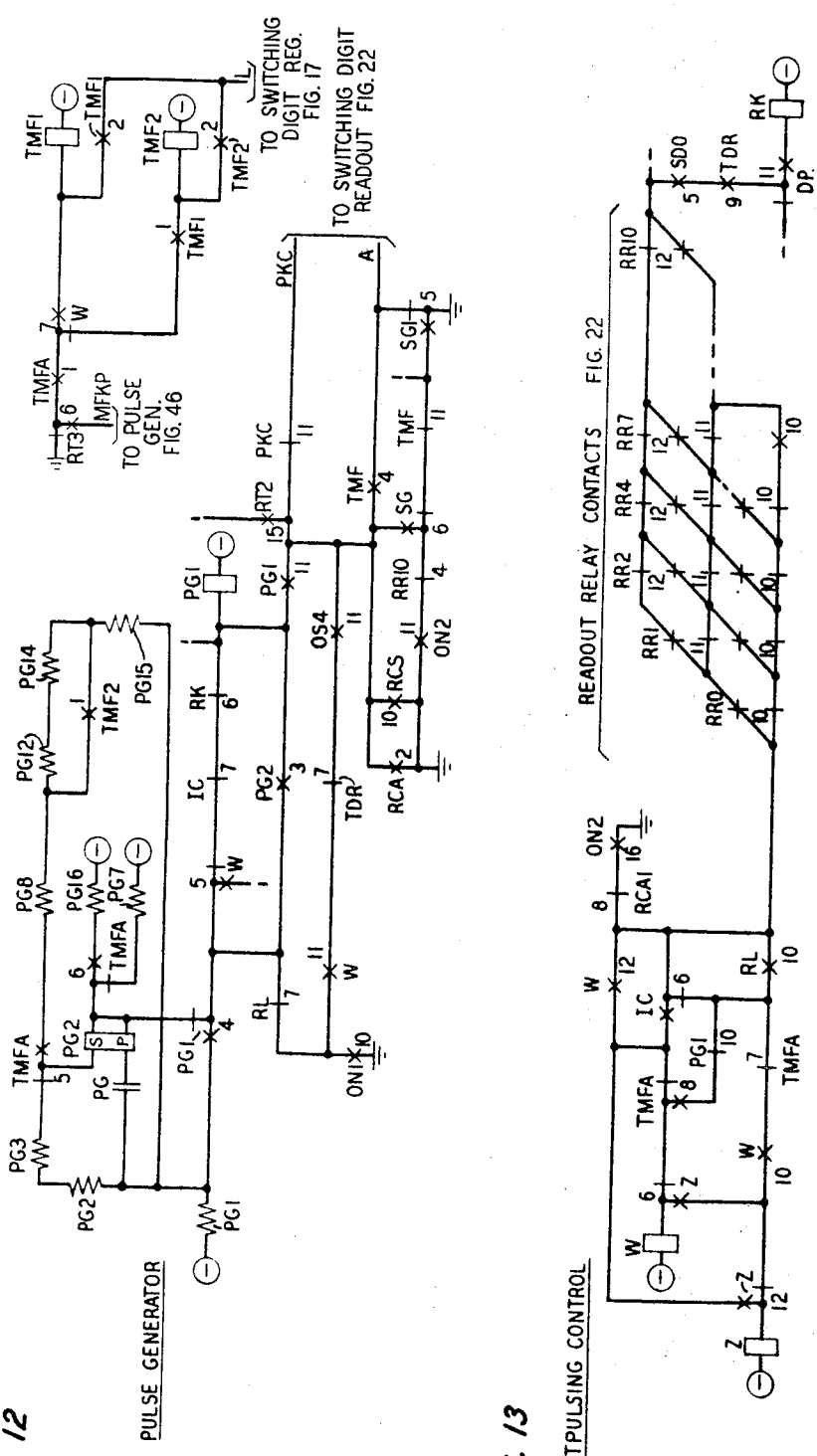

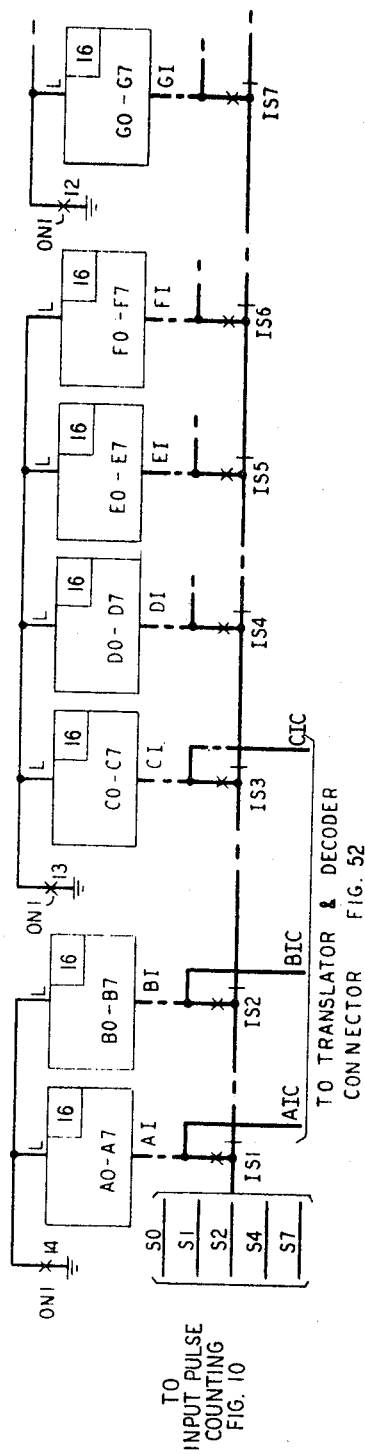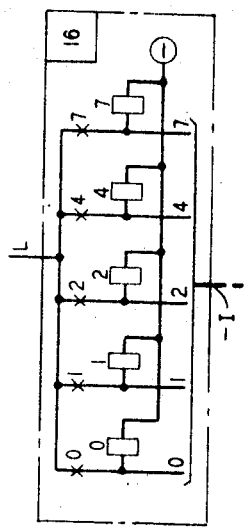
FIG. 15
FIG. 16  DIGIT REGISTER

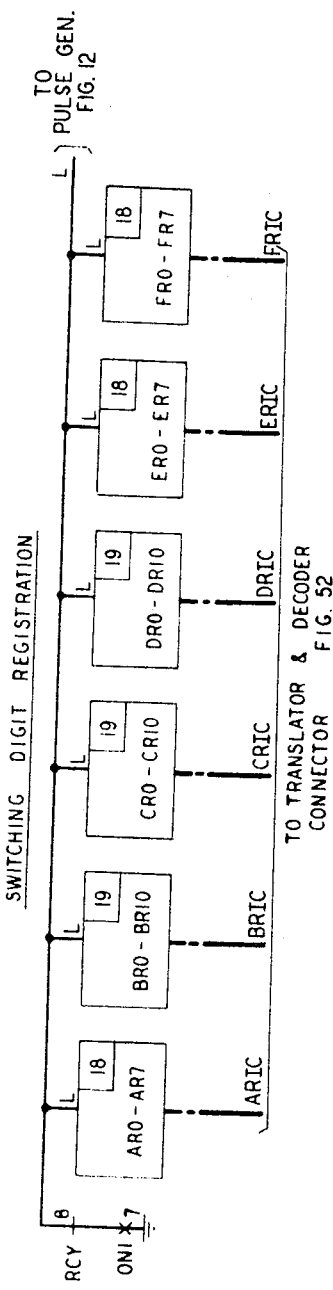
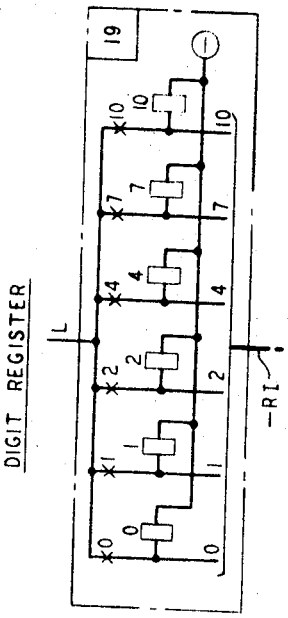
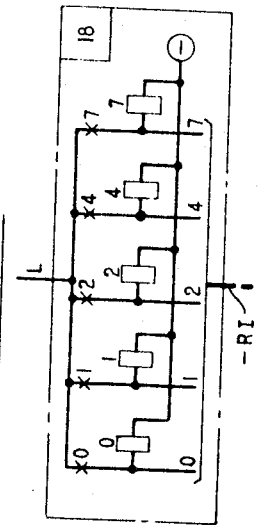

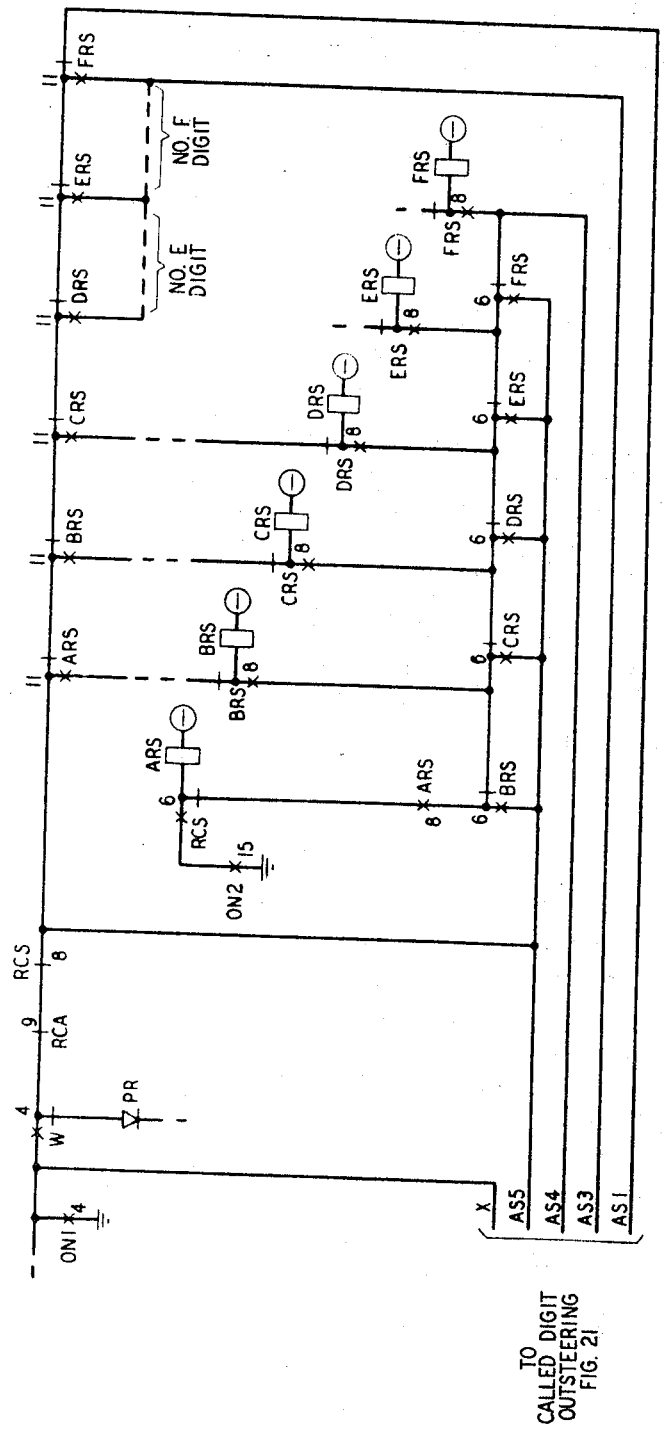

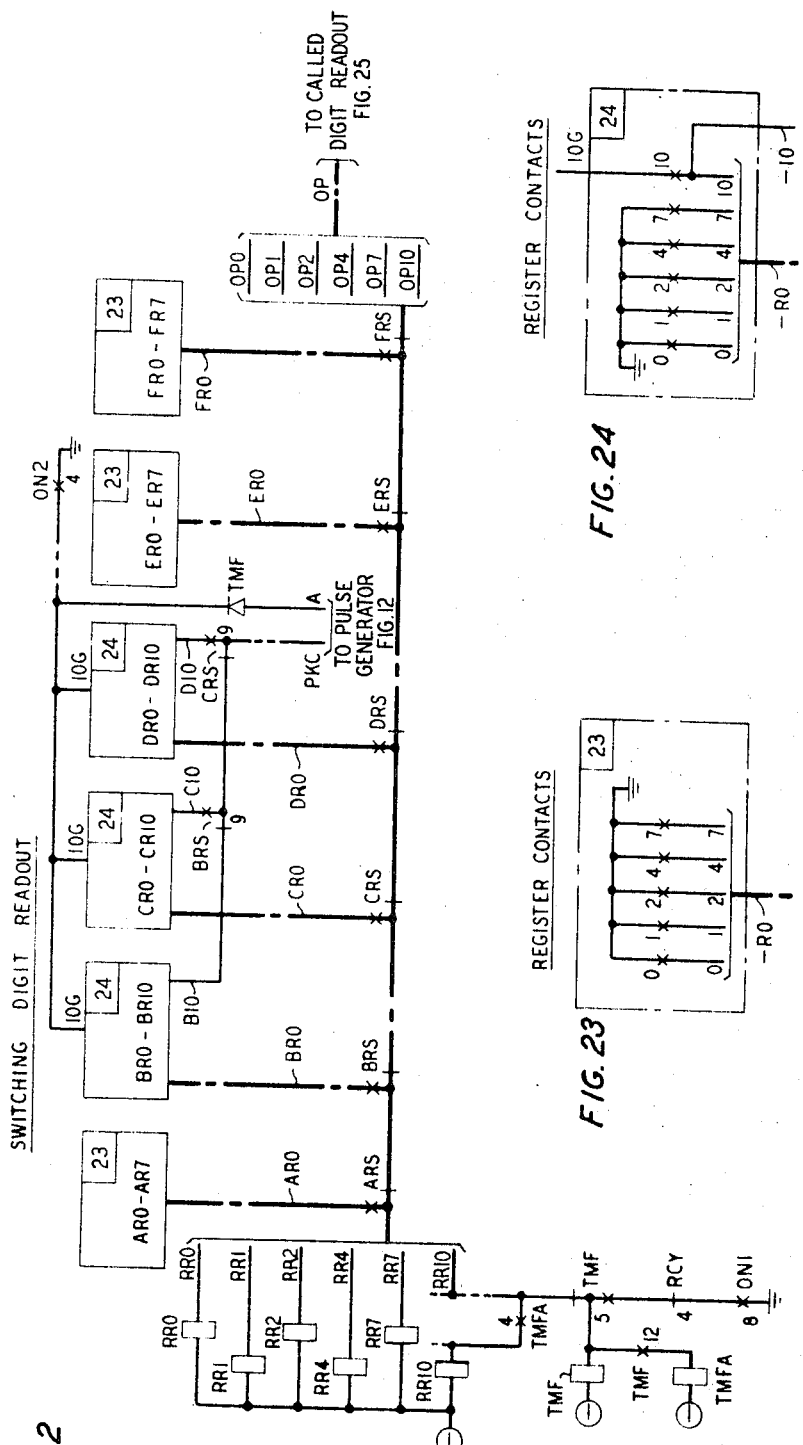

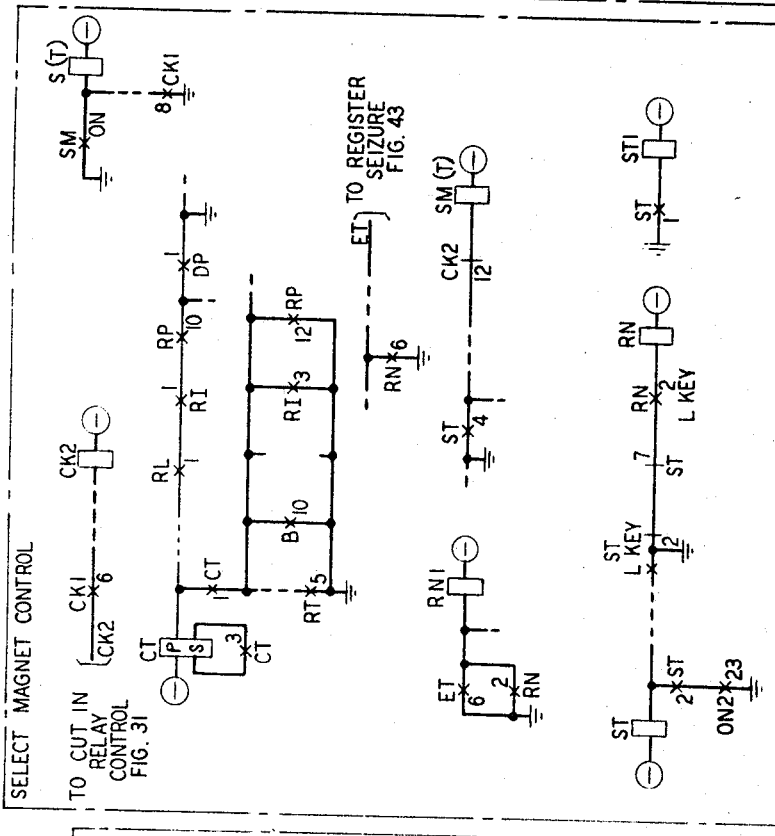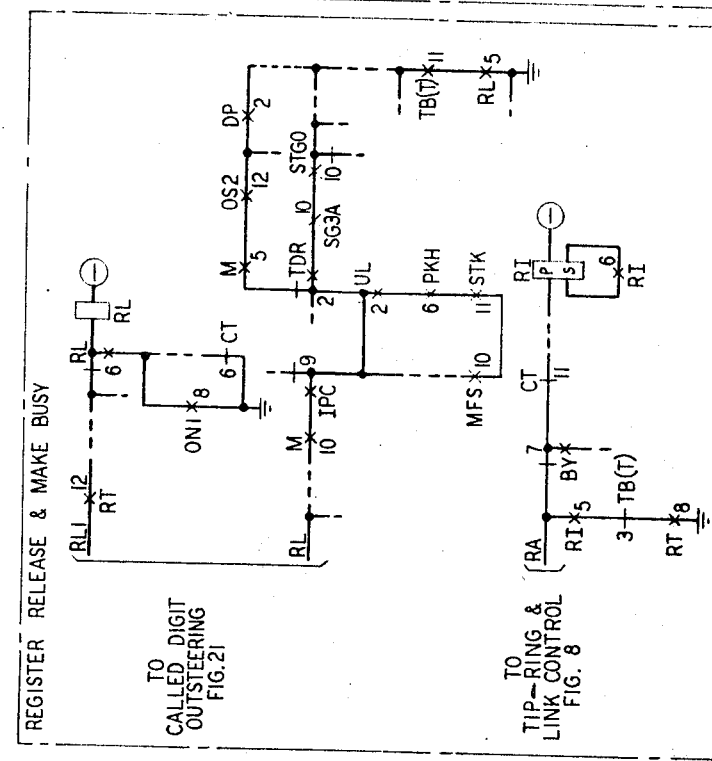
FIG. 34

FIG. 42

3,446,921
SWITCHING SYSTEM TESTING
Frank G. Denend, Middletown, N.J., assignor to Bell
 Telephone Laboratories, Incorporated, New York, N.Y.,
 a corporation of New York
Filed Mar. 3, 1966, Ser. No. 531,577
Int. Cl. H04m 3/30, 3/32
U.S. Cl. 179—175.23          13 Claims This invention relates generally to switching system testing and more particularly to the testing of register-senders in such systems.

There are many types of switching systems wherein the term "register-sender" per se is not necessarily used but wherein a comparable system component exists. What is referred to herein by that term is any such circuitry which involves at least the two functions of receiving or registering or recording and of sending or outpulsing or controlling. For instance, in crossbar telephone switching systems, such as disclosed in Busch Patent 2,585,904 of Feb. 19, 1952, Gooderham et al. Patent 2,868,884 of Jan. 13, 1959, and Carpenter Patents 2,089,921 of Apr. 10, 1937, and 2,235,803 of Mar. 18, 1941, various senders are used for registering called data and for performing switching or outpulsing functions according to such data. In the older panel telephone switching system, such as disclosed in Dodge Patent 1,531,080 of Mar. 24, 1925, Roberts Patent 1,840,132 of Jan. 5, 1932, Lundell Patent 1,550,377 of Aug. 18, 1925, Stearn Patent 1,505,171 of Aug. 19, 1924, and Raymond-Scully Patent 1,862,549 of June 14, 1932, senders are similarly provided for comparable purposes. Also, step-by-step telephone systems using common control, such as directors, register-senders, register-outpulsers, and the like, are well known: one such system is disclosed in Riddell Patent 3,413,422 of Nov. 26, 1968.

In such switching systems, and other similar systems not specifically mentioned, it is generally the case that whenever a register-sender type of circuit receives address data or called data it is necessary for some type of translator or decoder circuit to be consulted for switching instructions whereby the register-sender may perform the switching control functions required to complete the switching job indicated by the address data. Sometimes, the register-sender embodies such a translator; and, often such translators are provided as separate components but common to a plurality of register-senders. In any switching system requiring such translation or decoding, the called data is supplied to the translator and the latter supplies to the register-sender switching instructions. These instructions can include, along with others perhaps, such data as information to be used in actually completing the desired switching connection in the instant switching office and information, if any, to be outpulsed or transmitted over the completed connection to an office or called location beyond the instant switching center.

It is desirable to test register-senders, from time to time, to ascertain the serviceability thereof. Particularly, it is desirable to find out if a register-sender is capable of receiving called data and of performing the proper switching functions relating thereto. Heretofore in the art of testing such system components it has been usual to run such tests on an over-all basis where the testing circuitry is concerned only with the input and the final result. In other words, a test of a register-sender has comprised the steps of (1) seizing a register-sender for test purposes, (2) transmitting thereto test address data, such, for example, as a typical seven-digit called telephone number, (3) and monitoring or checking the actual switching functions performed by the register-sender to ascertain whether or not the performance is correct. The latter generally includes, but is not necessarily limited to ascertaining whether the proper switching connection is or would be established and whether the proper sending or outpulsing, if any, does or would take place. If any deviation occurs from proper operation, the testing circuit will block and in some cases will cause a record to be made of the blocking circumstances. Such a record is used by maintenance personnel to diagnose the trouble.

At least one significant deficiency occurs in the aforementioned prior art type of testing arrangements. If a trouble is detected during the checking of the sending or outpulsing or switching function phase of the register-sender operation, it is not known, without additional testing, whether the register-sender failed due to a trouble within itself or whether it failed due perhaps to having been supplied with incorrect switching instructions from a route translator or the like. Most, if not all, register-senders will block if a translator provides them with a set of switching instructions which does not appear to be legitimate; however, such machines have no way of knowing whether a legitimate set of instructions is actually a correct set. A legitimate but incorrect set of switching data can arise due, for instance, to incorrect cross-connections in a translator or decoder. The latter causes a register-sender to proceed with its switching functions, which, however, will be incorrect because the register-sender has been given the wrong data. In prior art testing arrangements the true nature of the fault can be ascertained but additional testing is required to do so.

In a testing arrangement according to the present invention the testing circuit performs all of the testing steps in the prior art but includes an additional step. In the present arrangement, the testing circuit will not allow the register-sender to proceed with its switching functions unless the switching data derived by the register-sender from the test address data is not only legitimate but also correct. This additional testing step in the middle of an over-all register-sender test enables maintenance personnel to be alerted at once upon the occurrence of a translating error. This precludes the necessity of waiting for the error to show up during the switching function phase with the resulting necessity of more complicated diagnosis and additional testing to locate the difficulty.

The general object of the present invention is to improve the art of register-sender testing.

A particular object of the present invention is to incorporate in an over-all test of a register-sender the additional step of checking the correctness of switching data derived from address data.

Another particular object of the present invention is to control the advance of a register-sender test beyond the address-data-to-switching-data derivation or translation phase depending upon whether or not the derivation or translation was properly completed.

Another particular object of the present invention is to allow a register-sender test to continue beyond the address-data-to-switching-data derivation or translation phase only if the derived switching data is not only legitimate but also correct.

The disclosed exemplary embodiment of the invention is a comon control step-by-step telephone switching system wherein is provided an automatic testing circuit for testing, among other things, the performance of originating register-outpulser controllers, which are of the register-sender family of telephone switching circuits. The aforementioned Riddell disclosure shows the details of a common control step-by-step telephone switching system. The present disclosure embodies portions of the Riddell disclosure and additional disclosure of an automatic testing circuit whereby the construction and operation of an exemplary embodiment of the present invention can readily be understood.

In the exemplary telephone switching system of the present disclosure a Register Trunk and Link circuit (see Patent 3,159,716 to G. Riddell and C. A. Throckmorton of Dec. 1, 1964) is interposed between a usual Line Finder and First Selector arrangement in the well-known step-by-step switching system. By means of such a link an Originating Register-Outpulsing Controller (referred to herein as a register-outpulser), which is of the register-sender type of common control, is seized to serve a calling subscriber. The register-outpulser may have associated therewith TOUCH-TONE Receiver-Converter circuitry for decoding and registering the well-known multifrequency TOUCH-TONE (TT) pulses received from such a subscriber. Also, the register-outpulser embodies the usual dial pulse (DP) counting and registering circuitry whereby the usual dial pulse customer's calls may be processed. As soon as a predetermined number of called digits (usually three, exclusive of any special prefix) have been registered, the register-outpulser consults a Translator-Decoder to ascertain the proper routing for the call. The translator-decoder, which may be common to a number of register-outpulsers, receives the digits from the register-outpulser, translates them into a set of switching instructions or data, and transmits such switching data back to the register-outpulser. If a legitimate set of switching data is registered in the register-outpulser, the translator-decoder will be released and the register-outpulser will proceed to control the outgoing switch train, and to outpulse beyond where required, in accordance with the switching data. When the switching functions are completed, the register-outpulser will release, leaving the register-trunk and link circuit in a cut-through condition between the line finder and first selector.

The present disclosure includes an Automatic Testing circuit for testing, among other aspects of the switching circuitry, the proper operation of register-controllers. The testing circuit includes means for seizing a register-controller for test purposes and for transmitting thereto a set of test address data such as a typical called number of seven digits, which digits can be sent by TT or DP signaling. The testing circuit includes means for ascertaining whether or not the register-outpulser performs the required switching functions, including any necessary DP signaling to simulate setting the outgoing switch train and any necessary DP or MF signaling subsequent to simulated outgoing trunk seizure. The testing circuit also monitors the switching data returned to the register-outpulser by the translator-decoder to determine whether such data is correct. The register-outpulser will be permitted to advance to its switching functions only if such data is not only legitimate but also correct.

One feature of the present invention is the provision of settable means in the testing circuit for establishing a set of test address data and a correct set of switching data pertinent thereto and means for checking the accuracy of translator-decoder translation during an overall test of the register-outpulser.

Another feature of the present invention is the provision in the testing circuit of means for comparing a legitimate set of switching data supplied from a translator-decoder circuit with the correct set thereof, as determined by the settable means of the testing circuit.

Another feature of the present invention is the provision of means for preventing the release of the translator-decoder incident to registration in the register-outpulser of a legitimate set of switching data until such time as that legitimate set has been ascertained by the testing circuit to be correct.

Another feature of the present invention is the provision of means for intercepting the normal operational release signal exchanged between the register-outpulser and the translator-decoder upon registration in the register-outpulser of a legitimate set of switching data, and for utilizing such intercepted signal to initiate the comparison testing of the registered set of data against the correct set thereof.

Other objects and features will be apparant to those skilled in the art from the teachings of the present disclosure, with respect to which the drawings are describable briefly as follows:

FIG. 1 is a block diagram of a common control step-by-step telephone switching system such as in the above-mentioned Riddell disclosure;

FIG. 2 is a block diagram of a portion of the system of FIG. 1 and illustrates the general relationship of those major circuit components of FIG. 1 necessary for an understanding of the present invention;

FIG. 3 illustrates how FIGS. 4 through 56 may be arranged to show the relationship of FIG. 2 in circuit detail;

FIG. 4 shows the circuit relationship of a typical Line Circuit and a typical Line Finder;

FIG. 5 shows important parts of a Register Trunk and Link Circuit such as in the above-mentioned Riddell-Throckmorton disclosure;

FIGS. 7 through 26 show portions of an Originating Register-Outpulsing Controller (referred to as a Register-Outpulser);

FIGS 27 through 51 show details of an Automatic Testing Circuit;

THE DESCRIPTION ARRANGEMENT

The description to follow is arranged according to the following outline:

Introduction
    Circuit Conventions
    Circuit Symbols
Brief description
    Block diagram (FIG 1.)
    Block diagram (FIG. 2)
    Functional system parts (FIG. 3)
Detailed description (FIGS. 4 through 56)
    Preparation for Register-Outpulser Test
    Seizing register-outpulser
    Registering test address data
    Translator-decoder seizure
    Deriving switching data
    Comparing switching data
    Translator-decoder release
    Checking switching functions
    Release of register-outpulser

INTRODUCTION

At the outset it is considered advisable to explain some conventions and symbols used throughout the circuitry.

*Circuit conventions*

Figure 8:
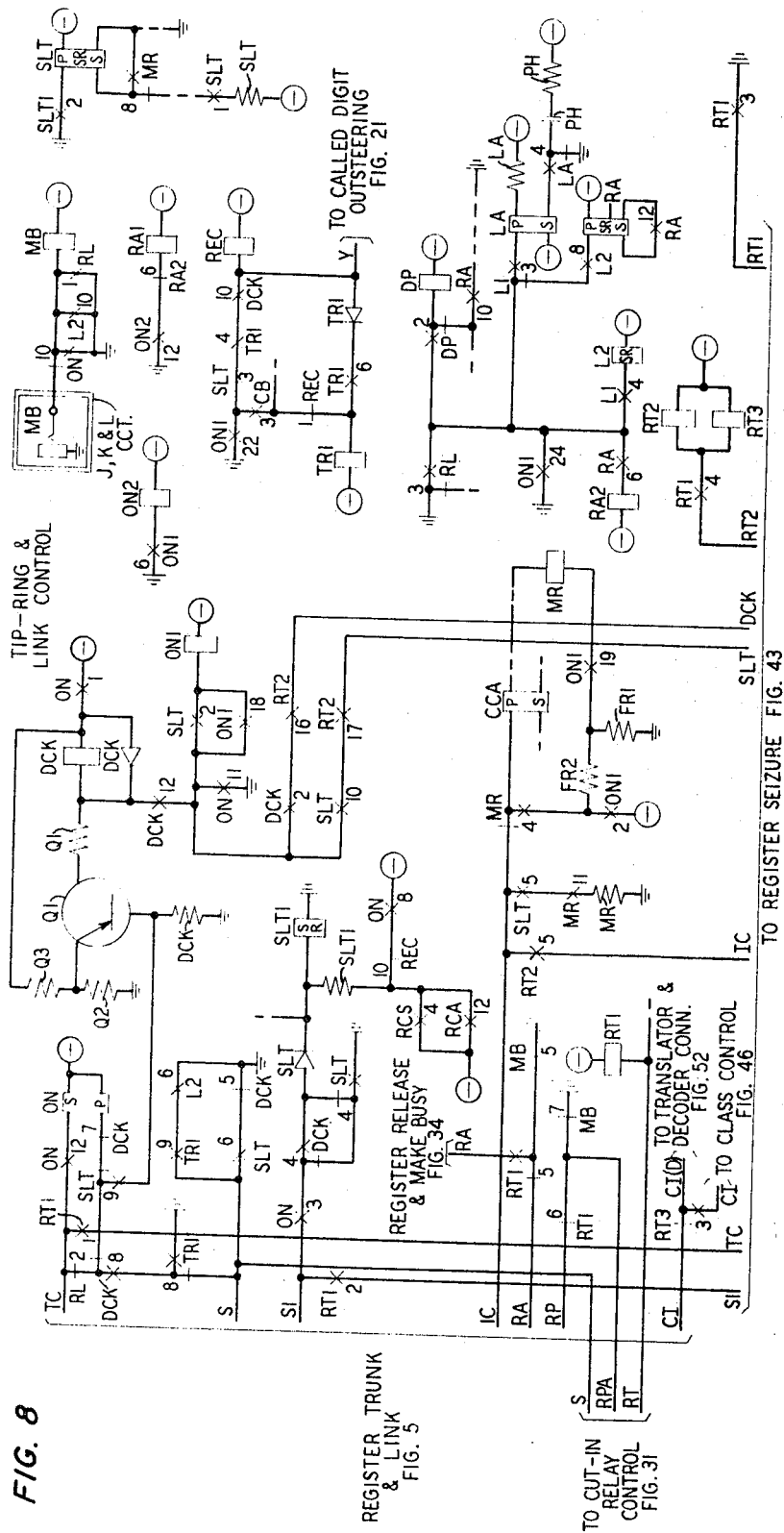

Generally the detached contact type of schematic is used wherein the contacts controlled by a relay winding are not necessarily physically attached to or associated on the drawings with the winding itself. For instance, in FIG. 8 the winding of the SLT relay is shown in the top right of the sheet and various contacts controlled by the SLT relay appear on FIG. 8 at different places and appear on different sheets of the drawing. On FIG. 8, in circuit with the bottom winding of relay SLT is an X appearing on the lead from resistance SLT. This X is marked with a 1 and with the letters SLT, indicating the No. 1 contact controlled by the relay winding SLT and indicating a make or front contact which is open when relay SLT is released and closed when relay SLT is operated. Also in the upper right portion of FIG. 8 is the winding of relay REC. In circuit with the winding of relay REC is a short dash line marked with a 3 and with the letters SLT, indicating the No. 3 contact controlled by the winding SLT and indicating a break or back contact which is closed when relay SLT is released and open when relay SLT is operated. In the upper left portion of FIG. 8, in circuit with the lower winding of relay ON is shown an X and a short dash line marked with a 9 and with the letters SLT. This indicates a set of transfer contacts controlled by relay SLT and which may be referred to as make or front contact 9 and break or back contact 9 of relay SLT. Immediately below is set forth a collection of relay tables indicating the drawing location of each relay winding for each of the major circuit components of the detailed disclosure.

Line Circuit and Line Finder (FIG. 4)

| Relay | Function | FIG. |
|---|---|---|
| CO | Line Cut-off | 4 |

Register Trunk and Link (FIG. 5)

| Relay | Function | FIG. |
|---|---|---|
| BC | Battery Control | 5 |
| GC | Ground Control | 5 |
| HG | Horizontal Group | 5 |
| PHML, PHMR | Primary Hold Magnet | 5 |
| PSM | Primary Select Magnet | 5 |
| RB(L) | Register Available | 5 |
| RD | Dial Pulse Register | 5 |
| RP(L) | Register Preference | 5 |
| RT(L) | TOUCH-TONE Register | 5 |
| S | Register Selected | 5 |
| SCK | Selection Check | 5 |
| SHML, SHMR | Secondary Hold Magnet | 5 |
| SK | Secondary Switch Check | 5 |
| SSM | Secondary Select Magnet | 5 |
| TB | Trunk Busy | 5 |
| TP | Trunk Preference | 5 |

Figure 6:
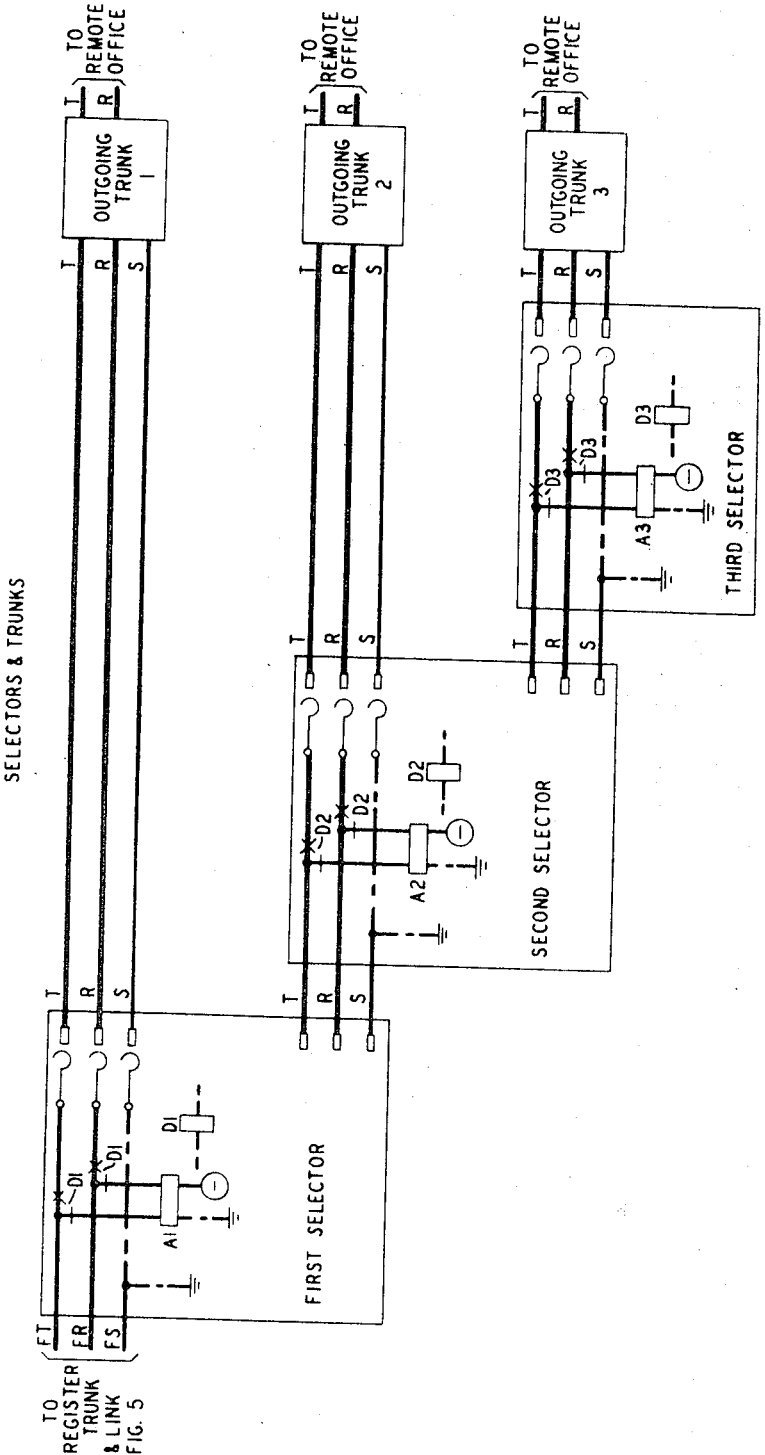
FIG. 6 shows the circuit relationship of typical Selectors and Outgoing Trunks in an outgoing switch train.

Selectors (FIG. 6)

| Relay | Function | FIG. |
|---|---|---|
| A- | Line | 6 |
| D- | Cut-through | 6 |

Register-Outpulser (FIGS. 7 to 26)

| Relay | Function | FIG. |
|---|---|---|
| A0-7 | A-Called Digit | 15 |
| AR0-7 | A-Arbitrary Switching Digit | 17 |
| ARA | Alternate Route Available | 9 |
| ARS | A-Arbitrary Digit Steering | 20 |
| B0-7 | B-Called Digit | 15 |
| BR0-10 | B-Arbitrary Switching Digit | 17 |
| BRS | B-Arbitrary Digit Steering | 20 |
| C0-7 | C-Called Digit | 15 |
| CB | Continuity Test | 7 |
| CCA | Coin Control | 8 |
| CR0-10 | C-Arbitrary Switching Digit | 17 |
| CRS | C-Arbitrary Digit Steering | 20 |
| D0-7 | D-Called Digit | 15 |
| DCK | Double Connection Check | 8 |
| DL3 | Delete Three Digits | 9 |
| DP | Rotary Dial Call | 8 |
| DR0-10 | D-Arbitrary Switching Digit | 17 |
| DRS | D-Arbitrary Digit Steering | 20 |
| E0-7 | E-Called Digit | 15 |
| ER0-7 | E-Arbitrary Switching Digit | 17 |
| ERS | E-Arbitrary | 20 |
| F0-7 | F-Called Digit | 15 |
| FR0-7 | F-Arbitrary Switching Digit | 17 |
| FRS | F-Arbitrary Digit Steering | 20 |
| G0-7 | G-Called Digit | 15 |
| IC | Interdigital Timing Control | 11 |
| IS1-8 | In Digit Steering | 14 |
| L1 | Line Supervisory | 7 |
| L2 | do | 8 |
| LA | do | 8 |
| LT | Loop Test | 7 |
| MB | Make Busy | 8 |
| MR | Message Rate | 8 |
| ON | Off-normal | 8 |
| ON1 | do | 8 |
| ON2 | do | 8 |
| OS1-7 | Out Digit Steering | 21 |
| P1-5 | Out Digit Pulse Count | 11 |
| PG1 | Pulse Generator | 12 |
| PG2 | do | 12 |
| PKC | Partial Dial Check | 14 |
| RA | Register Advance | 8 |
| RA1 | do | 8 |
| RA2 | do | 8 |

Register-Outpulser (FIGS. 7 to 26)—Continued

| Relay | Function | FIG. |
|---|---|---|
| RCA | Recycle | 9 |
| RCA1 | do | 9 |
| RCS | Recycle Steering | 9 |
| RCY | Recycle Control | 9 |
| REC | Receiver Cut-through | 8 |
| RK | Registration Check | 13 |
| RL | Release | 21 |
| RV | Reversal | 7 |
| RR0-10 | Digit Readout | 22 |
| RT1 | Register Test | 8 |
| RT2 | do | 8 |
| RT3 | do | 8 |
| SD0 | Sender Class | 9 |
| SG | Stop-Go | 9 |
| SG1 | do | 9 |
| SLT | Sleeve Lead Test | 8 |
| SLT1 | do | 8 |
| STGO | Prepare Stop-Go | 8 |
| ST | Start Pulse Steering | 9 |
| ST1 | End of MF Pulsing | 21 |
| STR | In Digit Steering | 21 |
| TDR | Translator-Decoder Release | 14 |
| TDSA | Translator-Decoder Start | 9 |
| TDST | do | 9 |
| TMF | Transfer to MF Pulsing | 9 |
| TMFA | do | 22 |
| TMF1 | do | 22 |
| TMF2 | do | 12 |
| TR1 | Verification Check | 12 |
| W | Interdigital Time Control | 8 |
| Z | do | 13 |
| 7DG | Seven Digit Call | 9 |

Automatic Test (FIGS. 27 to 51)

| Relay | Function | FIG. |
|---|---|---|
| A | Line (simulates selector) | 42 |
| AA | Line Auxiliary | 42 |
| ARA | Alternate Route Avaialble | 27 |
| AR0-7 | A-Exit Digit | 28 |
| ARS | A-Exit Digit Steering | 35 |
| B | B Relay (simulates selector) | 42 |
| BAT | Battery Supply | 49 |
| B1 | B Auxiliary | 42 |
| BR0-10 | B-Exit Digit | 27, 28 |
| BRS | B-Exit Digit Steering | 35 |
| BY | Register Busy | 43 |
| BY1 | Register Busy Auxiliary | 43 |
| CF | Close Fundamental | 49 |
| CK1 | XP-Relay Check | 31 |
| CK2 | XP-Relay Check Auxiliary | 34 |
| CK2(R) | Check | 50 |
| CK3(R) | do | 50 |
| CL | Class (simulates calling trunk class) | 46 |
| CR0-10 | C-Exit Digit | 27, 30 |
| CRS | C-Exit Digit Steering | 35 |
| CT | Circuit Tested | 34 |
| DAD | Delete All Digits | 27 |
| DCA | Decoder Connector | 38 |
| DCB | do | 38 |
| DCK | Double Connection Check | 43 |
| DCN | Decoder Connection | 38 |
| DK | Digit Check | 41 |
| DL1 | Delete One Digit | 27 |
| DL2 | Delete Two Digits | 27 |
| DL3 | Delete Three Digits | 27 |
| DL6 | Delete Six Digits | 27 |
| DP | Dial Pulse (type of circuit under test) | 31 |
| DR0-10 | D-Exit Digit | 27, 30 |
| DRS | D-Exit Digit Steer | 35 |
| EOP | End of Outpulsing | 37 |
| ER0-7 | E-Exit Digit | 33 |
| ERS | E-Exit Digit Steer | 35 |
| ET | End of Test | 43 |
| FR0-7 | F-Exit Digit | 33 |
| FRS | F-Exit Digit Steer | 35 |
| HM | Hold Magnet(s) | 42 |
| IP1-5 | Inpulse Count | 38 |
| IP2A | Inpulse Count Auxiliary | 38 |
| IPC | Inpulsing Complete | 36 |
| IS1-11 | In steering | 35, 36 |
| KG | Ground Check | 49 |
| KP | Key Pulse | 49 |
| KP1 | do | 49 |
| KP2 | do | 49 |
| LBD | Local Block | 47 |
| LK | Lock | 49 |
| M | Match | 38 |
| MFC | MF Check | 47 |
| MFK0-10 | MF Read | 49 |
| MFS | MF Switch | 47 |
| MR0-10 | Inpulse Readout | 39 |
| ON | Off-normal | 43 |
| ON1 | Off-normal Auxiliary | 43 |
| ON2 | do | 43 |
| OS1-11 | Outsteer | 37 |
| P1-5 | Outpulse Count | 41 |
| PG1 | Pulse Generator | 46 |
| PG2 | Pulse Generator Auxiliary | 46 |
| PK | Pulse Check | 47 |
| PKH | do | 47 |
| PKL | Pulse Check Lock | 49 |
| PTC | Party Test Complete | 43 |
| Q | Signal Present | 49 |

Automatic Test (FIGS. 27 to 51)—Continued

| Relay | Function | FIG. |
|---|---|---|
| RA | Register Advance | 42 |
| RA1 | Register Advance Auxiliary | 42 |
| RCA | Recycle Advance | 38 |
| RI | Register Idle | 34 |
| RCY | Recycle | 27 |
| RCY1 | Recycle Auxiliary | 27 |
| RK | Outpulse Readout Check | 41 |
| RL | Release | 34 |
| RN | Return to Normal | 34 |
| RN1 | do | 34 |
| RP | Register Present | 43 |
| RR0-7 | Outpulse Readout | 45 |
| RT | Register Test | 43 |
| RV(T) | Reverse | 42 |
| S(T) | Select Magnet Operated | 34 |
| SAR | A-Exit Digit Present | 40 |
| SBR | B-Exit Digit Present | 40 |
| SCR | C-Exit Digit Present | 40 |
| SDO | Sender Operation | 27 |
| SDOA | Sender Operation Auxiliary | 27 |
| SDR | D-Exit Digit Present | 44 |
| SER | E-Exit Digit Present | 44 |
| SFR | F-Exit Digit Present | 44 |
| SG(T) | Stop-go | 35 |
| SG1(T) | do | 42 |
| SG2 | do | 42 |
| SG3 | do | 42 |
| SG3A | do | 42 |
| SLF | Sleeve (line finder) | 43 |
| SLF2 | Sleeve Auxiliary | 43 |
| SM | Select Magnet(s) | 34 |
| SP | Signal Present | 50 |
| ST | Start | 34 |
| ST1 | Start Auxiliary | 34 |
| STF | Start Frequency | 36 |
| STGO | Stop-Go | 27 |
| STK | Start Frequency Check | 47 |
| STT | Start Timing | 48 |
| TB(T) | Test Battery | 43 |
| TD | Tone Detector | 42 |
| TDK | Translator-Decoder Check | 32 |
| TDR | Translator-Decoder Release | 38 |
| TDRA | Translator-Decoder Release Auxiliary | 38 |
| TDSA | Translator-Decoder Start | 38 |
| TDST | do | 38 |
| TM2 | Timing | 48 |
| TO | Time-out | 47 |
| TOK | Time-out Check | 47 |
| TP(T) | Trunk Link Preference | 43 |
| UL | Unit Lock | 49 |
| W | W (digit outpulse check) | 41 |
| XP0 | Crosspoint (Register 0) | 31 |
| XP1 | Crosspoint (Register 1) | 31 |
| XP2 | Crosspoint (Register 2) | 31 |
| XPC | Double Crosspoint | 43 |
| Z | Z (interdigital timing) | 41 |
| 0-10 | Channel Relay | 50, 51 |
| 3DG | 3-Digit Call | 27 |
| 4DG | 4-Digit Call | 27 |
| 5DG | 5-Digit Call | 27 |
| 7DG | 7-Digit Call | 27 |
| 10DG | 10-Digit Call | 27 |

Figure 52:
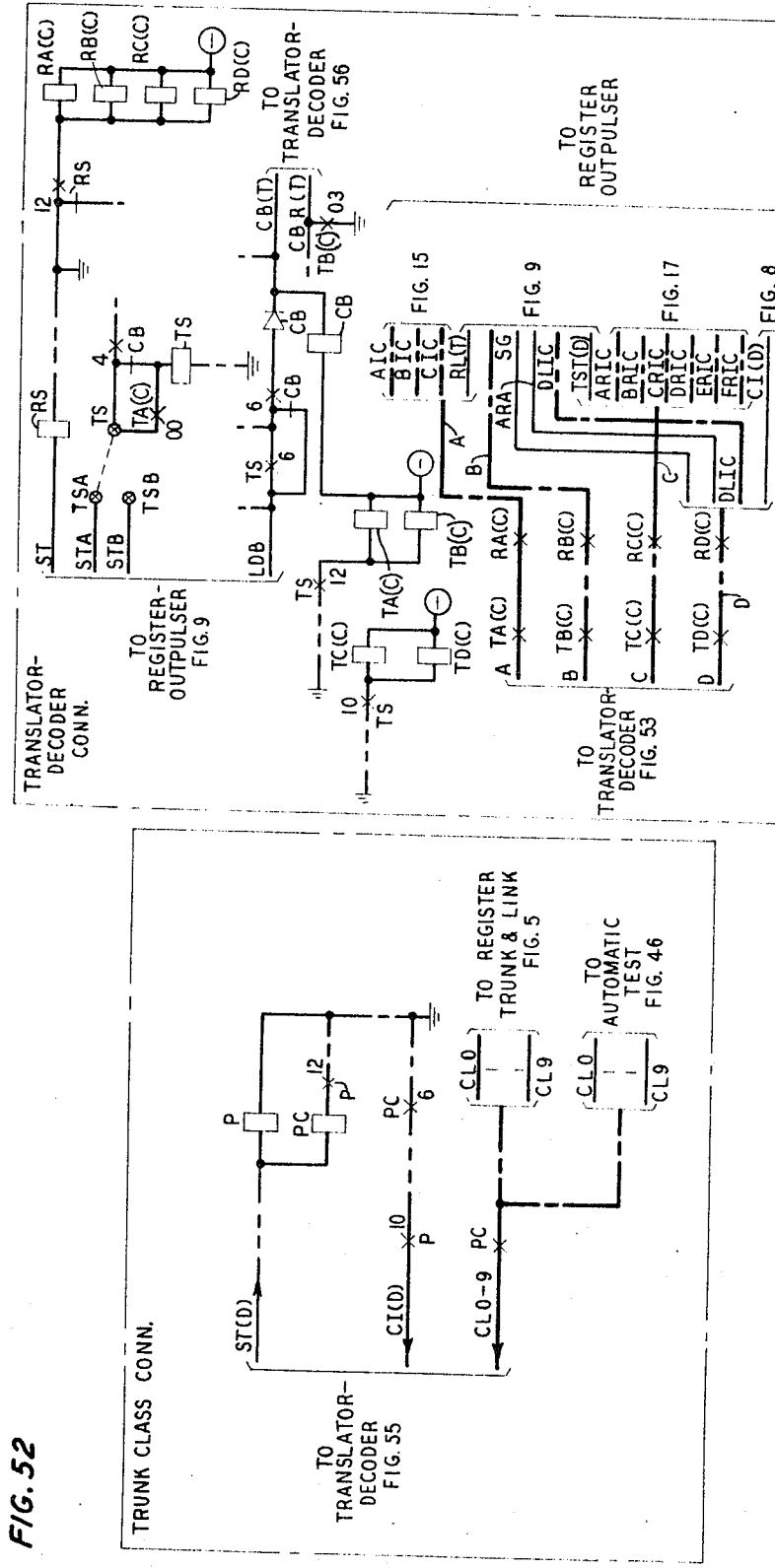
FIG. 52 shows significant details of a Translator-Decoder Conector and of a Trunk Class Conector; and, FIGS. 35 through 56 show details of a Translator and a Decoder arranged as a combined Tranlator-Decoder.

Translator-Decoder Connector (FIG. 52)

| Relay | Function | FIG. |
|---|---|---|
| CB | Connecting Circuit (Translator) Busy | 52 |
| RA(C)-RD(C) | Register-Outpulser Connector | 52 |
| RS | Register Start Preference | 52 |
| TA(C)-TD(C) | Translator-Decoder Connector | 52 |
| TS | Translator Start Preference | 52 |

Trunk Class Connector (FIG. 52)

| Relay | Function | FIG. |
|---|---|---|
| P | Decoder Preference | 52 |
| PC | Decoder Connector | 52 |

Translator-Decoder (FIGS. 53 to 56)

| Relay | Function | FIG. |
|---|---|---|
| ARA(D) | Alternate Route Available | 56 |
| ARAK | Alternate Route Available Check | 55 |
| ARK1, ARK2 | A-Arbitrary Digit Check | 53 |
| BRK1, BRK2 | B-Arbitrary Digit Check | 53 |
| CB(T) | Circuit Busy | 56 |
| CL0-9 | Class | 55 |
| CRK1, CRK2 | C-Arbitrary Digit Check | 54 |
| CS0 | Class Screening | 55 |
| DGK | Number of Digits Check | 55 |
| DLK | Delete Digits Check | 55 |
| DRK1, DRK2 | D-Arbitrary Digit Check | 54 |
| ERK1, ERK2 | E-Arbitrary Digit Check | 54 |
| FRK1, FRK2 | F-Arbitrary Digit Check | 55 |
| NAR | No Alternate Route | 56 |
| ON(D) | Off-normal | 56 |
| ON(T) | do | 55 |
| PCK | Pulsing Class Check | 53 |
| R00-R79 | Route | 53 |
| RB(D) | Route Battery | 53 |
| RL(T) | Release | 56 |
| RS00 | Route Supplementary | 56 |
| SG(D) | Multifrequency Pulsing | 56 |
| TST(D) | Test Call | 53 |

The following two tables indicate the drawing location of keys and switches of the Automatic Test Circuit of FIGS. 27 through 51. With regard to the keys, the functional designation applies when the pertinent key is operated.

| Key | Function | FIG. |
|---|---|---|
| ARA | Alternate Route Available | 29 |
| BR10 | B-Exit Digit Includes 10 Signal | 29 |
| CPT | Cancel Party Test | 43 |
| CR10 | C-Exit Digit Includes 10 Signal | 29 |
| DAD | Delete All Digits | 29 |
| DL1 | Delete One Digit | 29 |
| DL2 | Delete Two Digits | 29 |
| DL3 | Delete Three Digits | 29 |
| DL6 | Delete Six Digits | 29 |
| DR10 | D-Exit Digit Includes 10 Signal | 29 |
| MFKP | Multifrequency Keypulsing | 46 |
| RN | Return to Normal | 34 |
| SDO | Sender Operation | 29 |
| ST | Start | 34 |
| STGO | Stop-Go | 29 |
| 3DG | 3-Digit Call | 29 |
| 4DG | 4-Digit Call | 29 |
| 5DG | 5-Digit Call | 29 |
| 7DG | 7-Digit Call | 29 |
| 10DG | 10-Digit Call | 29 |

| Switch(s) | Function | FIG. |
|---|---|---|
| A | A-Called Digit | 39, 45 |
| B-H, J-L | B-H, J-L-Called Digit | 37, 39, 45 |
| AR, BR | A, B-Arbitrary Exit Digit | 28, 40 |
| CR | C-Arbitrary Exit Digit | 30, 40 |
| DR | D-Arbitrary Exit Digit | 30, 44 |
| ER, FR | E, F-Arbitrary Exit Digit | 33, 44 |
| CLU | Trunk Class | 46 |

A small dash line (or minus sign) inside of a circle, such as connected to the right-hand terminal of the ON1 relay winding in FIG. 8, indicates the negative terminal of a direct-current power source, such as a 48-volt battery, it being understood that the positive terminal is grounded.

Cabled contacts are used to save space. On FIG. 15, for instance, the cable AI (including five conductors as shown in FIG. 16) is shown extending over a single make contact of relay IS1. This indicates five separate make contacts of relay IS1, one make contact for each of the five leads in the cable AI.

Dotted lines in some cases indicate the presence of additional circuitry not of immediate interest. For instance, in FIG. 8 the windings of relays CCA and MR are interconnected by a line including a dotted portion. This indicates the presence of additional circuitry which is of no particular interest at the moment.

Circuit symbols

In the lower left part of FIG. 5 is shown a representation of a cross bar switch array wherein, as is well known, a multicontact crosspoint is closed by the operation of a select magnet such as PSM, followed by the operation of a hold magnet such as PHMR. The horizontal and vertical wires of the crossbar switch are shown by horizontal and vertical lines ending in small circles. The X at the intersection of a pair of such coordinate wires indicates a crosspoint, in this particular case representing a six-wire switch or a six-contact crosspoint.

In some cases a dotted line is used to indicate the repetitive nature of a circuit or group of circuits, the details of which have been shown at least once. For instance, in the upper right-hand portion of FIG. 55 two relays CL0 and CL9 have been shown connected by a dotted line. This indicates that relay CL1 through CL8 are also present and with circuit arrangements similar to those of the windings CL0 and CL9 which are shown.

Figure 7:
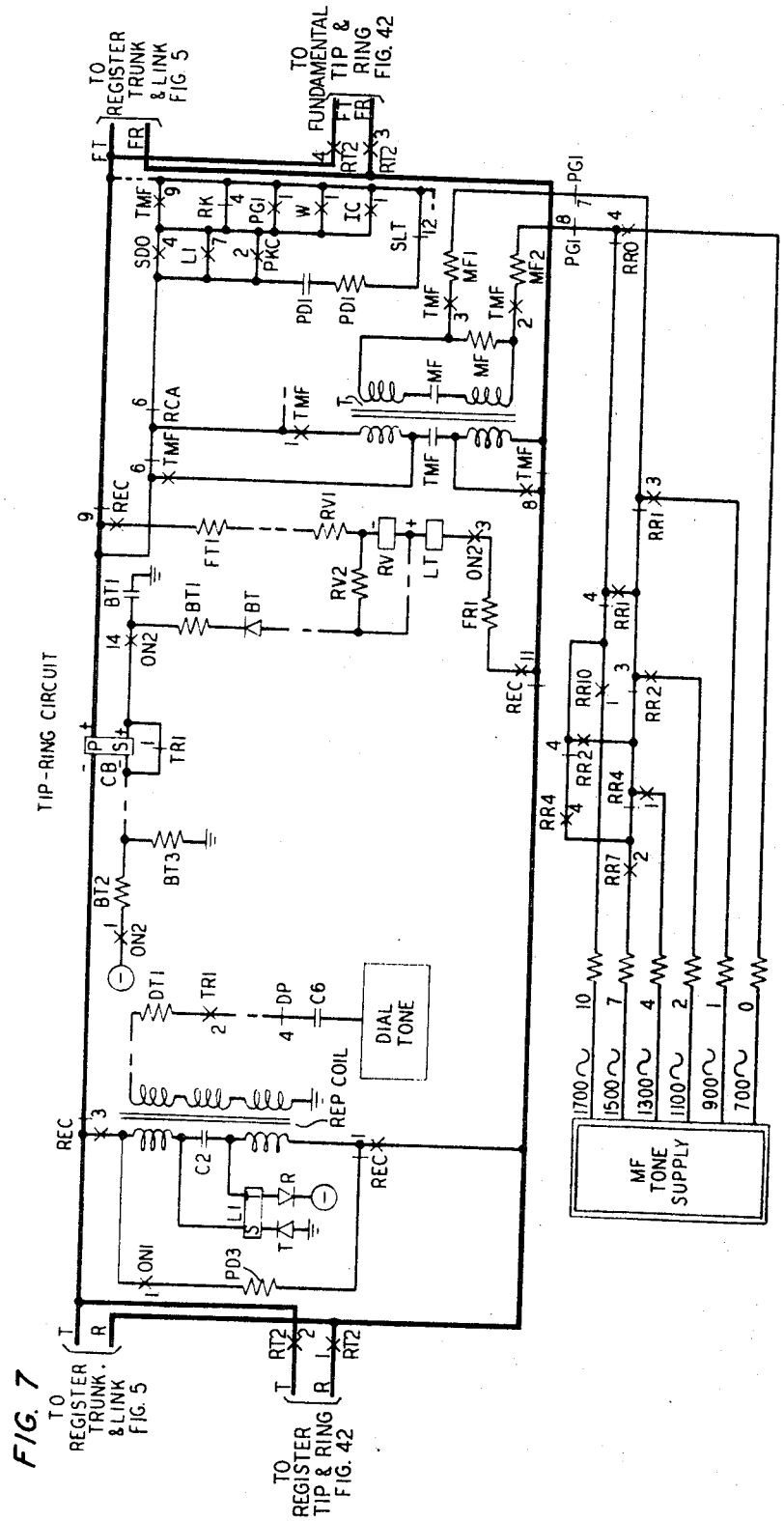

Double line boxes, such as the one shown in FIG. 7 and marked "MF TONE SUPPLY," indicate circuits not part of the one shown. In some instances, such as the one referred to, no details are shown inside of the box since the content may be any known such circuit. In other cases some circuit details may be shown where pertinent to the detailed circuit description.

Single line boxes are generally used to indicate functional groups of circuits or parts of a circuit. Again details are shown or not inside the boxes depending on whether or not such information is considered pertinent. For instance in FIG. 7 the box marked "DIAL TONE" is considered as self-explanatory, as is the box in FIG. 42 marked "TONE DET" which can be any circuit for accomplishing the detection of a particular frequency of tone. In some instances the details of a single line box are shown elsewhere, such as in FIG. 28 with respect to the box marked "BR SWITCH" which is shown with a small number 28 in the upper right-hand corner, thereby indicating that this box includes the same circuitry as the one immediately above it with respect to the AR switch. Similarly, the CR, DR, ER and FR switches of FIGS. 30 and 33, with the similar notation 28 in the upper right-hand corner, include the same details as the AR switch of FIG. 28. Another illustration of the use of circuit symbols is found in FIGS. 17, 18 and 19 wherein the switching digit registration circuit of FIG. 17 is shown completely in box form with the individual boxes marked with a number 18 or a number 19 in the upper right-hand corner thereof. These numbers refer to FIGS. 18 and 19 which show the details of the circuitry in these individual boxes.

With reference to FIGS. 4 and 6 a typical line circuit and line finder are shown in FIG. 4 and typical selectors are shown in FIG. 6. This rather symbolic showing of these well-known circuits is sufficient to afford an understanding of the present invention.

BRIEF DESCRIPTION

The brief description of the disclosed embodiment will be handled below in three parts: the first part will consist of a brief functional description of the operational system as shown in the block diagram of FIG. 1; the second portion will refer to FIG. 2 and will consist of a brief functional description of the testing aspect as distinguished from the description of the operational circuitry; and, the third portion will consist of a brief description of each of the major functional parts of the system as outlined in the diagram of FIG. 3.

The specific situation to be described here and also later in connection with the detailed description is based upon the following assumptions: the calling party is using a rotary dial to transmit by dial pulse (DP) signaling the directory number 243-0123 of a desired called party in a remote office, access to which is available over outgoing trunk 3 from a third selector as indicated in FIG. 6; and the first three digits 243 are cross-connected in the translator-decoder to furnish the originating register-outpulsing controller with the following instructions:

(1) Delete the code 243 and use the three arbitrary exit digits 238 to seize a direct route trunk.

(2) The complete called address to be received will consist of seven digits.

(3) Release the switch train (selectors)—set by repeating thereto part or all of the dialed code 243—and reset the selector train with the exit code 238.

(4) Use DP signaling to effect trunk seizure.

(5) Stop outpulsing exit digits after the first two unless or until address code registration is complete.

(6) Expect a "STOP" condition upon trunk seizure.

(7) Delete three digits when outpulsing beyond.

(8) Outpulse beyond on a multifrequency (MF) basis the KP start pulse, then the four numericals (0123) followed by the ST stop pulse.

(9) An alternate route is available.

*Block diagram (FIG. 1)*

With reference to FIG. 1, the usual operation of a switching system according to the exemplary embodiment is as follows. When the calling party SUB goes off-hook, the usual line finder operation takes place to find the calling line, to cause the register trunk and link to select a suitable idle register-outpulser and connect it to the line finder, and to split the connection between the line finder and the first selector. The register-outpulser will thereupon return dial tone to the calling party SUB.

At this point a relay in the register-outpulser will respond to dial pulses, will cause the successively dialed digits to be registered therein, and will repeat the dial pulses to the first and succeeding selectors. At the end of the third dialed digit, a third selector will have been stepped vertically to the specified trunk hunting level and will cause its stepping circuitry to initiate a change-over from vertical to rotary stepping. While this selector action is taking place, and usually before rotary trunk hunting can become effective, the rest of the basic code conversion action takes place.

At the end of the third dialed digit, the register-outpulser will seek connection with an idle translator-decoder circuit to ascertain switching instructions. This operation, to be described presently, takes place very quickly so that actual seizure by the third selector of outgoing trunk 3 will not be effected. The register-outpulser transmits the first three digits (243) to the translator-decoder to which is also supplied, through the trunk class connector, class information used in the code conversion operation. The translator-decoder will transmit back to the register-outpulser the assumed information; namely, release the switch train, reset the selectors according to the arbitrary exit digits 238, do not actuate the third selector with the third exit digit 8 unless or until all dialed digits (243–0123) have been received in the register-outpulser, expect to find a stop-go condition upon seizing outgoing trunk 3, and then transmit over outgoing trunk 3 on an MF signaling basis the KP pulse followed by the four dialed numericals (0123) and the ST pulse—the register-outpulser having been instructed to delete three digits (the dialed 243 code) when outpulsing.

The translator-decoder and the trunk class connector will be released as soon as the above information is properly registered in the register-outpulser. The holding time of these circuits can be expected not to exceed perhaps 100 milliseconds (MS) which is hardly enough time for the third selector to start hunting for a trunk, let alone to actually cause seizure of one. Thus, the register-outpulser will receive the signal to release the switch train before any selection beyond can take place incident to the repeating of dialed digits into the selector train.

The register-outpulser will release the previously set selectors and will proceed with the selector resetting operation. Since the exit code contains three digits (238) the register-outpulser is permitted to set a first and a second selector according to the respective exit digits 2 and 3 independently of whether or not the calling party SUB has completed sending all seven address digits (243–0123) to the register-outpulser. Actually the very short holding time of the transistor-decoder will most likely expire before the calling party even dials the fourth digit. In any event, the first two exit digits are used without regard to completeness of address code registration. The third or last, or trunk seizure exit digit 8, is not permitted to be used to control the third selector until or unless address code registration is complete.

When address code registration becomes completed, the register-outpulser will control the third selector with the digit 8 and will expect to find a "STOP" condition on this trunk. This signal will prevent any further outpulsing until the trunk changes to a "GO" condition. At that time the register-outpulser will proceed to MF outpulse the KP signal, the four numericals (0123) of the address code—having deleted three digits thereof (243)—and the ST pulse. Having completed its registering and outpulsing functions, the register-outpulser will release, leaving the register trunk and link circuit cut-through between the line finder and the first selector.

Block diagram (FIG. 2)

In FIG. 2 an automatic test circuit is shown in the center of the figure with various functional connections therefrom to a register-outpulser, a translator-decoder, a trunk class connector, and a trouble ticketer. Also, a translator-decoder connector is shown connected to the register-outpulser, the translator-decoder, the trunk class connector and the trouble ticketer. Also, the trouble ticketer is shown connected to the trunk class connector. In the description to follow of the exemplary embodiment, the trouble ticketer circuitry is not shown; however, it will be appreciated by those skilled in the art that this circuitry performs in its usual manner when called upon. It will also be observed in FIG. 2 that the automatic test circuit, the register-outpulser, and the trunk class connector are shown connected to the register trunk and link circuit: when the automatic test circuit is in operation on a test basis the register trunk and link circuit is actually not used, the register-outpulser being tested appearing busy in this register trunk and link circuit so that the particular register-outpulser under test cannot be seized for operational use.

Prior to starting an automatic test for a register-outpulser, various switches and keys in the automatic test circuit are set to determine the seven-digit simulated called number, the trunk class information, and the switching instructions which should be returned to the register-outpulser from a translator-decoder as a result of decoding or translating the first three digits of the seven-digit called number. In the example upon which the detailed disclosure is based, the assumed called number will consist of the seven digits 243–0123; the simulated class of the trunk circuit will be class zero; and, the switching instructions will be to recycle the switch train, use the three digits 238 to seize an outgoing trunk, expect a stop-go condition on the outgoing trunk when seized, delete three of the seven called number digits when outpulsing beyond, outpulse on an MF basis the four numericals 0123 of the called number preceded by a KP pulse and followed by an ST pulse, expect seven digits in the called number, and an alternate route is available. Also, the translator-decoder should return to the register-outpulser information to the effect that the third exit digit 8 should not be used to effect actual outgoing trunk seizure until or unless all seven digits of the called number have been received and registered in the register-outpulser.

The automatic test circuit of the present invention is aranged, as it is well known in the art, to make a test of a series of register-outpulses automatically, the test of one register-outpulser automaticalily following the test of another in a prescribed sequence. However, for purposes of the present description it will be assumed that the automatic test circuit, also as is well known in the art may be and is arranged to enable the selection of a particular register-outpulser for test purposes.

After the automatic test circuit has been properly adjusted, by the setting of various switches and keys therein, the testing of the register-outpulser may be started and it will proceed on an automatic basis. The starting of the test comprises the seizure by the automatic test circuit of a register-outpulser; the seizure of the register-outpulser causes it to appear busy in the regiser trunk and link circuit so that it cannot be seized for operational use during the progress of the test. The automatic test circuit includes circuitry for simulating a tip, ring and sleeve circuit such as would appear through the register trunk and link circuit before an operational register-outpulser. The automatic test circuit also includes circuitry representing the tip, ring and sleeve circuit of a typical first selector such as would be presented to the outpulsing end of an operational register-outpulser.

When the test begins, the circuitry of the automatic test circuit which simulates a calling subscriber will, under control of the switches, cause the transmission to the register-outpulser of the seven digits of the called number on a dial pulse basis. Since an operational register-outpulser should repeat dial pulses into the selectors of the switch train, the automatic test circuit is provided with means for ascertaining whether or not the register-outpulser under test actually repeats at least the initial dial pulse called digits, as it would under an operational condition.

As is the cse operational conditions, the register-outpulser will, upon the receipt of the first three called digits, bid for and seize a translator-decoder through a translator-decoder connector circuit. The register-outpulser will transmit to the translator-decoder these three digits, whereupon the translator-decoder will transmit back to the register-outpulser the above-mentioned data necessary for controlling the continuation of this call.

Each translator-decoder combination includes checking circuitry for ascertaining whether or not a register-outpulser attached thereto actually receives the proper set of switching data transmitted thereto from the translator-decoder. When this check is made, the translator-decoder attempts to transmit to the register-outpulser a release signal. Under normal operational conditions, this release signal would be received by the register-outpulser which, in response thereto, would cause the release of the translator-decoder and of the translator-decoder connector circuitry, whereupon the register-outpulser would proceed with the switching instructions to control the outgoing switch train to completion of the call. However, under test conditions, the release signal normally transmitted from the translator-decoder to the register-outpulser is intercepted by the automatic test circuit and is used to initiate circuit operations within the automatic test circuit for ascertaining whether or not the information transmitted by the translator-decoder to the register-outpulser actually was the correct information.

The automatic test circuit, upon intercepting the usual release signal from the translator-decoder, causes register relays in the automatic test circuit to be operated in accordance with the switching information transmitted to the register-outpulser. These register relays are then used in a check circuit, in combination with various ones of the preset switches and keys in the automatic test circuit, to ascertain whether or not the switching data actually is the correct switching data. If the information transmitted to the register-outpulser is ascertained to be correct by the operation in the automatic test circuit of a check relay, the automatic test circuit will then relay the release signal to the register-outpulser. The register-outpulser, in receiving this release signal, will cause the release of the translator-decoder and of the translator-decoder connector as in the operational conditions.

After the release of the translator-decoder circuitry, et cetera, as above-mentioned, the register-outpulser will thereupon proceed to control the outgoing switch train to seize a trunk and to transmit thereover the required information. During this latter outpulsing operation, the automatic test circuit will utilize the information in its register relays to ascertain whether or not the register-outpulser performs its outpulsing or switch control functions properly as specified by the translator-decoder.

In the usual operational circumstances, a register-outpulser will release from connection with the register trunk and link circuit when it has completed its outpulsing functions. Similarly under test conditions, when the register-outpulser has completed its outpulsing functions and when the automatic test circuit has been satisfied that these switching operations have been properly performed, the automatic test circuit will cause the release of the register-outpulser, the release of which will in turn place the register-outpulser in an idle condition before the register trunk and link circuit so that this register-outpulser may be used under operational circumstances.

Functional system parts (FIG. 3)

With regard to FIG. 3, the seven functional parts of the system disclosure are set forth in individual sections connected together in a manner corresponding to the functional interconnections shown in FIG. 2. FIGS. 4, 5 and 6, show a typical well-known arrangement in a step-by-step system of a line circuit, a line finder, a register trunk and link circuit, and an outgoing switch train comprising selectors and outgoing trunk circuits. These circuits of FIGS. 4, 5 and 6 are not used during the testing process to be described in the detailed portion of this specification; however, it is worthwhile to see these circuits in their operational context.

FIGS. 7 through 26 show enough of the details of a register-outpulser to illustrate the principles of the invention. FIG. 52 shows sufficient details of a trunk class connector and a translator-decoder connector to make known the operational relationship of this circuit to the others under test conditions. Also FIGS. 53 through 56 show pertinent details of a typical translator-decoder circuit as this circuit would be used under test conditions. The complete details of a register-outpulser, a trunk class connector, a translator-decoder connector and a translator-decoder are set forth in the previously mentioned Riddell disclosure of a common control step-by-step telephone switching system.

Figure 27:
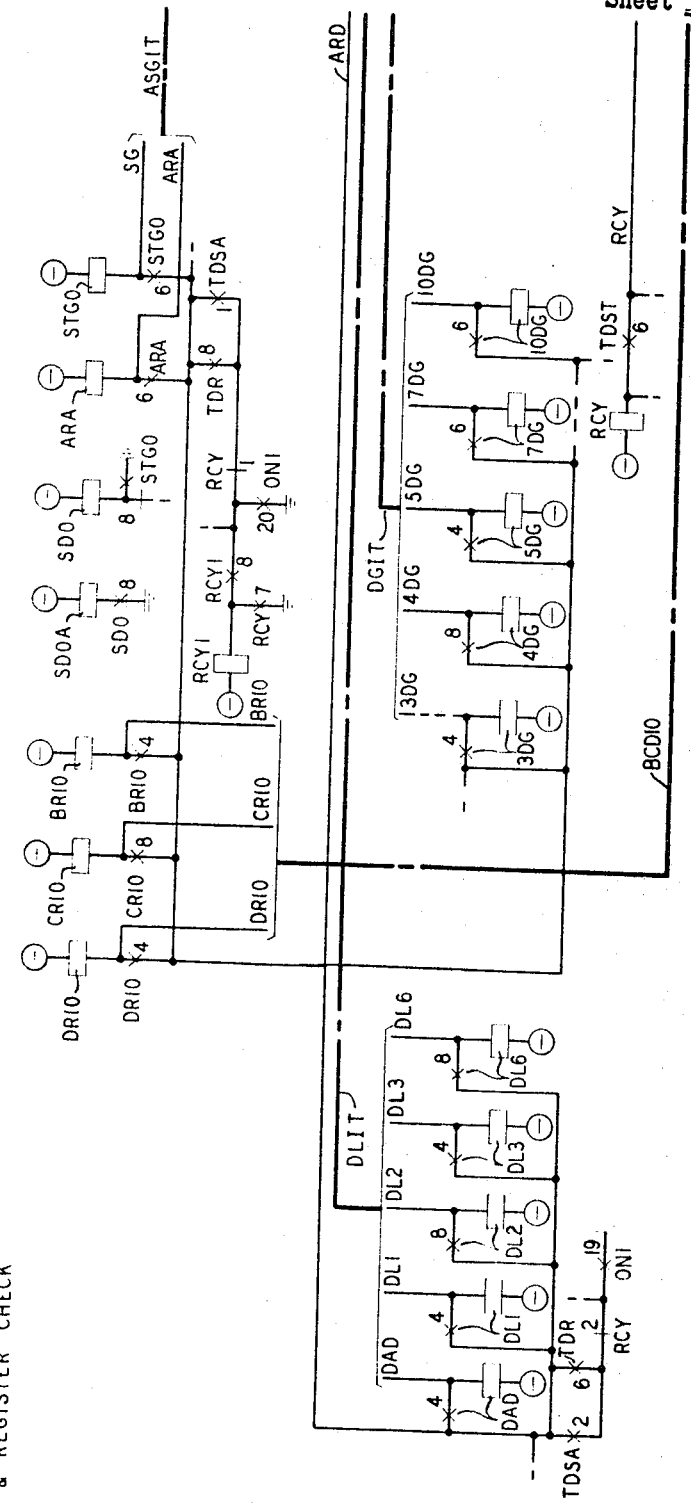
Figure 28:
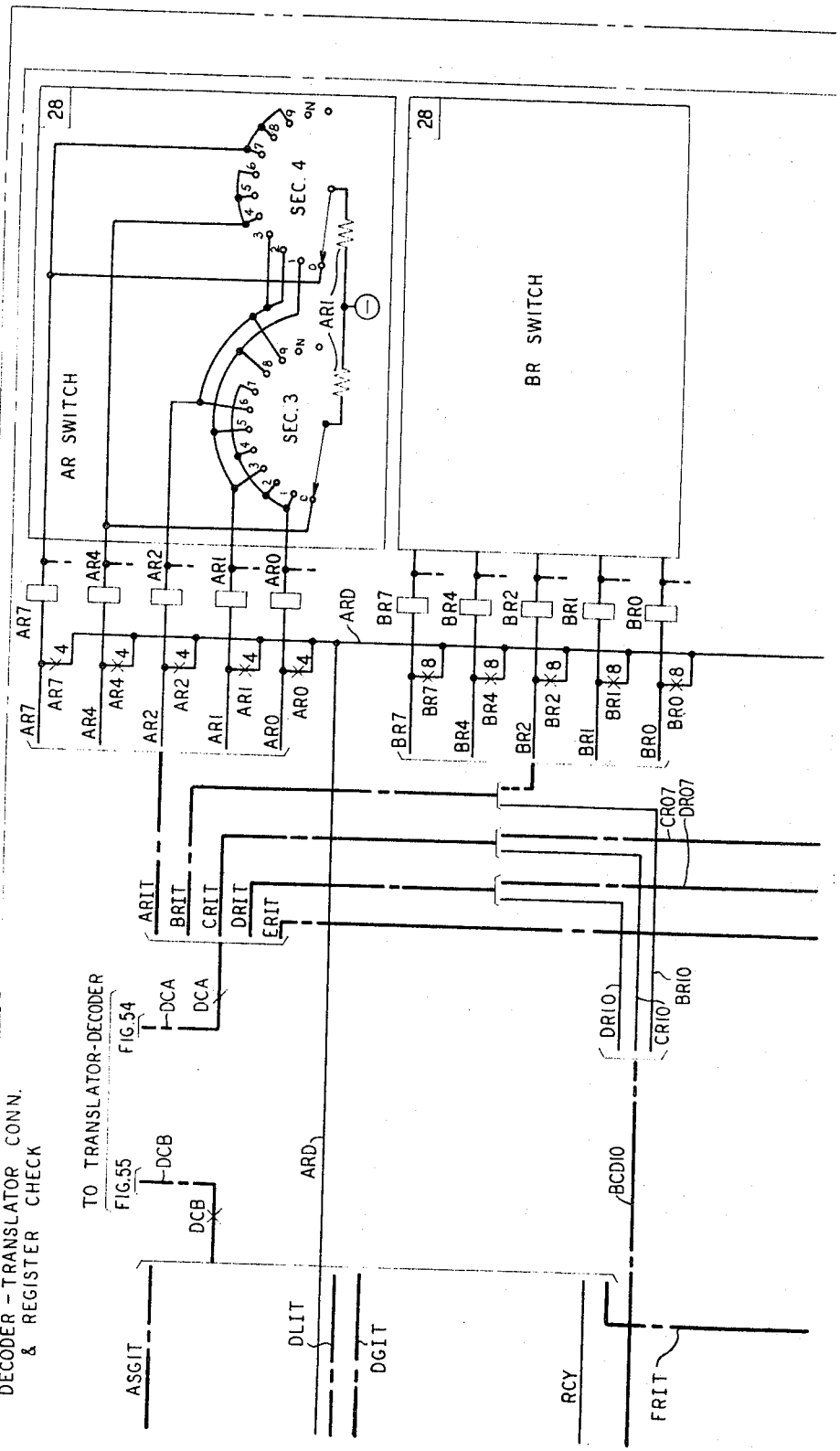
Figure 29:
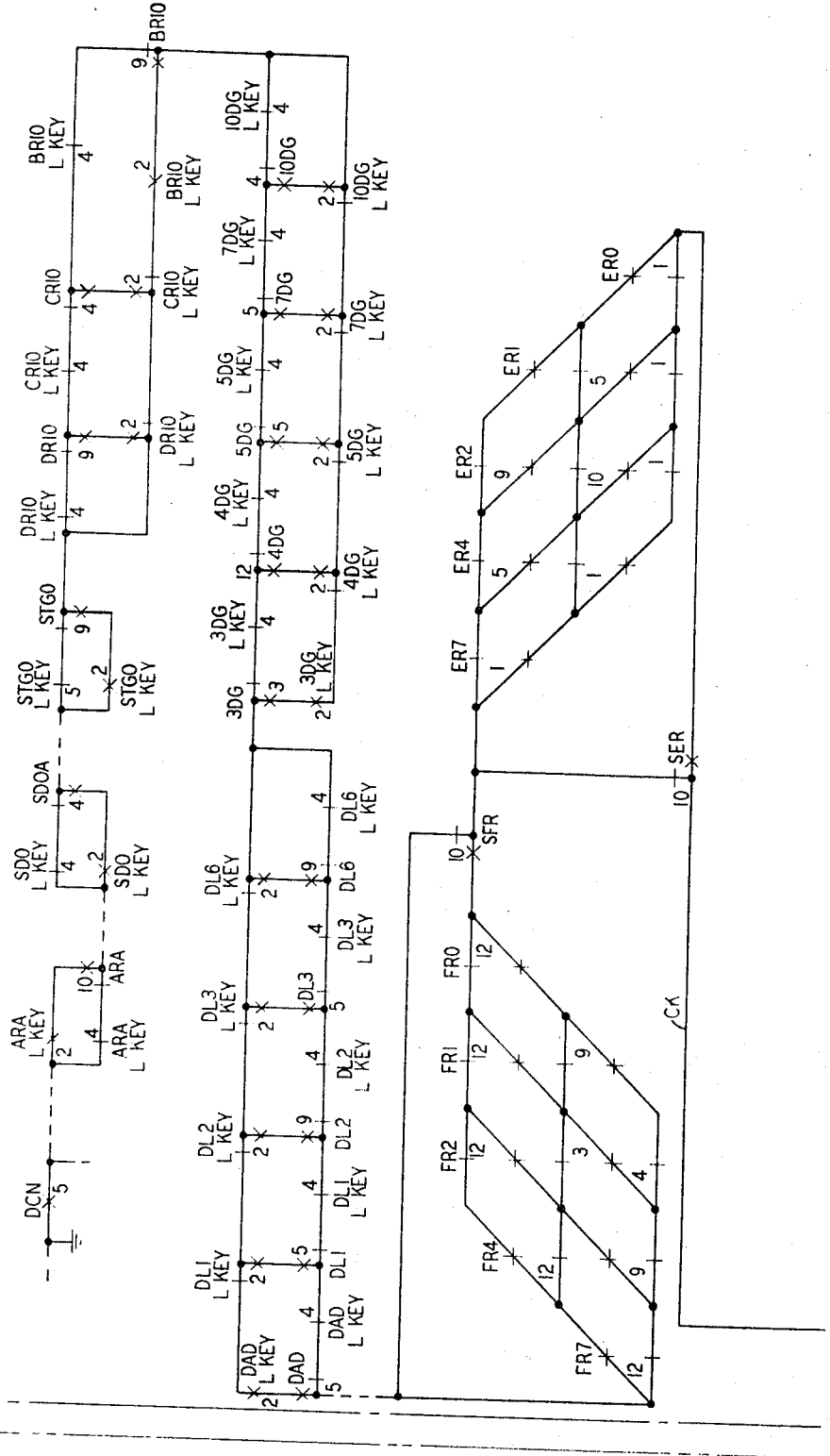
Figure 44:
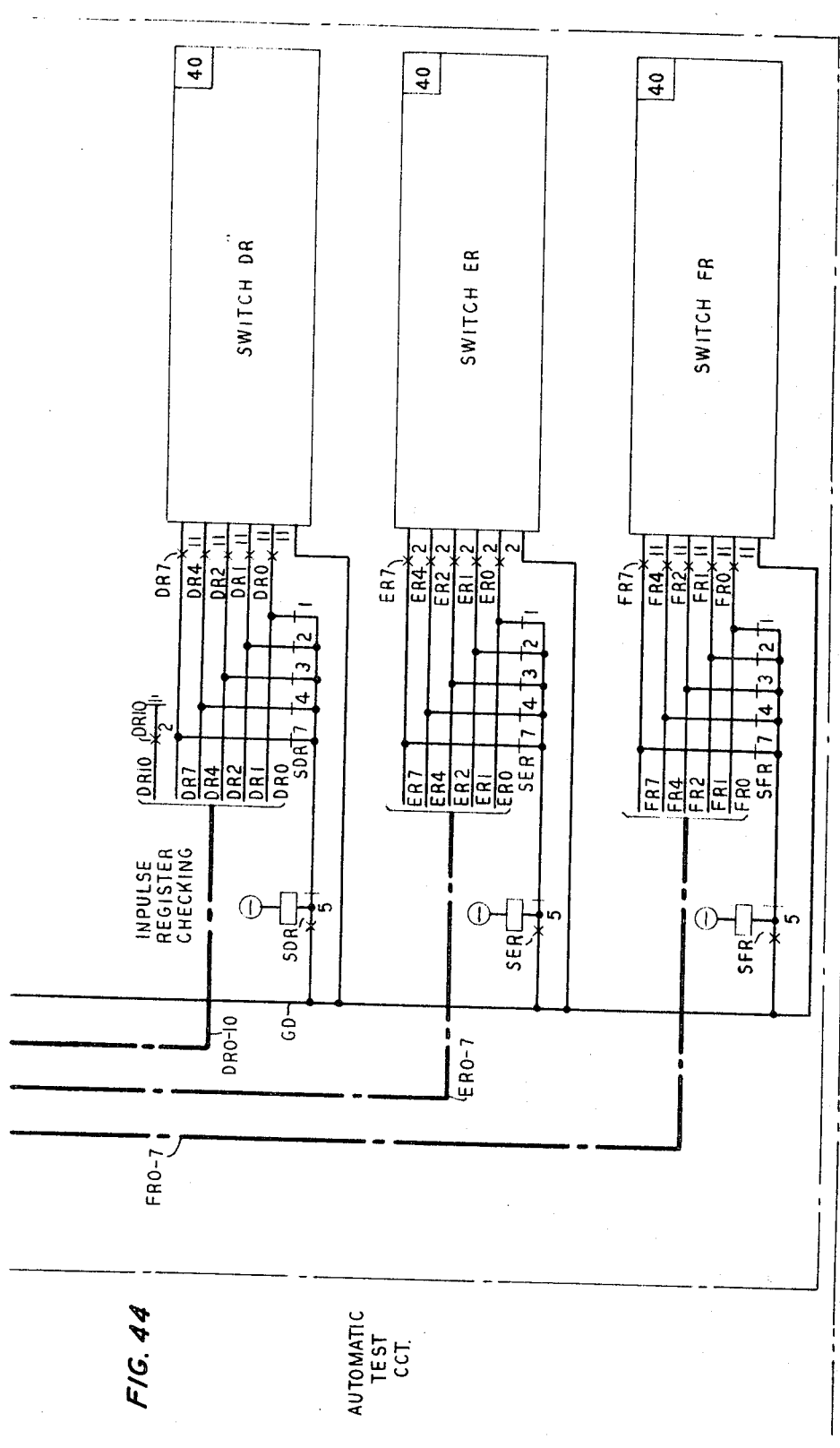
Figure 45:
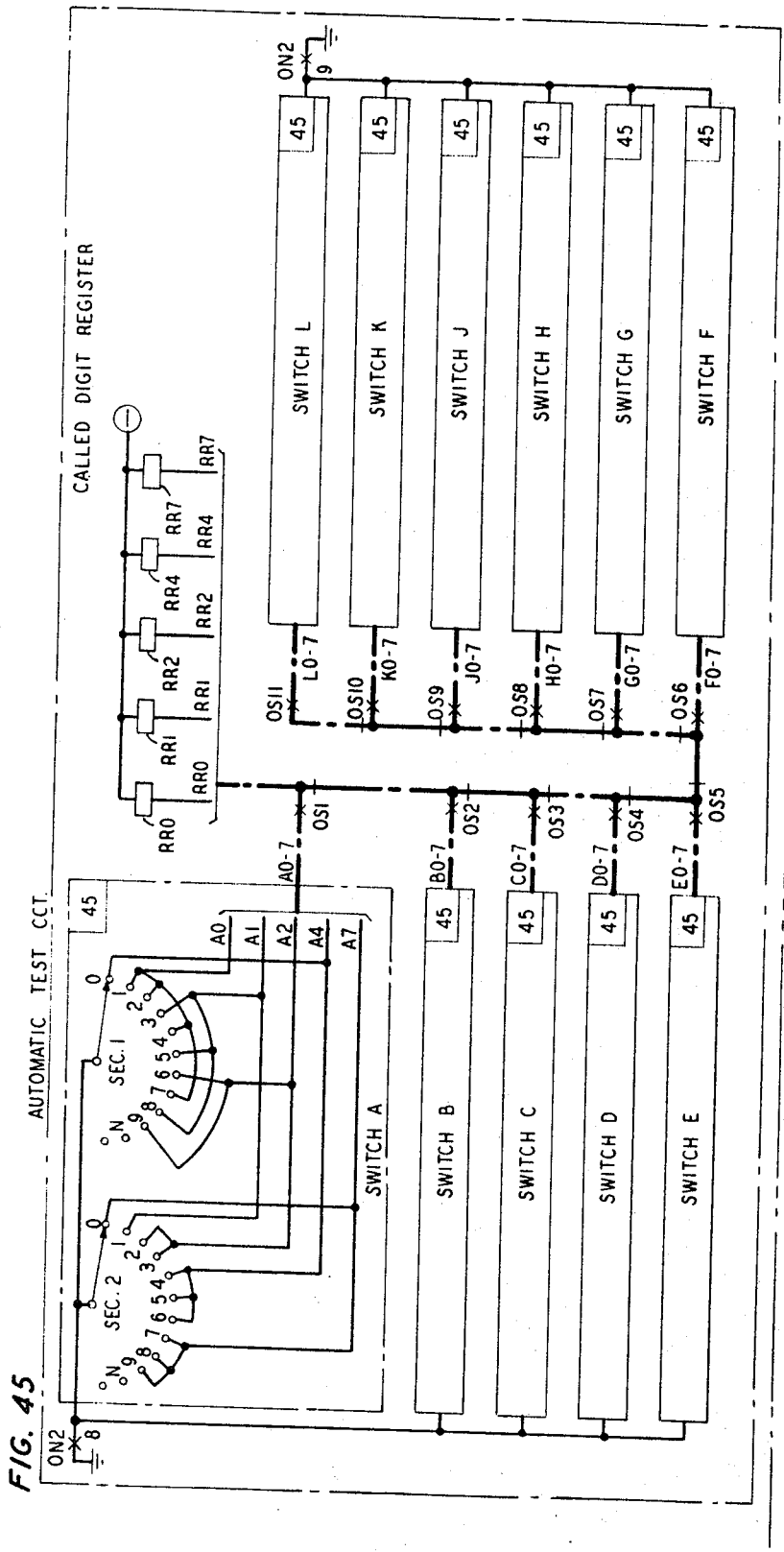
Figure 46:
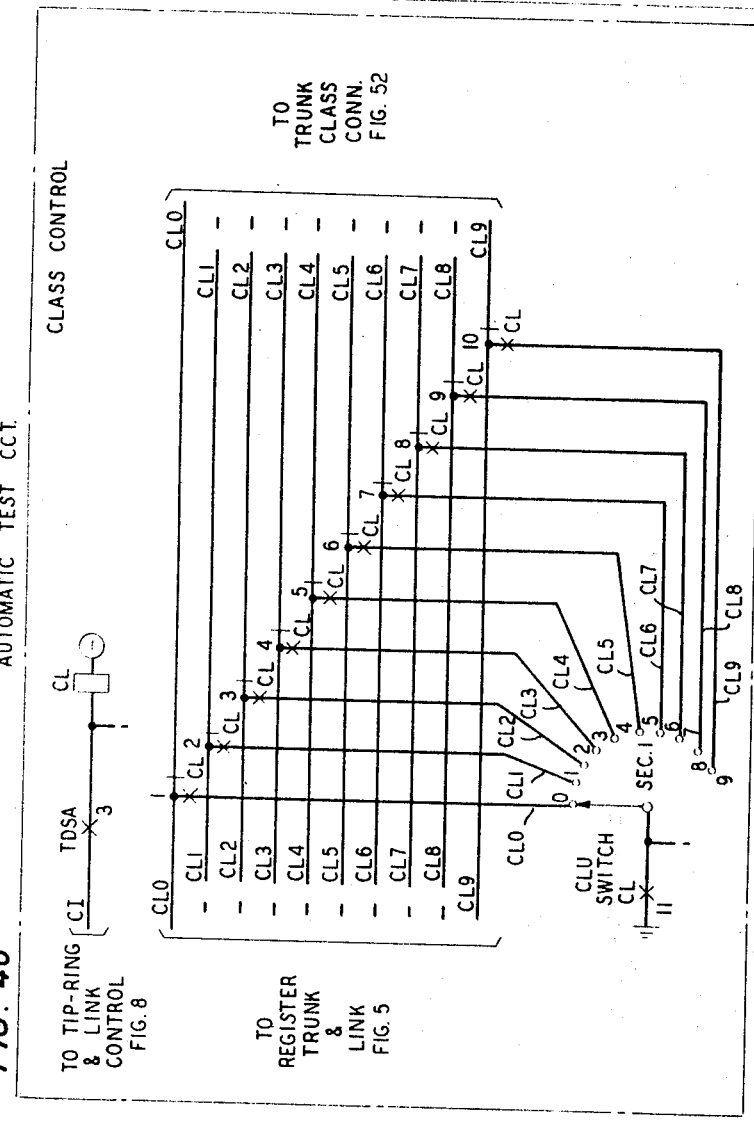

FIGS. 27 through 51 disclose in detail those portions of the automatic test circuit which are necessary to teach and disclose an exemplary embodiment of the present invention. FIGS. 37, 39 and 45 show portions of eleven manually settable switches A through H and J through L by means of which up to eleven digits of a typical simulated called number may be set. FIGS. 28, 30, 33, 40 and 44 show portions of six switches AR through FR which may be manually set to determine as many as six arbitrary exit digits which should correspond with switching information returned to a register-outpulser from a translator-decoder. The right-hand lower portion of FIG. 34 shows contacts of a start key ST and of a return-to-normal key RN, respectively manually settable to cause the automatic test of a register-outpulser to begin and to cause the testing circuitry to return to normal when desired. In FIG. 46 is shown a class switch CLU manually settable to determine a class of trunk circuit, which class indication is necessary to satisfy the decoding process. FIG. 29 shows a series circuit of contacts of a large number of keys and relays. The latter keys are also manually settable prior to the initiation of a register-outpulser test and are used in the final checking process to ascertain whether or not the translator-decoder actually transmitted to a register-outpulser not only legitimate switching data but switching data which was correct.

Figure 41:
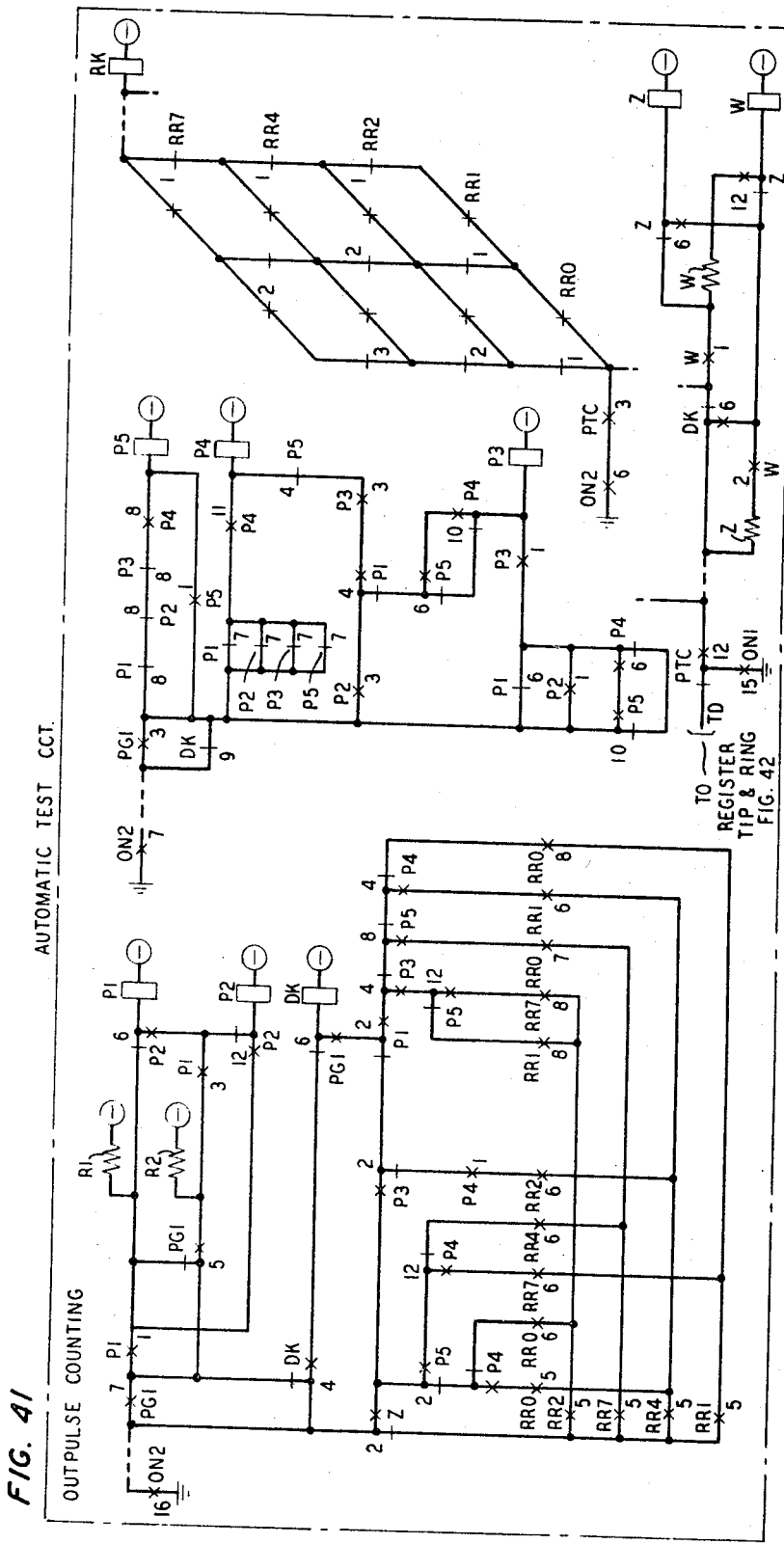

Outpulsing of the simulated called number digits from the automatic test circuit to the register-outpulser is effected by the pulse generator circuitry in the right-hand portion of FIG. 46 comprsing relays PG1 and PG2. This pulse generator is controlled by the outpulse counting circuitry of FIG. 41 comprising relays P1 through P5. The outpulse counting circuitry of FIG. 41 is, in turn, controlled by the called digit register circuit of FIG. 45 which, under the control of the outsteering circuitry of FIG. 37, successively selects the called digits and registers them in the readout relays RR0 through RR7 of FIG. 45. These readout relays are used in the outpulse counting circuitry of FIG. 41 to cause the pulse counting relays P1 through P5 to count up to the required digit pulse count, in the meantime causing the pulse generator of FIG. 46 to transmit to the register-outpulser each of the successive dial pulse digits. In the meantime the inpulse registering circuitry of FIG. 39 operates under control of the inpulse steering circuit of FIGS. 35 and 36 to operate the relays MR0 through MR10 of FIG. 39 in accordance with each digit transmitted from the register-outpulser to the automatic test circuit, which in turn counts these received digits in the inpulse counting circuitry on the right-hand part of FIG. 38. As indicated in the right-hand part of FIG. 38, when the inpulse counting relays IP1 through IP5 have counted a digit pulse content and when this corresponds with the setting of the MR0 through MR10 relays of FIG. 39 under circumstances where only one of the inpulse steering relays of FIGS. 35 and 36 is operated, the matching relay M of FIG. 38 will operate as an indication that the register-outpulser has properly repeated the dial pulse digit transmitted thereto by the automatic test circuit.

Figure 32:
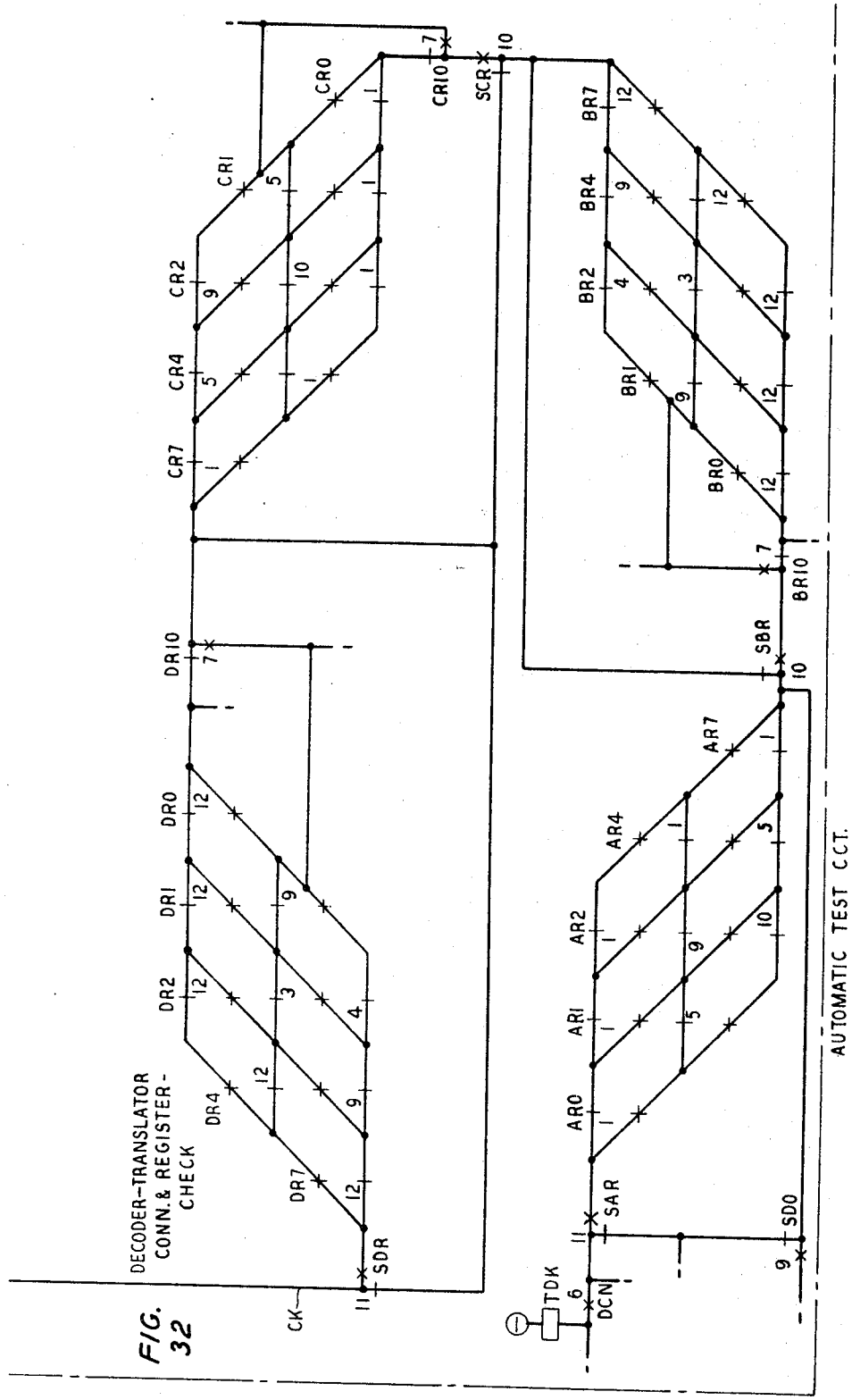
Figure 38:
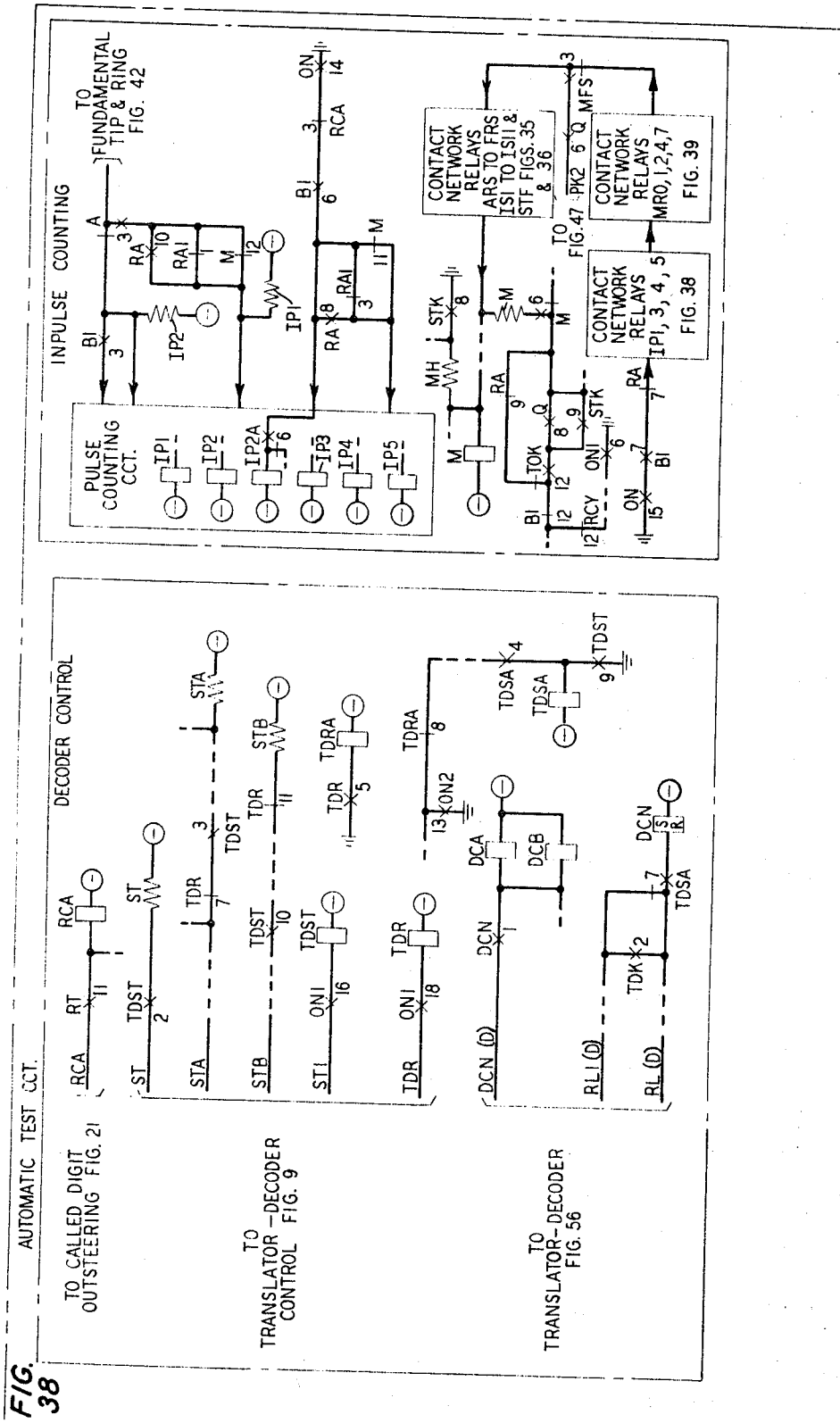
Figure 39:
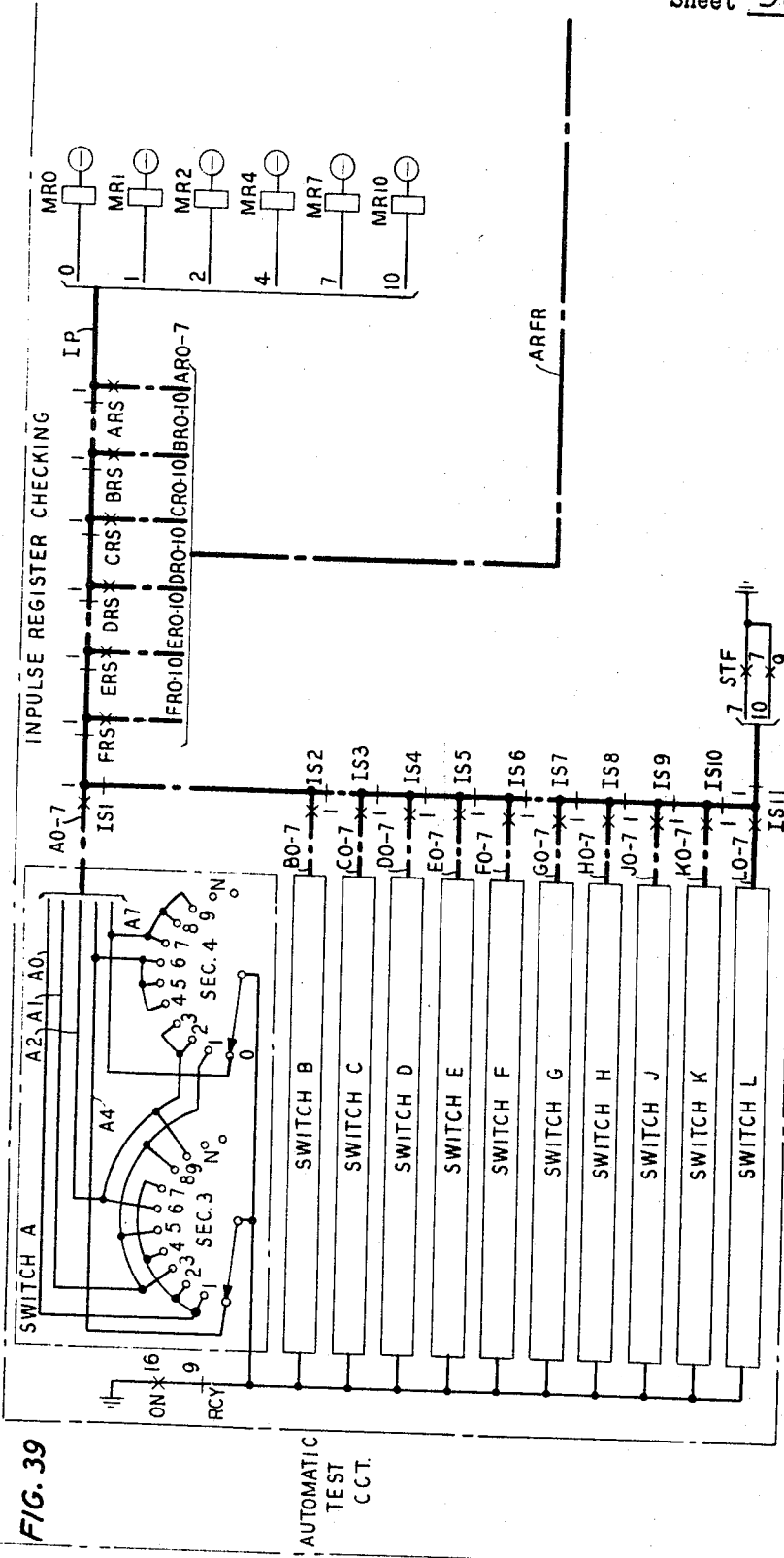

The decoder control circuitry in the left-hand part of FIG. 38 will cause the operation of relay DCN when the automatic test circuit intercepts the normal release signal from a translator-decoder. Upon the operation of this relay DCN, a pair of large connector relays DCA and DCB of FIG. 38 will become operated, completing a large number of circuits between the translator-decoder and the automatic test circuitry of FIGS. 27, 28, 30 and 33, whereby the automatic test circuit will register the switching data information transmitted by the translator-decoder to the register-outpulser. FIGS. 29 and 32 comprise the basic check circuit whereby, if all of the switching instructions are proper and correct, a circuit is completed to cause the operation in FIG. 32 of the check relay TDK. The operation of this check relay TDK will in turn repeat the translator-decoder release signal to the register-outpulser, thereby to cause the release of the associated translator-decoder and translator-decoder connector circuitry, leaving the register-outpulser attached to the automatic test circuit for further outpulse testing.

Figure 35:
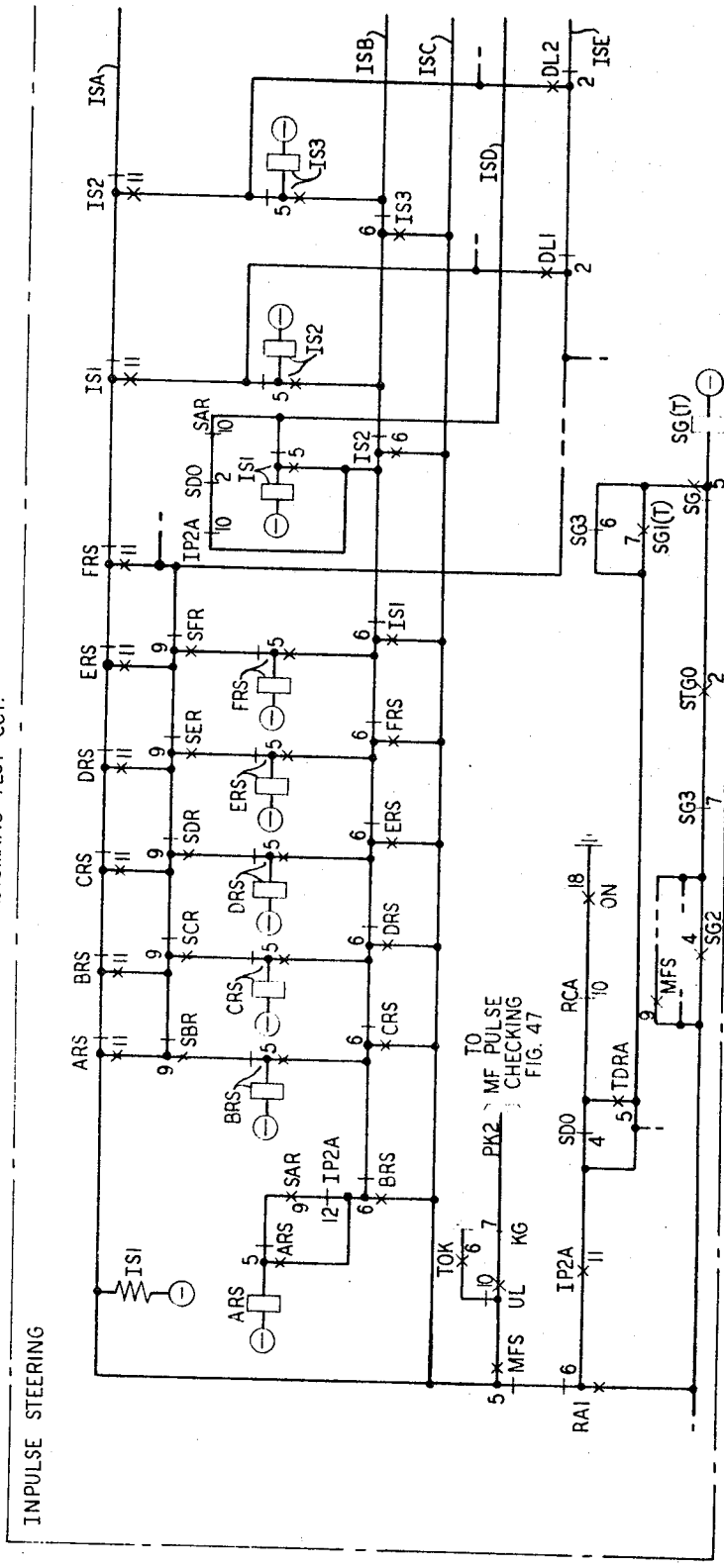
Figure 36:
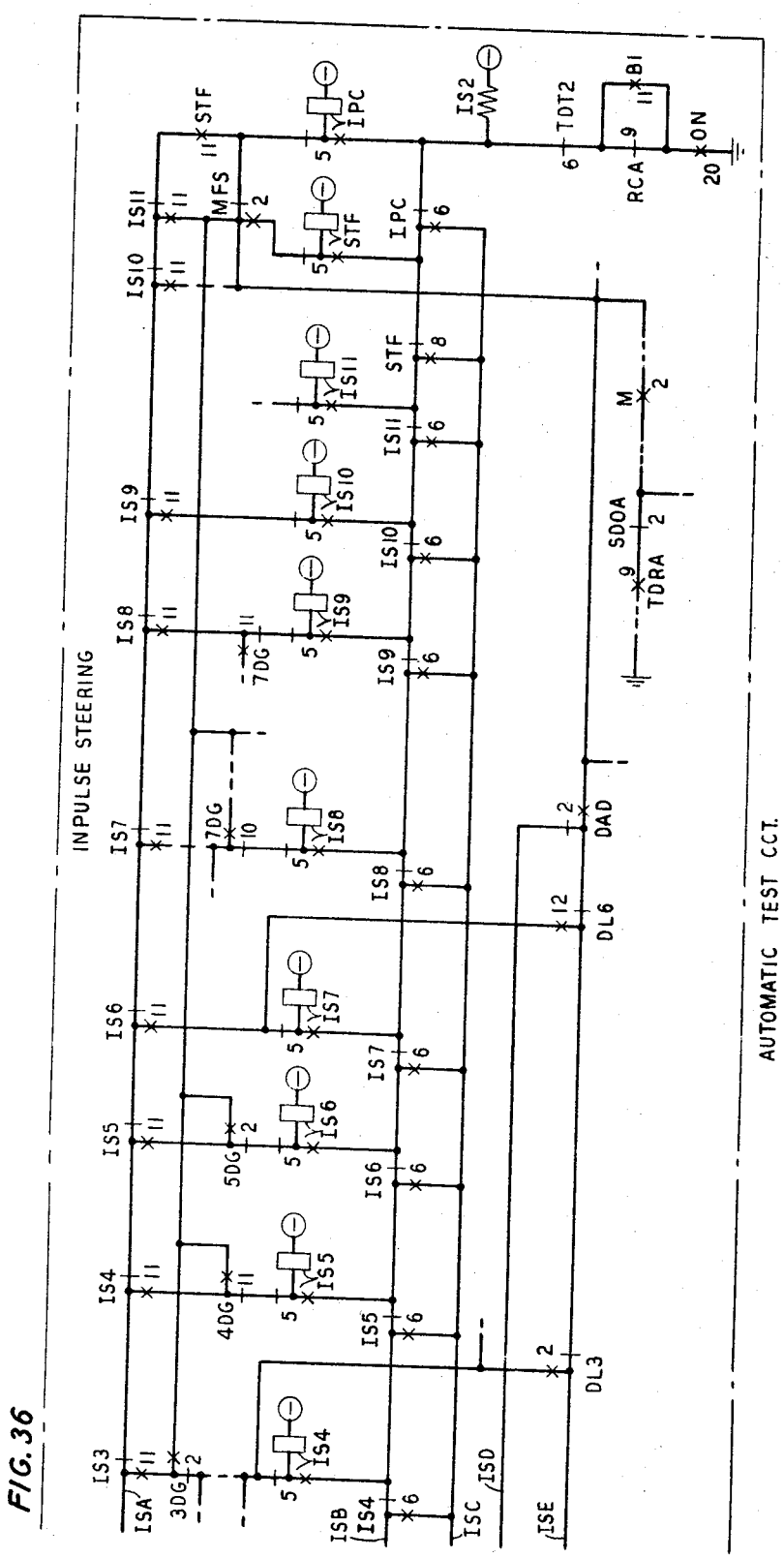
Figure 37:
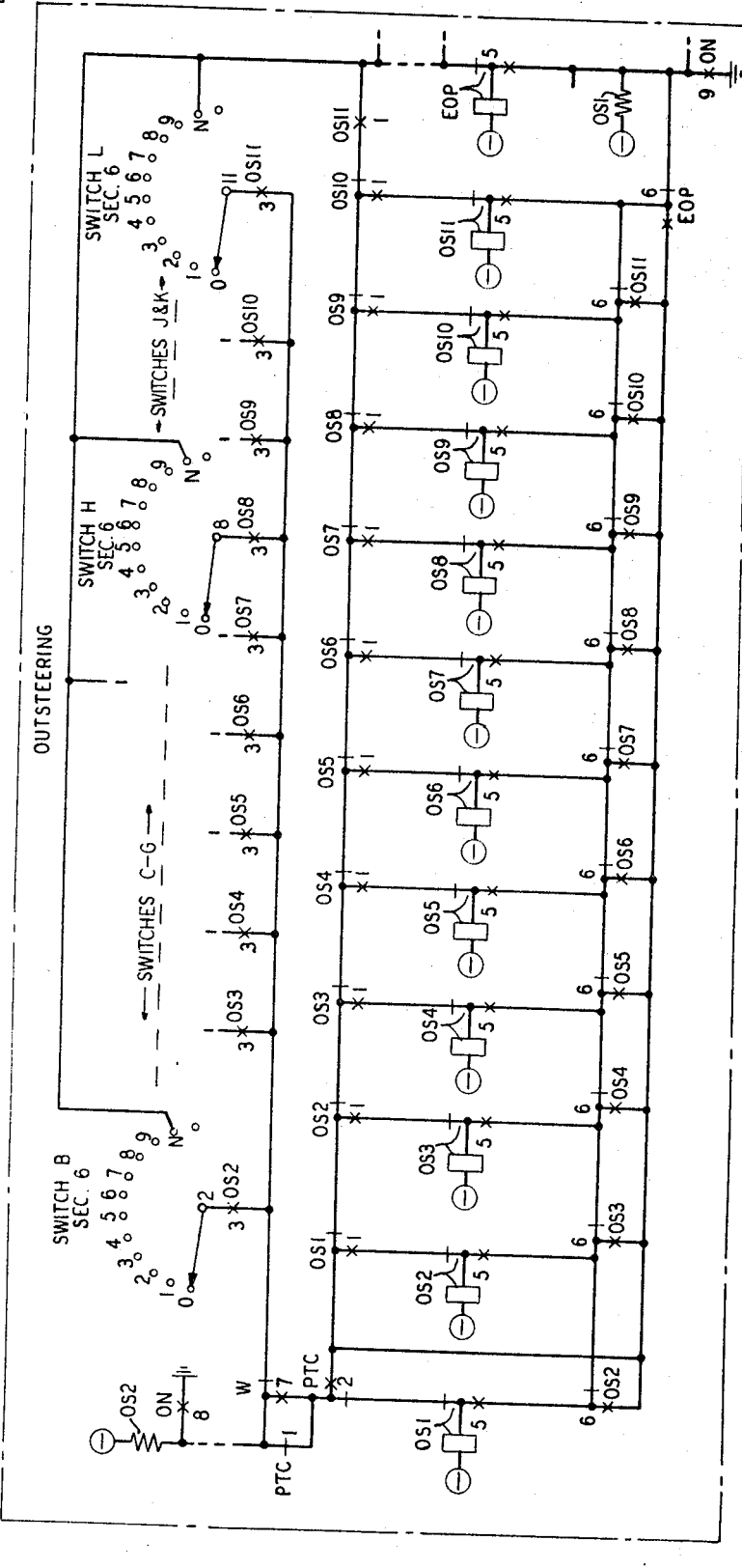

As a result of the translator-decoder release, the automatic test circuit will readjust its impulse steering circuitry of FIGS. 35 and 36 so that it may receive from the register-outpulser the dial pulse exit digits, followed by the proper multifrequency outpulsing digits. These outpulsing operations will be checked one after the other by the dial pulse inpulse counting circuitry of FIG. 38, the steering circuitry of FIG. 39, and the multifrequency pulse checking circuit of FIG. 47, in combination with the timing control of FIG. 48 and the multifrequency receiver circuitry of FIGS. 49, 50 and 51. The latter portions of the automatic test circuitry (FIGS. 47 through 51) are used only under those circumstances where the outpulsing functions of the register-outpulser require it to outpulse over the simulated outgoing trunk various digital information on a multifrequency basis.

When the register-outpulser has completed all of its required outpulsing operations, the association and interconnection of the register-outpulser and the automatic test circuit will be broken, thereby returning both of these circuits to their normal operational conditions.

DETAILED DESCRIPTION (FIGS. 4–56)

Figure 56:
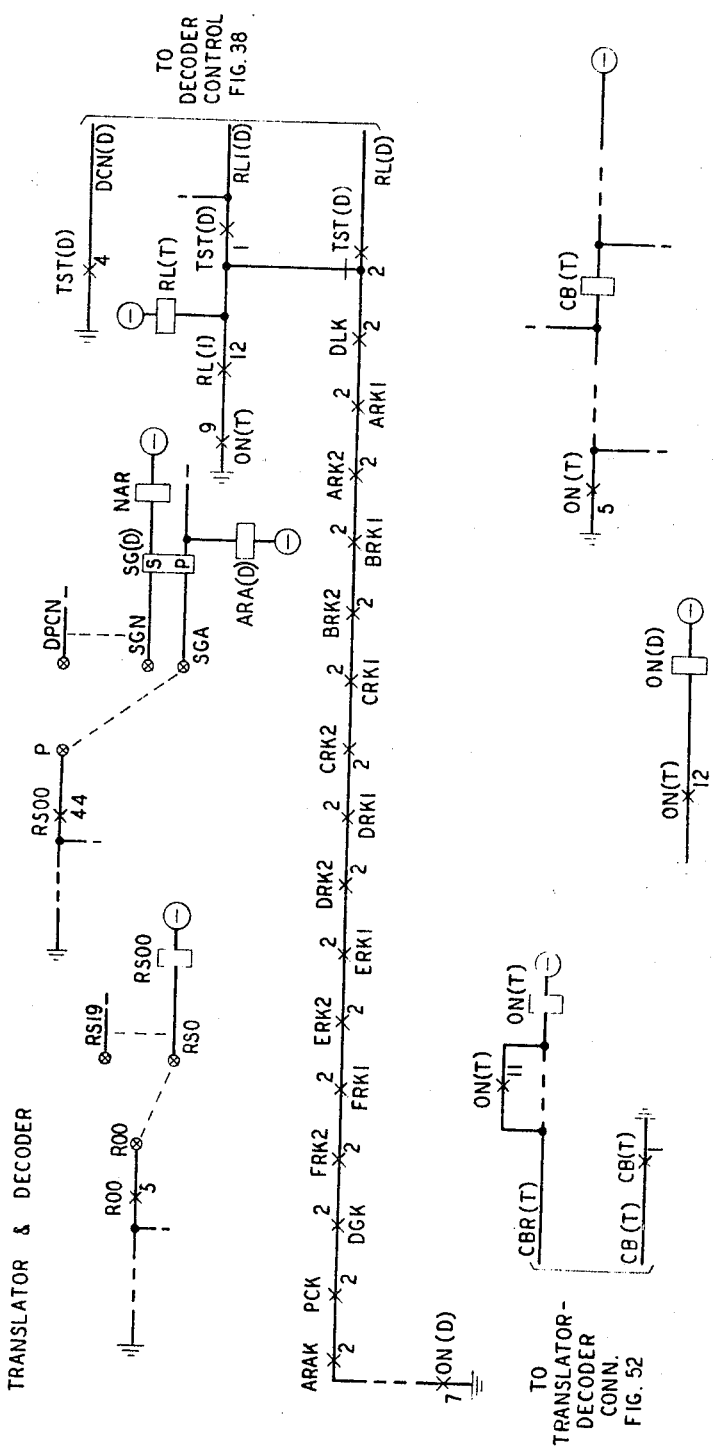

The detailed description to follow of the exemplary embodiment involving the specific circuits shown in FIGS. 4 through 56 is presented in nine sections as follows: Preparing for Register-Outpulser Test; Seizing Register-Outpulser; Registering Test Address Data; Translator-Decoder Seizure; Deriving Switching Data; Comparing Switching Data; Translator-Decoder Release; Checking Switching Functions; and, Release of Register-Outpulser.

Preparing for register-outpulser test

Initially it will be assumed that certain of the circuits of the exemplary embodiment are available for performing the testing operations to be described. It will be assumed that the register-outpulser of FIGS. 7 through 26 is idle and available; it will be assumed that the trunk class connector and the translator-decoder connector of FIG. 52 are idle; it will be assumed that the translator-decoder of FIGS. 53 through 56 is available; and, it will be assumed that the automatic test circuit of FIGS. 27 through 51 is available for use in testing the register-outpulser.

Before allowing the automatic test circuit to initiate and perform the automatic testing of the register-outpulser, it is necessary to set a number of manually settable switches and keys in the automatic test circuit to determine two basic sets of information: one set of information comprises the assumed called number which will be pulsed into the register-outpulser to simulate a calling line; and, the other set of information will be the proper switching instructions which should be returned to the register-outpulser from the translator-decoder as a result of the decoding operation in response to the first three digits of the called number.

It will be recalled that the simulated called number which will be used for test purposes consists of the seven-digit assumed called directory number 243–0123. The manually settable switches A through H and J through L of FIGS. 37, 39 and 45 must be initially manually set to indicate this called number. In FIG. 39 sections 3 and 4 of switch A will be set so that the wipers thereof are resting on terminals 2 of these two switch sections, thereby at the appropriate time, to be described hereinafter, to cause the grounding of conductors A0 and A2 into cable A0–7 in FIG. 39 to indicate the A digit of 2 in the usual two-out-of-five coding. Likewise, in FIG. 39 switches B, C, D, E, F and G will be similarly set to indicate in the usual two-out-of-five coding, the respective digits 43–0123. Switches H, J, K and L in FIG. 39 will be set on their terminals N to indicate that there are no called digits corresponding to these switches. In FIG. 45 similar settings of sections 1 and 2 of switches A through G will likewise indicate the corresponding seven digits 243–0123; and, switches H, J, K and L will set on their terminals N, indicating that there are no called digits corresponding to these switches. In FIG. 37 switches B through G will be set on some terminal other than terminal N because of the setting of a particular digit corresponding to these switches; however, switches H, J, K and L will be set on their terminals N in FIG. 37.

Figure 30:
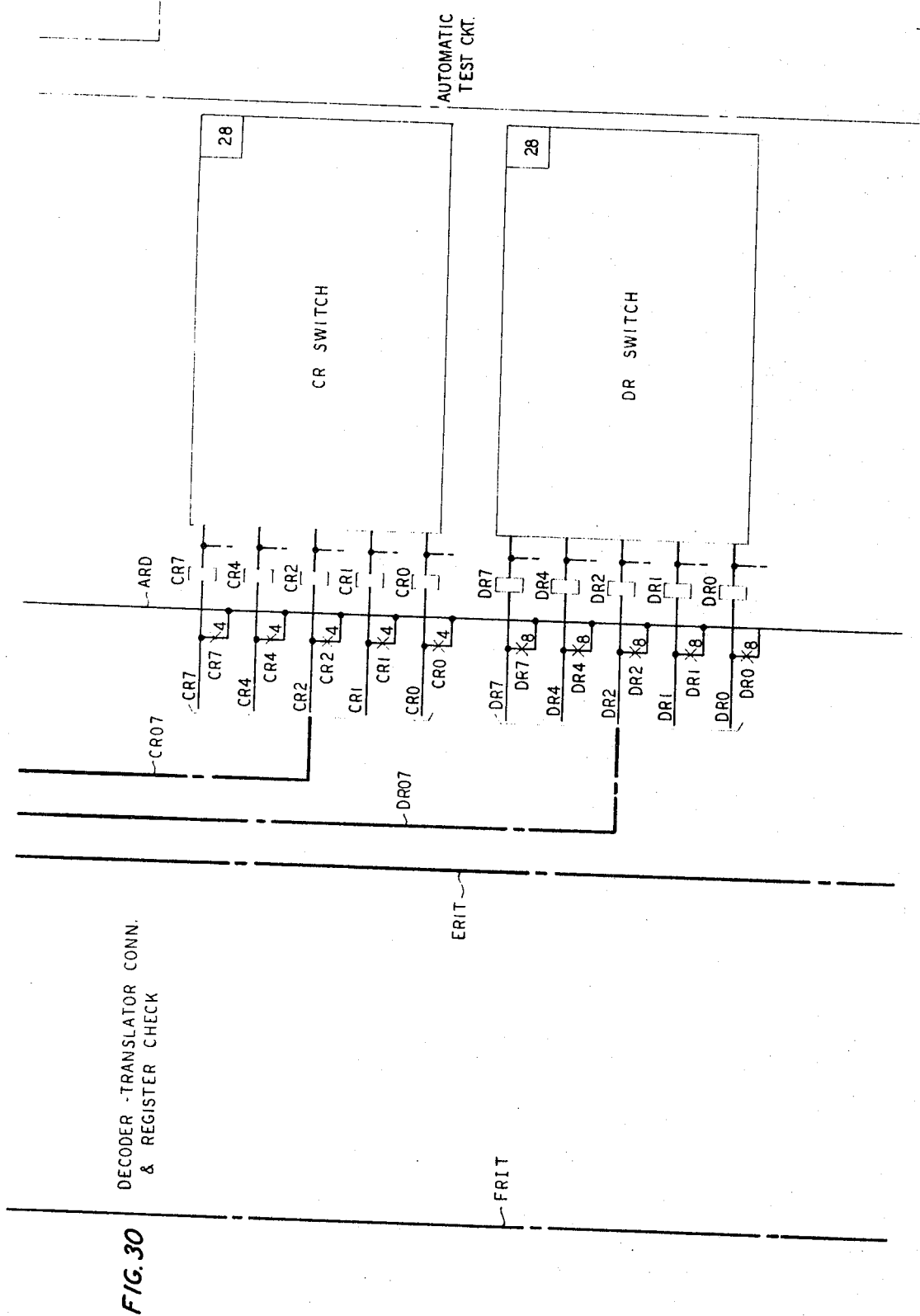
Figure 40:
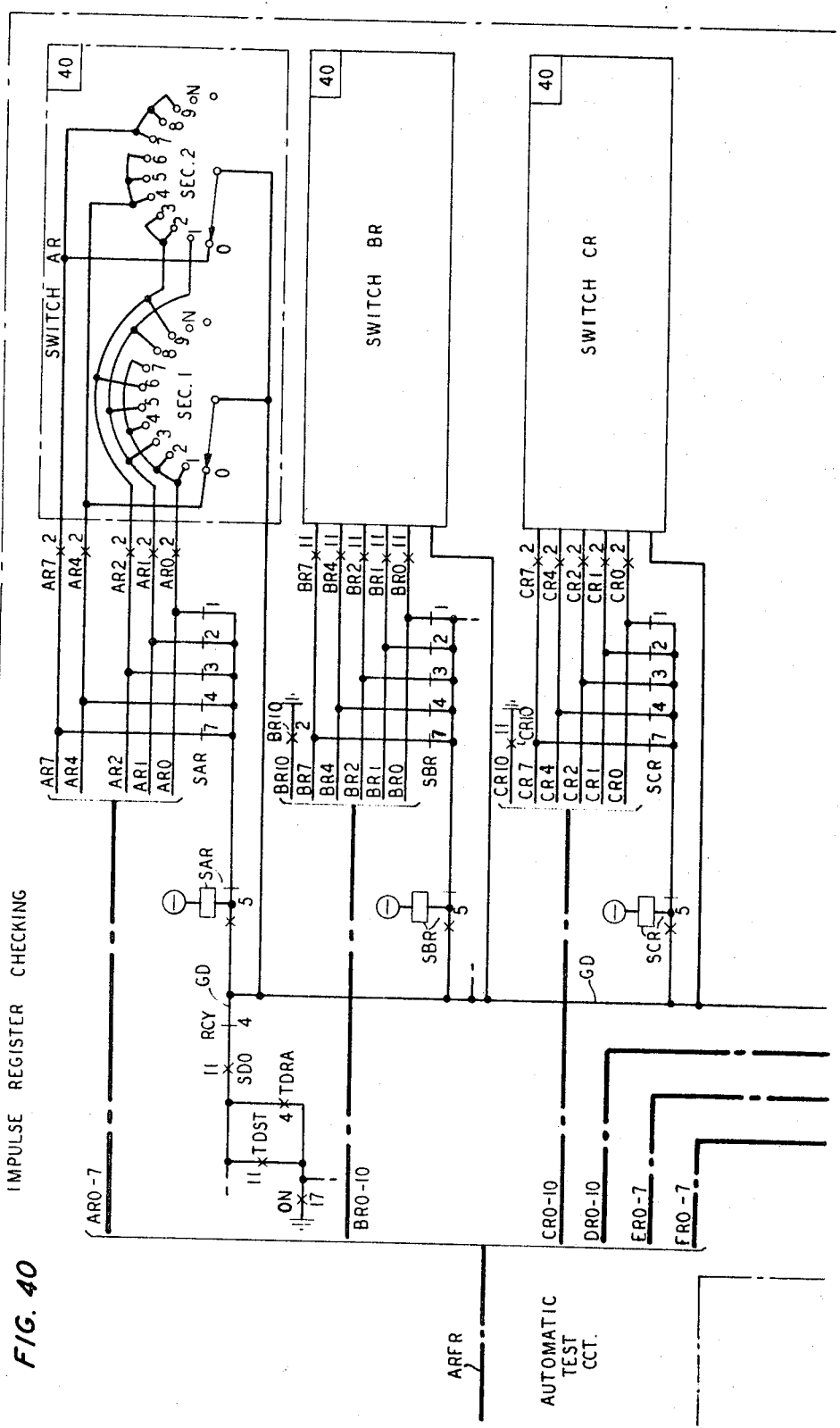

As will be seen from subsequent description, a translator-decoder, such as the one disclosed in FIGS. 53–56, will be seized by the register-outpulser for purposes of decoding and translating the first three digits 243 of the called number pulsed into the register-outpulser by the automatic test circuit. As a result of the transmission of these three digits to the translator-decoder, the latter circuit should return to the register-outpulser a number of switching instructions. Accordingly, a number of switches and keys must be preset in the automatic test circuit in accordance with a proper and correct set of switching instructions in order that the automatic test circuit may ascertain whether or not the translator-decoder does its job properly and in order to ascertain whether or not the register-outpulser properly performs switching instructions in accordance with the switching data transmitted thereto from the translator-decoder. According to the assumed example the translator-decoder should instruct the register-outpulser to release the outgoing switch train (which will have been partially set by the called digits being repeated to the switch train) and to reset the switch train in accordance with the three arbitrary exit digits 238. In FIG. 28 the arbitrary digit switch AR will be set so that the wipers of sections 3 and 4 of this switch are resting on their terminals 2, thereby to designate that the first arbitrary exit digit should be a 2. Likewise, in FIGS. 28 and 30 the BR and CR switches must be preset to indicate the second and third exit digits of 3 and 8. Also according to the assumed example, the translator-decoder should inform the register-outpulser to switch from dial pulse signaling to multifrequency signaling after the use of the third exit digit (which will seize a trunk). The translator-decoder should accomplish this instruction by transmitting to the register-outpulser in the fourth arbitrary exit digit position a registration of 2 and 10, this registration involving one extra signal (the 10 signal) over and above the usual two-out-of-five system (0, 1, 2, 4 and 7 signals). This 2 and 10 combination represents the so-called KP pulse which must be transmitted forward ahead of any multifrequency signaling in order to prepare the forward multifreuency receiver for accepting this kind of signaling. Accordingly, the DR switch of FIG. 30 should have its wipers set on its terminals 2 so that the windings of relays DR2 and DR0 of FIG. 30 will be returned to a battery supply for a purpose to be described presently. In addition, the DR10 key of FIG. 29 should be operated so that when circuits are completed between the decoder-translator connector and the checking circuits of FIGS. 27, 28 and 30, the automatic test circuit may receive and respond to ground signals on conductors DR2 in FIG. 30 and DR10 into FIG. 27, thereby to cause the operation in FIG. 30 of relay DR2 and the operation in FIG. 27 of relay DR10. In FIG. 30, relay DR0 will not be operated because conductor DR0 extending thereto from the translator-decoder will not have ground potential thereon. Switches ER and FR of FIG. 33 will have the wipers of their switch sections 3 and 4 set on their respective terminals N to indicate that there should be on exit digit information in these two arbitrary exit digit register positions. In FIGS. 40 and 44, sections 1 and 2 of the arbitrary exit digit switches AR through FR will be similarly set. In FIG. 46 the class switch CLU will be set on its contact 0 (as shown) to simulate a trunk class 0 in order to satisfy certain circuit operations which take place in the translator-decoder. It will be noted in FIG. 5 that a cross-connection exists between punchings CI and CLO, this cross-connection under operational circuit conditions indicating to the translator-decoder that the class of the particular trunk circuit being used is class 0; therefore, the operation in FIG. 46 of the CLU switch will simulate this operational class cross-connection condition. In FIG. 29 the key 7DG will be operated to provide circuitry for checking whether or not the translator-decoder properly transmits to the register-outpulser a 7DG indication specifying that the called number includes seven digits. Also, in FIG. 29 key DL3 must be operated because one item of the assumed circumstances is that the translator-decoder should instruct the register-outpulser to delete the first three (243) of the called digits (243–0123) before outpulsing the remaining digits on a multifrequency basis to the forward switching center. Key ARA in FIG. 29 must be operated in order to check that the translator-decoder properly returns to the register-outpulser information to the effect that an alternate route is available in the event that the register-outpulser cannot secure a proper route by the use of the arbitrary exit digits 238 supplied thereto from the translator-decoder. Also, in FIG. 29, key SDO must be operated to check the proper transmission by the translator-decoder to the register-outpulser that the class of this call is a sender outgoing class. Key STGO in FIG. 29 must be operated to check whether or not the translator-decoder properly informs the register-outpulser that a stop-go condition is to be expected upon trunk seizure (upon the use of the third exit digit 8). Also, in FIG. 43, key CPT must be operated to specify cancellation of party testing. In FIG. 46 the MFKP key remains in the released condition because under the assumed circumstances the automatic test circuit is not testing for the proper pulsing speed from the register-outpulser.

With the above-described manual settings of various switches and keys, the automatic test circuit is prepared to initiate and carry through the automatic testing of the register-outpulser. This automatic testing is initiated by the operation, to be described in detail hereinafter, in FIG. 34 of the start key ST.

*Seizing register-outpulser*

Figure 43:
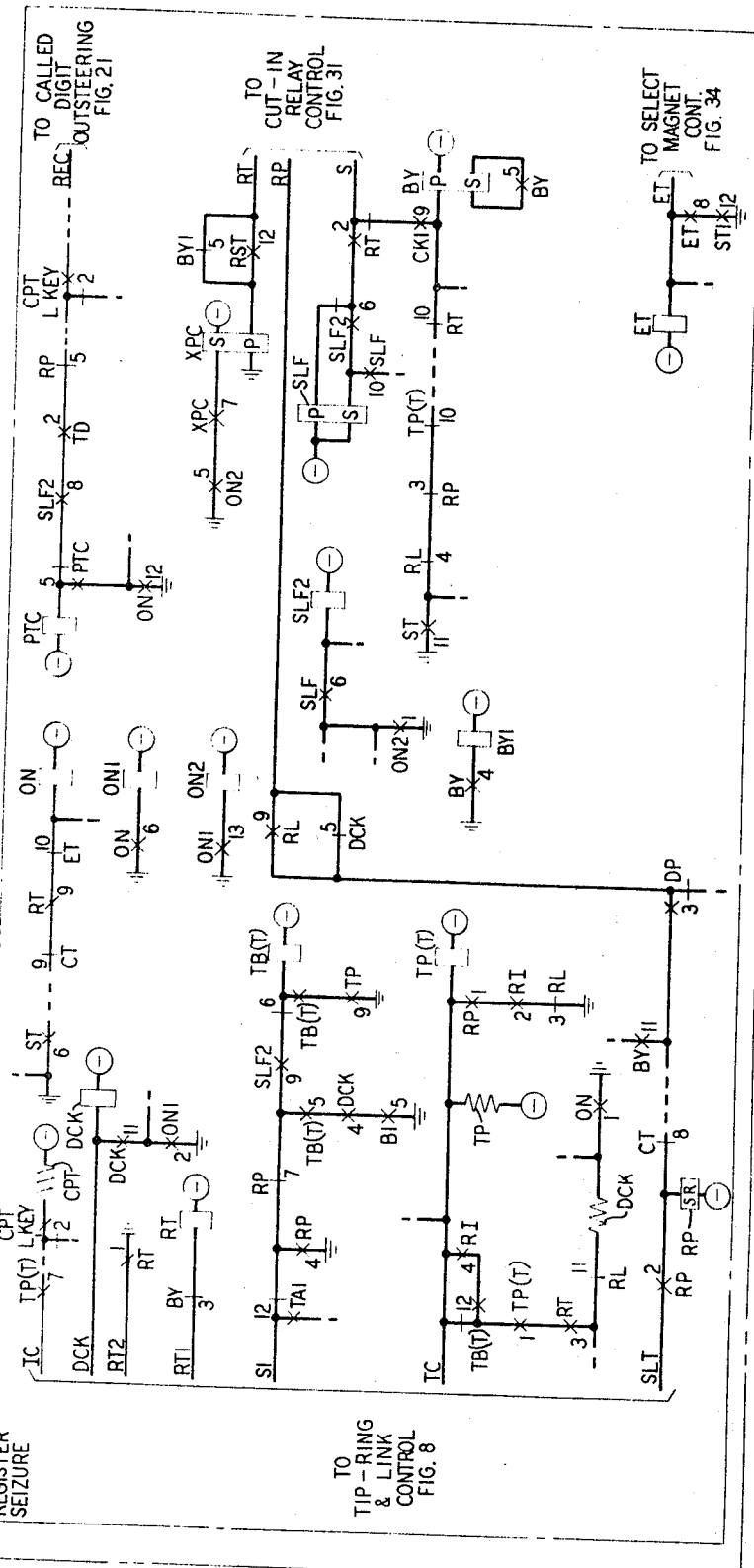

This section of the description will begin with the operation in FIG. 34 of the start key ST and will end with the operation in FIG. 43 of relay PTC, the operation of which is an indication to the automatic test circuit that a register-outpulser has been seized and has returned dial tone to the automatic test circuit. The transmission by the automatic test circuit to the register-outpulser of the test address data will be the subject matter of the next main section of this description.

Figure 31:
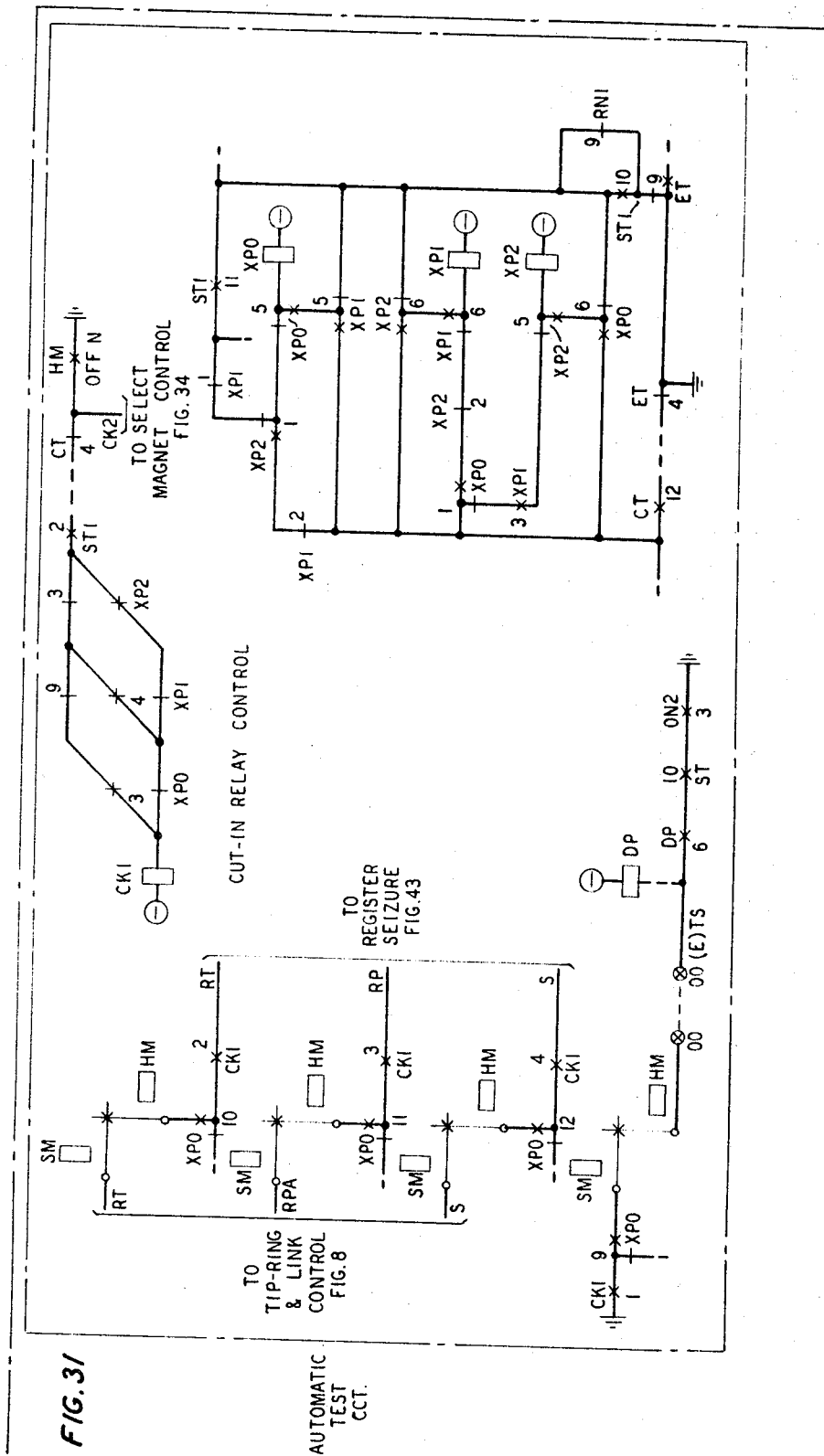

The test circuit gains access to the register-outpulser through two crossbar switches, some crosspoints of which have been indicated schematically in FIG. 31. After gaining access to the register-outpulser, the test circuit makes a busy test thereof. If the circuit is idle, additional test connector relays are operated in the register-outpulser to close through additional test leads between the two circuits. Before pulsing into the register-outpulser, tests are made of certain supervisory relays in the register-outpulser and a check is made to ascertain the completion of any necessary party testing. Upon receiving dial tone, the test circuit functions to detect the presence of dial tone as a final condition of seizures. The crossbar interconnecting circuit between the test circuit and a register-outpulser consists of two 100-point, 6-wire crossbar switches, the control relays for the switch components and miscellaneous starting relays. The control relays shown in FIG. 31 cause the operation of the correct select and hold magnets and make effective four of the twelve crosspoints closed either on an automatic basis or on an individual selection basis. Prior to seizure, busy test relays are made to operate as an assumed busy register-outpulser condition. If the register-outpulser is idle, register-outpulser test connector relays are made to operate such as the relays RT1, RT2 and RT3 of FIG. 8. Thereupon, the connector relays close through a number of leads between the register-outpulser and the test circuit. An idle test is then made before register-outpulser seizure is complete. The test circuit checks for the presence of a register-outpulser availability ground before the test connector relays of the register-outpulser are operated. If a sleeve ground is not encountered during the release time of a busy test relay, the test connector relays located in the register-outpulser are allowed to operate, thereby isolating the register-outpulser from service connections. On operation of these test connector relays, a test is made to determine the idle status of the register-outpulser, followed by the starting of test functions.

When the start key ST of FIG. 34 is operated, the test circuit will be connected, as above mentioned, to a register-outpulser. Three register-outpulsers may be connected through the twelve available contacts of one crosspoint location, making a total of 300 register-outpulsers that may be tested through the two crossbar switches. Although twelve contacts are closed upon operation of a pair of hold magnets, only four of the twelve contacts are made effective because only one of the three relays XP0, XP1 and XP2 of FIG. 31 will be operated at any one time. The purpose of making just four contacts effective is to close through the leads S, RPA and RT in FIG. 31 to the register-outpulser for busy test purposes and to operate the test connector relay RT1 in FIG. 8 at the completion of such a successful busy test. In the lower left-hand portion of FIG. 31 is shown the fourth crosspoint which is used to control on a crossconnection basis an indication as to the type of register-outpulser under test, such as the circuitry shown in FIG. 31 for operating relay DP as an indication that the register-outpulser under test is a dial-pulse register-outpulser.

When the start key ST of FIG. 34 is operated, a number of relay operations take place whereby connection is made between the test circuit and an idle register-outpulser such as the one shown in FIGS. 7 through 26, this operation culminating in the operation of the test connector relays RT1, RT2 and RT3 of the register-outpulser shown in FIG. 8. The operation of these connector relays extends test leads between the register-outpulser and the automatic test circuit. In FIG. 34 an obvious circuit is completed over make contact 2 of the ST key to cause the operation of relay ST which in turn, upon operating, completes an obvious circuit in the lower right-hand part of FIG. 34 for causing the operation of relay ST1. In FIG. 31, upon the operation of relay ST1 of FIG. 34, a circuit is completed for causing the operation of one of the three crosspoint selection relays XP0, XP1 and XP2. Assuming that none of these three crosspoint relays is operated (indicating that all three register-outpulsers associated with this particular group of twelve crosspoints may be idle and therefore available for test seizure), relay XP0 will be operated in a circuit extending from ground in FIG. 31, through break contact 9 of relay ET, a parallel circuit consisting of make contact 10 of relay ST1 and break contact 9 of relay RN1, through make contact 11 of relay ST1, through break contacts 1 of relays XP1 and XP2, through break contact 5 of relay XP0, to battery through the winding of relay XP0. Relay XP0, in operating, completes a locking circuit for itself over its own make contact 5 and through break contact 5 of relay XP1 to the previously-described ground under control of make contact 10 of relay ST1. In the left-hand part of FIG. 31 it will be noted that make contacts 9, 10, 11 and 12 of relay XP0 will complete circuits over four of the twelve crosspoints associated with the crosspoint relays XP0, XP1 and XP2 in preparation for completion of some of the initial test lead connections to the register-outpulser of FIGS. 7 through 26. In the meantime, in FIG. 34, upon the operation of relay ST, a circuit is completed for causing the operation of the select magnet SM extending from ground in FIG. 34, over make contact 4 of relay ST, thence over break contact 12 of relay CK2 to battery through the winding of select magnet SM. Select magnet SM in FIG. 34 (also shown symbolically four times in the left-hand part of FIG. 31) will prepare a set of twelve crosspoints as is well known in the art of crossbar switch operation. In the upper right-hand part of FIG. 34, upon the operation of select magnet SM, off-normal contacts thereof will be closed to complete an obvious circuit to cause the operation of relay S(T), the operation of which will complete a circuit in FIG. 42 for causing the operation of hold magnet HM under control of make contact 2 of relay S(T) and break contact 2 of relay ET. As is well known in the art of crossbar switch operation, in FIG. 31 upon the opertaion of a select magnet SM and a hold magnet HM, the four crosspoints will be closed. In FIG. 31, upon the operation of hold magnet HM, the off-normal contacts thereof will be closed, thereby completing a circuit from ground in FIG. 31, over the off-normal contacts of the hold magnet HM, through break contact 4 of relay CT, make contact 2 of relay ST1, thence over break contacts 3 and 9 of relays XP2 and XP1 and over make contact 3 of relay XP0 to battery through the winding of relay CK1. Relay CK1 operates and completes a circuit extending from conductor CK2 in FIG. 31 into FIG. 34, over make contact 6 of relay CK1, to battery through the winding of relay CK2 which thereupon operates. Also, in FIG. 34, upon the operation of relay CK1 of FIG. 31, a locking circuit is supplied for relay S(T) under control of make contact 8 of relay CK1. Also in FIG. 34, upon the operation of relay CK2, the select magnet SM is released, leaving the crosspoints closed in FIG. 31 under control of the operated hold magnet HM. In the meantime, in FIG. 43, upon the opertaion of the start relay ST of FIG. 34, a circuit is completed for causing the operation of the busy relay BY, extending from ground in FIG. 43, over make contact 11 of relay ST, break contact 4 of relay RL, break contact 3 of relay RP, break contact 10 of relay TP(T), break contact 10 of relay RT, to battery through the upper winding of relay BY. Relay BY, in operating completes an obvious circuit over its own make contact 5 through its lower winding to provide itself with a slow-releasing characteristic and completes a circuit in FIG. 43 over its make contact 4 for causing the operation of the auxiliary relay BY1. Relays BY and BY1 of FIG. 43 are operated to prevent seizure of the register-outpulser before a busy test is completed. It will be noted that a circuit extends from the left-hand side of the upper winding of relay BY over make contact 9 of relay CK1, break contact 2 of relay RT, conductor S into FIG. 31, thence over make contact 4 of relay CK1, make contact 12 of relay XP0, over a crosspoint of the crossbar switch, to conductor S extending into the register-outpulser of FIG. 8 and to the sleeve conductor S extending from FIG. 8 into the register, trunk and link circuit of FIG. 5, whereby relay BY of FIG. 43 will be locked operated in the event that the sleeve conductor extending into FIG. 8 of the register-outpulser is grounded from the register, trunk and link circuit of FIG. 5. In the lower left-hand part of FIG. 31, upon the closure of the crossbar switch crosspoint and upon the operation of relay CK1 of FIG. 31, a circuit is completed for causing the operation of relay DP, this circuit extending from ground in FIG. 31, over make contact 1 of relay CK1, make contact 9 of relay XP0, over the closed crosspoint to punching 00, which is crossconnected to punching 00(E)TS, and thence to battery through the winding of relay DP. Relay DP operates as an indication to the automatic test circuit that the particular register-outpulser selected for test is a dial pulse register and therefore must receive dial pulse digits. Upon the operation of relay DP of FIG. 31, and assuming that the register-outpulser of FIGS. 7 through 26 does not have its make-busy relay MB of FIG. 8 operated, a circuit is completed for causing the operation in FIG. 43 of relay RP, this circuit extending from ground in the register-outpulser of FIG. 8, over break contact 7 of relay MB, thence over conductor RPA into FIG. 31, over the closed crosspoint, through make contact 11 of relay XP0, make contact 3 of relay CK1, conductor RP into FIG. 43, thence over break contact 5 of relay DCK, make contact 3 of relay DP, break contact 8 of relay CT, to battery through the winding of the slow-release relay RP, which thereupon operates. Upon the operation of relay RP of FIG. 43, the operating circuit in FIG. 43 of relay BY is opened at break contact 3 of relay RP, thereby allowing relay BY to start to release, provided there is no locking ground on the upper winding thereof from the sleeve conductor S extending into FIG. 8 of the register-outpulser as above mentioned. Assuming that the register-outpulser circuitry of FIG. 8 does not have ground on its sleeve conductor S (indicating that it has not been seized on a service basis from the register, trunk and link circuit of FIG. 5), relay BY of FIG. 43 will release after an interval of time determined by its slow-release characteristic, thereby in turn causing the release in FIG. 43 of relay BY1. Upon the release in FIG. 43 of relay BY1, a circuit is completed for causing the operation in FIG. 8 of the register-outpulser test connector cut-in relay RT1, this circuit extending from ground in FIG. 43, through the lower winding of relay XPC, thence over break contact 5 of relay BY1, conductor RT extending into FIG. 31, thence over make contact 2 of relay CK1, make contact 10 of relay XP0, over the closed crosspoint, thence over conductor RT into FIG. 8, and to battery through the winding of relay RT1. The operation of relay RT1 in FIG. 8, by opening its break contacts 5 and 6, opens the conductors RA and RP extending toward the register, trunk and link circuit of FIG. 5 to prevent any service seizure of this particular register-outpulser. In FIG. 43, it will be noted that the operating circuit for the test connector cut-in relay RT1 of FIG. 8 includes the lower winding of relay XPC. Relay XPC is a trouble indicating relay which will be operated over its lower winding only in the event that there is sufficient current flowing therethrough, the operation of only one register-outpulser cut-in relay (such as relay RT1 of FIG. 8) not allowing sufficient current to flow through the lower winding of relay XPC to operate it. However, if two or more register-outpulser test connector cut-in relays are operated in parallel, thereby indicating a trouble condition somewhere, relay XPC of FIG. 43 would operate because of the lower impedance in series with its lower winding. It will be assumed that relay XPC does not operate. Upon the operation in FIG. 8 of relay RT1, a circuit is completed for causing the operation in FIG. 43 of relay RT, this circuit extending from ground in FIG. 8, over make contact 3 of relay RT1, conductor RT1 extending into FIG. 43, thence over break contact 3 of relay BY, to negative battery through the winding of relay RT. The operation in FIG. 43 of relay RT completes a circuit for causing the operation in FIG. 8 of the test connector relays RT2 and RT3, this circuit extending from ground in FIG. 43, over make contact 1 of relay RT, conductor RT2 extending into FIG. 8, thence over make contact 4 of relay RT1 and to negative battery through the parallel windings of the test connectors RT2 and RT3, which thereupon operate. The operations in FIG. 8 of the test connector cut-in relay RT1 and of the test connector relays RT2 and RT3 close a number of test leads between the register-outpulser of FIGS. 7 through 26 and the automatic test circuit of FIGS. 27 through 51 whereby the remaining circuit operations may take place.

Figure 14:
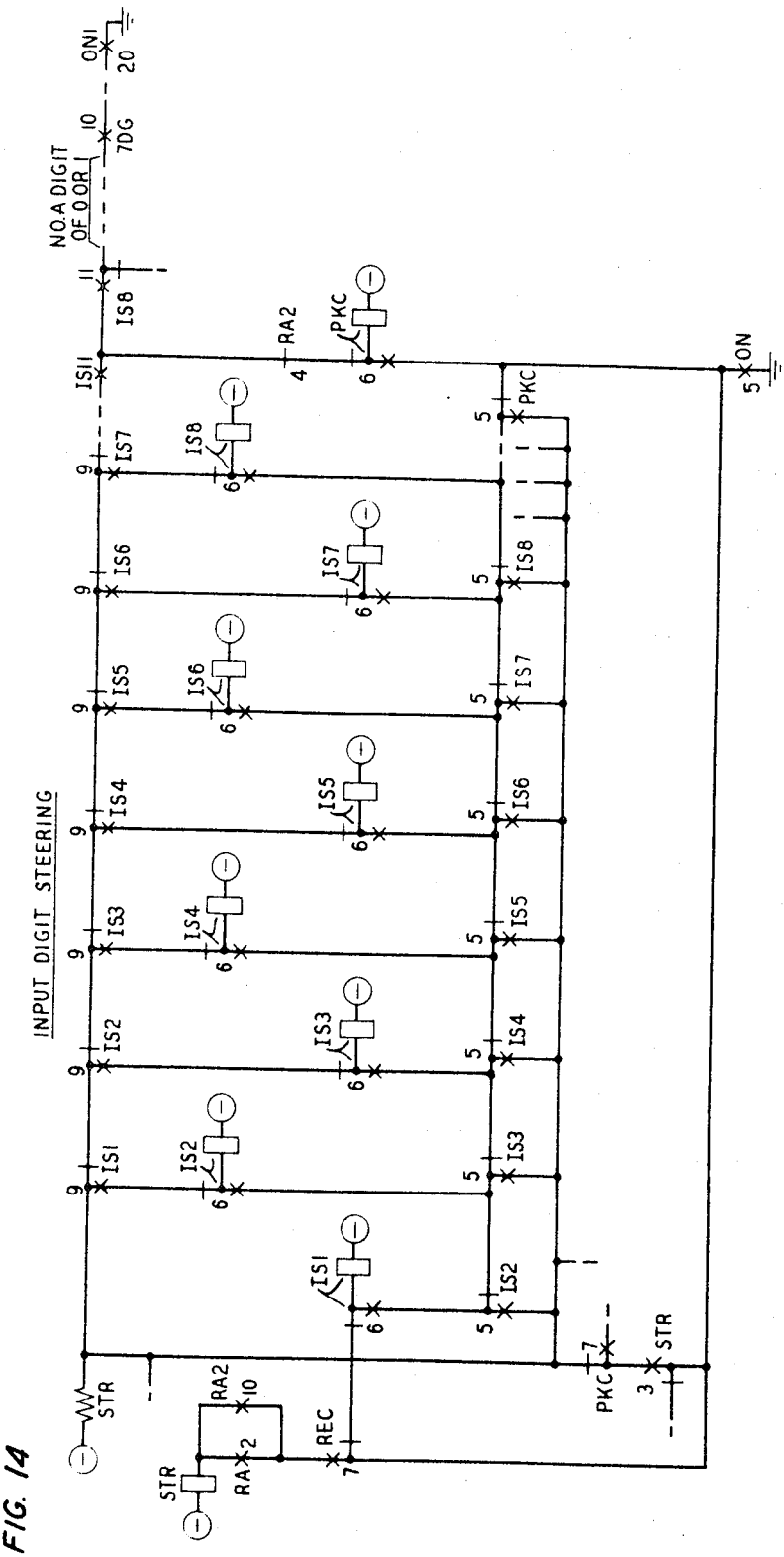

Upon the operation in FIG. 8 of the register-outpulser test connector cut-in relay RT1, circuit operations are initiated for causing the operation in FIG. 8 of the register-outpulser off-normal relay ON and for completing some other circuit operations in the register-outpulser necessary for containuing the connecting operation between the test circuit and the register-outpulser. A circuit is completed for causing the operation in FIG. 34 of relay RI extending from ground in FIG. 8, over break contact 5 of relay MB, make contact 5 of relay RT1, conductor RA extending into FIG. 34, thence over break contacts 7 and 11 of relays BY and CT, to negative battery through the upper winding of relay RI. Relay RI, in operating, completes a circuit over its own make contact 6 through its lower winding to provide itself with a slow-releasing characteristic and completes a locking circuit for itself in FIG. 34 extending over its own make contact 5, break contact 3 of relay TB(T), to ground over make contact 8 of relay RT. Upon the operation in FIG. 34 of relay RI, a circuit is completed in FIG. 43 for causing the operation of relay TP extending from ground in FIG. 43, over break contact 3 of relay RL, make contact 2 of relay RI, make contact 1 of relay RP, to the left-hand side of the winding of relay TP(T), thence to negative battery through the winding thereof. The operating ground in FIG. 43 for causing the operation of relay TP extends from the left-hand side of the winding thereof over conductor TC into FIG. 8, thence over make contact 1 of relay RT1, break contact 2 of relay RL, break contact 8 of relay DCK, break contact 9 of relay SLT, break contact 7 of relay DCK, to negative battery through the lower winding of relay ON, which thereupon operates and locks through its upper winding under control of its own make contact 12 and make contact 1 of relay RT1. In FIG. 8, upon the operation of the off-normal relay ON, a circuit is completed for supplying resistance battery to the left-hand side of the winding of relay SLT1 extending from battery in FIG. 8, over make contact 8 of relay ON, break contact 10 of relay REC, and through resistance SLT1 to the left-hand side of the winding of relay SLT1. Relay SLT1 in FIG. 8 cannot operate, however, because the left-hand side of its winding is also grounded in a circuit extending through diode SLT, break contacts 4 of relays SLT and DCK, make contacts 3 of relay ON, make contact 2 of relay RT1, conductor S1 extending into FIG. 43, and thence to ground over break contact 12 of relay TA1 and make contact 4 of relay RP. In FIG. 8, upon the operation of the off-normal relay ON, an obvious circuit is completed in the upper right-hand part of FIG. 8 for causing the operation of the register-outpulser make-busy relay BM under control of make contact 10 of relay ON. The opertaion in FIG. 8 of relay MB allows the slow release in FIG. 43 of relay RP, the circuit action incident thereto being dealt with in detail below. The operation in FIG. 8 of the register-outpulser off-normal relay ON causes the operation in FIG. 14 of the first input digit steering relay IS1 to prepare the register-outpulser for receiving the first dial pulse digit. Relay IS1 of FIG. 14 is operated in a circuit extending from ground in FIG. 14, over make contact 5 of relay ON, through break contact 7 of relay REC, over break contact 6 of relay IS1, to negative battery through the winding thereof. Relay IS1, in operating, completes a locking circuit for itself over its own make contact 6, thence through the chain of break contacts 5 of relays IS2 through IS8 and of relay PKC to off-normal ground. In FIG. 15 of the register-outpulser it will be noted that the operation of relay IS1 arranges the input digit registration circuit so that the first, or A digit counted by the input pulse counting circuit of FIG. 10 will be steered into the A digit register of FIG. 15.

Upon the operation in FIG. 43 of relay RT, a circuit is completed for causing the operation in FIG. 43 of the test circuit off-normal relay ON and for causing the operation of other circuits incident to this off-normal operation to continue the preparation of the test connections. In FIG. 43, relay ON is operated in a circuit extending from ground in FIG. 43, over make contact 6 of relay ST, break contact 9 of relay CT, make contact 9 of relay RT, break contact 10 of relay ET, to negative battery through the winding of relay ON, which, in operating, completes an obvious circuit in FIG. 43 for operating relay ON1, which in turn completes an obvious circuit for causing the operation of relay ON2. Upon the operation of relay ON in FIG. 43, a resistance holding ground is supplied to the TC lead of FIG. 43 and also extending back into the register-outpulser in FIG. 8. This resistance holding ground extends from ground in FIG. 43, over make contact 1 of relay ON, through resistance DCK, break contact 11 of relay RL, make contact 3 of relay RT, make contact 1 of relay TP(T), and over break contact 12 of relay TB(T), to conductor TC to supply a resistance holding ground for locking operated relay TP(T) in FIG. 43. The resistance holding ground on conductor TC in FIG. 43 also extends into FIG. 8 and over previously traced circuitry to the upper and lower windings of relay ON to hold operated this off-normal relay of the register-outpulser. Upon the operation of relay ON of FIG. 43, a circuit is completed in FIGS. 35 and 36 for causing the operation of in-steering relay IS1 of FIG. 35, this circuit extending from ground in FIG. 36, over make contact 20 of relay ON, break contact 9 of relay RCA, break contact 6 of relay TDT2, break contact 6 of relay IPC, break contact 8 of relay STF, and thence through the series of break contacts 6 of relays IS11 through IS4, conductor ISB into FIG. 35, thence over break contacts 6 of relays IS3 and IS2, break contact 10 of relay IP2A, break contact 2 of relay SD0, break contact 10 of relay SAR, break contact 5 of relay IS1, to negative battery through the winding of relay IS1. Relay IS1, in operating, completes a locking circuit over its own make contact 5, thence over break contacts 6 of relay IS2 and IS3 to the previously-described operating ground on conductor ISB. The operation of the in-steering relay IS1 of FIG. 35 completes circuits in FIG. 39 whereby the inpulse register checking circuit can cause the operation of two out of the six matching relays MR0 through MR10 in the upper right-hand corner of FIG. 39. This circuit extends from ground in FIG. 39, over make contact 16 of relay ON, break contact 9 of relay RCY, over the wipers of sections 3 and 4 of the A digit switch (which as recalled has been set on its contact 2, thereby to ground conductors A0 and A2 to simulate the first called digit of 2), thence over conductors A0 and A2 into cable A0–7, over make contacts of relay IS1, thence over break contacts of the arbitrary exit digit steering relays FRS through ARS, cable IP, conductors 0 and 2, to battery through the windings of relays MR0 and MR2, thereby operating these latter two matching relays. In FIG. 42, upon the operation of relay ON1 of FIG. 43, a circuit is completed for causing the operation of relay RA1 extending from ground in FIG. 42, over make contact 11 of relay ON1, and thence in parallel over break contacts 5 and 7 of respective relays RA and SLF2, to negative battery through the winding of relay RA1. Also in FIG. 46, upon the operation of relays ON and ON1 of FIG. 43, circuits are completed for causing the operation of relay PG1 and the release of relay PG2 to place the pulse generator of FIG. 46 in condition to start generating dial pulses when required. In FIG. 46, ground extends over make contact 14 of relay ON1, through break contacts 4, 7 and 4 of relays W, DK and RK, to negative battery through the winding of relay PG1, thereby causing relay PG1 to operate and to lock over its own make contact 1, through resistance LKG to off-normal ground under control of break contact 10 of relay PTC. Relay PG1, in operating, extends ground in FIG. 46 over its make contact 2 to the left-hand side of condenser DP and of resistance DP1. This causes a steady current to flow from left to right in the lower winding of relay PG2 which tends to cause relay PG2 to be in a released condition and allows condenser DP to draw charging current from left to right through the upper winding of relay PG2, which tends to cause relay PG2 to be operated. The current through the upper winding of relay PG2 will prevail, thereby causing relay PG2 to operate, until such time as the charging current has diminished to a level where the steady current through the lower winding of relay PG2 can exercise control and cause the release of relay PG2. Upon the release of relay PG2, with relay PG1 remaining operated, the circuit remains in this status until outpulsing begins, as will be described hereinafter. Upon the operation of the off-normal relay ON2 of FIG. 43, a circuit is completed in FIG. 31 for locking operated relay DP extending from ground in FIG. 31, over make contact 3 of relay ON2, make contact 10 of relay ST, make contact 6 of relay DP, to the winding of relay DP. Also in FIG. 34, relay ST becomes locked in a circuit completed over its own make contact 2, to ground over make contact 23 of relay ON2. In regard to the latter locking circuit of relay ST of FIG. 34, it will be appreciated that the ST key of FIG. 34 may now be released by the test personnel, leaving relay ST locked under control of the off-normal relay ON2. The release of the ST key in FIG. 34 will allow the operation of relay RN (contingent upon a subsequent release of relay ST) in FIG. 34 at such time as the test person chooses to operate the RN key. Upon the operation of relay ON of FIG. 43, a circuit is completed in FIG. 37 for causing the operation of the first outsteering relay OS1, this circuit extending from ground in FIG. 37, over make contact 8 of relay ON, break contact 1 of relay PTC, break contact 2 of relay PTC, break contact 5 of relay OS1, to battery through the winding of relay OS1. Relay OS1, in operating, locks over its own make contact 5 and through the chain of break contacts 6 of the other steering relays OS2 through OS11, break contact 6 of relay EOP, to off-normal ground over make contact 9 of relay ON. Upon the operation of outsteering relay OS1 of FIG. 37, and upon the operation of the off-normal relay ON2 of FIG. 43, circuits are completed in FIG. 45 for operating two of the five readout relays RR0 through RR7 of the called digit register. These circuits extend from ground in FIG. 45, over make contact 8 of relay ON2, to the wipers of sections 1 and 2 of the A digit switch (set on their terminals 2 to indicate the digit of 2), thence over conductors A0 and A2, through cable A0–7, over make contacts of relay OS1, to battery through the windings of relays RR0 and RR2, causing these latter relays to operate. The operation in FIG. 45 of the two readout relays RR0 and RR2 adjusts the outpulse counting circuit of FIG. 41 to properly count and to cause the pulse generator of FIG. 46 to transmit the first digit of two when required to do so, as will be described hereinafter.

As previously mentioned, upon the operation in FIG. 8 of the register-outpulser MB relay, the test circuit relay RP in FIG. 43 is allowed to start its slow-release. Upon the release in FIG. 43 of relay RP, relays TP(T) of FIG. 43 and relay ON of FIG. 8 remain operated to the resistance ground on conductor TC in FIGS. 43 and 8. The release of relay RP of FIG. 43 also removes ground in FIG. 43 from conductor S1 extending into FIG. 8, thereby allowing relay SLT1 of FIG. 8 to operate in the previously-described circuit in series with resistance SLT1. In FIG. 8, upon the operation of relay SLT1, a circuit is completed in the upper right-hand corner for causing the operation of relay SLT in an obvious circuit through its upper primary winding. Relay SLT, in operating, completes a locking circuit for itself through its lower secondary winding to resistance battery under control of break contact 8 of relay MR and make contact 1 of relay SLT. In the upper central part of FIG. 8, upon the operation of relay SLT, a circuit is completed for operating relay ON1 extending from ground in FIG. 8, over make contact 11 of relay ON, make contact 2 of relay SLT, to negative battery through the winding of relay ON1, which thereupon operates and locks over its own make contact 18 independently of make contact 2 of relay SLT. The operation of relay ON1 completes an obvious circuit in the upper central part of FIG. 8 to cause the operation of off-normal relay ON2, which in turn completes a circuit from ground over its make contact 12 and through break contact 6 of relay RA2, through the winding of relay RA1 to negative battery, thereby causing the operation in FIG. 8 of relay RA1. The operations in FIG. 8 of the off-normal relays ON1 and ON2 supply grounds in FIGS. 10 and 11 to prepare the input and output pulse counting circuits for operation. Also, in FIG. 21 the operation of relays ON1 and ON2 causes the operation of the first called digit outsteering relay OS1 in a circuit extending from ground in FIG. 20, over make contact 4 of relay ON1, conductor X into FIG. 21, thence over break contact 8 of relay REC, through break contact 6 of relay OS1, to negative battery through the winding of relay OS1, which operates and locks over its own make contact 6 and thence through the series of break contacts 5 of relays OS2 through OS7, et cetera, relays ST and ST1, to ground over make contact 18 of relay ON2.

Upon the operation of off-normal relay ON1 of FIG. 8 circuit operations take place in FIGS. 7, 8 and 12 for continuing to prepare the register-outpulser for test. Relay MR of FIG. 8 is operated in a circuit extending from battery in FIG. 8, over make contact 2 of relay ON1, through resistance FR2, make contact 19 of relay ON1, through the winding of relay MR, through the upper primary winding of relay CCA, thence over break contact 4 of relay MR, make contact 5 of relay RT2, conductor IC into FIG. 43, thence over make contact 7 of relay TP(T), make contact 2 of the CPT key, to negative battery through resistance CPT. Relay MR of FIG. 8 operates in this circuit in series with the upper winding of relay CCA (which does not operate), relay MR completing a locking circuit for itself over its make contact 4 in FIG. 8 to negative battery supplied by make contact 2 of relay ON1. In the upper right-hand part of FIG. 8, upon the operation of relay MR, the locking circuit through the lower secondary winding of relay SLT is opened and make contact 8 of relay MR short circuits the lower winding of relay SLT, thereby to provide this relay with a slow-release characteristic at such time as the upper winding of relay SLT may be deenergized upon the release of relay SLT1. In FIG. 7, upon the operation of relay ON1, a circuit is completed for operating relay L1 extending from ground in FIG. 7, through diode T, through the left secondary winding of relay L1, through upper left winding of the repeat coil, thence over make contact 1 of relay ON1, through resistance PD3, break contact 1 of relay REC, the lower left winding of the repeat coil, through the right-hand tertiary winding of relay L1 to negative battery through diode R. Upon the operation of relay L1 of FIG. 7, circuits are completed in FIG. 8 for causing the operation of the slow-release relay L2 and of relay LA. Relay L2 is operated in a circuit extending from ground in FIG. 8, over make contact 24 of relay ON1, through make contact 4 of relay L1, to negative battery through the winding of relay L2. Relay LA operates in a circuit extending from ground in FIG. 8, over make contact 24 of relay ON1, through make contact 3 of relay L1, through the upper primary winding of relay RA, to negative battery through the LA resistance. Upon the operation of relay ON1 of FIG. 8, the pulse generator of FIG. 12 is placed in a starting condition with relay PG1 operated and relay PG2 released to prepare this circuit for generating dial pulses, as will be explained. Relay PG1 of FIG. 12 operates in a circuit extending from ground in FIG. 12, over make contact 10 of relay ON1, thence over break contacts 7, 5, 7 and 6 of respective relays RL, W, IC and RK, thence to negative battery through the winding of relay PG1. Relay PG1, in operating, applies off-normal ground through its make contact 4 to the left-hand side of condenser PG and to the lower junction of resistance PG2. Condenser PG thereupon carries charging current from left to right through the lower primary winding of relay PG2 to negative battery through break contact 6 of relay TMFA and resistance PG7, this charging current passing from left to right through the lower primary winding of relay PG2, causing relay PG2 to operate. A steady current also flows from left to right through the upper secondary winding of relay PG2 through resistances PG2 and PG3, break contact 5 of relay TMFA and break contact 6 of relay TMFA under control of resistance PG7, this current in the upper winding of relay PG2 tending to cause relay PG2 to become released. At such time as the charging current through the lower winding of relay PG2 has decreased sufficiently, the steady current in the upper winding thereof will assume control and will cause relay PG2 to assume a released condition. Without any further control at this particular time over the pulse generator of FIG. 12, relay PG1 thereof remains in an operated condition and relay PG2 remains released.

Upon the operation in FIG. 8 of relay SLT, ground is supplied to the sleeve lead S of FIG. 8 and also through FIG. 31 into FIG. 43, ground is applied to the S1 lead in FIG. 8 also extending into FIG. 43 over make contact 2 of relay RT1 in FIG. 8, and the base of transistor Q1 in FIG. 8 is connected to the TC lead in FIG. 8 also extending over make contact 1 of relay RT1 into FIG. 43. In FIG. 8 ground extends over break contact 5 of relay DCK and over make contact 6 of relay SLT to the sleeve conductor S, also extending over conductor S through FIG. 31 into FIG. 43, thence over make contact 2 of relay RT, break contact 6 of relay SLF2, to negative battery through the upper primary winding of relay SLF, which thereupon operates. In FIG. 43, upon the operation of relay SLF a circuit is completed for causing the operation of relay SLF2 from ground in FIG. 43, over make contact 1 of relay ON2, make contact 6 of relay SLF, to negative battery through the winding of relay SLF2 which, in operating, completes a locking circuit for relay SLF through the secondary winding of relay SLF under control of make contact 6 of relay SLF2. Upon the operation of relay SLF2, a circuit is completed for causing the operation in FIG. 43 of relay TB(T) extending from battery in FIG. 43, through the winding of relay TB(T), through break contact 6 of relay TB(T), make contact 9 of relay SLF2, break contact 7 of relay RP, break contact 12 of relay TA1, conductor S1 extending into FIG. 8, thence over make contact 2 of relay RT1, make contact 3 of relay ON, break contact 4 of relay DCK, to ground over make contact 4 of relay SLT, relay TB(T), in operating, completing a locking circuit for itself in FIG. 43 over its own make contact 6. In FIG. 34, upon the operation of relay TB(T) the upper winding of relay RI is deenergized, thereby allowing relay RI to initiate its release under control of the slow-release characteristic derived from its short circuited secondary winding. Before the release of relay RI of FIG. 34, the TC leads of FIGS. 43 and 8 have connected thereto in parallel to ground the DCK resistance of FIG. 43 and the DCK resistance of FIG. 8 in the base circuit of transistor Q1, one circuit extending from ground in FIG. 43 through make contact 1 of relay ON, resistance DCK, break contact 11 of relay RL, make contact 3 of relay RT, make contact 1 of relay TP(T), make contact 12 of relay TB(T), make contact 4 of relay RI, conductor TC extending into FIG. 8 and over make contact 1 of relay RT1 to the TC conductor of FIG. 8, the other circuit extending from the TC conductor of FIG. 8 through break contact 2 of relay RL, break contact 8 of relay DCK, make contact 9 of relay SLT, through resistance DCK to ground. The upper secondary winding of the off-normal relay ON of FIG. 8 and the winding of relay TP(T) in FIG. 43 are held operated in this circuit involving the parallel circuitry of the two DCK resistances. Under these circumstances the DCK resistance of FIG. 8 does not draw enough current to cause the operation or firing of transistor Q1. However, when relay RI of FIG. 34 eventually releases, resistance DCK of FIG. 8 is left alone to provide full current drain for relays ON of FIG. 8 and relay TP(T) of FIG. 43, by virtue of the opening of make contact 4 of relay RI in FIG. 43, thereby permitting resistance DCK of FIG. 8 to draw enough current to lower the potential of the base of transistor Q1 sufficiently to cause this transistor to go into a conductive condition, the results of which will be described below.

In the meantime, upon the operation in FIG. 43 of relay SLF2, circuits are completed between FIG. 7 of the register-outpulser and FIG. 42 of the test circuit whereby the tip and ring circuit is completely closed. This circuit extends from negative battery in FIG. 42, through the primary winding of relay A, through break contact 8 of relay SG2, through make contact 11 of relay SLF2, conductor FR extending into FIG. 7, thence over make contact 3 of relay RT2, break contacts 8 and 11 of respective relays TMF and REC, thence over make contact 1 of relay RT2, conductor R extending into FIG. 42, over break contact 8 of relay PTC through resistance TD, over break contact 6 of relay PTC, thence over conductor T into FIG. 7 and therein over make contact 2 of relay RT2, break contact 3 of relay REC, through the upper primary winding of relay CB, over break contact 9 of relay REC, through make contact 4 of relay RT2, conductor FT returning into FIG. 42, thence over make contact 12 of relay SLF2, break contact 6 of relay SG2, to ground through the secondary winding of relay A. In the series loop circuit just described relays CB of FIG. 7 and A of FIG. 42 operate in series. Upon the operation in FIG. 7 of relay CB, a circuit is completed in FIG. 8 for causing the operation of relay TR1 extending from ground in FIG. 8, over make contact 22 of relay ON1, make contact 3 of relay CB, break contact 1 of relay REC, to negative battery through the winding of relay TR1 which, in operating, extends ground in FIG. 8 over make contact 6 of relay L2 and make contact 9 of relay TR1 to supply an additional ground to the sleeve conductor S of FIGS. 8 and 43. Upon the operation in FIG. 42 of the A relay, a circuit is completed for causing the operation of relay AA of FIG. 42 extending from off-normal ground in FIG. 42, over make contact 4 of relay ON, break contacts 7 and 8 of relays CT and RCA, thence over make contact 3 of relay A, through resistance AA, to negative battery through the winding of relay AA. In the upper left-hand corner of FIG. 42, it will be apparent that the operation of relay AA causes the slow-release relay B to operate, which in turn causes relay B1 to become operated. In FIG. 38, upon the operation of relays A and B1 of FIG. 42, the inpulse counting circuitry is initially prepared to count pulses as will be described hereinafter.

As was mentioned above, transistor Q1 of FIG. 8 is caused to assume a conducting condition when resistance DCK in FIG. 8 is caused to carry the full holding current for relays ON of FIG. 8 and TP(T) of FIG. 43. Upon conduction in transistor Q1 of FIG. 8, relay DCK operates in a circuit including the collector of transistor Q1, resistance Q1, the winding of relay DCK, to negative battery through make contact 1 of relay ON, the operated relay DCK completing a locking circuit over its own make contact 12 to ground over make contact 11 of relay ON, thereby also causing the transistor Q1 to turn off by virtue of grounding the collector circuit. The operation of relay DCK also causes the grounding in FIG. 8 of the TC lead in a circuit extending from ground in FIG. 8, over make contact 8 of relay TR1, make contact 8 of relay DCK, and through break contact 2 of relay RL to the TC lead, thereby supplying holding ground for the off-normal relay ON of FIG. 8 and for relay TP(T) of FIG. 43. The operation of relay DCK of FIG. 8 also completes a circuit for causing the operation of its counterpart relay DCK of FIG. 43 extending from ground in FIG. 8, over make contact 11 of relay ON, through make contacts 2 and 16 of respective relays DCK and RT2, conductor DCK extending into FIG. 43, thence to negative battery through the winding of relay DCK, which operates and locks in an obvious manner over its own make contact 11 to ground through make contact 2 of relay ON1. Also, in FIG. 8 upon the operation of relay DCK, relay SLT1 of FIG. 8 is shunted down thereby to cause its release after a time interval determined by its slow-release characteristic, this action being effected by the extension from FIG. 43 into FIG. 8 of ground on the S1 lead, this circuit extending from ground in FIG. 43 over make contact 5 of relay TB(T), break contact 7 of relay RP, break contact 12 of relay TA1, conductor S1 extending into FIG. 8, thence over make contact 2 of relay RT1, make contact 3 of relay ON, make contact 4 of relay DCK, through the SLT diode, to the left-hand side of the winding of relay SLT1, which thereupon starts to release. Upon the release in FIG. 8 of relay SLT1, relay SLT in the upper right-hand part of FIG. 8 is also deenergized, thereby allowing relay SLT to release after an additional interval of time determined by the slow-release characteristic due to its short-circuited lower secondary winding.

Figure 21:
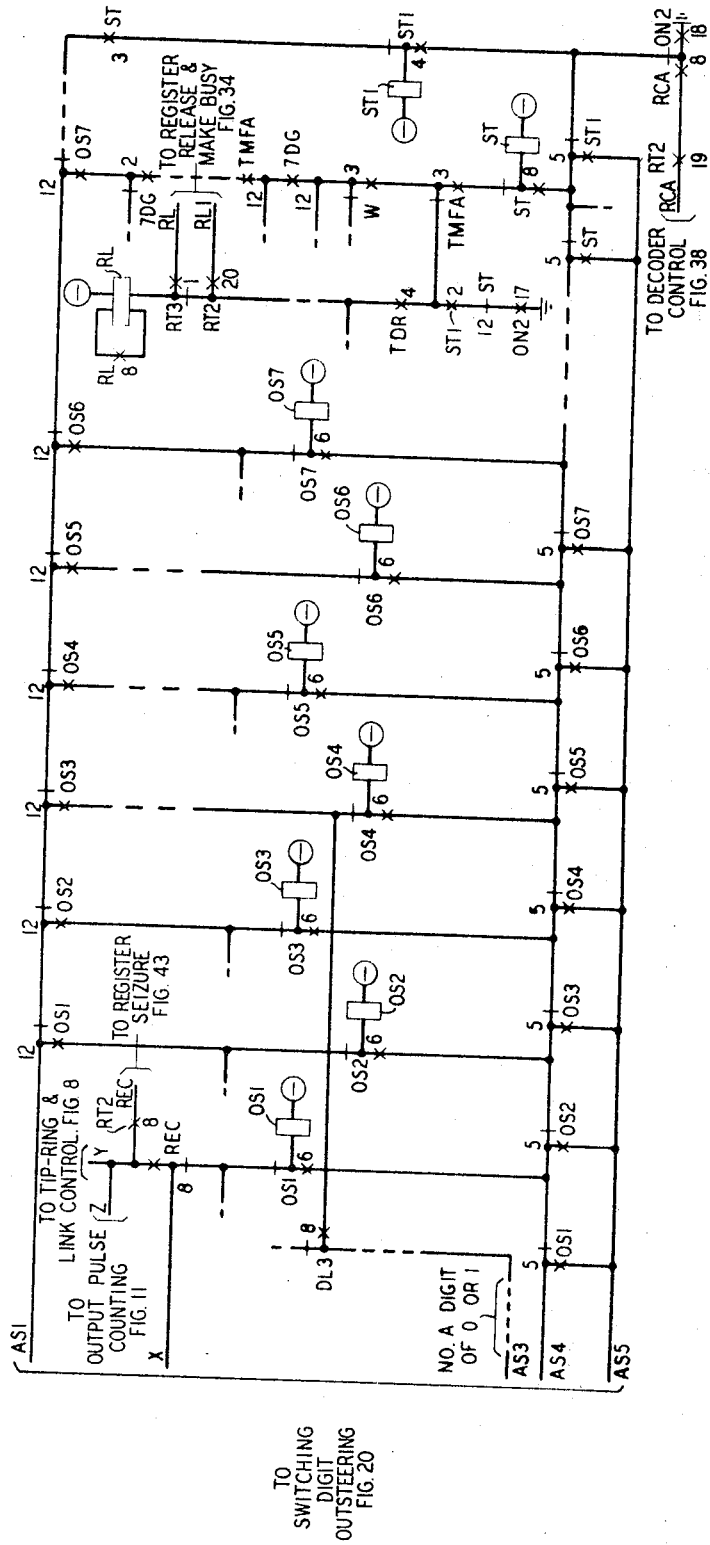
Figure 25:
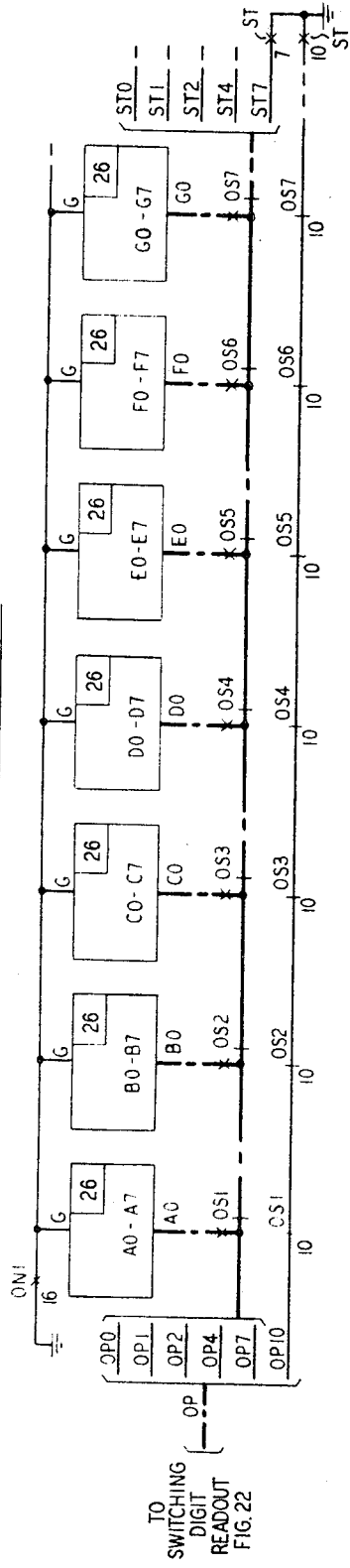
Figure 26:
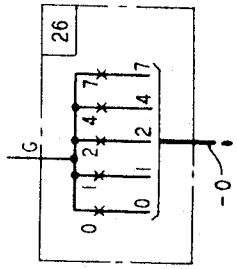

Upon the eventual release in FIG. 8 of relay SLT, a circuit is completed in FIG. 8 for causing the operation of relay REC extending from ground in FIG. 8, over make contact 22 of relay ON1, break contact 3 of relay SLT, make contact 4 of relay TR1, make contact 10 of relay DCK, to negative battery through the winding of relay REC. Upon the operation in FIG. 8 of relay REC, circuits are completed for locking relays REC and TR1 of FIG. 8, this circuit extending from off-normal ground in FIG. 20 over make contact 4 of relay ON1, conductor X into FIG. 21, thence over make contact 8 of relay REC, conductor Y extending into FIG. 8, to the winding of relay REC and through diode TR1 and make contact 6 of relay TR1 to the winding of relay TR1. The operation of relay REC also causes the T and R leads into FIG. 7 from FIG. 42 to be terminated in the windings of the L1 relay of FIG. 7 under control of make contacts 3 and 1 of relay REC, thereby causing relay L1 of FIG. 7 to remain in an operated condition under control of the tip-ring loop closed through the TD resistance as previously described in reference to FIG. 42. In FIG. 7, the operation of relay REC removes relay CB from the previously described loop circuit, thereby causing relay CB to become released, and completes a loop circuit for the fundamental tip and ring leads FT and FR extending between FIGS. 7 and 42 through the relays RV and LT of FIG. 7 in series. This latter circuit extends from the FT lead in FIG. 7, through make contact 4 of relay RT2, thence through the series make contacts 1 and 7 of relays PG1 and L1, through break contacts 6 of relays RCA and TMF, thence over make contact 9 of relay REC, through resistances FT1 and RV1, through relays RV and LT, over make contact 3 of relay ON2, resistance FR1, make contact 11 of relay REC, thence over break contact 8 of relay TFM and make contact 3 of relay RT2 to conductor FR. In this fundamental tip and ring loop circuit, relay LT of FIG. 7 will operate as an indication that this loop is closed, relay RV not operating because this relay is a polar relay and will not respond to the loop current flowing from top to bottom through its winding under the present conditions of ground on the FT lead and battery on the FR lead supplied through the windings of the A relay of FIG. 42. As will be described later in the detailed description, under trunk seizure conditions a reversal of this battery ground condition will take place in the test circuit, which in turn will cause the operation of relay RV in FIG. 7 to effect the so-called "stop-go" signal timing in the register-outpulser. This matter will be dealt with in detail hereinafter. In FIG. 21, upon the operation of relay REC, ground through make contact 8 thereof is also extended over conductor Z into FIG. 11 to complete the preparation of the output pulse counting circuitry of FIG. 11 for purposes to be described below.

When the tip and ring loop extending from FIG. 42 into FIG. 7 is completed through the left-hand windings of the repeat coil in series with relay L1 of FIG. 7 upon the operation of relay REC of FIG. 8, dial tone is supplied to the "calling end" of the connection extending from the source of dial tone in FIG. 7, through condenser C6, break contact 4 of relay DP, make contact 2 of relay TR1, resistance DT1, to ground through the right-hand windings of the repeat coil, thence by induction into the left-hand windings of the repeat coil and over the tip-ring loop by means of conductors T and R extending from FIG. 7 into FIG. 42 to the tone detector of FIG. 42. The tone detector of FIG. 42 responds to this dial tone to cause the operation of relay TD which locks over its own make contact 9 and conductor TD into FIG. 41, over break contact 12 of relay PTC, to ground over make contact 15 of relay ON1. Upon the operation in FIG. 42 of relay TD, a circuit is completed for causing the operation in FIG. 43 of relay PTC extending from ground in FIG. 20, over make contact 4 of relay ON1, conductor X extending into FIG. 21, thence over make contact 8 of relay REC, make contact 8 of relay RT2, conductor REC extending into FIG. 43, thence over make contact 2 of the CPT key, break contact 5 of relay RP, make contact 2 of relay TD, make contact 8 of relay SLF2, break contact 5 of relay PTC, to negative battery through the winding of relay PTC. Relay PTC, in operating, locks over its own make contact 5 in FIG. 43 to ground over make contact 12 of relay ON. Relay PTC, in operating, opens its break contact 12 in FIG. 41, thereby opening the locking circuit for relay TD in FIG. 42 and opens its break contacts 8 and 6 in FIG. 42, thereby to open the operating circuit for relay TD, whereupon relay TD of FIG. 42 releases. In FIG. 42, the tip and ring loop on conductors T and R extending thereto from FIG. 7 is completed in a circuit extending from the tip conductor T in FIG. 42, over make contact 6 of relay PTC, make contact 4 of relay PG1, through resistance LP16, and over make contact 8 of relay PTC to the ring conductor R. Also in FIG. 41, upon the operation of relay PTC, ground is extended over make contact 15 of relay ON1 and make contact 12 of relay PTC to the circuit for controlling relays W and Z in FIG. 41 for purposes to be described hereinafter.

Figure 10:
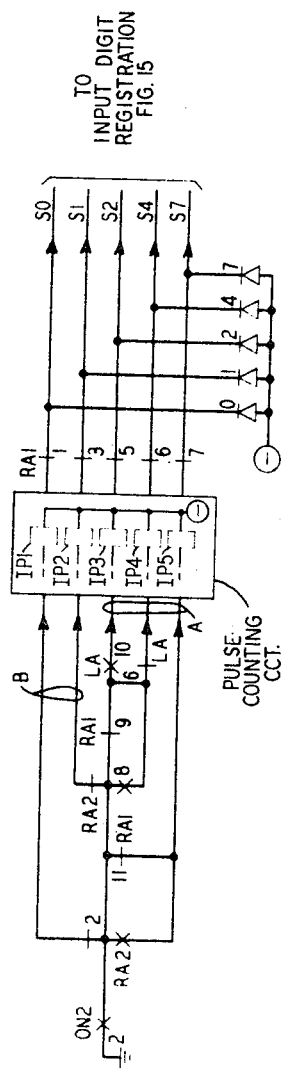
Figure 11:
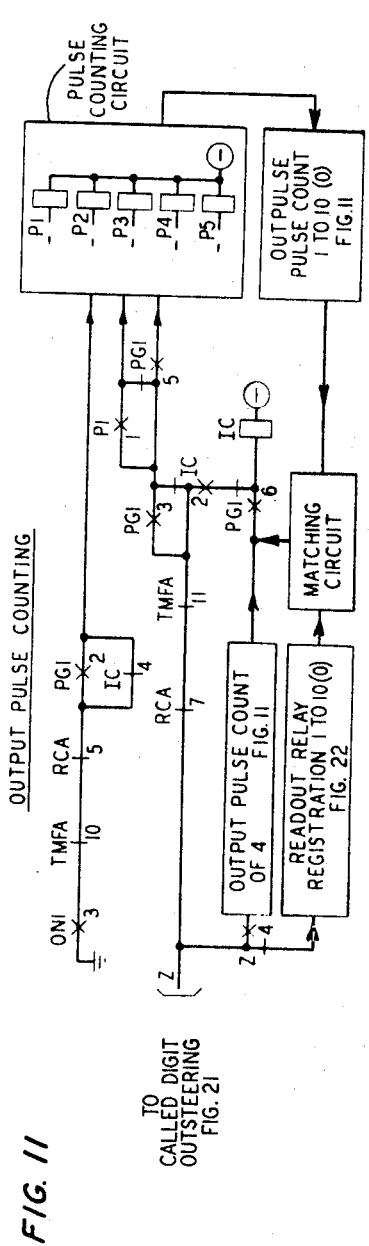

Upon the operation of relay PTC of FIG. 43, the status of various of the circuits is as follows. The tip and ring loop consisting of the tip and ring leads T and R extending between FIG. 42 and FIG. 7 is closed in FIG. 42 under control of make contact 4 of relay PG1 and in FIG. 7 extends through the left-hand windings of the repeat coil in series with the operated relay L1 of FIG. 7. The fundamental tip and ring loop comprising the leads FT and FR extending between FIGS. 7 and 42 is terminated in the primary and secondary windings of the operated relay A in FIG. 42 and in FIG. 7 includes the windings of relays RV and LT in series therewith, relay LT being in an operated condition. In FIG. 8 of the register-outpulser, relays ON, ON1, ON2, DCK, MR, MB, REC, TR1, RA1, L2, LA, RT1, RT2 and RT3 are operated. In the pulse generator circuit of FIG. 12 of the register-outpulser, relay PG1 is operated and relay PG2 is released. In the input digit steering circuit of FIG. 14, relay IS1 is operated; and, in the called digit outsteering circuit of FIG. 21, relay OS1 is operated. In FIGS. 10 and 11 of the register-outpulser the input pulse counting and the output pulse counting circuits have been adjusted in their normal conditions preparatory to counting pulses as will be described hereinafter. In FIG. 31 of the automatic test circuit, relays CK1 and DP are operated as are the necessary hold magnets (HM) of the crossbar link switch. In the select magnet control circuitry of FIG. 34, relays S, CK2, ST and ST1 are in operated conditions. In the inpulse steering circuitry of FIGS. 35 and 36, relay IS1 is in an operated condition; and, in the outsteering circuitry of FIG. 37, relay OS1 is operated. In FIG. 42, the hold magnet HM is operated, as are relays A, AA, B, B1 and RA1. The pulse generator circuitry of FIG. 46 is arranged with relay PG1 operated and relay PG2 released preparatory to developing dial pulses when required. In FIG. 39 the matching relays MR0 and MR2 are operated to prepare the circuit for matching the first or A digit of 2; and, in FIG. 45 the called digit register readout relays RR0 and RR2 are operated to assist in checking the proper use of the first A digit of 2. In the register seizure circuit of FIG. 43 the following relays are operated: relays ON, ON1, ON2, DCK, RT, TB(T), TP(T), PTC, SLF and SLF2.

The circuits of the register-outpulser and of the automatic test circuit remain in the conditions above summarized upon the operation in FIG. 43 of relay PTC until the automatic test circuit begins to transmit to the register-outpulser the dial pulses of the first of the assumed called digits, such circuit action to be the subject of the detailed description in the next main section.

*Registering test address data*

The transmission of the test address data, the assumed called number 243–0123, to the register-outpulser by the automatic test circuit is initiated when relay PTC operates in FIG. 43 as previously described. It will be recalled with reference to FIG. 45 that the readout relays RR0 and RR2 are at the moment operated as an indication that the first digit to be outpulsed should be the digit 2. Upon the operation of relay PTC of FIG. 43, a circuit is completed in FIG. 41 for causing the operation of the readout check relay RK extending from ground in FIG. 41, over make contact 6 of relay ON2, make contact 3 of relay PTC, make contact 1 of relay RR0, break contact 1 of relay RR1, make contact 1 of relay RR2, break contacts 1 of relays RR4 and RR7, to negative battery through the winding of relay RK which thereupon operates. Upon the operation of relay RK in FIG. 41, the locking circuit in FIG. 46 for relay PG1 is opened at break contact 4 of relay RK, thereby allowing relay PG1 to release to initiate the oscillation of relays PG1 and PG2 in the pulse generator of FIG. 46 for transmitting dial pulses to the register-outpulser. In FIG. 46 upon the release of relay PG1, a circuit is completed from ground in FIG. 46, over make contact 14 of relay ON1, over break contact 2 of relay PG1, to the right-hand side of the windings of relay PG2. The upper winding of relay PG2 carries charging current for condenser DP in an obvious circuit including resistance PG2 and the current flows from right to left through this upper primary winding of relay PG2; whereas, the lower secondary winding of relay PG2 carries a steady current from right to left through its winding under control of resistances DP1 and PG2. The charging current from right to left through the upper winding of relay PG2 keeps relay PG2 in a released condition until such time as this charging current has reduced to a level whereby the right-to-left steady current through the lower winding of relay PG2 can cause relay PG2 to operate. Relay PG2, in operating, completes an obvious circuit in FIG. 46 over its make contact 2 to cause the operation of relay PG1. Relay PG1, in operating, extends ground over its make contact 2 in FIG. 46 to reverse the current situations in both of the windings of relay PG2, the reverse charging current flowing from left to right in the upper winding of relay PG2 keeping this relay operated until such time as the charging current decays to a level such that the steady left-to-right current in its lower winding will cause relay PG2 to release. Upon the release of relay PG2, relay PG1 is released to cause this cycle to repeat itself. Relays PG1 and PG2 will continue to successively release and reoperate as long as the locking circuit for relay PG1 remains open. Whenever any one of the relays W, DK and RK of FIG. 41 is operated, the locking circuit for relay PG1 in FIG. 46 will be opened, whereupon relays PG1 and PG2 will continue to oscillate at a timed rate determined by the resistance-capacitance charging current timing through the upper winding of relay PG2. Likewise, at such time as the locking circuit is completed for relay PG1 in FIG. 46, relay PG1 will thereupon be held in an operated condition to stop the pulsing of relays PG1 and PG2.

It will be recalled that the tip and ring loop extending over conductors T and R from FIG. 42 into FIG. 7 to hold operated relay L1 of FIG. 7 is controlled in FIG. 42 by make contact 4 of relay PG1. Therefore, each time relay PG1 releases and reoperates it will transmit to the register-outpulser one open loop period representing a single pulse on a dial pulse basis. This will cause relay L1 of FIG. 7 to release and reoperate in response to each pulse transmitted by make contact 4 of relay PG1 in FIG. 42. In FIG. 7, it will be recalled that make contact 7 of relay L1 (upper right-hand portion of FIG. 7) is in series with the fundamental tip and ring loop (conductors FT and FR) extending between FIG. 7 and FIG. 42. Therefore, each time relay L1 of FIG. 7 releases and reoperates in response to each open loop pulse, relay A of FIG. 42 will release and reoperate in response to these open loop pulses repeated into FIG. 42. The repeating of these dial pulses into relay A of FIG. 42 simulates the repeating of dial pulses by a register-outpulser into selectors of a switching train, such as those shown in FIG. 6. Also, as will be described in detail below, each release and reoperation of relay PG1 of FIG. 46 will cause the outpulse counting circuitry of FIG. 41 (particularly relays P1 through P5) to count the pulses transmitted by the automatic test circuit to the register-outpulser. Furthermore, each release and reoperation of relay L1 of FIG. 7, responsive to the dial pulses transmitted thereto by the automatic test circuit, will cause the input pulse counting circuitry of FIG. 10 to count these pulses received from the automatic test circuit. Also, each release and reoperation of relay A of FIG. 42, responsive to the dial pulses repeated to the automatic test circuit by the register-outpulser, will cause the inpulse counting circuitry on the right-hand part of FIG. 38 to count these dial pulses repeated to the automatic test circuit by the register-outpulser.

The outpulse counting circuit of FIG. 41, particularly relays P1 through P5 thereof, is a well-known circuit for counting dial pulses up to a total count of ten pulses by utilizing only five relays. Upon the first release of relay PG1 of FIG. 46, at the beginning of the first open loop dial pulse period, relay P1 of FIG. 41 is operated in a circuit extending from ground in FIG. 41, over make contact 16 of relay ON2, break contact 4 of relay DK, break contact 5 of relay PG1, break contact 6 of relay P2, to negative battery through the winding of relay P1, which operates and locks in a circuit extending from the left-hand side of its winding, through break contact 6 of relay P2, make contact 1 of relay P1, and break contact 4 of relay DK to off-normal ground, independently of the contacts of relay PG1. Upon the reoperation of relay PG1, at the end of the first pulse, relay P2 of FIG. 41 operates in a circuit extending from negative battery, through the winding of relay P2, over break contact 12 of relay P2, make contact 3 of relay P1, make contact 5 of relay PG1, and break contact 4 of relay DK to off-normal ground. Relay P1 remains locked in a circuit extending from the left-hand side of its winding, over make contact 6 of relay P2, make contact 3 of relay P1, make contact 5 of relay PG1, over break contact 4 of relay DK, to off-normal ground, thereby leaving relays P1 and P2 operated at the end of the first pulse. Upon the release of relay PG1 at the beginning of the second pulse, the locking circuit for relay P1 is opened at make contact 5 of relay PG1, thereby allowing relay P1 to release, relay P2 remaining operated in a circuit extending over break contact 5 of relay PG1. Upon the release of relay P1, relay P3 is operated in a circuit extending from ground in FIG. 41, over make contact 7 of relay ON2, break contact 9 of relay DK, make contact 3 of relay P2, break contacts 4, 6 and 10 of relays P1, P5 and P4, to negative battery through the winding of relay P3. Relay P3, in operating, locks over its own make contact 1 to off-normal ground over break contact 6 of relay P1 in parallel with make contact 1 of relay P2 and in parallel with the series break contacts 6 and 10 of relays P4 and P5. Upon the reoperation of relay PG1 at the end of the second pulse, relay P2 is released, thereby leaving relay P3 alone operated at the end of the second pulse. Upon the release of relay PG1 at the beginning of the third pulse, relay P1 is reoperated in the above-described circuit, thereby completing a circuit for operating relay P4 extending from off-normal ground, over make contact 3 of relay P2, make contact 4 of relay P1, make contact 3 of relay P3, break contact 4 of relay P5, to negative battery through the winding of relay P4. Relay P4, in operating, locks over its own make contact 11 to off-normal ground under control of the parallel break contacts 7 of relays P1, P2, P3 and P5. Upon the reoperation of relay PG1 at the end of the third pulse, relay P2 of FIG. 41 reoperates as above described, thereby leaving relays P1, P2, P3 and P4 operated at the end of the third pulse. As described above, upon the release of relay PG1 and its subsequent reoperation at the beginning and the end of the fourth pulse, relays P1 and P2 are released, leaving relays P3 and P4 operated at the end of the fourth pulse. Upon the release of relay PG1 at the beginning of the fifth pulse, relay P1 is reoperated as above described, thereby causing the release of relay P3. At the end of the fifth pulse, upon the reoperation of relay PG1, relay P2 is again operated as above described, thereby leaving relays P1, P2 and P4 operated at the end of the fifth pulse. Upon the release and reoperation of relay PG1 incident to the sixth pulse, relays P1 and P2 will be released as previously described, thereby completing a circuit for causing the operation of relay P5 in a circuit extending from battery, through its winding, over make contact 4 of relay P4, break contacts 8 of relays P3, P2 and P1, to off-normal ground, thereby leaving relays P4 and P5 operated at the end of the sixth pulse. As above described, upon the next release and reoperation of relay PG1 incident to the seventh pulse, relays P1 and P2 will be reoperated, thereby leaving relays P1, P2, P4 and P5 operated at the end of the seventh pulse. Upon the next release of relay PG1 at the beginning of the eighth pulse, relay P1 releases, thereby completing a circuit for reoperating relay P3 in a circuit extending from battery, through the winding of relay P3, over make contacts 10 and 6 of relays P4 and P5, break contact 4 of relay P1, to off-normal ground over make contact 3 of relay P2. Relay P3, in operating, locks over its own make contact 1 to off-normal ground through make contacts 6 and 10 of relays P4 and P5. Upon the reoperation of relay PG1 at the end of the eighth pulse, relay P2 will be released, thereby leaving relays P3, P4 and P5 operated at the end of the eighth pulse. Relay P5 remains locked in a circuit extending from the left side of its winding to off-normal ground over its own make contact 1. Upon the next release and reoperation of relay PG1 incident to the ninth pulse, relays P1 and P2 will become reoperated as above described, thereby opening the locking circuit for relay P4 to allow this relay to release. At the end of the ninth pulse, therefore, relays P1, P2, P3 and P5 will be operated. Lastingly, upon the next release and reoperation of relay PG1 incident to the tenth pulse, relays P1 and P2 will be released as above described, leaving relays P3 and P5 operated at the end of the tenth pulse. The following table summarizes the status of the P1 through P5 relays at the ends of various pulse counts from 1 to 10.

| End of digit: | Relays operated |
| --- | --- |
| 1 | 1, 2 |
| 2 | 3 |
| 3 | 1, 2, 3, 4 |
| 4 | 3, 4 |
| 5 | 1, 2, 4 |
| 6 | 4, 5 |
| 7 | 1, 2, 4, 5 |
| 8 | 3, 4, 5 |
| 9 | 1, 2, 3, 5 |
| 0 | 3, 5 |

Upon the first release of relay L1 of FIG. 7, incident to the transmission thereto from FIG. 42 of the first open loop dial pulse, relay LA of FIG. 8 releases; but, relay L2 of FIG. 8 remains operated due to its slow-release characteristic provided that make contact 4 of relay L1 does not remain open too long. Relay RA of FIG. 8 operates in a circuit extending from battery, through its upper primary winding, over make contact 2 of relay L2, break contact 3 of relay L1, to off-normal ground, the operation of relay RA completing an obvious circuit over its make contact 6 for causing the operation of relay RA2, the operation of which releases relay RA1. Upon the operation in FIG. 8 of relay RA, a circuit is completed for operating relay DP of FIG. 8 extending from ground, over make contact 10 of relay RA, break contact 2 of relay DP, to negative battery through the winding of relay DP, which operates and locks over its own make contact 2 to off-normal ground. The operation of relay DP opens its break contact 4 in FIG. 7, thereby removing dial tone from the tip and ring circuit. Upon the reoperation in FIG. 7 of relay L1, at the end of the first dial pulse transmitted thereto from the automatic test circuit, relay LA of FIG. 8 will reoperate, relay RA remaining operated due to its slow-release characteristic over the closed loop periods when relay L1 is operated, relay RA2 remaining operated under control of the operated relay RA and relay RA1 remaining released as long as relay RA2 is operated. As long as relay L1 of FIG. 7 continues to release and reoperate at a regular dial pulse rate, the relays of FIG. 8 will remain as above described, relay LA releasing and reoperating to repeat the dial pulses detected by relay L1 of FIG. 7. In FIG. 10 make contact 10 of relay LA and break contact 6 thereof, along with make contacts 2 and 8 of relay RA2 and break contacts 11 and 9 of relay RA1, cause the pulse counting circuitry (not shown) consisting of relays IP1 through IP5 to be controlled over the three leads connected by the bracket A to count the number of dial pulses transmitted to the register-outpulser. This pulse counting circuit of FIG. 10 is very similar to the above-described pulse counting circuitry of FIG. 41 consisting of relays P1 through P5 and is considered not necessary of detail circuit showing at this point.

In the right-hand part of FIG. 38 is shown the inpulse counting circuitry of the automatic test circuit comprising relays IP1 through IP5 (and an additional relay IP2A) whereby the releases and reoperations in FIG. 42 of relay A will cause a pulse count to be made of the dial pulses repeated to the automatic test circuit over the fundamental tip and ring conductors from the register-outpulser. Upon the first release in FIG. 42 of relay A, due to the opening of the fundamental tip and ring circuit by make contact 7 of relay L1 in FIG. 7, relay AA of FIG. 42 is released, relays B and B1 of FIG. 42 remaining operated over the open loop period providing that relays A and AA of FIG. 42 do not remain released too long. Relay RA of FIG. 42 operates in a circuit extending from battery, through its upper primary winding, over make contact 6 of relay B, break contact 3 of relay A, to the previously-described off-normal ground, the operation of relay RA causing the release in FIG. 42 of relay RA1. Upon the reoperation of relay A in FIG. 42 at the end of the first repeated dial pulse, relay AA of FIG. 42 reoperates, relay RA holding operated due to its slow-releasing characteristic over the closed loop periods when relay A is operated. In the right-hand part of FIG. 38, the pulse counting circuit (relays IP1 through IP5) is controlled by contacts of relays A, B1, RA and RA1 of FIG. 42 to cause a pulse count of the dial pulses, this circuitry being substantially the same as that previously described in detail with respect to the counting circuit of FIG. 41. Relay IP2A in FIG. 38 is arranged, as is well known, to operate upon the counting of the first dial pulse, relay IP2A thereupon locking to off-normal ground under control of make contact 6 of relay B1.

At the end of the number of pulses in the first digit transmitted from the test circuit to the register-outpulser three main circuit actions take place. The circuitry of FIG. 41 recycles and counts four pulses to set the timing for an interdigital interval, the tip and ring loop consisting of conductors T and R extending from FIG. 42 to FIG. 7 is bridged to prevent any further pulses reaching the register-outpulser, and in FIG. 37 the outsteering circuitry is advanced so that relay OS2 is operated and relay OS1 released to adjust the test circuit for outpulsing the second of the called digits. In the register-outpulser, relay IS2 of FIG. 14 is operated to prepare the register-outpulser to receive the second digit, relay L1 of FIG. 7 remains operated to in turn allow the circuitry of FIG. 8 to stop the counting circuit of FIG. 10 from counting any further pulses, and the pulse count of the first digit is read out of FIG. 10 into the A digilt register of FIG. 15 in the register-outpulser, and in FIG. 14 the input digit steering circuitry is advanced (relay IS2 operated and relay IS1 released) to arrange the input digit registration circuitry of FIG. 15 to steer the second digit into the B register. In FIG. 42 relay A remains operated, thereby stopping the counting circuitry of FIG. 38, whereupon the matching relay M of FIG. 38 ascertains whether or not the digit which was transmitted to the register-outpulser agrees with the digit repeated to the test circuit from the register-outpulser, and in FIGS. 35 and 36 the inpulse steering circuitry is advanced so that relay IS2 is operated and relay IS1 released in FIG. 35 to arrange for the receipt and counting of the second digit repeated to the automatic test circuit from the register-outpulser.

When the outpulse counting circuitry of FIG. 41 has counted a number of pulses corresponding to the registration in the readout relays of FIG. 45, a circuit is completed in FIG. 41 for operating relay DK. It will be recalled that the first dial pulse digit transmitted from the pulse generator of FIG. 46 on a loop pulsing basis to the register-outpulser L1 relay of FIG. 7 was 2 (of the called number 243-0123). Under these circumstances relays RR0 and RR2 of FIG. 45 are operated and at the end of the counting of two pulses it will be recalled that only relay P3 of the counting relays P1 through P5 of FIG. 41 is operated. At this point a circuit extends from ground in FIG. 41 over make contact 16 of relay ON2, break contact 2 of relay Z, make contact 5 of relay RR2, make contact 6 of relay RR0, break contacts 2 of relays P4 and P5, thence over make contact 2 of relay P3, break contact 1 of relay P1, and make contact 6 of relay PG1 to negative battery through the winding of relay DK. Relay DK operates as an indication that the pulse generator of FIG. 46 has transmitted the proper number of pulses corresponding with the first called digit as determined by the readout relays of FIG. 45. In FIG. 42, upon the operation of relay DK of FIG. 41, make contact 2 of relay DK holds closed the tip and ring loop extending over conductors T and R into FIG. 7, thereby to maintain operated relay L1 of FIG. 7 at the end of the first digit of 2. Relay L1 of FIG. 7, in remaining operated, holds closed its make contact 7 in FIG. 7, thereby holding closed the fundamental tip and ring loop on conductors FT and FR extending from FIG. 7 into FIG. 42, thereby holding relay A of FIG. 42 in an operated condition at the end of the first digit of two pulses. Relay DK of FIG. 41, in operating, completes a circuit in the lower right-hand corner of FIG. 41 for operating relay W, this circuit extending from ground in FIG. 41 over make contact 15 of relay ON1, make contact 12 of relay PTC, make contact 6 of relay DK, break contact 12 of relay Z, to negative battery through the winding of relay W. Relay W, in operating, locks over its own make contact 2 to off-normal ground through resistance Z, independently of make contact 6 of relay DK. The operation of relay W in FIG. 41 prepares the outsteering circuitry of FIG. 37 for advancing the called digit register circuit of FIG. 45 in preparation for outpulsing the second or B digit. Relay OS2 of FIG. 37 is operated in a circuit extending from off-normal ground in the upper left corner of FIG. 37, through make contact 8 of relay ON, over make contact 7 of relay W, make contact 2 of relay PTC, make contact 1 of relay OS1, break contact 5 of relay OS2, to negative battery through the winding of relay OS2. Relay OS2 operates and locks over its own make contact 5 to off-normal ground through the chain of break contacts 6 of the remaining relays in the chain. Relay OS1 remains locked operated in a circuit over its own make contact 5, make contact 6 of relay OS2, make contact 2 of relay PTC, and make contact 7 of relay W to off-normal ground over make contact 8 of relay ON. The fact that relay OS1 remains operated, as will be apparent in FIG. 45, prevents the operation of relay OS2 from changing the situation involving the presently operated readout relays RR0 and RR2 of FIG. 45.

In the meantime, with reference to FIG. 46, upon the operation of relay DK of FIG. 41, the locking circuit for relay PG1 in FIG. 46 is opened, thereby allowing relays PG1 and PG2 to continue their oscillations as previously described. However, it will be appreciated as above mentioned that the continuing releases and reoperations of relay PG1 of FIG. 46 will not transmit any further dial pulses over the tip and ring circuit from FIG. 42 into the register-outpulser of FIG. 7 due to the closure of make contacts 2 and 3 of respective relays DK and W in the tip ring loop of FIG. 42. Relays PG1 and PG2 of FIG. 46 are allowed to continue oscillating for a period of time representing four more pulses of relay PG1, this four pulse interval being used to determine the interdigital time between digit transmissions, as will be described presently. Upon the first release of relay PG1, with relay DK of FIG. 41 operated, the locking circuits in FIG. 41 of all of the relays P1 through P5 are opened thereby causing any operated ones of these relays to become released, relay DK remaining locked in a circuit extending from the left side of its winding, over break contact 6 of relay PG1, to off-normal ground over make contact 4 of relay DK. No further circuit action takes place until relay PG1 of FIG. 46 reoperates, thereby allowing one pulse count of the relay PG1 to be lost. Upon the reoperation of relay PG1 at the end of this first pulse, relay DK of FIG. 41 is allowed to release, due to the release of all of the P1 through P5 relays of FIG. 41. Upon the release of relay DK, a circuit is completed in the lower right-hand corner of FIG. 41 for causing the operation of relay Z, this circuit extending from ground in FIG. 41, over make contacts 15 and 12 of respective relays ON1 and PTC, thence over break contact 6 of relay DK, make contact 1 of relay W, break contact 6 of relay Z, to negative battery through the winding of relay Z, which thereupon operates and locks over its own make contact 6 to off-normal ground through make contact 2 of relay W and resistance Z. Relay W remains operated under control of make contact 12 of relay Z and resistance W to the operating ground previously described as supplied to relay Z. Upon the next release of relay PG1 of FIG. 46, at the beginning of the second interdigital pulse count, relay P1 of FIG. 41 is reoperated in a circuit previously described. At the end of the second interdigital pulse count when relay PG1 of FIG. 46 reoperates, a previously described circuit is completed in FIG. 41 for operating relay P2 such that at the end of this second pulse count relays P1 and P2 of FIG. 41 remain operated as previously described. Also, as previously described, the subsequent release of relay PG1 and its reoperation during the third pulse of the interdigital timing will cause relay P3 of FIG. 41 to become operated and relays P1 and P2 to be released, thereby leaving relay P3 of FIG. 41 operated at the end of the third pulse count. In FIG. 41, upon the operation of relay P3 with relay Z also operated, a circuit is completed for causing the operation of relay DK of FIG. 41 at the end of the third interdigital pulse count, this circuit extending from off-normal ground in FIG. 41, over make contact 2 of relay Z, make contact 2 of relay P3, break contact 2 of relay P1, and make contact 6 of relay PG1, to negative battery through the winding of relay DK. Relay DK, in operating, causes the release in FIG. 41 of relay W, the release of which causes the release in FIG. 37 of the first steering relay OS1, thereby causing the release in FIG. 45 of the readout relays RR0 and RR2 and the operation of readout relays RR0 and RR4 (the second called digit of 4) over make contacts of relay OS2 of FIG. 45 under control of the B digit switch. Upon the release of the readout relays RR0 and RR2 of FIG. 45, relay RK of FIG. 41 will release; and, relay RK will immediately reoperate in accordance with the reoperated readout relays RR0 and RR4 of FIG. 45. Upon the next release of relay PG1 of FIG. 46, at the beginning of the fourth interdigital pulse count, relay P3 of FIG. 41 is released and none of the relays P1 through P5 will become operated due to the fact that relay Z of FIG. 41 is still operated. Upon the reoperation of relay PG1 of FIG. 46 at the end of the fourth pulse, relay DK of FIG. 41 is released which in turn causes the release in FIG. 41 of relay Z, thereby returning relays W and Z to their normal unoperated conditions in FIG. 41. With relays W and Z of FIG. 41 in their unoperated conditions, with relay DK of FIG. 41 released, with relay RK of FIG. 41 operated, and with relay PG1 of FIG. 46 reoperated and relay PG2 of FIG. 46 released, the circuits are returned to their normal situations preparatory to transmitting the second dial pulse digit to the register-outpulser.

In the meantime, upon the operation in FIG. 8 of relays RA and RA2 at the time that relay L1 of FIG. 7 released incident to the first pulse of the first called digit, a circuit was completed in FIG. 14 for causing the operation of relay STR extending from ground in FIG. 14, over make contact 5 of relay ON, make contact 7 of relay REC, over the parallel make contacts 2 and 10 of relays RA and RA2, to negative battery through the winding of relay STR. The operation of relay STR extends off-normal ground in FIG. 14 over its make contact 3, thence over break contact 7 of relay PKC, make contact 9 of relay IS1, and break contact 6 of relay IS2 to negative battery through the winding of relay IS2. Relay IS2 operates and locks over its own make contact 6 to off-normal ground through the previously-described chain of back contacts 5 of the other relays in the steering chain. Relay IS1 at this time remains operated over its own make contact 6 and make contact 5 of relay IS2 to off-normal ground under control of the operated STR relay. Subsequently, when relay L1 remains operated for a substantial length of time at the end of the first digital transmission, relay LA of FIG. 8 will reoperate and relays RA and RA2 will release after an interval of time determined by the slow-release characteristic of relay RA. Also, relay L2 of FIG. 8 remains operated and relay RA1 of FIG. 8 reoperates on the release of relay RA2. This causes the circuits of FIGS. 7 and 8 to revert to their normal status prior to the counting of dial pulses upon the release and reoperation of relay L1 of FIG. 7. In FIG. 10, upon the release of relay RA2 and the reoperation of relay RA1, pulse counting by the relays IP1 through IP5 is stopped and ground is supplied over break contacts 2 and 8 of relay RA2 to the conductors B extending into the pulse counting circuit. Grounds on these two leads will cause readout, on a two-out-of-five basis through two of the break contacts 1, 3, 5, 6 and 7 of relay RA1, of the pulse count, which in this particular case will be represented by grounds on conductors S0 and S2 extending into FIG. 15 in accordance with the first digit of 2. In FIG. 15, grounds on conductors S0 and S2 from FIG. 10 will be extended over make contacts of relay IS1 to cause the digit 2 to be recorded in the A digit registers A0 and A2 (see FIG. 16). In FIG. 14, upon the release of relays RA and RA2 of FIG. 8, relay STR is allowed to release, thereby in turn releasing relay IS1, thereby arranging the input digit registration circuitry of FIG. 15 to steer the second digit counted by FIG. 10 into the B digit register of FIG. 15.

In the meantime, with reference to FIG. 38, when relay IP2A of the inpulse counting circuit operates (upon the first pulse transmission from the register-outpulser), and upon the release in FIG. 42 of relay RA1 as above described, a circuit is completed in FIGS. 35 and 36 for causing the operation of the steering relay IS2, this circuit extending from ground in FIG. 35, over make contact 18 of relay ON, break contact 10 of relay RCA, break contact 4 of relay SD0, make contact 11 of relay IP2A, break contact 6 of relay RA1, break contact 5 of relay MFS, thence over the chain of back contacts 11 of steering relays ARS through FRS, thence over make contact 11 of relay IS1, and break contact 5 of relay IS2 to negative battery through the winding of relay IS2. Relay IS2 in operating locks over its own make contact 5, through break contact 6 of relay IS3, conductor ISB into FIG. 36, and thence to off-normal ground over the previously-described circuit including the back contact chain of the remaining steering relays. Relay IS1 in FIG. 35 remains operated over its own make contact 5 and make contact 6 of relay IS2 to the above-described operating ground for relay IS2. At this point the M relay of FIG. 38 ascertains whether or not the pulse count of the first digit repeated to the automatic test circuit by the register-outpulser (as counted by the relays IP1 through IP5 of FIG. 38) matches the registration in the matching relays MR0 through MR10 of FIG. 39, which comprises an indication of what this second digit should have been. This circuit extends from ground in FIG. 38, over make contact 15 of relay ON, make contact 7 of relay B1, break contact 7 of relay RA, through a contact network (not shown) of the pulse counting relays IP1, IP3, IP4 and IP5 of FIG. 38, through a contact network (not shown) of the matching relays MR0 through MR7 of FIG. 39, thence over break contact 3 of relay MFS, and thence over a contact network (not shown) of the steering relays of FIGS. 35 and 36 indicating that at least one of these relays ARS through STF is operated, thence to negative battery through the winding of relay M. Relay M will operate in this described circuit only if the pulse count on the contact network of the inpulse counting relays of FIG. 38 matches the registration in the matching relays MR0 through MR10 of FIG. 39 and only if at least one of the steering relays of FIGS. 35 and 36 is operated. Assuming that these proper situations prevail, relay M of FIG. 38 will operate. When relay A of FIG. 42 remains operated at the end of the first digit as above described, relay RA of FIG. 42 will release after an interval of time determined by its slow-release characteristic, thereby allowing the reoperation in FIG. 42 of relay RA1. The reoperation of relay RA1 will cause the release in FIG. 35 of the steering relay IS1, leaving relay IS2 of FIG. 35 operated and locked in the circuit above described. In FIG. 39, upon the release of relay IS1 and upon the operation of relay IS2, the matching relays MR0 and MR2 are released and are reoperated in accordance with the second digit (digit 4) determined by the setting of the B digit switch in FIG. 39. Therefore, relays MR0 and MR4 will be operated in FIG. 39 in accordance with the second digit of 4. The operation in FIG. 38 of relay M resets the inpulse counting relays IP1, IP2, IP3, IP4 and IP5 to their normal unoperated conditions, leaving relay IP2A locked operated to off-normal ground under control of make contact 6 of relay B1. The return to normal of the counting relays IP1 through IP5 opens the operating circuit in FIG. 38 of the M relay, thereby causing relay M to release.

At this point in the description the register-outpulser circuitry is back to its normal condition whereby it is responsive to receipt of pulses of another digit: in FIG. 7 relays L1 and LT are operated; in FIG. 8 relays LA, L2 and RA1 are reoperated and relays RA and RA2 are released; the inpulse counting circuit of FIG. 10 has been returned to its normal condition; in FIG. 15 the A digit of 2 has been registered by the operation of the A digit register relays A0 and A2; in the input steering circuitry of FIG. 14 relay IS2 is operated alone to arrange the input digit registration circuit of FIG. 15 to cause the next digit to be registered in the B digit registers; and, in FIG. 21 relay OS1 remains operated preparatory to causing the register-outpulser to outpulse the first digit when required.

In the automatic test circuit the following situation prevails: in FIG. 41 the outpulse counting circuitry has been returned to normal with all of the relays released except relay RK which will be operated under control of the operation in FIG. 39 of relays MR0 and MR4 in accordance with the second or B digit of 4; in FIG. 42 relays A, AA, RA1, B and B1 have reoperated preparatory to receiving the second digit to be repeated thereto from the register-outpulser, and relay RA is in a released condition; in FIG. 46, relay PG1 is operated and relay PG2 is released preparatory to transmitting the first pulse of the second digit to the register-outpulser; in FIG. 37 relay OS2 is operated alone, thereby arranging the called digit register of FIG. 45 to cause the operation of the readout relays RR0 and RR4 in accordance with the second or B digit of 4; and, in FIGS. 35 and 36 the insteering relay IS2 is operated alone, thereby controlling the operation in FIG. 39 of relays MR0 and MR4 under control of the B digit switch as a determination that the second digit should be a 4 as this enters into the control of FIG. 38 of the matching relay M as above described.

In the pulse generator of FIG. 46, with relay RK of FIG. 41 operated and with relays DK and W of FIG. 41 released, the locking circuit for relay PG1 remains open, thereby allowing relays PG1 and PG2 to continue their oscillation. As will be appreciated from previous description, the continued oscillation of relays PG1 and PG2 will again control the outpulse counting circuitry of FIG. 41 to count the number of releases and reoperations of relay PG1. When the circuitry of FIG. 41 arrives at a status corresponding to the registration in the readout relays RR0 through RR7 of FIG. 45, relay DK of FIG. 41 will operate as above described to indicate the completion of digit transmission. This, in turn, will cause relays PG1 and PG2 of FIG. 46 to continue pulsing for an interval of four pulses to set the interdigital timing interval. The register-outpulser L1 relay of FIG. 7 will respond to the second digit of four pulses to in turn cause the LA relay of FIG. 8 to control the inpulse counting circuit of FIG. 10 in accordance with the pulse count. At the end of the digit count, the digit will be read out from FIG. 10 into the B digit register of FIG. 15, causing the operation therein of the relays B0 and B4 in accordance with the second digit of 4. Incident to this operation, the input digit steering circuit of FIG. 14 will be advanced to a point where relay IS3 is operated and relay IS2 is released, thereby adjusting the input digit registration of FIG. 15 to accept the third or C digit. In the meantime the A relay and the AA relay of FIG. 42 will respond to the repeated pulses transmitted thereto from the register-outpulser to set the inpulse counting circuit of FIG. 38, which in turn will result in the operation of the matching relay M of FIG. 38, thereby to advance the automatic test circuitry preparatory to transmitting the third digit of 3 (of the called number 243–0123).

It will be understood in subsequent description that the circuitry above described for transmitting the seven called digits 243–0123 to the register-outpulser and for causing these digits to be repeated back to the automatic test circuit continues as above described except as will be noted at particular points. In this manner the seven digits are transmitted to the register-outpulser; but, as will be seen, the automatic test circuit does not check that dial pulse digits are actually received by the register-outpulser beyond the first three necessary for translator-decoder seizure. The automatic test circuit will monitor for proper transmission beyond such additional digits after trunk seizure by the register-outpulser.

*Translator-decoder seizure*

Upon receipt of the third digit of 3 of the called number 243–0123, the register-outpulser will seize an idle translator-decoder circuit, such as the one shown in FIGS. 53 through 56, through the translator-decoder connector circuitry of FIG. 52 in order to request from the translator-decoder switching instructions depending upon a decoding of the first three digits 243. In the meantime, the automatic test circuit will continue to transmit to the register-outpulser the remaining four digits of the called number, as above described with respect to the first two or three. Until the time comes for the automatic test circuit to check the accuracy of the decoding process, the test circuit will perform only such functions as are necessary to assist in the register-outpulser interconnection with the translator-decoder. The above-described Riddell disclosure includes complete details of this interconnection circuitry: only such details are shown and described herein as are necessary to understand the basic circuit operations incident to this interconnection.

Figure 9:
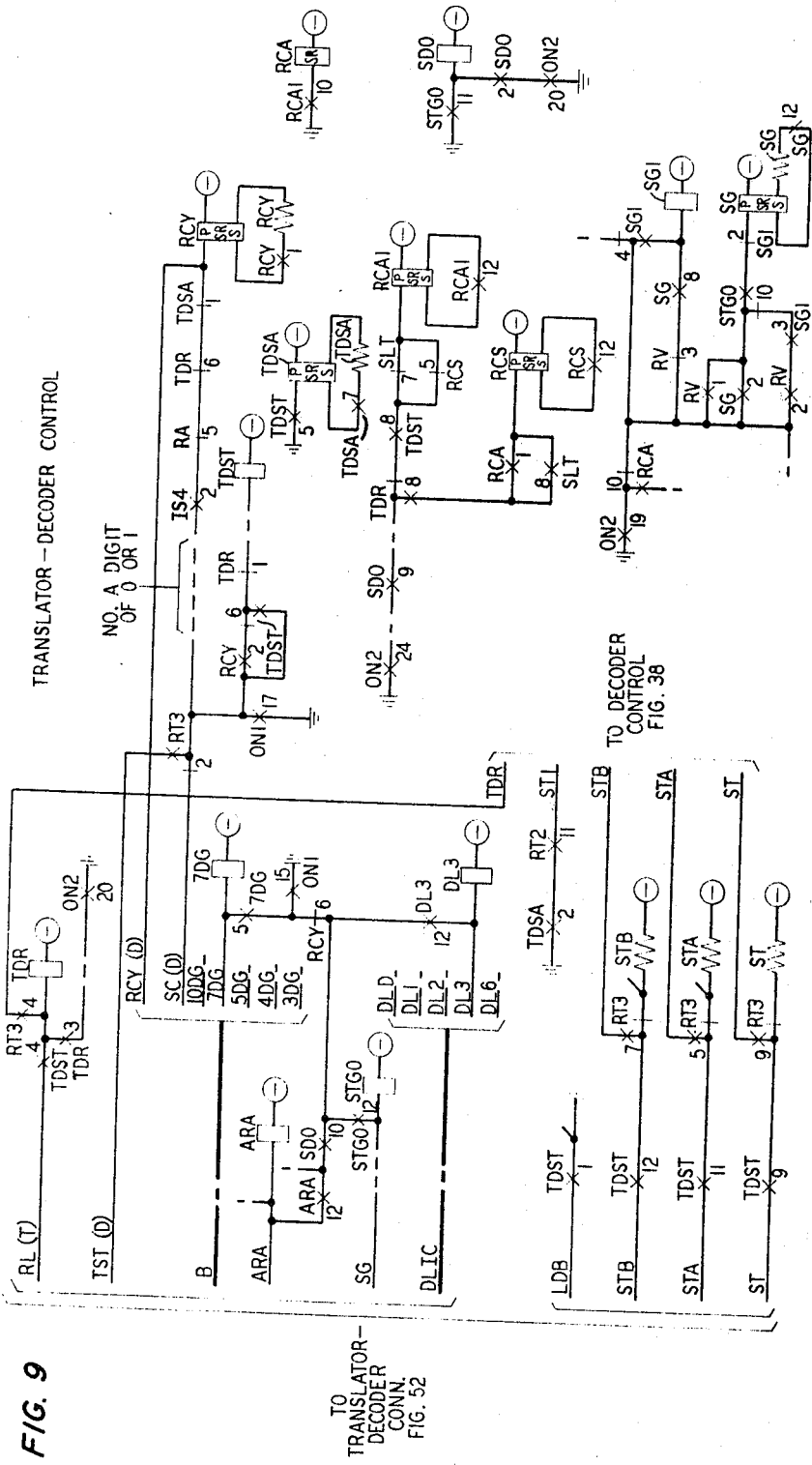

When the interdigital time occurs between the transmission of the third and fourth digits from the automatic test circuit to the register-outpulser, relay L1 of FIG. 7 and relays LA and L2 of FIG. 8 will remain in their operated conditions as above described. This will cause relays RA of FIG. 8 and RA2 of FIG. 8 to become released and relay RA1 of FIG. 8 to become reoperated. In FIG. 14, the release of relays RA and RA2 of FIG. 8 will allow the third digit steering relay IS3 to become released, leaving the fourth steering relay IS4 operated and locked to prepare the input digit registration circuitry of FIG. 15 for receiving and registering the fourth digit of 0 of the called number 243–0123. With relay RA of FIG. 8 released and relay IS4 of FIG. 14 operated, a circuit is completed for operating relay RCY in FIG. 9, this circuit extending from ground in FIG. 9, over make contact 17 of relay ON1, thence over a checking network (not shown) over contacts of the A digit register relays of FIG. 15 indicating that the A digit is neither a 0 nor a 1, thence over make contact 2 of relay IS4, break contact 5 of relay RA, break contact 6 of relay TDR, break contact 1 of relay TDSA, to negative battery through the upper primary winding of relay RCY, which thereupon operates and closes a circuit through its secondary winding to provide itself with a slow-releasing characteristic. Upon the operation of relay RCY, a circuit is completed in FIG. 9 for operating relay TDST extending from off-normal ground, over make contact 17 of relay ON1 in FIG. 9, thence over make contact 2 of relay RCY, break contact 6 of relay TDST, break contact 1 of relay TDR, to negative battery through the winding of relay TDST, which locks over its own make contact 6 independently of make contact 2 of relay RCY. In FIG. 9 upon the operation of relay TDST, an obvious circuit is completed through the upper primary winding of relay TDSA to operate this relay which, in operating, completes a circuit through its secondary winding to provide itself with a slow-releasing characteristic. The operation of relay TDSA opens the operating circuit for relay RCY, thereby permitting relay RCY to release after a time interval determined by its slow-releasing characteristic. The operation in FIG. 9 of relay TDSA also completes a circuit for operating relay TDST in FIG. 38 of the automatic test circuit, this circuit extending from ground in FIG. 9, over make contacts 2 and 11 of respective relays TDSA and RT2, thence over conductor ST1 into FIG. 38, over make contact 16 of relay ON1, to negative battery through the winding of relay TDST. The operation in FIG. 38 of relay TDST completes an obvious circuit in FIG. 38 over its make contact 9 to cause the operation of relay TDSA, which thereupon locks over its own make contact 4, break contact 8 of relay TDRA, to ground over make contact 13 of relay ON2. Upon the operation in FIG. 38 of relay TDST, circuits are completed for supplying resistance battery to the three leads ST, STA and STB over respective make contacts 2, 3 and 10 of relay TDST, these three conductors ST, STA and STB extending into FIG. 9, thence over respective make contacts 9, 5 and 7 of relay RT3, thence over respective make contacts 9, 11 and 12 of relay TDST, to conductors ST, STA and STB extending into FIG. 52. In FIG. 52, punching TSA is shown cross-connected to punching TS but punching TSB is unconnected; therefore, the resistance battery supplied to conductor STB is of no effect, whereas the resistance battery connected to punching TSA will cause the operation of relays TS of FIG. 52 in a circuit completed over back contact 4 of relay CB. Resistance battery on conductor ST in FIG. 52 will be extended through the winding of relay RS to ground, thereby causing the operation of relay RS. In FIG. 52 the operation of relay RS completes an obvious circuit from ground over its make contact 12 to cause the operation of the four register-outpulser connectors RA(C), RB(C), RC(C) and RD(C). Likewise, the operation of relay TS completes circuits over its make contacts 12 and 10 to cause the operation of the translator-decoder connectors TA(C), TB(C) and TD(C), the operation of connector TA(C) completing a locking circuit for relay TS over make contact 00 of relay TA(C) directly to punching TS independently of break contact 4 of relay CB.

Figure 53:
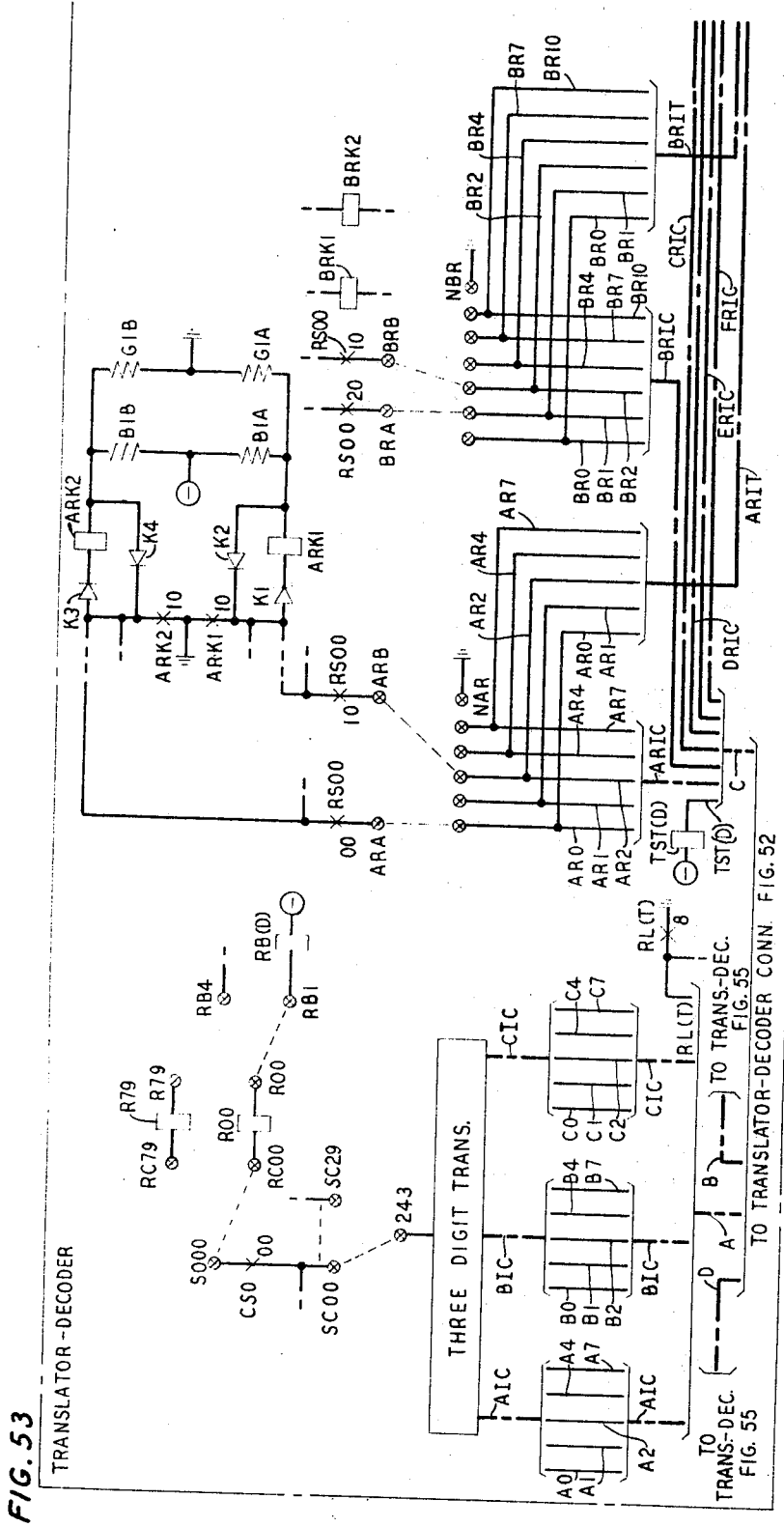

In the lower right-hand portion of FIG. 52 are shown a number of cables carrying a number of leads which are interconnected between FIG. 53 of the translator-decoder and FIGS. 8, 9, 15 and 17 of the register-outpulser under control of pairs of make contacts of the connectors TA(C) through TD(C) and RA(C) through RD(C). As a result of these interconnections, a number of circuit operations take place in the translator-decoder and in the automatic test circuit to complete the translator-decoder seizure operation. The translator off-normal relay ON(T) of FIG. 56 is operated in a circuit extending from ground in FIG. 52, over make contact 03 of connector TB(C), thence over conductor CBR(T) extending into FIG. 56, thence to negative battery through the winding of relay ON(T), which operates and completes a locking circuit over its own make contact 11 to the ground supplied on conductor CBR(T). In FIG. 56 upon the operation of relay ON(T), obvious circuits are completed in the lower right-hand corner for causing the operation of the decoder off-normal relay ON(D) and the connector busy relay CB(T). The operation in FIG. 56 of relay CB(T) completes a circuit for causing the operation in FIG. 52 of the connector busy relay CB, this circuit extending from ground in FIG. 56, over make contact 1 of relay CB(T), conductor CB(T) extending into FIG. 52, thence through the winding of relay CB to negative battery. Relay CB of FIG. 52 operates in this circuit in order to make this particular translator-decoder of FIGS. 53 through 56 busy to all other register-outpulsers, as described in detail in the above-mentioned Riddell disclosure. Relay CB of FIG. 52 locks in a circuit extending from the right-hand side of its winding, through diode CB, make contact 6 of relay CB, make contact 6 of relay TS, conductor LDB extending into FIG. 9, and therein to ground over make contact 1 of relay TDST. In FIG. 52, the operation of relay CB opens at its break contact 4 the operating circuit for relay TS, which remains locked as above described under control of make contact 00 of connector TA(C). Upon the operation of the decoder off-normal relay ON(D) of FIG. 56, a circuit is completed for causing the operation in FIG. 52 of the preference relay P of the trunk class connector, this circuit extending from negative battery in FIG. 55, over make contact 5 of relay ON(D), conductor ST(D) extending into FIG. 52, and thence to ground through the winding of relay P, which operates and completes an obvious circuit over its make contact 12 to cause the operation of the connector relay PC in FIG. 52. The operation in FIG. 52 of relays P and PC completes a circuit for operating relay CL in FIG. 46 of the automatic test circuit, this circuit extending from ground in FIG. 52, over make contacts 6 and 10 of respective relays PC and P, thence over conductor CI(D) into FIG. 55, thence into cable D extending from FIG. 55 into FIG. 53, and thence over cable D to FIG. 52 where it extends over make contacts of connectors TD(C) and RD(C), cable D, conductor CI(D) extending into FIG. 8 of the register-outpulser, and therein over make contact 3 of relay RT3, conductor CI extending into FIG. 46 of the automatic test circuit, thence over make contact 3 of relay TDSA, to negative battery through the winding of relay CL. In FIG. 46 upon the operation of relay CL with the CLU switch set on its zero contact, a circuit is completed for causing the operation in FIG. 55 of the trunk class relay CL0, this circuit extending from ground in FIG. 46 over make contact 11 of relay CL, the wiper of the CLU switch, conductor CL0, make contact 1 of relay CL, conductor CL0 extending into the register, trunk and link circuit of FIG. 5, and therein over conductor CL0 to the trunk class connector of FIG. 52, thence over a make contact of the connector relay PC, conductor CL0 extending into FIG. 55, and therein to negative battery through the winding of relay CL0. In the upper right-hand corner of FIG. 55, upon the operation of relay CL0, and by virtue of the cross-connection between punchings CL0 and CS0, a circuit is completed for operating the class-screening relay CS0 extending from negative battery in FIG. 55, over make contact 10 of relay CL0, the cross-connection between punchings CL0 and CS0, and thence to ground through the winding of relay CS0, which thereupon operates.

During the time that the above circuit operations are taking place, upon the operation of the connector relays RC(C) and TC(C) of FIG. 52, a circuit is completed for causing the operation of the test relay TST(D) in FIG. 53 of the translator-decoder. This circuit extends from ground in FIG. 9 of the register-outpulser, over make contact 17 of relay ON1, make contact 2 of relay RT3, conductor TST(D) extending from FIG. 9 to the translator-decoder connector of FIG. 52, thence over cable C, make contacts of connector relays RC(C) and TC(C), cable C extending into FIG. 53, thence over conductor TST(D) to negative battery through the winding of relay TST(D) which thereupon operates. In FIG. 56 a long check circuit involving make contacts of a number of check relays is shown normally connected to the winding of the translator release relay RL(T) over break contact 2 of relay TST(D), whereby, as will be described in detail hereinafter, normally (under service rather than test conditions) the translator-decoder would operate this release relay RL(T) upon a satisfactory check that all switching instructions have properly been transferred to and registered in the register-outpulser. Under the test conditions with relay TST(D) of FIG. 53 operated, it will be noted in FIG. 56 that make contacts 1 and 2 of relay TST(D) extend the operating circuit of relay RL(T) into FIG. 38 of the automatic test circuit over conductors RL(D) and RL1(D). In FIG. 38 these conductors RL1(D) and RL(D) will be connected together, thereby to allow the release relay RL(T) of FIG. 56 to operate only after the automatic test circuit has satisfied itself that the switching instructions actually transmitted to and registered in the register-outpulser are not only legitimate but correct. The detailed circuitry involved in this checking operation will be described hereinafter.

*Deriving switching data*

As a result of the seizure of the translator-decoder circuitry of FIGS. 53 through 56 and the interconnection thereof with the register-outpulser of FIGS. 7 through 26, the first three called digits 243 of the called number 243–0123 are transmitted from the A, B and C digit registers of FIG. 15 to the three-digit translator shown as a box in FIG. 53 to start the decoding action in the translator-decoder. The translator-decoder will accept the A, B and C digits, will decode them, and will transmit back to the register-outpulser a set of switching data or switching instructions. Various check relays in the translator-decoder will be operated as an indication that the data has been transmitted to and registered in the register-outpulser. This will result in the completion in FIG. 56 of a check circuit extending from ground to transfer contacts 2 of relay TST(D), as will be described in detail below. Normally, that is under normal service conditions, as described in complete detail in the aforementioned Riddell disclosure, this would cause the operation of the translator release relay RL(T) of FIG. 56, which eventually would cause the disconnection of the register-outpulser from the translator-decoder. However, due to the fact that relay TST(D) of FIG. 53 will be operated under test conditions, as will be seen below, the action will be different at that point, as will be described.

Various typical cross-connections have been shown in FIGS. 53 through 56 in order to illustrate the particular example chosen for purposes of describing the detailed exemplary embodiment. Of course, it will be appreciated by those skilled in the art, as shown more in detail in the above-mentioned Riddell disclosure, that numerous different arrangements of various of the cross-connections could be made if desired.

With regard to FIG. 15 of the register-outpulser, it will be understood that locking ground (see FIG. 16) will be extended over make contacts of the operated relays A0 and A2 to conductors 0 and 2 into cable AI, ground will extend over make contacts of the operated relays B0 and B4 into cable BI, and ground will be extended over make contacts of the operated relays C1 and C2 to conductors 1 and 2 extending into cable CI. These six grounded conductors extend over cables AIC, BIC and CIC into the translator-decoder connector circuitry of FIG. 52, thence over cable A, make contacts of the connectors RA(C) and TA(C), cable A into FIG. 53, and thence through cables AIC, BIC and CIC to provide to the three-digit translator three pairs of indications so that the three-digit translator may operate in a well-known manner to resolve these three digits into the grounding of the single code point 243, which represents the first three digits of the called number 243–0123. Upon the grounding of the code point 243 in FIG. 53, a circuit is completed for operating relays R00 and RB(D) in series extending from code point 243, over a cross-connection to code point SC00, thence over make contact 00 of relay CS0 to code point S000, thence over a cross-connection to code point RC00, through the winding of relay R00 to code point R00, over the cross-connection to code point RB1, and to battery through the winding of relay RB(D), whereupon relays R00 and RB(D) operate. Relay R00, in operating in FIG. 53, causes the operation in FIG. 56 of relay RS00 in a circuit extending from ground in FIG. 56, over make contact 5 of relay RC0, code point R00, over the cross-connection to code point RS0, and to negative battery through the winding of relay RS00, which thereupon operates. When relay RS00 of FIG. 56 operates, it completes a circuit in FIG. 56 for causing the operation of relay ARA(D) in series with the lower primary winding of relay SG(D), this circuit extending from ground in FIG. 56, over make contact 44 of relay RS00 to punching P, over the cross-connection to punching SGA, through the lower primary winding of relay SG(D), to negative battery through the winding of relay ARA(D), the latter two relays operating in series with each other in this circuit.

Figure 54:
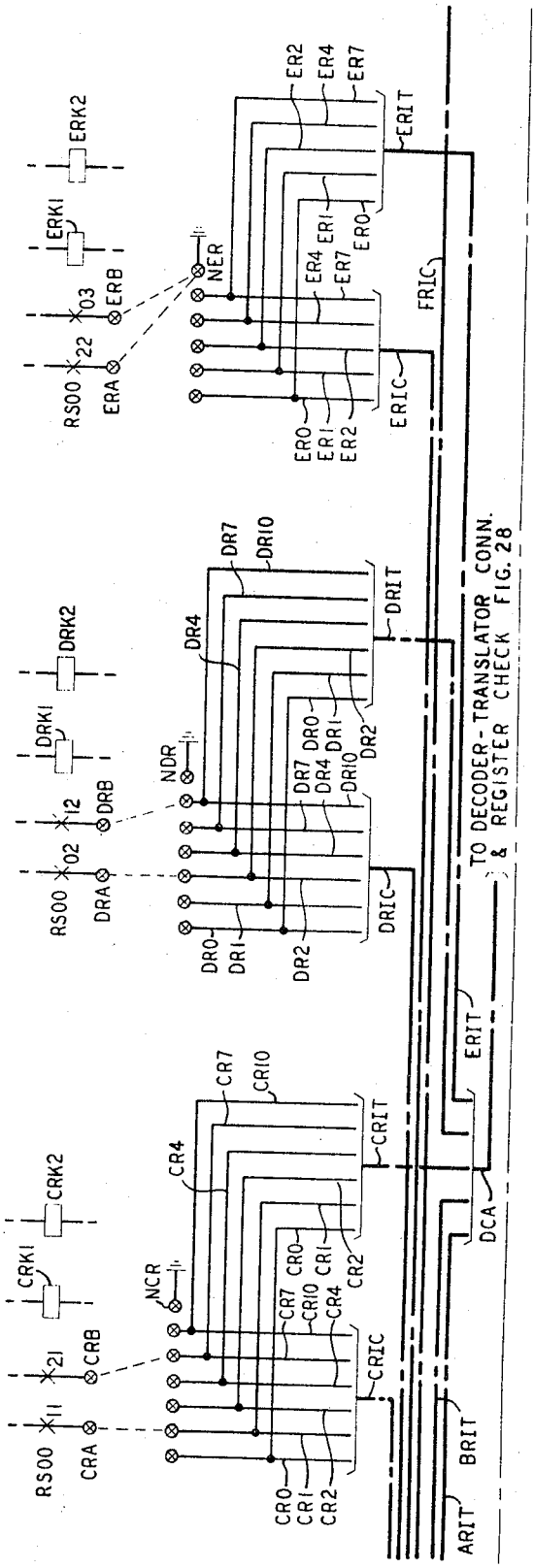
Figure 55:
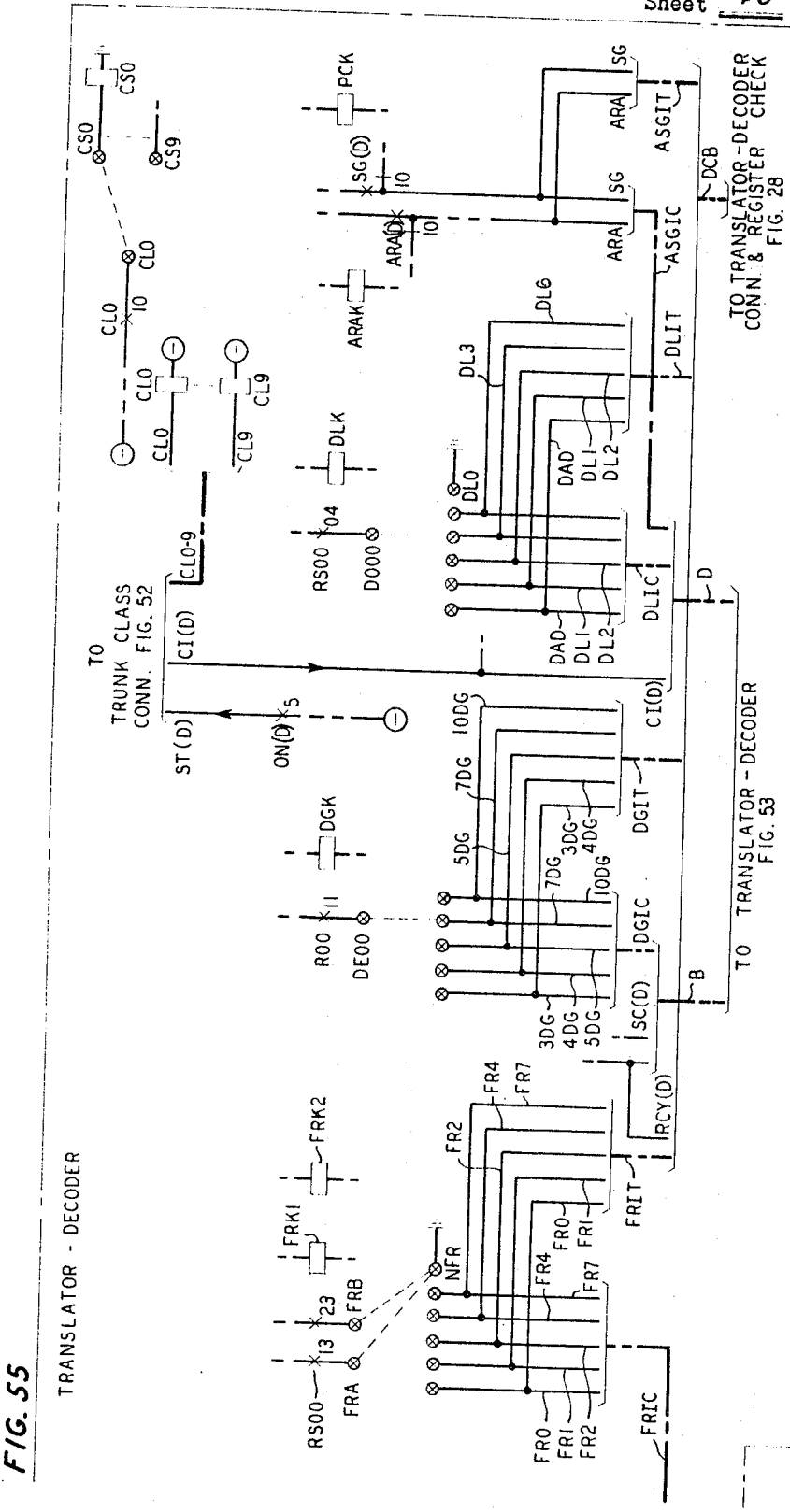

Upon the operation of relay RS00 of FIG. 56, the translator-decoder will transmit to the register-outpulser the three arbitrary exit digits 238 plus the so-called KP pulse (signals on leads 2 and 10) in the fourth digit position, there being in the assumed example no fifth or sixth digital information in the arbitrary exit digit registers. The first arbitrary exit digit of 2 is transmitted to the register-outpulser by causing the operation in FIG. 17 of the two A digit arbitrary exit digit registers AR0 and AR2. In FIG. 53, ground extends through resistance G1A, through diode K2, over make contact 10 of relay RS00 to punching ARB, which in turn is cross-connected to a punching connected to conductor AR2 extending into cable ARIC; whereas, ground also extends from FIG. 53, through resistance G1B, through diode K4, thence over make contact 00 of relay RS00 to punching ARA, which is cross-connected to a punching connected to conductor AR0 extending into cable ARIC. Cable ARIC extends through cable C into FIG. 52, thence over make contacts of the connectors TC(C) and RC(C), cable C, cable ARIC extending into FIG. 17, and to the A digit register (see FIG. 18), whereupon relays AR0 and AR2 are operated by the resistance grounds on these conductors 0 and 2 out of cable ARIC. Relays AR0 and AR2 thereupon lock over their make contacts and conductor L to off-normal ground through break contact 8 of relay RCY and make contact 7 of relay ON1. Upon the operation of these two relays AR0 and AR2 of FIG. 17, the locking grounds supplied to the left-hand sides of their winding reflect back over conductors 0 and 2 through the previously traced circuits into FIG. 53, and thence in FIG. 53 through diodes K3 and K1, through the windings of relays ARK2 and ARK1, and to battery through resistances B1B and B1A. In this latter circuit the check relays ARK1 and ARK2 of FIG. 53 operate as an indication to the translator-decoder that the arbitrary exit digit in the A position has properly been registered on a two-out-of-five basis in the register-outpulser. In a like manner, it being considered unnecessary to repeat all the details thereof, the B and C digits will be transmitted from punching BRA, BRB and CRA, CRB of FIGS. 53 and 54, over cables BRIC and CRIC into FIG. 17 to cause the operation of relays BR1, BR2 and CR1, CR7, thereby to register in FIG. 17 the B and C arbitrary digits of 38. Likewise, the B and C digit check relays of FIGS. 53 and 54, namely, relays BRK1, BRK2, CRK1 and CRK2, will be operated by the locking grounds returned thereto from the registers of FIG. 17. In the assumed example it will require the three arbitrary exit digits 238 to cause seizure of an outgoing trunk circuit in a typical outgoing switch train such as shown in FIG. 6. In the D position of the arbitrary exit digit registers of FIG. 17 will be registered the so-called KP pulse which is derived by virtue of the cross-connections from punchings DRA and DRB in FIG. 54 to conductors DR2 and DR10 extending by means of cable DRIC over the previously traced circuit through the translator-decoder connector of FIG. 52 into FIG. 17 to cause the operation of the D switching digit registration relays DR2 and DR10, the operation of which will in turn cause the operation in FIG. 54 of the D digit check relays DRK1 and DRK2. In the assumed example there is no exit digit information in the E and F digit positions. Therefore, in FIGS. 54 and 55 punchings ERA, ERB, FRA and FRB are connected directly to ground through appropriate punchings as shown in FIGS. 54 and 55, these grounds thereupon causing the operation of the E and F digit check relays ERK1, ERK2, FRK1 and FRK2 in FIGS. 54 and 55. Consequently, there will be no register relays operated in the E and F digit positions of FIG. 17 in the register-outpulser.

Upon the operation of relay R00 in FIG. 53 and of relays RS00, SG(D) and ARA(D) of FIG. 56 additional switching instructions are transmitted from the translator-decoder to FIG. 9 of the register-outpulser. Relay 7DG of FIG. 9 is operated in the register-outpulser as an indication from the translator-decoder that the complete called number will consist of seven digits, this circuit extending from resistance ground on punching DE00 in FIG. 55 to punching 7DG, thence over conductor 7DG, cable DGIC, cable B into FIG. 53, thence to the translator-decoder connector circuitry of FIG. 52, over make contacts of the connector relays TB(C) and RB(C), cable B into FIG. 9, and over conductor 7DG to negative battery through the winding of relay 7DG, which thereupon operates and locks over its own make contact 5 to off-normal ground under control of make contact 15 of relay ON1. In FIG. 9, the locking ground on the left-hand side of the winding of relay 7DG is returned over conductor 7DG into FIG. 55 to cause the operation of the check relay DGK. Relay DL3 in FIG. 9 is operated as an indication to the register-outpulser to delete the first three digits (243) of the called number 243–0123 when outpulsing beyond after trunk seizure. This circuit extends from resistance ground on punching D000 in FIG. 55, thence by cross-connection to conductor DL3, cable DLIC, cable D into FIG. 53, thence into FIG. 52, over make contacts of the connectors TD(C) and RD(C), cable D, cable DLIC extending into FIG. 9, thence over conductor DL3 to negative battery through the winding of relay DL3, which thereupon operates and locks over its own make contact 12 and break contact 6 of relay RCY to off-normal ground. In a manner similar to previously-described circuits, the locking ground on the left-hand side of the winding of relay DL3 in FIG. 9 reverts back into the translator-decorder circuitry of FIG. 55 to cause the operation of the check relay DLK therein. Upon the operation in FIG. 56 of relay SG(D), ground is extended in FIG. 55 over make contact 10 of relay SG(D), conductor SG into cable ASGIC, thence over cable D into FIG. 53, thence into FIG. 52, cable D, over make contacts of connectors TD(C) and RD(C), conductor SG into FIG. 9, and therein to negative battery through the winding of relay STG0. Relay STG0 operates and locks over its own make contact 12 to the previously-described off-normal ground, the operation of relay STG0 informing the register-outpulser that this is a sender-outgoing class of call and that a "stop-go" condition should be expected upon trunk seizure. The locking ground on the left-hand side of the winding of relay STG0 reverts back into the translator-decoder circuitry of FIG. 55 to cause the operation of the check relay PCK therein. In FIG. 9, the operation of relay STG0 causes the operation of relay SD0 in an obvious circuit over make contact 11 of relay STG0. Relay SD0, in operating, locks over its own make contact 2 to ground over make contact 20 of relay ON2. The operation of relay ARA(D) of FIG. 56 causes the operation in FIG. 9 of relay ARA as an indication to the register-outpulser that an alternate route is available in the event that the register-outpulser cannot secure a proper route by the use of the arbitrary digits 238 supplied thereto by the translator-decoder. The circuit for operating relay ARA of FIG. 9 extends from ground in FIG. 55, over make contact 10 of relay ARA(D), conductor ARA, cable ASGIC, cable D into FIG. 53, thence into FIG. 52, over make contacts of the connectors TD(C) and RD(C), conductor ARA into FIG. 9, and thence to negative battery through the winding of relay ARA. Relay ARA operates and locks over its own make contact 12 to off-normal ground under control of make contact 10 of the operated relay SD0. The locking ground on conductor ARA in FIG. 9 reverts back into the translator-decoder circuitry of FIG. 55 to cause the operation therein of the check relay ARAK.

According to the assumed example, two tdditional items of switching instruction should be transmitted from the translator-decoder to the register-outpulser. These two items are to the effect that the register-outpulser should switch to multifrequency (MF) pulsing when outpulsing beyond after trunk seizure and to the effect that the register-outpulser should release the switch train and reoperate it in accordance with the exit digits of 238 transmitted to the switching digit registers of FIG. 17. The presence of the KP pulse in the D digit registers of FIG. 17 (relays DR2 and DR10 operated), as will be described hereinafter, will be the instruction to the register-outpulser to initiate MF pulsing from that point on. The recycling of the outgoing switch train takes place as an incident to the operation in FIG. 9 of the register-outpulser relay SD0. It will be recalled that during the interval when the decoding process is functioning, the register-outpulser will have transmitted the first three called digits 243 to the automatic test circuit by virtue of repeating the dial pulses to the A relay of FIG. 42. It will also be recalled, with reference to FIG. 7 of the register-outpulser, that the fundamental tip and ring circuit consisting of conductors FT and FR extending between FIGS. 7 and 42 includes in series therewith back contact 6 of relay RCA. Recycling (that is, the release of) of the outgoing switch train, which has been set in accordance with the first three digits 243 of the called number, will be caused by the operation of relay RCA in FIG. 9, the operation of which will open back contact 6 thereof in FIG. 7 to in turn cause the opening of the fundamental tip and ring loop to the relay A of FIG. 42 in the automatic test circuit. This will be detected by the automatic test circuit as an indication that the register-outpulser properly would have recycled the outgoing switch train if this had been a service situation. Upon the operation in FIG. 9 of relay SD0 a circuit is completed for causing the operation of relay RCA1 in FIG. 9 extending from ground in FIG. 9 over make contact 24 of relay ON2, make contact 9 of relay SD0, break contact 8 of relay TDR, make contact 8 of relay TDST, break contact 7 of relay SLT, to negative battery through the upper primary winding of relay RCA1. Relay RCA1 operates and completes a circuit through its secondary winding to provide itself with a slow-releasing characteristic. Also, relay RCA1, in operating, causes the operation in FIG. 9 of relay RCA over make contact 10 of relay RCA1. Relay RCA of FIG. 9, in operating, opens its break contact 8 in the lower right-hand portion of FIG. 21, thereby causing the release of outsteering relay OS1 in FIG. 21. Also, ground extends from the lower right-hand corner of FIG. 21, over make contact 18 of relay ON2, make contact 8 of relay RCA, make contact 19 of relay RT2, conductor RCA extending into FIG. 38, over make contact 11 of relay RT, to negative battery through the winding of relay RCA in FIG. 38 of the automatic test circuit. The operation of relay RCA in FIG. 38 returns the impulse counting circuitry in the right-hand part of FIG. 38 to normal, including the release of relay IP2A. In FIG. 7, upon the operation of relay RCA of FIG. 9, the fundamental tip and ring loop, consisting of conductors FT and FR extending from FIG. 7 into FIG. 42, is opened at break contact 6 of relay RCA, thereby to cause the release in FIG. 42 of relays A, AA, B and B1. The release of these relays in FIG. 42 of the automatic test circuit is an indication to the automatic test circuit that the register-outpulser has properly recycled the outgoing switch train. Upon the release of relay B1 of FIG. 42, with relay RCA of FIG. 38 operated as an indication that the register-outpulser has gone through a recycle operation, the operated insteering relay IS4 of FIG. 36 is released so that the insteering circuitry of FIGS. 35 and 36 may be reoperated to check the dial pulse (DP) outpulsing by the register-outpulser of the arbitrary exit digits and the subsequent MF pulsing beyond. Of course, the release of the input steering circuitry of FIGS. 35 and 36 causes the release in FIG. 39 of any operated memory relays MR0 through MR10.

With all of the translator-decoder check relays of FIGS. 53, 54 and 55 operated, as an indication that a complete and legitimate set of switching data has been transmitted to and properly registered in the register-outpulser, a circuit is completed in FIG. 56 of the translator-decoder from ground, over make contact 7 of relay ON(D) and the chain of make contacts 2 of all of the check relays ARAK, PCK, DGK, FRK2, FRK1, ERK2, ERK1, DRK2, DRK1, CRK2, CRK1, BRK2, BRK1, ARK2, ARK1 and DLK to transfer contact 2 of relay TST(D). Under normal service conditions, when the register-outpulser is handling a regular service call, as distinguished from test conditions where the automatic test circuit is testing the register-outpulser, the relay TST(D) in FIG. 53 of the translator-decoder would not be operated. Under these service conditions ground in FIG. 56 would extend over break contact 2 of relay TST(D) to cause the operation of the translator-decoder release relay RL(T). This, in turn, would canse a circuit to extend from ground in FIG. 53, over make contact 8 of relay RL(T), conductor RL(T), conductor A into FIG. 52, thence over make contacts of connectors TA(C) and RA(C), cable A, conductor RL(T) extending into FIG. 9 of the register-outpulser, and therein over make contact 4 of relay TDST to negative battery through the winding of the translator-decoder release relay TDR. The operation of relay TDR in FIG. 9 would thereupon cause the register-outpulser to become released from the translator-decoder and cause the register-outpulser to thereupon proceed to control the outgoing switch train and any necessary outpulsing beyond in accordance with the switching instructions previously transmitted thereto by the translator-decoder. The aforementioned Riddell disclosure provides a complete and detailed description of all of these normal service circuit operations.

*Comparing switching data*

When all of the check relays in the translator-decoder circuitry of FIGS. 53, 54 and 55 have operated, as above described, as an indication that the switching data resulting from the decoding process has been transmitted to and properly registered in the register-outpulser, the circuit in FIG. 56 previously described extends ground through make contacts of all of these check relays to transfer contacts 2 of relay TST(D) in FIG. 56. Ground extends over make contact 2 of relay TST(D) in FIG. 56, over conductor RL(D) into FIG. 38, and thence through make contact 7 of relay TDSA to negative battery through the winding of the slow-release relay DCN, which thereupon operates. Upon the operation in FIG. 38 of relay DCN, a circuit is completed for operating the connector relays DCA and DCB of FIG. 38, this circuit extending from ground in FIG. 56, over make contact 4 of relay TST(D), conductor DCN(D) extending into FIG. 38, and therein through make contact 1 of relay DCN to negative battery through the windings of connectors DCA and DCB, which therepuon operate. In FIG. 28 a make contact of connector DCA is shown in series with the cable DCA extending to FIG. 28 from FIG. 54 and a make contact of connector DCB is shown in series with cable DCB extending to FIG. 28 from FIG. 55. In FIG. 54 cable DCA includes cables ARIT, BRIT, CRIT, DRIT and ERIT whereby the arbitrary exit digit information for the A, B, C, D and E digits, as determined by the translator-decoder, may be extended to the automatic test circuit over cable DCA. In FIG. 55 cable DCB includes cables FRIT, DGIT, DLIT and ASGIT, whereby the arbitrary F digit information, the number of digits in the called number, the number of digits to be deleted on outpulsing, the alternate route information, and the stop-go indication may be transmitted to the automatic test circuit.

Figure 33:
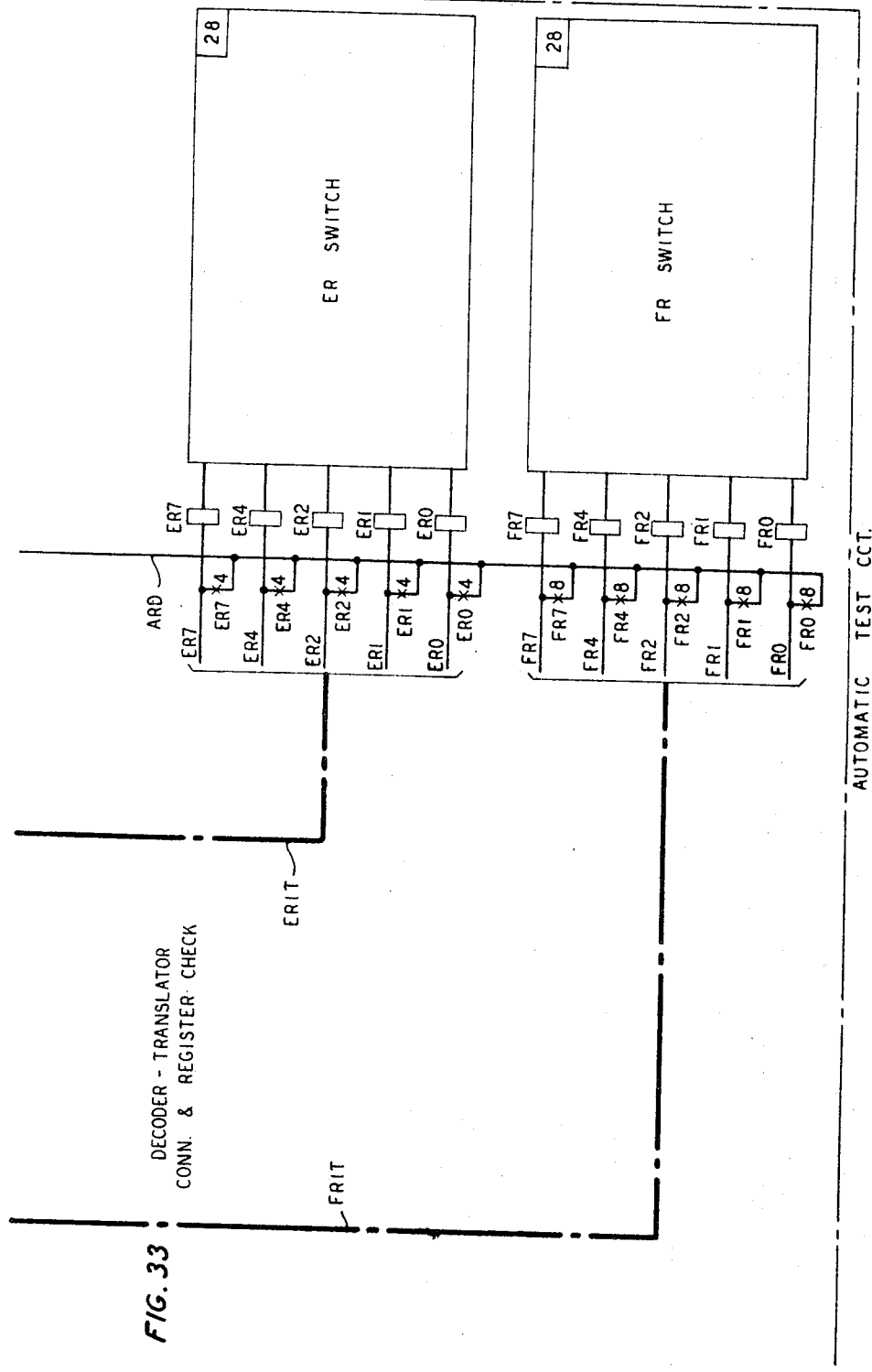

In FIGS. 28, 30 and 33 the arbitrary exit digit switches AR through FR will have been set in positions at the beginning of the test as follows: the AR switch of FIG. 28 will be set on its terminal 2 thereby to provide a resistance battery supply to the right-hand sides of relays AR0 and AR2; the BR switch of FIG. 28 will be set on its terminal 3 in accordance with the second exit digit of 3, thereby supplying resistance battery to the right-hand sides of the windings of relays BR1 and BR2; in FIG. 30, the CR switch will be set on its terminal 8, thereby supplying resistance battery to the right-hand sides of the windings of relays CR1 and CR7; the DR switch will be set on its terminal 2, thereby supplying resistance battery to the right-hand sides of the windings of relays DR0 and DR2; and, in FIG. 33 the ER and FR switches will be set on their terminals N such that none of the relays ER0 through ER7 and FR0 through FR7 of FIG. 33 will have any battery supplied to the right-hand sides of their windings. Upon the operation of the connector relay DCA of FIG. 38, conductors AR0 and AR2, grounded in the translator-decoder circuitry of FIG. 53, are extended over cable ARIT, cable DCA into FIG. 28 over make contacts of connector DCA, cable ARIT, conductors AR0 and AR2 to resistance battery through the windings of relays AR0 and AR2, which thereupon operate and lock over their own make contacts 4, conductor ARD extending into FIG. 27, over make contact 2 of relay TDSA, break contact 2 of relay RCY and to ground over make contact 19 of relay ON1. Likewise, the B arbitrary digit of 3 is transmitted from the translator-decoder of FIG. 53 over cable BRIT into FIG. 28 to cause the operation of relays BR1 and BR2, which lock over their make contacts 8 to off-normal ground on conductor ARD. The C digit of 8 is transmitted from the translator-decoder circuit of FIG. 54 over conductor CRIT into FIG. 28, and thence over cable CRO7 into FIG. 30, where ground on conductors CR1 and CR7 causes the operation in FIG. 30 of relays CR1 and CR7, which thereupon lock over their make contacts 4 to ground on conductor ARD. The KP pulse information (consisting of the grounding in the translator-decoder of FIG. 54 of leads DR2 and DR10) extends from FIG. 54 over cable DRIT into FIG. 28, where these two grounded conductors extend over make contacts of the connector relay DCA and thence into cable DRIT. In FIG. 28 the grounded conductor DR10 comes out of cable DRIT and extends over cable BCD10 into FIG. 27 and through the winding of relay DR10 to negative battery, thereby causing the operation in FIG. 27 of relay DR10, which locks in a circuit extending over its own make contact 4, make contact 1 of relay TDSA, break contact 1 of relay RCY, to ground over make contact 20 of relay ON1. In FIG. 28 the grounded conductor DR2 extends from cable DRIT into cable DRO7 extending into FIG. 30, where the grounded conductor DR2 causes the operation of relay DR2, which locks over its own contact 8 to ground on conductor ARD. Even though both sections 3 and 4 of the DR switch in FIG. 30 have been set on their terminal 2, thereby energizing the right-hand sides of both of the relays DR0 and DR2, relay DR0 cannot operate under the present circumstances because the only ground reaching the five relays in FIG. 30 is the ground on conductor DR2. Since there is no E digit information supplied from the translator-decoder of FIG. 54 into cable ERIT, none of the relays ER0 through ER7 of FIG. 33 will be operated. In FIG. 55 of the translator-decoder, there is no information supplied on conductors FR0 through FR7 with respect to the sixth arbitrary digit position, thereby causing none of the five conductors entering cable FRIT in FIG. 55 to be energized. Cable FRIT extends over cable DCB from FIG. 55 into FIG. 28, thence over make contacts of the connector DCB, thence over cable FRIT into FIGS. 30 and 33, it being understood that none of the relays FR0 through FR7 of FIG. 33 is operated under these circumstances. In FIG. 55 the grounded conductors ARA and SG enter cable ASGIT, extend by means of this cable into FIG. 28, over make contacts of the connector DCB, thence over cable ASGIT into FIG. 27, where these grounded conductors cause the operations of relays ARA and STG0, each relay locking over its respective make contact 6 to the previously described locking ground under control of make contact 1 of relay TDSA. Similarly, the delete-digit information comprising the grounding in FIG. 55 of conductor DL3 into cable DLIT, and the called digit number indication comprising the grounding in FIG. 55 of conductor 7DG into cable DGIT, are transmitted into FIG. 28, over make contacts of the connector DCB, and thence over cables DLIT and DGIT into FIG. 27, where relays DL3 and 7DG are operated. Relay DL3, in operating, locks over its own make contact 4 to off-normal ground under control of make contact 2 of relay TDSA; whereas, relay 7DG locks over its own make contact 6 to off-normal ground under control of make contact 1 of relay TDSA. In FIG. 27, upon the operation of relay STG0, relay SD0 is operated in an obvious circuit over make contact 8 of relay STG0. Relay SD0, in operating, completes an obvious circuit for causing the operation in FIG. 27 of relay SDOA.

Upon the operation of relay SD0 of FIG. 27 and upon the operation of relays AR0, AR2, BR1, and BR2 of FIG. 28, and of relays CR1, CR7 and DR2 of FIG. 30, and under control of the previous settings of the arbitrary exit digit switches AR through FR of FIGS. 40 and 44, circuits are completed in FIGS. 40 and 44 for causing the operation of relays SAR, SBR, SCR of FIG. 40 and of relay SDR of FIG. 44, relays SER and SFR of FIG. 44 remaining released. In FIG. 40, the circuit for operating relay SAR extends from ground, over make contact 17 of relay ON, make contact 11 of relay TDST, make contact 11 of relay SD0, break contact 4 of relay RCY, thence to the wipers of sections 1 and 2 of switch AR (which have been set on their terminals 2 in accordance with the first arbitrary digit of 2), thence in parallel over make contacts 2 of relays AR0 and AR2 and break contacts 1 and 3 of relay SAR, break contact 5 of relay SAR, to negative battery through the winding of relay SAR, which operates and locks over its own make contact 5 to ground on conductor GD. Similarly, relay SBR in FIG. 40 operates and locks under control of the setting of switch BR and make contacts 11 of the operated relays BR1 and BR2. Relay SCR of FIG. 40 operates in a similar circuit under control of the setting of switch CR and make contacts 2 of the operated relays CR1 and CR7. In FIG. 44, relay SDR is operated in a similar manner under control of the setting of section 2 of switch DR and make contact 11 of relay DR2. In FIG. 44, since switches ER and FR have been set on their terminals N and also since none of the relays ER0 through ER7 and FR0 through FR7 is operated, neither of the relays SER and SFR of FIG. 40 is operated.

As a result of the operation of these various relays in FIGS. 27, 28, 30, 33, 40 and 44 of the automatic test circuit, a circuit will be completed extending through FIGS. 29 and 32 for causing the operation in FIG. 32 of relay TDK provided that the information supplied from the translator-decoder to the automatic test circuit (the same switching instruction information transmitted by the translator-decoder to the register-outpulser) is complete and correct in accordance with the previously-described setting of various of the keys and switches in the automatic test circuit. This circuit extends from ground in FIG. 29, over make contact 5 of relay DCN, make contact 2 of the ARA key, make contact 10 of the ARA relay, make contact 2 of the SD0 key, make contact 4 of relay SD0A, make contact 2 of the STG0 key, make contact 9 of relay STG0, make contact 2 of the DR10 key, make contact 9 of the DR10 relay, break contact 4 of the CR10 key, break contact 4 of the CR10 relay, break contact 4 of the BR10 key, break contact 9 of the BR10 relay, break contact 2 of the 10DG key, make contact 2 of the 7DG key, make contact 5 of relay 7DG, break contact 4 of the 5DG key, break contact 5 of relay 5DG, break contact 4 of the 4DG key, break contact 12 of relay 4DG, break contact 3 of the 3DG key, break contact 3 of the 3DG relay, thence over break contact 2 of the DL6 key, make contact 2 of the DL3 key, make contact 5 of relay DL3, break contact 4 of the DL2 key, break contact 2 of relay DL2, break contact 4 of the DL1 key, break contact 5 of relay DL1, break contact 4 of the DAD key, break contact 5 of relay DAD, thence over break contact 10 of relay SFR and break contact 10 of relay SER to conductor CK extending into FIG. 32. In FIG. 32, ground on conductor CK extends over make contact 11 of relay SDR, over break contact 12 of relay DR7, break contact 9 of relay DR4, make contact 4 of relay DR2, break contact 9 of relay DR1, thence over make contact 7 of relay DR10, make contact 1 of relay CR7, break contact 1 of relay CR4, break contact 10 of relay CR2, make contact 1 of relay CR1, break contact 1 of relay CR0, break contact 7 of relay CR10, make contact 1 of relay SCR, break contacts 12 and 9 of relays BR7 and BR4, make contact 4 of relay BR2, make contact 12 of relay BR1, break contacts 12 and 7 of relays BR0 and BR10, thence over make contact 10 of relay SBR, break contacts 1 and 5 of relays AR7 and AR4, make contact 10 of relay AR2, break contact 5 of relay AR1, make contact 1 of relay AR0, make contact 11 of relay SAR, make contact 6 of relay DCN, to negative battery through the winding of relay TDK. Relay TDK of FIG. 32 operates in this circuit as an indication that the information supplied by the translator-decoder circuitry is complete and accurate and that therefore the translator-decoder may be released by the register-outpulser.

Upon the operation of relay TDK of FIG. 32 a circuit is completed for causing the operation of the translator release relay RL(T) in FIG. 56, the circuit extending from ground on conductor RL(D) in FIG. 38, over make contact 2 of relay TDK, conductor RL1(D) extending into FIG. 56, thence over make contact 1 of relay TST(D), to negative battery through the winding of relay RL(T), which operates and locks over its own make contact 12 to ground over make contact 9 of relay ON(T). The operation in FIG. 56 of the translator release relay RL(T) will cause the register-outpulser to release its connection with the translator-decoder circuitry of FIGS. 53 through 56, as will be described in detail in the next section of this description.

*Translator-decoder release*

The operation in FIG. 56 of the translator release relay RL(T) will cause the release of the translator-decoder and of the trunk class connector from connection with the register-outpulser and will cause the release of the translator-decoder from the automatic test circuit. Upon the operation of relay RL(T) of FIG. 56, a circuit is completed for causing the operation in FIG. 9 of the register-outpulser of the translator-decoder release relay TDR, this circuit extending from ground in FIG. 53, over make contact 8 of relay RL(T), conductor RL(T), cable A into FIG. 52, over make contacts of the connectors TA(C) and RA(C), cable A, conductor RL(T) into FIG. 9, thence over make contact 4 of relay TDST and to negative battery through the winding of relay TDR. Relay TDR, in operating, locks over its own make contacts 3 to ground over make contact 20 of relay ON2 and extends ground from the lefthand side of its winding, over make contact 4 of relay RT3, conductor TDR into FIG. 38, over make contact 18 of relay ON1, to battery through the winding of relay TDR, which thereupon operates. In FIG. 38, the operation of relay TDR completes an obvious circuit over its make contact 5 to cause the operation of relay TDRA. The operation of relay TDR in FIG. 38 closes circuits in FIG. 27 over its make contacts 6 and 8 to provide locking circuits for the operated relays in FIGS. 27, 28 and 30 independently of the relay TDSA. The operation of relay TDRA of FIG. 38 completes a circuit in FIG. 40 over its make contact 4 to provide locking grounds for the operated relays of FIGS. 40 and 44 independently of relay TDST. The operation in FIG. 9 of relay TDR causes the release in FIG. 9 of relay TDST, the release of which deenergizes the upper winding of relay TDSA in FIG. 9, thereby permitting relay TDSA to release after a time interval determined by its slow-release characteristic. The release in FIG. 9 of relay TDSA will in turn cause the release in FIG. 38 of relay TDST. The release in FIG. 38 of relay TDST permits the release of relay TDSA in FIG. 38. In FIG. 38, upon the release of relay TDSA, relay DCN is allowed to release after an interval determined by its slow-releasing characteristic, whereupin the connector relays DCA and DCB of FIG. 38 are released and the check relay TDK of FIG. 32 is released. The release of the connectors DCA and DCB of FIG. 38 disconnects the translator-decoder of FIGS. 53 through 56 from the automatic test circuitry of FIGS. 27 through 51.

The release in FIG. 9 of relay TDST causes the release in the translator-decoder connector circuitry of FIG. 52 of the operated relays TS and RS to in turn cause the release of the connector relays RA(C) through RD(C) and TA(C) through TD(C). The release of these eight connector relays disassociates all of the information leads previously extending between the translator-decoder of FIGS. 53 through 56 and the register-outpulser of FIGS. 7 through 26. Upon the release of connector relay TB(C) in FIG. 52, the translator off-normal relay ON(T) of FIG. 56 is released, which in turn causes the release of the decoder off-normal relay ON(D) of FIG. 56 and of the connector busy relay CB(T) in FIG. 56. The release in FIG. 56 of relay CB(T) causes the release in FIG. 52 of relay CB; and, the release in FIG. 56 of the decoder off-normal relay ON(D) causes the release in the trunk class connector circuitry of FIG. 52 of relay P and of connector PC. Following these release operations, all of the rest of the operated relays in the translator-decoder circuitry of FIGS. 53 through 56 are released, thereby returning the translator-decoder to a normal idle condition.

*Checking switching functions*

As described hereinbefore, upon the operation in FIG. 9 of the register-outpulser relay RCA, the fundamental tip and ring loop extending between FIGS. 7 and 42 over conductors FT and FR is opened in FIG. 7 at break contact 6 of relay RCA. The opening of this fundamental tip and ring loop in FIG. 42 of the automatic test circuit causes the release of relays A, AA, RA, B and B1, leaping relay RA1 of FIG. 42 reoperated. The release of relay B1 in FIG. 42 removes ground in FIG. 43 from the S1 conductor extending back into FIG. 8, the removal of ground from conductor S1 in FIG. 8 being an indication to the register-outpulser that the simulated switch train has been dropped in accordance with the recycle operation. Accordingly, relay SLT1 of FIG. 8 becomes operated in a circuit extending from ground, through its winding, through resistance SLT1, to negative battery over make contact 12 of relay RCA. Relay SLT1, in operating, causes the reoperation in FIG. 8 of relay SLT. The reoperation in FIG. 8 of relays SLT1 and SLT is an indication to the rest of the register-outpulser circuitry that the simulated switch train has been dropped.

Upon the operation, previously described, of the translator-decoder release relay TDR in FIG. 9 of the register-outpulser, circuit operations take place to prepare the register-outpulser for resetting the simulated outgoing switch train in accordance with the three arbitrary exit digits 238 registered in the A, B and C digit registers of FIG. 17. Upon the operation of relay TDR in FIG. 9, the primary winding of relay RCA1 in FIG. 9 is deenergized, thereby allowing relay RCA1 to release after a time determined by its slow-release characteristic, the ultimate release of relay RCA1, causing relay RCA of FIG. 9, to release after an additional interval of time determined by its slow-release characteristic. Also in FIG. 9, the operation of relay TDR completes a circuit for causing the operation of relay RCS extending from ground in FIG. 9, over the contact 24 of relay ON2, make contact 9 of relay SDO, make contact 8 of relay TDR, the parallel make contacts 1 and 8 of respective relays RCA and SLT, thence to negative battery through the upper primary winding of relay RCS, which operates and completes a circuit over its own make contact 12 in series with its lower secondary winding to provide itself with a slow-releasing characteristic. Upon the operation of relay RCS of FIG. 9, a circuit is completed in FIG. 20 for causing the operation of the first arbitrary exit digit steering relay ARS extending from ground in FIG. 20, over make contact 15 of relay ON2, make contact 6 of relay RCS, to negative battery through the winding of relay ARS. In FIG. 22, the operation of steering relay ARS causes the operation of the two readout relays RR0 and RR2 in accordance with the first arbitrary exit digit 2 registered in the A digit register of FIG. 22. With relay RCA1 of FIG. 9 released, and with relays RR0 and RR2 of FIG. 22 operated, a circuit is completed in FIG. 13 for causing the operation of the readout check relay RK extending from ground in FIG. 13, over make contact 16 of relay ON2, break contact 8 of relay RCA1, thence over make contact 10 of relay RR0, break contact 11 of relay RR1, make contact 11 of relay RR2, break contacts 12 of relays RR4 and RR7, thence over break contact 12 of relay RR10, make contact 5 of relay SDO, make contact 9 of relay TDR, make contact 11 of relay DP, to negative battery through the winding of relay RK, which thereupon operates.

In the meantime, upon the eventual release in FIG. 9 of relay RCA, the fundamental tip and ring loop is again completed between FIGS. 7 and 42. Upon the reclosing of the fundamental tip and ring loop into FIG. 42, relays A and AA become reoperated, as do relays B and B1, leaving relay RA of FIG. 42 released and relay RA1 of FIG. 42 operated. Upon the release of relay RCA of FIG. 38, or the reoperation of relay B1 in FIG. 42, whichever occurs first, a circuit is completed in FIGS. 35 and 36 for causing the operation of the first arbitrary digit inpulse steering relay ARS, this circuit extending from ground in FIG. 36, over make contact 20 of relay ON, and thence over the parallel combination of make contact 11 of relay B1 and break contact 9 of relay RCA, thence through break contact 6 of relay TDT2, break contact 6 of relay IPC, break contact 8 of relay STF, thence over the chain of break contacts 6 of relays IS11 through IS4, conductor ISB into FIG. 35, thence over the chain of break contacts 6 of relays IS3, IS2, IS1, FRS, ERS, DRS, CRS and BRS, thence over break contact 12 of relay IP2A, make contact 9 of relay SAR, break contact 5 of relay ARS, to negative battery through the winding of relay ARS, which operates and locks over its own make contact 5 to its previously-described operating ground independently of the contacts of relays SAR and IP2A. In FIG. 39, upon the operation of the steering relay ARS, relays MR0 and MR2 are operated in circuits extending from ground on conductor GD in FIG. 40, thence over the wipers of sections 1 and 2 of the AR switch, over make contacts 2 of respective relays AR0 and AR2, conductors AR0 and AR2, cable AR0–7, cable ARFR into FIG. 39, cable AR0–7, over make contacts of relay ARS, cable IP and thence over conductors 0 and 2 to negative battery through the windings of relays MR0 and MR2, to operate these relays in accordance with the first arbitrary exit digit of 2 as determined by the setting of the AR switch in FIG. 40. The operation of these relays MR0 and MR2 of FIG. 39 prepares the inpulse counting cricuitry of FIG. 38 for checking the proper transmission from the register-outpulser of this first exit digit of 2.

In the meantime, in FIG. 43 upon the reoperation of relay B1 of FIG. 42 when the fundamental tip and ring loop was reclosed, ground is reapplied to conductor S1 in FIG. 43, extending back into FIG. 8, over make contact 2 of relay RT1, make contact 3 of relay ON, make contact 4 of relay DCK, through the SLT diode, to the left-hand side of the winding of relay SLT1, which thereupon becomes deenergized (shunted down) and will eventually release after an interval of time determined by its slow-release characteristic. The ultimate release in FIG. 8 of relay SLT1 will in turn cause the release in FIG. 8 of relay SLT after an additional slow-release interval of time. In FIG. 9, upon the ultimate release of relay SLT of FIG. 8, relay RCS becomes deenergized and in turn will release after a still additional interval of time determined by its slow-release characteristic. In FIG. 20 upon the release of relay RCS of FIG. 9, relay ARS locks over break contact 6 of relay RCS, make contact 8 of relay ARS, through the chain of break contacts 6 of steering relays BRS through FRS, conductor AS4 extending into FIG. 21, thence over the chain of break contacts 5 of the remaining steering relays OS1 through ST1, and over break contact 8 of relay RCA, to ground over make contact 18 of relay ON2.

Upon the release of relay RCS of FIG. 9 in the register-outpulser, the pulse generator of FIG. 12 is unlocked by the opening of make contact 10 of relay RCS in FIG. 12, thereby allowing relays PG1 and PG2 of FIG. 12 to oscillate, as previously described, for the purpose of transmitting the first arbitrary exit digit to the simulated reseized first selector of the simulated switch train. Relays PG1 and PG2 of FIG. 12 will oscillate until ground is supplied to conductor PKC in FIG. 12 from the switching digit readout circuitry of FIG. 22 at a time just after the second exit digit has been transmitted to this test circuit. The grounding of conductor PKC in FIG. 22, as will be described, locks the pulse generator of FIG. 12 to prevent the use of the third exit digit to seize a trunk until or unless all seven digits of the called number have been received and registered in the input digit registration circuit of FIG. 15, as indicated by the operation in FIG. 14 of the relay PKC. With respect to FIG. 22, the conductor PKC extending therefrom into FIG. 12 (to lock the pulse generator of FIG. 12) will be grounded when the third exit digit steering relay CRS of FIG. 20 operates, with the second exit digit steering relay BRS of FIG. 20 also operated during the transmission of the second digit. The grounding of the conductor PKC in FIG. 22 is under control of the operated relay DR10 in FIG. 22 since this is an indication that the fourth switching digit is the KP pulse, which will be the first one transmitted over a seized trunk. When relay PG1 of FIG. 12 releases at the beginning of the first pulse, the fundamental tip and ring loop is opened over conductors FT and FR from FIG. 7 into FIG. 42, thereby causing the release in FIG. 42 of relays A and AA. Relays B and B1 of FIG. 42 remain operated during the pulsing of relays A and AA. Upon the release of relay A in FIG. 42, relay RA reoperaes and relay RA1 releases, as previously described, these relays staying in this condition during the pulsing of the A relay of FIG. 42. Upon the subsequent reoperation of relay PG1 of FIG. 12, at the end of the first pulse, relays A and AA of FIG. 42 reoperate, et cetera. In this manner the A and AA relays of FIG. 42 count the pulses of the dial pulse digits transmitted thereto by the pulse generator of FIG. 12 in the register-outpulser.

As has been described hereinbefore, the inpulse counting circuitry of FIG. 38 counts the releases and reoperations of relay A of FIG. 42 to cause the counting relays IP1 through IP5 to count the number of pulses in each digit, relay IP2A operating and locking in a circuit previously described, upon the detection of the first dial pulse. In a like manner, also as previously described, the output pulse counting circuitry of FIG. 11 in the register-outpulser counts the pulses transmitted to the test circuit on the P1 through P5 relays of FIG. 11.

When the pulse count of FIG. 11 in the register-outpulser has counted two pulses in accordance with the registration in the readout relays of FIG. 22, upon the reoperation of relay PG1 of FIG. 12 at the end of the second pulse, a circuit is completed in FIG. 11 for causing the operation of the interdigital timing relay IC extending from off-normal ground on conductor Z from FIG. 21, thence over break contact 4 of relay Z, through contacts (not shown) of the readout relays of FIG. 22 into a matching circuit, which in turn is controlled by contacts (not shown) of the P1 through P5 counting relays of FIG. 11, whereupon the matching circuit, in recognizing a match between the readout relays of FIG. 22 and the pulse count of the P1 through P5 relays of FIG. 11, completes the circuit through make contact 6 of relay PG1, to battery through the winding of relay IC which thereupon operates. In FIG. 12, the operation of relay IC opens its break contact 7, thereby allowing relays PG1 and PG2 to continue to oscillate. In FIG. 7, the operation of relay IC closes its make contact 1 in parallel with make contact 1 of relay PG1, thereby preventing any further pulsing of relay PG1 to be effective over the fundamental tip and ring loop into FIG. 42. Upon the operation of relay IC of FIG. 11, a circuit is completed in FIG. 13 for causing the operation of relay W extending from ground in FIG. 13, over make contact 16 of relay ON2, break contact 8 of relay RCA1, make contact 6 of relay IC, break contact 8 of relay TMFA, break contact 6 of relay Z, to battery through the winding of relay W, which locks over its own make contact 12 independently of relay IC. In FIG. 7, the operation of relay W closes a circuit over its make contact 1 in parallel with make contact 1 of relay IC to also hold closed the fundamental tip and ring loop into FIG. 42. Also, in FIG. 12 break contact 5 of relay W opens another part of the locking circuit of relay PG1, thereby allowing relay PG1 to continue oscillating. In FIG. 20, upon the operation of the relay W, a circuit is completed for causing the operation of the second exit digit steering relay BRS extending from ground in FIG. 20, over make contact 4 of relay ON1, make contact 4 of relay W, break contacts 9 and 8 of respective relays RCA and RCS, make contact 11 of relay ARS, break contact 8 of relay BRS, to negative battery through the winding of relay BRS, which locks over its own make contact 8 to the ground supplied over the chain of break contacts 6 of the remaining steering relays. Relay ARS of FIG. 20 remains locked under control of make contact 6 of relay BRS and break contact 8 of relay RCS as long as relay W of FIG. 13 remains operated.

Upon the operation of relay IC in FIG. 11, relay PGI of FIG. 12 eventually releases, thereupon to recycle the pulse counting circuit FIG. 11 and to provide a locking circiut for relay IC over break contact 6 of relay PGI and make contact 2 of relay IC to off-normal ground on conductor Z under control of break contacts 11 and 7 of respective relays TMFA and RCA. Upon the next reoperation of relay PG1 of FIG. 12, relay IC of FIG. 11 is released, thereby to allow the opeartion in FIG. 13 of relay Z, this circuit extending from ground in FIG. 13, over make contact 16 of relay ON2, break contact 8 of relay RCA1, break contact 6 of relay IC, break contact 7 of relay TMFA, make contact 10 of relay W, break contact 12 of relay Z, to negative battery through the winding of relay Z, which thereupon locks over its own make contact 12 and make contact 12 of relay W to the operating ground. During the next three releases and reoperations of relay PG1 of FIG. 12, the outpulse counting relays of FIG. 11 are arranged in a configuration such that upon the reoperation of relay PG1 at the end of the third such additional pulsing period relays P1 through P5 will be in a configuration representing a pulse count of 4. When this situation prevails, a circuit is completed in FIG. 11 for causing the operation of relay IC extending from off-normal ground on conductor Z in FIG. 11, over make contact 4 of relay Z, through a contact network (not shown) of the P1 through P5 relays of FIG. 11 representing a count of four pulses, thence over make contact 6 of relay PG1, to negative battery through the winding of relay IC. Relay IC, in operating, recloses its make contact 1 in FIG. 7, thereby to keep closed the fundamental tip and ring loop into FIG. 42, and allows relay W of FIG. 13 to release, while retaining opearted relay Z under control of make contact 6 of relay IC in FIG. 13. When relay W of FIG. 13 becomes released, the first exit digit steering relay ARS of FIG. 20 is released, thereby releasing the readout relays RR0 and RR2 of FIG. 22, the release of which causes the release in FIG. 13 of the readout check relay RK, which in turn closes its break contact 4 in FIG. 7 to close an additional path in the fundamental tip and ring loop extending into FIG. 42. The readout relays RR1 and RR2 of FIG. 22 immediately become reoperated under control of the operated steering relay BRS of FIG. 20 in accordance with the second or B exit digit of 3 registered in the B register of FIG. 22. The reoperation of these two-out-of-five readout relays of FIG. 22 causes the reoperation in FIG. 13 of the check relay RK. Upon the next release of relay PG1 of FIG. 12 the outpulse counting relay circuitry of FIG. 11 is completely recycled to prepare this counting circuit for counting the next outpulsed digit. Relay PG1 of FIG. 12 subsequently reoperates, to in turn cause the release in FIG. 11 of relay IC, which in turn causes the release in FIG. 13 of relay Z, thereby returning the register-outpulser circuitry to the condition wherein it is prepared to outpulse on a dial pulse basis the second or B exit digit presently registered in the opearted readout relay RR1 and RR2 of FIG. 22.

In the meantime, when the A relay of FIG. 42 reoperates at the end of the first digit of 2 transmitted to the automatic test circuit, relay AA of FIG. 42 reoperates, relays B and B1 of FIG. 42 remain operated, and relay RA of FIG. 42 will release during the interdigital interval. During the reception of the pulses of this digit, relay RA of FIG. 42 will be operated and relay RA1 of FIG. 42 will be released. The released relay RA1 causes the operation in FIG. 35 of the second or B digit steering relay BRS. The circuit for operating relay BRS of FIG. 35 extends from ground in FIG. 35, over make contact 18 of relay ON, break contact 10 of relay RCA, make contact 5 of relay TDRA, make contact 11 of relay IP2A, break contact 6 of relay RA1, break contact 5 of relay MFS, make contact 11 of relay ARS, make contact 9 of relay SBR, break contact 5 of relay BRS, to negative battery through the winding of relay BRS. Relay BRS locks over its own make contact 5 to the previously-described locking ground through the chain of back contacts 6 of the subsequent steering relays. Relay ARS remains locked over make contact 6 of relay BRS under control of break contact 6 of relay RA1. As has been described hereinbefore, upon the release in FIG. 42 of relay RA at the end of the first arbitrary exit digit of 2 counted by the counting relays IP1 through IP5 of FIG. 38, a circuit is completed for causing the operation of the matching relay M of FIG. 38 provided that the pulse count in relay IP1 through IP5 of FIG. 38 matches the registration of the first exit digit of 2 in the memory relays MR0 and MR2 of FIG. 39. The operation of relay M in FIG. 38 recycles the pulse counting circuitry of relays IP1 through IP5 in FIG. 38, which in turn causes the release of relay M. Also, relay RA of FIG. 42, in releasing, reoperates relay RA1 of FIG. 42, to in turn release the steering relay ARS of FIG. 35. The release of relay ARS of FIG. 35 causes the release in FIG. 39 of the memory relays MR0 and MR2. Relays MR1 and MR2 will immediately reoperate in accordance with the second arbitrary exit digit of 3 as determined by the setting in FIG. 39 of the B switch, all under control of make contacts of the operated B digit steering relay BRS of FIG. 35. This prepares the circuitry of FIG. 38 for counting and checking the use by the register-outpulser of the second exit digit of 3.

In the meantime, the pulse generator of FIG. 46 continues to transmit to the register-outpulser the remaining ones of the seven called number digits 243-0123, this transmission as previously described, being under control of the outpulse counting circuitry of FIG. 41, the called digit register of FIG. 45, and the outsteering circuitry of FIG. 37.

When the pulse generator relay PG1 of FIG. 12 reoperates at the end of the last pulse of the second or B exit digit, the interdigital timing is started as previously described. Upon the operation of relay W in FIG. 13 during this interdigital timing interval, the third exit digit steering relay CRS of FIG. 20 is operated and relay BRS of FIG. 20 is held locked until relay W of FIG. 13 ultimately releases. Upon the operation of steering relay CRS of FIG. 20, ground will be extended from FIG. 22, over make contact 4 of relay ON2, conductor 10G into the D digit register of FIG. 22, over make contact 10 of relay DR10, thence over conductor D10, make contact 9 of relay CRS, conductor PKC into FIG. 12, thence over break contact 11 of relay PKC, and make contact 11 of relay PG1, to hold relay PG1 locked operated, thereby to prevent the pulse generator of FIG. 12 from developing any further dial pulses. As has been mentioned hereinbefore, pulse generator relay PG1 of FIG. 12 will remain locked until relay PKC of FIG. 14 operates as an indication that all seven of the called digits 243-0123 have been transmitted to and registered in the register-outpulser. In meantime, the fundamental tip and ring loop extending over conductors FT and FR from FIG. 7 into FIG. 42 will be closed and held closed, thereby to cause relays A and AA of FIG. 42 to remain operated. In addition, relay RA of FIG. 42 releases and allows relay RA1 of FIG. 42 to become reoperated. In FIG. 22 the readout relays RR1 and RR2 remain operated under control of the closed contacts of the B digit steering relay BRS in accordance with the B digit of 3 registered in the B digit register of FIG. 22. Likewise, in FIG. 13 relay RK remains operated.

Eventually the automatic test circuit will have transmitted to the register-outpulser the last or seventh digit of the called number 243-0123. When relay PG1 in FIG. 46 reoperates at the end of the last pulse of the last digit, relay DK of FIG. 41 will operate as previously described, thereby closing its make contact 2 in FIG. 42 to close the tip and ring loop extending to FIG. 7 of the register-outpulser. Relay W of FIG. 41 will reoperate, as previously described, to in turn cause the advance of the outsteering circuitry of FIG. 37 whereby relay OS8 is operated and locked. Actually, there is no eighth digit but the operation of relay OS8 will be utilized, when relay W of FIG. 41 releases at the end of the interdigital timing, to cause the operation in FIG. 37 of the end of pulsing relay EOP, as will be described. Also, as previously described, the previously operated steering relay OS7 of FIG. 37 will remain locked operated as long as relay W of FIG. 41 remains operated. In FIG. 46, with relay DK of FIG. 41 operated, relays PG1 and PG2 continue to oscillate for an interval of four pulse counts, measuring the interdigital time as previously described. When relay PG1 releases at the beginning of the first interdigital pulse, relay DK of FIG. 41 remains operated and the P1 through P5 relays of FIG. 41 are released, as previously described. Upon the next reoperation of relay PG1 of FIG. 46 at the end of the first interdigital pulse, relay DK of FIG. 41 is released, thereby to cause the operation of relay Z in FIG. 41 and the locking operated of relay W. Relays PG1 and PG2 of FIG. 46 continue to oscillate for two more pulse counts, whereupon relay P3 of FIG. 41 will remain operated at the end of the count of two pulses after the operation of relay Z in FIG. 41. Thereupon, upon the reoperation of relay PG1 at the end of these additional two pulses, relay DK of FIG. 41 is reoperated to release relay W and to hold operated relay Z of FIG. 41. Upon the release of relay W, relay OS7 of FIG. 37 is released, thereby completing a circuit in FIG. 37 for causing the operation of the end of pulsing relay EOP, this circuit extending from ground in FIG. 37 over make contact 8 of relay ON, break contact 7 of relay W, make contact 3 of relay OS8, the wiper of section 6 of switch H (set on its contact N), thence over break contact 5 of relay EOP, to negative battery through the winding of relay EOP, which operates and locks over its make contact 5 to off-normal ground over make contact 9 of relay ON. The operation of relay EOP causes the release in FIG. 37 of relay OS8.

In FIG. 46, the pulse generator relay PG1 is locked operated under control of make contact 4 of relay DK, make contact 11 of relay Z, and make contact 1 of relay EOP, thereby to prevent any further generation of dial pulses by the automatic test circuit pulse generator in FIG. 46. The release of all of the outsteering relays of FIG. 37 causes the release in FIG. 45 of any operated ones of the readout relays RR0 through RR7, thereby to cause the release in FIG. 41 of relay RK. In FIG. 37, relay EOP remains locked to ground under control of make contact 9 of relay ON; relay Z of FIG. 41 remains locked operated under control of make contact 6 of relay DK, make contact 12 of relay PTC, and make contact 15 of relay ON1; in FIG. 43, relay PTC remains locked operated under control of make contact 12 of relay ON; in FIG. 41, relay DK remains locked operated under control of make contact 6 of relay PG1, break contact 2 of relay P1, make contact 3 of relay P3, make contact 2 of relay Z, and make contact 16 of relay ON2; in FIG. 41, relay P3 remains locked operated under control of make contact 3 of relay PG1 and make contact 7 of relay ON2; and, relay PG1 of FIG. 46 remains operated under control of make contact 4 of relay DK, make contact 11 of relay Z, make contact 1 of relay EOP, and make contact 24 of relay ON. All of these relays stay in the operated and locked condition without any further change until the release of the off-normal relays in FIG. 43 of the automatic test circuit.

In the meantime, in the register-outpulser circuitry the input digit steering circuit of FIG. 14 has been controlled incident to the receipt of the seventh or last digit 3 of the called number 243–0123, which digit has been registered in the G1 and G2 relays of FIG. 15 under control of the operated insteering relay 1S7 of FIG. 14. Also, in FIG. 14 relay IS8 has been operated to prepare to accept the eighth digit, if any. With the pulse generator of FIG. 12 of the register-outpulser locked after the outpulsing of the second or B exit digit from the B digit registers of FIG. 17, as previously described, there will be no more repeating of called digits to the test circuit. The fundamental tip and ring loop comprising conductors FT and FR extending from FIG. 7 into FIG. 42 of the automatic test circuit remains closed under control in FIG. 7 of make contact 1 of relay PG1, and make contact 4 of relay SDO and break contact 6 of relay RCA. At the end of the last pulse of the seventh digit received by the register-outpulser from the test circuit, relay L1 of FIG. 7 will remain operated, relays LA and L2 of FIG. 8 remain operated, relays RA and RA2 of FIG. 8 remain released, and relay RA1 of FIG. 8 remains operated. When relays RA and RA2 of FIG. 8 release, relay STR in FIG. 14 releases, as previously described, thereby causing the release in FIG. 14 of insteering relay IS7. Upon the release of relay IS7 in FIG. 14, a circuit is completed for causing the operation of relay PKC extending from ground in FIG. 14, over make contact 20 of relay ON1, make contact 10 of 7DG, thence through a contact network (not shown) of the A digit register of FIG. 15 indicating that the A digit is neither a 0 nor a 1, thence over make contact 11 of relay IS8, break contact 4 of relay RA2, and break contact 6 of relay PKC to negative battery. Relay PKC operates and locks over its own make contact 6 to ground under control of make contact 5 of relay ON. Upon the operation of relay PKC of FIG. 14, the previously-described locking ground for locking the pulse generator of FIG. 12 is opened in FIG. 12 by the opening of break contact 11 of relay PKC, thereby allowing the PG1 and PG2 relays of the pulse generator of FIG. 12 to once again oscillate so as to outpulse the third or C exit digit from the C digit register of FIG. 17 to cause simulated trunk seizure in the automatic test circuit, as will be described.

In the meantime, during the transmission by the register-outpulser of the second or B exit digit to the automatic test circuit of FIG. 42, relay RA1 of FIG. 42 will be released due to the operation of relay RA in FIG. 42. The release of relay RA1 causes the operation in FIG. 35 of the C digit steering relay CRS in an obvious manner as previously described, while retaining locked operated the second or B exit digit steering relay BRS of FIG. 35. At the end of the last pulse of the second exit digit, relay RA1 of FIG. 42 becomes reoperated, thereby to cause the release in FIG. 35 of steering relay BRS. This, in turn, causes the release in FIG. 39 of the memory relays MR1 and MR2 (in accordance with the second exit digit of 3) and the immediate reoperation of relays MR1 and MR7 in accordance with the third exit digit of 8. With relay CRS of FIG. 35 operated and with relays MR1 and MR7 of FIG. 39 operated, the inpulse counting circuitry in the right-hand part of FIG. 38 is again prepared to check the use of the third exit digit of 8 by the register-outpulser.

As mentioned above, the operation of relap PKC of FIG. 14 in the register-outpulser unlocks the pulse generator of FIG. 12, thereby to allow transmission by the register-outpulser to FIG. 42 of the automatic test circuit of the third exit digit of 8 presently registered in the C digit register of FIG. 17. As has been described hereinbefore, upon the first release of relay PG1 of FIG. 12, the output pulse counting circuit of FIG. 11 is recycled and relay IC in FIG. 11 is locked operated. The pulse generator of FIG. 12 thereupon goes through its interdigital timing interval which consists of the counting of four pulses of the relay PG1. Relay IC of FIG. 11 will become released upon the first reoperation of relay PG1, to in turn cause the operation in FIG. 13 of relay Z. Upon the reoperation of relay PG1 of FIG. 12, at the end of the fourth pulse of the interdigital timing interval, relay IC of FIG. 11 will become reoperated, to in turn lock operated relay Z of FIG. 13 and to hold closed the fundamental tip and ring loop to the automatic test circuit by the closing in FIG. 7 of make contact 1 of relay IC. This reoperation of relay IC causes the release in FIG. 13 of relay W, to in turn cause the release in FIG. 20 of relay BRS, which in turn causes the release in FIG. 22 of the readout relays RR1 and RR2, the release of which in turn causes the release in FIG. 13 of relay RK. With relay CRS of FIG. 20 operated, the readout relays RR1 and RR7 of FIG. 22 immediately reoperate in accordance with the third exit digit of 8, thereby in turn causing the reoperation in FIG. 13 of the readout check relay RK. In the meantime, the next release of relay PG1 of FIG. 12 recycles the counting circuit of FIG. 11 and locks operated relay IC of FIG. 11. Upon the next reoperation of relay PG1 of FIG. 12, relay IC of FIG. 11 is released, to in turn cause the release in FIG. 13 of relay Z. At this point in the operation, relay CRS of FIG. 20 is operated, thereby causing the operation in FIG. 22 of readout relays RR1 and RR7 in accordance with the third exit digit of 8 registered in the C digit register of FIG. 22. The operation of the relays RR1 and RR7 of FIG. 22 in turn causes the operation of the readout check relay RK of FIG. 13, which in turn allows the pulse generator of FIG. 12 to continue developing pulses for the purpose of outpulsing the third exit digit of 8 into the automatic test circuit of FIG. 42.

The third exit digit of 8 is transmitted to the A relay of FIG. 42 in the automatic test circuit, is counted by the inpulse counting circuitry of FIG. 38, is matched against the operated matching relays MR1 and MR7 of FIG. 39, to in turn cause the operation of the matching relay M in FIG. 38 and the recycling of the counting relays IP1 through IP5 of FIG. 38. During the transmission of this third exit digit, relay RA1 of FIG. 42 will be released, thereby allowing the operation in FIG. 35 of the fourth exit digit steering relay DRS with relay CRS locked operated. At the end of the eighth pulse of this third exit digit of 8, when relay RA1 of FIG. 42 reoperates, relay CRS of FIG. 35 will be released to in turn cause the release in FIG. 39 of the memory relays MR1 and MR7 and the immediate reoperation of memory relays MR2 and MR10 of FIG. 39 in accordance with the KP pulse (indications 2 and 10 determined by the setting of the DR switch of FIG. 44 and the operation in FIG. 27 of relay DR10). This prepares the automatic test circuit to check the first multifrequency signal to be transmitted from the register-outpulser, this signal to be the so-called KP pulse consisting of two frequencies (1100 cycles and 1700 cycles) corresponding to the two indications of 2 and 10.

In the meantime, in the register-outpulser, at the end of the eighth pulse of the third exit digit, relay PG1 of FIG. 12 will reoperate, to in turn cause the operation in FIG. 11 of relay IC, which in turn causes the operation in FIG. 13 of relay W, to in turn cause the operation in FIG. 20 of the fourth exit digit steering relay DRS, with relay CRS of FIG. 20 locked operated. The next release of relay PG1 of FIG. 12 recycles the counting circuit of FIG. 11 and locks operated relay IC therein. Upon the next operation of relay PG1 of FIG. 12, relay IC of FIG. 11 is released, to in turn cause the reoperation in FIG. 13 of relay Z. Relays PG1 and PG2 of FIG. 12 continue to develop three more pulses during the interdigital timing interval as previously explained. Eventually, relay PG1 reoperates to in turn cause the reoperation in FIG. 11 of relay IC, which holds operated relay Z of FIG. 13 and closes the fundamental tip and ring loop from FIG. 7 to FIG. 42. Upon this reoperation of relay IC in FIG. 11, relay W of FIG. 13 is released, to in turn release relay CRS in FIG. 20. This causes the release in FIG. 22 of readout relays RR1 and RR7 and the release in FIG. 13 of the readout check relay RK. With relay DRS of FIG. 20 operated, circuits are completed in FIG. 22 for causing the operation of relays TMF, TMFA, RR2 and RR10 in accordance with the registration in the D digit register of FIG. 22 of the KP pulse as evidenced by the operation therein of relays DR2 and DR10. Conductors 2 and 10 will be grounded out of the D digit register of FIG. 22, over cable DRO, make contacts of relay DRS, break contacts of relays CRS, BRS and ARS. The grounded conductor RR2 causes the operation of relay RR2 and the grounded conductor RR10 extends over break contact 5 of relay TMF to battery through the winding of relay TMF. Relay TMF operates and locks over its own make contact 5, break contact 4 of relay RCY, to ground over make contact 8 of relay ON, in turn completing an obvious circuit over make contact 12 of relay TMF to cause the operation of relay TMFA. The operation of relay TMFA extends ground on conductor RR10, over its make contact 4, to battery through the winding of relay RR10, thereby to cause the operation of this readout relay RR10. In FIG. 13, the operation of readout relays RR2 and RR10 causes the reoperation of the readout check relay RK. Eventually, in FIG. 12 relay PG1 again releases, thereby to recycle the counting circuitry of FIG. 11 and to lock operated relay IC therein. Upon the next reoperation of relay PG1 of FIG. 12, relay IC of FIG. 11 is again released, to in turn cause the release in FIG. 13 of relay Z. Upon the operation in FIG. 22 of relay TMF, the pulse generator of FIG. 12 is locked operated, the circuit extending from ground in FIG. 12, over break contact 5 of relay SG1, make contact 4 of relay TMF, make contact 11 of relay PG1, to the left-hand side of the winding of relay PG1. This will prevent any further development of pulsing by the pulse generator of FIG. 12 until the completion, as will be described below, of the "stop-go" timing operation upon simulated trunk seizure. Upon the operation of relay TMFA of FIG. 22, transfer contacts 5 and 6 thereof in the pulse generator of FIG. 12 change the timing of the PG1–PG2 relay oscillation in accordance with proper requirements (an MF pulse length of about 100 milliseconds) for transmitting the KP pulse when the time comes. In FIG. 7 of the register-outpulser, when relays TMF and TMFA of FIG. 22 operate, the fundamental tip and ring loop extending from FIG. 7 into FIG. 42 extends in FIG. 7 from conductor FT, over make contact 4 of relay RT2, over make contacts 9 and 4 of respective relays TMF and SDO, thence over break contact 6 of relay RCA, make contact 1 of relay TMF, through the upper left coil of the transformer T, thence over make contact 6 of relay TMF, make contact 9 of relay REC, resistance FT1, resistance RV1, the windings of relays RV and LT, make contact 3 of relay ON2, resistance FR1, make contact 11 of relay REC, make contact 8 of relay TMF, through the lower left winding of transformer T, and thence over make contact 3 of relay RT2 to conductor FR. Relays LT of FIG. 7 and A of FIG. 42 are held operated in this loop circuit. The make contacts 9 and 4 in FIG. 7 of respective relays TMF and SDO hold closed the fundamental tip and ring loop so that no more dial pulsing can be transmitted to the automatic test circuit. In FIG. 7, the right-hand side of transformer T is connected over make contacts 3 and 2 of relay TMF, through resistances MF1 and MF2, over break contacts 7 and 8 of relay PG1 (at such time as the pulse generator of FIG. 12 is allowed to reoscillate), and then through contacts of the readout relays RR0 through RR10 of FIG. 22 to the source of multifrequency tones. This will allow the remaining digits (the KP pulse followed by the four numericals 0123 and ending up with the ST signal) to be transmitted on a multifrequency basis under control of back contacts 7 and 8 of relay PG1 of FIG. 12. Also, in FIG. 11 the operation of relay TMFA, in opening its break contacts 10 and 11, prevents further use of FIG. 11 for any output pulse counting. The KP pulse (signals 2 and 10) in register relays DR2 and DR10 of FIG. 22 will not be transmitted until the pulse generator of FIG. 12 is unlocked after the stop-go signaling condition which will be met upon trunk seizure in response to the use of the third exit digit of 8.

Figure 47:
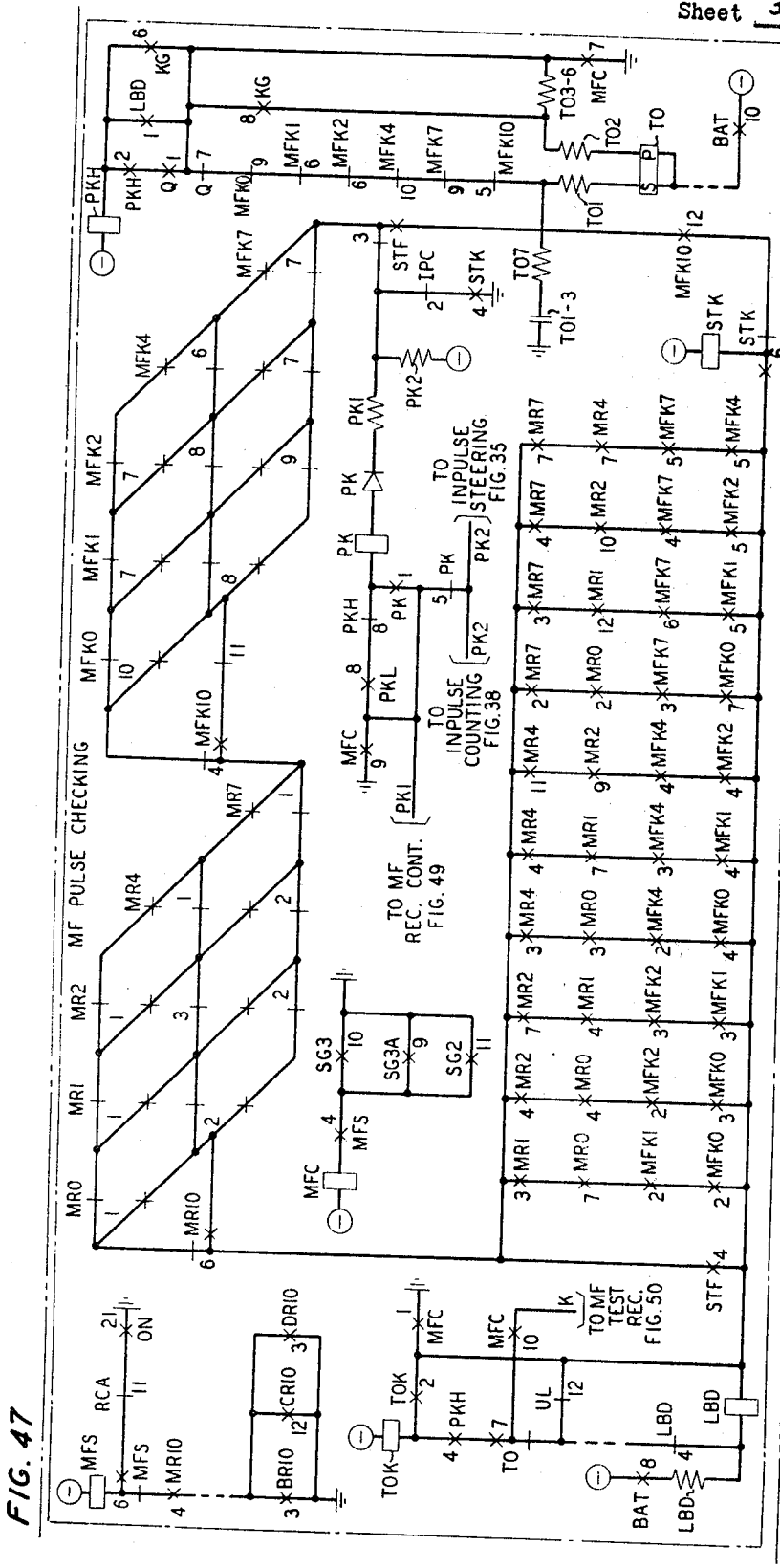

With memory relay MR10 of FIG. 39 operated in accordance with the setting of switch DR of FIG. 44, and with relay DR10 in FIG. 27 operated, a circuit is completed in FIG. 47 for causing the operation of relay MFS to prepare the automatic test circuit to switch to MF pulse checking, this circuit extending from ground in FIG. 47, over make contact 3 of relay DR10, over make contact 4 of relay MR10, through break contact 6 of relay MFS, to negative battery through the winding of relay MFS, which thereupon operates and locks over its own make contact 6, break contact 11 of relay RCA, to ground over make contact 21 of relay ON. In FIG. 35, the operation of relay MFS of FIG. 47 switches, at its transfer contacts 5, the advance control on the inpulse steering circuitry to the MF pulse checking circuit of FIG. 47. Also, in FIG. 35, when relay RA1 of FIG. 42 reoperates at the end of the use of the third exit digit of 8, and before relay IP2A of FIG. 38 is released by the operation of relay M in FIG. 38, relay SG(T) in FIG. 35 is operated in a circuit extending from ground in FIG. 35, over make contact 18 of relay ON, break contact 10 of relay RCA, make contact 5 of relay TDRA, make contact 11 of relay IP2A, make contact 6 of relay RA1, make contact 9 of relay MFS, break contact 7 of relay SG3, make contact 2 of relay STGO, break contact 5 of relay SG, to negative battery through the winding of relay SG(T). Relay SG(T) operates in FIG. 35 and locks over its own make contact 5, break contact 6 of relay SG3, and make contact 5 of relay TDRA to off-normal ground. At such time as relay SG1(T) of FIG. 42 operates, as will be explained, the previously-described locking circuit for relay SG(T) of FIG. 35 will be completed also over make contact 7 in FIG. 35 of relay SG1(T).

Figure 48:
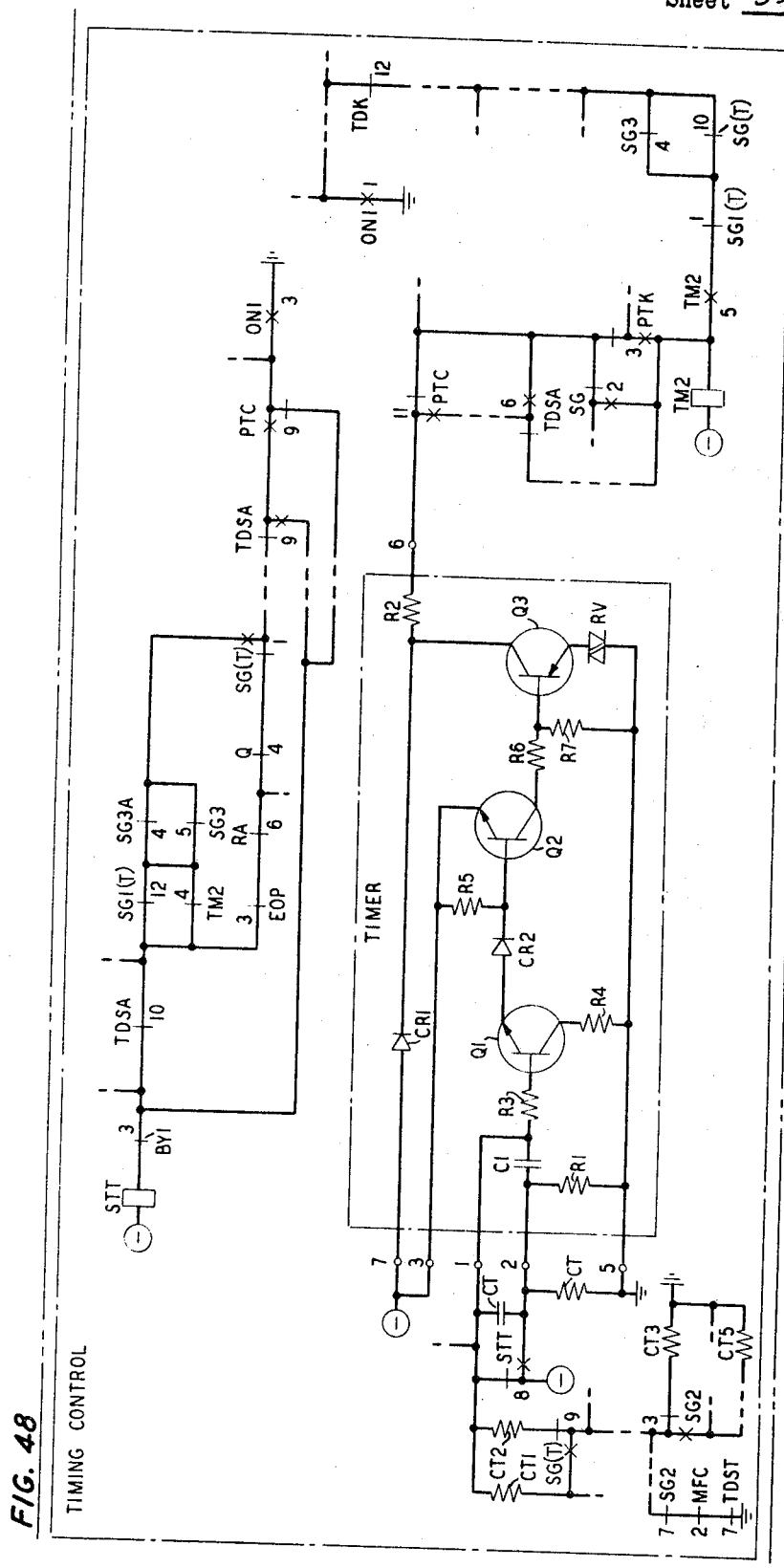

The operation in FIG. 35 of relay SG(T) starts circuit operations in the automatic test circuit for simulating a stop-go condition which would be met by the register-outpulser under service circumstances upon seizure of a trunk circuit. The operation in FIG. 35 of relay SG(T) completes a circuit in FIG. 48 for causing the operation of the start timing relay STT extending from ground in FIG. 48, over make contact 3 of relay ON1, make contact 9 of relay PTC, break contact 9 of relay TDSA, make contact 1 of relay SG(T), and thence over break contacts 4, 12, 10, and 3 of respective relays SG3A, SG1(T), TDSA, and BY1, to negative battery through the winding of relay STT, which thereupon operates. In FIG. 48 prior to the operation of relay STT, the timer circuit consisting of transistors Q1, Q2 and Q3 is in an unoperated condition with relay TM2 released. Normally transistors Q1, Q2, and Q3 are in their non-conducting conditions with the upper electrode of condenser CT and the right-hand electrode of condenser C1 charged to a potential of substantially negative battery. Upon the operation of relay STT, negative battery is applied over make contact 8 thereof to the lower electrode of condenser CT and to the left-hand electrode of condenser C1, thereby momentarily driving the upper and right-hand electrodes of these respective condensers to substantially minus twice the battery potential. The charge on these condensers CT and C1 immediately starts to discharge through resistance CT1, over make contact 9 of relay SG(T), to ground over break contacts 7, 2 and 7 of respective relays SG2, MFC and TDST. When condensers CT and C1 have become sufficiently discharged to allow the base of transistor Q1 (supplied through resistance R3) to reduce its potential sufficiently, transistor Q1 will fire, to in turn cause conduction in transistor Q2, which in turn will cause transistor Q3 to go into conducting saturation. The saturated condition in transistor Q3 will in turn cause the operation in FIG. 48 of relay TM2 in a circuit extending from negative battery, through the winding of relay TM2, break contact 6 of relay TDSA, and make contact 11 of relay PTC, to the collector circuit of transistor Q3 through resistance R2, relay TM2 locking in a circuit extending over its own make contact 5, break contact 1 of relay SG1(T), thence over break contact 4 of relay SG3, and break contact 12 of relay TDK, to ground over make contact 1 of relay ON1. Upon the operation in FIG. 48 of relay TM2, a circuit is completed in FIG. 42 for operating relay SG1(T) extending from ground in FIG. 42, over make contact 3 of relay ON, make contact 3 of relay STGO, make contact 6 of relay TM2, make contact 12 of relay SG(T), break contact 2 of relay SG3, break contact 10 of relay SG2, to negative battery through the lower primary winding of relay SG1(T), which thereupon operates and locks over its own make contact 10 independently of the contacts of relays STGO, TM2 and SG(T). In the upper right-hand part of FIG. 42, it will be noted that upon the operation of relay SG1(T), a circuit is completed over make contact 6 thereof to hold operated relay A. In FIG. 48, the operation of relay SG1(T) with relay TM2 operated causes the release of relay STT, the release of which will in turn shut off the timer. Upon the operation of relay SG1(T) in FIG. 42, relay TM2 of FIG. 48 is de-energized, thereby allowing this relay to release. The release in FIG. 48 of relay TM2 causes the operation in FIG. 42 of relay SG2 in a circuit extending from ground in FIG. 42, over a make contact 4 or relay ON, make contact 4 of relay SG1(T), break contact 11 of relay TM2, break contact 3 of relay SG3, to negative battery through the upper primary winding of relay SG2, which operates and locks over its make contact 1 independently of the contacts of relay TM2 and SG1(T). The operation of relay SG2 in FIG. 42 changes the timing of the timer in FIG. 48 by virtue of its break contact 7 and transfer contacts 3, supplies over its make contact 5 in FIG. 42 an additional holding circuit for relay A, and completes a circuit in FIG. 42 for causing the operation of relay RV(T), the latter circuit extending from ground in FIG. 42, through the upper secondary winding of relay RV(T), over make contact 8 of relay SG2, make contact 11 of relay SLF2, thence over the fundamental ring and tip circuit into FIG. 7, back over the FT lead from FIG. 7, over make contacts 12 and 6 of relays SLF2 and SG2 in FIG. 42, to negative battery through the lower primary winding of relay RV(T). It will be noted that the operation of relay RV(T) in FIG. 42 over the fundamental tip and ring loop in FIG. 7 of the register-outpulser reverses the battery and ground condition on the tip and ring circuit. This, as will be explained below, causes the operation in FIG. 7 of the register-outpulser relay RV as an indication of a "stop" condition on simulated trunk seizure. In the meantime, in FIG. 48 upon the release of relay TM2 therein, relay STT is reoperated, to in turn cause the reoperation of the timer consisting of transistors Q1 through Q3, to in turn cause the reoperation of relay TM2 in FIG. 48 after an additional timing interval. The operation of relay TM2 in FIG. 48 completes a circuit in FIG. 42 for causing the operation of relay SG3 extending from ground in FIG. 42, over make contact 12 of relay TM2, make contact 12 of relay SG2, to negative battery through the winding of relay SG3, which thereupon locks over its own make contact 1 to ground over make contact 2 of relay ON and completes an obvious circuit in FIG. 42 over its make contact 8 for causing the operation of relay SG3A, which in turn locks over its own make contact 12 to off normal ground. Upon the operation in FIG. 42 of relays SG3 and SG3A, relay SG2 of FIG. 42 is released and relay SG1(T) of FIG. 42 is released, along with relays TM2 and STT of FIG. 48. The release in FIG. 42 of relays SG1(T) and SG2 removes the shunt around the upper two windings of relay A, thereby placing relay A in FIG. 42 under control of the fundamental tip and ring loop back to the register-outpulser, again under control of back contacts 6 and 8 of relay SG2 in FIG. 42. This places the battery and ground situation as originally existing on the fundamental tip and ring loop, thereby causing the release in FIG. 7 of the reverse relay RV. Also in FIG. 35, upon the operation of relay SG3 and the release of relay SG1(T), relay SG(T) of FIG. 35 becomes released.

The operation in FIG. 7 of the reverse relay RV, and its subsequent release incident to the stop-go timing operation simulated by the automatic test circuit, as has been described above, causes the register-outpulser to go through its usual stop-go timing interval as will be explained presently. Upon the operation in FIG. 7 of relay RV, a circuit is completed in FIG. 9 for causing the operation of relay SG extending from ground in FIG. 9, over make contact 19 of relay ON2, break contact 10 of relay RCA, contact 1 of relay RV, make contact 10 of relay STGO, break contact 2 of relay SG1, to negative battery through the upper primary winding of relay SG. Relay SG operates, locks over its own make contact 2 independently of make contact 1 of relay RV, and completes an obvious circuit through its secondary windings to provide itself with a slow-releasing characteristic. In FIG. 12, upon trunk seizure is caused by the use of the third exit digit of 8 (relays RR1 and RR7 of FIG. 22 operated), upon the operation of relay SG of FIG. 9, the pulse generator of FIG. 12 is locked operated in a circuit extending from ground in FIG. 12 over make contact 11 of relay ON2, break contact 4 of relay RR10, make contact 6 of relay SG, and make contact 11 of relay PG1, to the left-hand side of the winding of relay PG1. When the second reversal of battery and ground on the fundamental tip and ring loop from the automatic test circuit takes place, relay RV of FIG. 7 will be released to cause the operation of relay SG1 in FIG. 9 in a circuit extending from ground in FIG. 9, over make contact 19 of relay ON2, break contact 10 of relay RCA, break contact 3 of relay RV, make contact 8 of relay SG, to negative battery through the winding of SG1, which locks over its own make contact 4 to off-normal ground. The operation of relay SG1 in FIG. 9 de-energizes the upper winding of relay SG, thereby allowing relay SG to release after an interval of time determined by its slow-releasing characteristic. Upon the ultimate release of relay SG in FIG. 9, the pulse generator of FIG. 12 is unlocked, thereby allowing relays PG1 and PG2 to go through a pulsing cycle whereby the KP pulse registered in the D digit register of FIG. 22 may be utilized for sending the KP pulse on a multifrequency basis over the simulated trunk circuit. As previously described with reference to FIG. 12, it will be recalled that the pulse generator relay PG1 is also locked under control of break contact 5 of relay SG1 (of FIG. 9) and make contact 4 of relay TMF (of FIG. 22), upon the registration in the readout relays of FIG. 22 of the KP pulse (relays RR2 and RR10) until such time as relay SG1 of FIG. 9 is operated at the end of the stop-go timing interval.

When relay PG1 of FIG. 12 releases, after being unlocked at the end of the stop-go timing interval after trunk seizure, circuits are completed in FIG. 7 for causing the transmission over the fundamental tip and ring loop to FIG. 42 of the automatic test circuit of the two frequencies 1100 cycles and 1700 cycles representing the signals 2 and 10 of the so-called KP pulse. This circuit extends from the multifrequency tone supply in FIG. 7, over output conductor 10, through make contact 1 of relay RR10, break contact 4 of relay RR1, break contact 4 of relay RR0, to break contact 8 of relay PG1 and from the multifrequency tone supply, over output conductor 2, through make contact 3 of relay RR2, break contact 3 of relay RR1, to break contact 7 of relay PG1. Break contacts 7 and 8 of relay PG1 extend through make contacts 3 and 2 of relay TMF to the righthand side of transformer T. Upon the release of relay PG1, these two frequencies combined in a single multifrequency pulse will be transferred by induction into the left-hand secondary windings of transformer T in FIG. 7 and thence over the fundamental tip and ring loop (conductors FT and FR) into the automatic test circuit of FIG. 42. On the release of relay PG1 of FIG. 12, relay W of FIG. 13 is operated in a circuit extending from ground in FIG. 13, over make contact 16 of relay ON2, break contact 8 of relay RCA1, break contact 6 of relay IC, break contact 10 of relay PG1, make contact 8 of relay TMFA and over break contact 6 of relay Z to cause the operation of relay W. Relay W, in operating, completes a circuit for causing the operation in FIG. 12 of relay TMF1 extending from ground in FIG. 46, over the break contact of the MFKP key, conductor MFKP into FIG. 12, thence over make contact 6 of relay RT3, make contact 1 of relay TMFA, make contact 7 of relay W, to negative battery through the winding of relay TMF1, which thereupon locks over its own make contact 2, conductor L into FIG. 17, and thence to ground over break contact 8 of relay RCY and make contact 7 of relay ON1. Upon the operation of relay W of FIG. 13, a circuit is completed for causing the operation of the out-steering relay OS4 in the called digit out-steering circuitry of FIG. 21 extending from ground in FIG. 20, over make contact 4 of relay ON1, make contact 4 of relay W, break contacts 9 and 8 of relays RCA and RCS, thence over break contacts 11 of relays ARS, BRS, and CRS, thence over make contact 11 of relay DRS, through a circuit (not shown) indicating that there is no E or F arbitrary exit digit, thence over conductor AS3 into FIG. 21, thence through a circuit (not shown) indicating that the A digit registered in the A-digit register of FIG. 15 is neither a zero nor a one, thence over make contact 8 of relay DL3 (operated to indicate that the first 3 digits A, B and C of FIG. 15 should be deleted), thence over break contact 6 of relay OS4, to negative battery through the winding of relay OS4. Relay OS4 locks over its own make contact 6 and to off-normal ground through the previously described chain of back contacts 5 of the remaining relays of the out-steering chain of FIG. 21. Relay DRS of FIG. 20 remains locked operated over its own make contact 8, break contacts 6 of relays ERS and FRS, conductor AS4 extending into FIG. 21, over break contacts 5 of relays OS1, OS2 and OS3, thence over make contact 5 of relay OS4, conductor AS5 extending into FIG. 20, and thence to the operating ground supplied over break contact 8 of relay RCS. At such time as relay W of FIG. 13 is released, relay DRS of FIG. 20 will also be released. Upon the next reoperation of relay PG1 of FIG. 12, relay W of FIG. 13 is released to in turn cause the release of relay DRS of FIG. 20. The release of relay DRS of FIG. 20 causes the release of relays RR2 and RR10 of FIG. 22, which in turn causes the release of relay RK in FIG. 13. With relay OS4 operated, upon the release of relay DRS of FIG. 20 circuits are completed between FIGS. 22 and 25 for causing the operation of read-out relays RR4 and RR7 in accordance with the digit registered in the D-digit registers of FIG. 25 (the digit zero of the last four numericals 0, 1, 2, 3 of the called number). The operation of read-out relays RR4 and RR7 in FIG. 22 causes the reoperation in FIG. 13 of relay RK, which in turn allows the pulse generator of FIG. 12 to continue oscillating in order to transmit this digit on a multifrequency basis over the simulated outgoing trunk. In the meantime, upon the release in FIG. 13 of relay W, a circuit is completed in FIG. 12 for causing the operation of relay TMF2 extending from ground at transfer contacts 7 of relay W, over break contact 7 of relay W, make contact 1 of relay TMF1, to negative battery through the winding of relay TMF2, which thereupon operates and locks over its own make contact 2 to off-normal ground on conductor L from FIG. 17. The operation of relay TMF2 closes its make contact 1 in the pulse generator circuit of FIG. 12, thereby short-circuiting resistances PG12 and PG14 to change the timing operation of relays PG1 and PG2 incident to the subsequent transmission of the four numericals (0, 1, 2, 3) of the called number on a multifrequency basis. Upon the next release of PG1 of FIG. 12, the digit of 0 registered in the operated read-out relays RR4 and RR7 of FIG. 22 is transmitted in FIG. 7 over break contacts 7 and 8 of relay PG1 as a single pulse of the two frequencies 1300 cycles and 1500 cycles under control of the contact network of the read-out relays RR0 through RR10 of FIG. 22. In this manner, the register outpulser continues to send on a multifrequency basis the KP pulse followed by the four numericals 0, 1, 2, 3 as a succession of multifrequency pulses to the automatic test circuit. The operation of the automatic test circuit in checking the accuracy of this multifrequency transmission will be described below.

Figure 49:
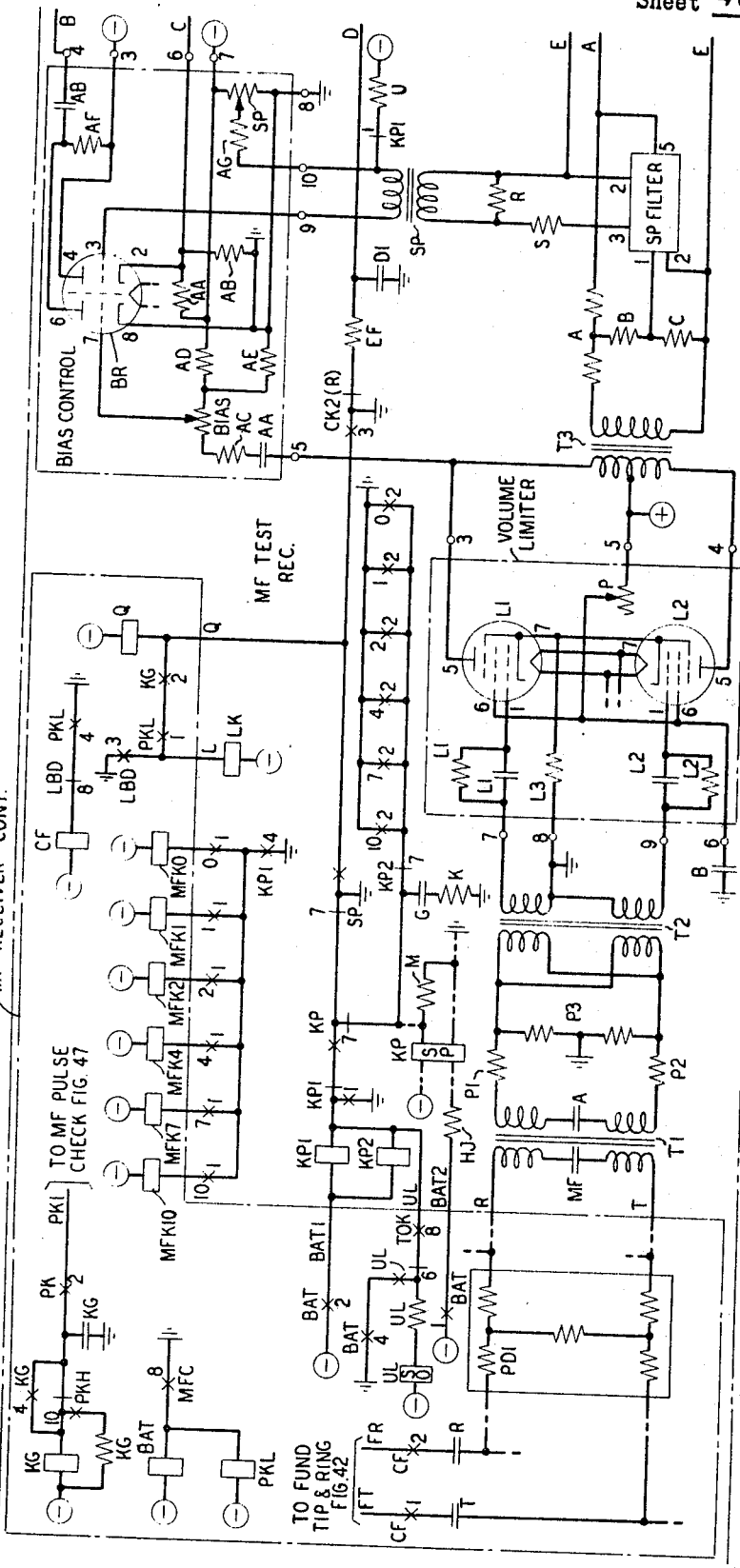

When relay SG2 in FIG. 42 of the automatic test circuit operated, as above described, at the end of the stop-go timing upon simulated trunk seizure, a circuit was completed in FIG. 47 for causing the operation of relay MFC of the multifrequency pulse checking circuit, this circuit extending from ground in FIG. 47, over make contact 11 of relay SG2 and make contact 4 of relay MFS, to negative battery through the winding of relay MFC. Relay MFC later becomes locked operated under control of make contacts 9 and 10 of respective relays SG3A and SG3 of FIG. 42 when these latter relays become operated and locked as described above. The operated relay MFC of FIG. 47 supplies off-normal ground to FIGS. 47 and 49 and supplies ground to FIGS. 35 and 38 on leads PK2 to control the advance in FIGS. 35 and 36 of the in-pulse steering circuitry and to control the operation of the matching relay M of FIG. 38 with respect to matching multifrequency pulsing by the register-outpulser. The operation of relay MFC of FIG. 47 causes the operation in FIG. 49, in obvious circuits over its make contact 8, of relays BAT and PKL. Relay BAT, in operating, supplies battery to the multifrequency receiver of FIGS. 50 and 51 and supplies negative battery to the windings of relays TO and LBD of FIG. 47. Relay LBD of FIG. 47 is shunted down under control of its own back contact 4 and back contact 12 of relay UL. Relay TO of FIG. 47 is held in a released condition by current through its left-hand secondary winding under control of make contact 7 of relay MFC, break contacts of the released relays Q and MFK0 to MFK10 of FIG. 49, and make contact 10 of relay BAT. Upon the operation in FIG. 49 of relay PKL, relay CF of FIG. 49 is operated in an obvious circuit under control of make contact 4 of relay PKL and break contact 8 of relay LBD. The operation of relay CF of FIG. 49 closes its make contacts 1 and 2 in FIG. 49, thereby extending the fundamental tip and ring loop from the automatic test circuit of FIG. 42, over conductors FR and FT into FIG. 49, and thence through condensers R and T to the input of multifrequency receiver circuit. Also, relay PK of FIG. 47 operates in a circuit extending from ground in FIG. 47, over make contact 9 of relay MFC, make contacts 8 of relay PKL, break contact 8 of relay PKH, through the winding of relay PK, through diode PK, through resistances PK1 and PK2 to negative battery. Relay PK locks over its own make contact 1 to off-normal ground under control of make contact 9 of relay MFC. Upon the operation in FIG. 47 of relay PK, a circuit is completed in FIG. 49 for causing the operation of relay KG extending from ground in FIG. 47, over make contact 9 of relay MFC, conductor PK1 into FIG. 49, over make contact 2 of relay PK, break contact 10 of relay PKH, to negative battery through the winding of relay KG, which thereupon operates and locks over its own make contact 4. The operation of relay KG of FIG. 49 biases the windings of relay TO of FIG. 47 to provide for a short timing interval as will be explained below. Upon the operation of relay KG of FIG. 49, relay PKH of FIG. 47 operates in a circuit extending from ground in FIG. 47, over make contact 7 of relay MFC, make contact 6 of relay KG, to negative battery through the winding of relay PKH. Relay PKH, in operating, connects resistance KG in FIG. 49 in parallel with the winding of relay KG, thereby to provide relay KG with a fast-release characteristic. The above described relay operations in the circuitry of FIGS. 47 and 49 of the automatic test circuit have prepared the multifrequency pulse checking circuit of FIG. 47, the multifrequency receiver control of FIG. 49, and the multifrequency receiver itself shown partly in FIGS. 49, 50 and 51 for receiving, detecting and decoding multifrequency pulse transmissions from the register-outpulser as will be explained below.

After the stop-go timing interval, the register-outpulser of FIGS. 7 through 26 will have been set in a condition to transmit on a multifrequency basis the so-called KP pulse. In FIG. 20 the fourth exit digit steering relay DRS will be operated and locked. In FIG. 22 relays TMF and TMFA will have been operated, along with the read-out relays RR2 and RR10 in accordance with the content of the KP pulse signal. In FIG. 14, it will be assumed that relay PKC has been operated and locked, as previously described, indicating that all seven of the called digits 243-0123 are registered in the registers of FIG. 15. In FIG. 9, relay SG1 is operated and locked with relay SG released, indicating the end of the stop-go timing interval. The counting circuitry of FIG. 11 is immobilized by the opening of break contacts 10 and 11 of relay TMFA. In FIG. 13, relays W and Z are released awaiting further control by the subsequent release of relay PG1 of FIG. 12 with relay TMFA of FIG. 22 operated. Also, in FIG. 13 the read-out check relay RK is operated in accordance with the operation in FIG. 22 of the two read-out relays RR2 and RR10. With these circuit situations prevailing, the pulse generator relay PG1 of FIG. 12 is unlocked and it may thereupon release and reoperate in accordance with the changed timing interval on the PG2 relay due to the closing of make contacts 5 and 6 in FIG. 12 of relay TMFA. When relay PG1 of FIG. 12 eventually releases, the KP pulse (frequencies of 1100 and 1700 cycles) is transmitted from the register-outpulser of FIG. 7 over the fundamental tip and ring loop on conductors FT and FR into FIG. 42 of the automatic test circuit.

Also, as has been discussed previously, when relay PG1 of FIG. 12 releases to send the KP pulse, relay W of FIG. 13 is operated to cause the steering relay OS4 of FIG. 21 to become operated under control of the operated relay DL3 in FIG. 9 (indicating that the first three digits 243 of the called number 243-0123 are to be deleted). When relay PG1 of FIG. 12 again reoperates, relay W of FIG. 13 releases, to cause the release in FIG. 20 of the fourth exit digit steering relay DRS. When relay DRS of FIG. 20 releases, read-out relays RR2 and RR10 of FIG. 22 will release, to in turn cause the release in FIG. 13 of the read-out check relay RK. Read-out relays RR4 and RR7 of FIG. 22 immediately reoperate in accordance with the D digit of 0 registered in the D digit register of FIG. 25, thereby in turn causing the immediate reoperation of the read-out check relay RK in FIG. 13. The operation and subsequent release of relay W in FIG. 13 causes relays TMF1 and TMF2 of FIG. 12 to become operated and locked, thereby changing the timing of the PG1 and PG2 relays of FIG. 12 to readjust the timing of these relays for sending the remaining digits on a multifrequency basis. These remaining digits consist of the last four numericals 0123 of the called number followed by the ST pulse (consisting of frequencies 4 and 7 as an indication to the receiving equipment that the end of pulsing has been reached).

This process continues until the register-outpulser has transmitted the KP pulse followed by the four numericals 0123, the first three digits 243 of the called number having been deleted on outpulsing beyond. When relay W of FIG. 13 operates upon the release of relay PG1 of FIG. 12 when transmitting the last numerical 3, a circuit is completed in FIG. 21 for causing the operation of relay ST. This circuit extends from ground in FIG. 20, over make contact 4 of relay ON1, make contact 4 of relay W, break contacts 9 and 8 of respective relays RCA and RCS, thence over the chain of break contacts 11 of relays ARS through FRS, over conductor AS1 extending into FIG. 21, thence over the chain of break contacts 12 of steering relays OS1 through OS6, make contact 12 of steering relay OS7, make contact 2 of relay 7DG, make contacts 12 of respective relays TMFA and 7DG, make contacts 3 of relays W and TMFA, break contact 8 of relay ST, to negative battery through the winding of relay ST. Relay ST operates and locks over its own make contact 8, break contact 5 of relay ST1, to ground over make contact 18 of relay ON2. When relay PG1 of FIG. 12 reoperates at the end of transmission of the digit 3 on a multifrequency basis, relay W of FIG. 13 reoperates, to in turn cause the release in FIG. 21 of the out-steering relay OS7. This causes the release in FIG. 22 of the read-out relays RR1 and RR2, which in turn cause the release in FIG. 13 of the read-out check relay RK. Read-out relays RR7 and RR10 in FIG. 22 immediately operate in circuits extending from ground in FIG. 25, over make contacts 7 and 10 of relay ST, thence over break contacts of all of the steering relays OS7 through OS1, conductors OP7 and OP10, cable OP into FIG. 22, conductors OP7 and OP10, thence over break contacts of the remaining steering relays FRS through ARS, conductors RR7 and RR10, to battery through the windings of relays RR7 and RR10. The operation of these two read-out relays RR7 and RR10 of FIG. 22 causes the operation in FIG. 13 of the check relay RK. The next release of relay PG1 of FIG. 12 transmits this ST pulse consisting of frequencies 1500 and 1700 cycles per second. Upon the release, above described, of relay OS7 in FIG. 21, relay ST1 of FIG. 21 operates in a circuit extending from ground at transfer contacts 12 of relay OS7 in FIG. 21, thence over make contact 3 of relay ST, through break contact 4 of relay ST1, to negative battery through the winding of relay ST1. Relay ST1 operates and locks over its own make contact 4 to off-normal ground, relay ST remaining locked under control of make contact 5 of relay ST1 until such time as relay W of FIG. 13 releases. Eventually, relay ST of FIG. 21 will release with relay ST1 of FIG. 21 operated after the transmission of the ST pulse, whereupon circuits are completed between FIG. 21 in the register-outpulser and FIG. 34 of the automatic test circuit to cause the operation in FIG. 34 of the automatic test circuit release relay RL, which in turn will cause the release of the entire circuitry, as will be described in the next main section of this detail description.

With respect to the automatic test circuitry of FIGS. 27 through 51, at the end of the stop-go timing interval following simulated trunk seizure, relays SG3 and SG3A of FIG. 42 are operated and locked, with relay SG(T) of FIG. 35 and relays SG1(T) and SG2 of FIG. 42 released. In FIG. 42, relays A, AA, B and B1 are operated with respect to the closed fundamental tip and ring loop on conductors FT and FR extending between FIG. 7 and FIG. 42, relay RA is released and relay RA1 is operated.

The pulse generator of FIG. 46 is locked with relay PG1 operated so that no more dial pulse digits may be transmitted to the register-outpulser, assuming that all of the called digits 243–0123 have been sent to the register-outpulser. In regard to the latter, in FIG. 37 steering relays OS1 through OS11 will be released and relay EOP will be operated indicating the end of outpulsing; thus, the readout relays RR0 through RR7 of FIG. 45 will be released, as will be relay RK of FIG. 41. Also, in FIG. 41 the outpulse counting circuitry is stopped, with relays DK, P3 and Z operated. In FIG. 38, the counting of inpulse dialed digits ceases, with relays IP1 through IP5 released.

In FIGS. 35 and 36 the fourth arbitrary exit digit steering relay DRS is operated so that in FIG. 39 the memory relays MR2 and MR10 will be operated in accordance with the KP pulse, as determined by the setting of the DR switch of FIG. 44. Relay MFS in FIG. 47 is operated, thus placing the advance of the inpulse steering circuitry of FIGS. 35 and 36 under control of the MF pulse checking circuit in FIG. 47, this being adjusted in FIG. 35 by transfer contacts 5 of relay MFS. The operation of relay MFS in FIG. 47 also places the control of the matching relay M of FIG. 38 under control of the MF pulse checking circuitry of FIG. 47 by virtue of the transfer contacts 3 in FIG. 38 of relay MFS.

Relays MFC, PK and PKH of FIG. 47 are operated and relays KG, BAT, PKL and CF of FIG. 49 are operated. The operation of relay CF in FIG. 49 completes a circuit over its make contacts 1 and 2 in FIG. 49 for extending the fundamental tip and ring conductors FT and FR from FIG. 42 into FIG. 49 to the input transformer T1 of the multifrequency receiver circuit. The automatic test circuit is thereupon ready to receive, check and decode the multifrequency pulses consisting of KP–0123–ST as they will be transmitted from the register-outpulser. The automatic test circuit thereupon ascertains whether the register-outpulser properly finishes its job in accordance with the switching instructions provided thereto previously from the translator-decoder.

Relay TO in FIG. 47 is released due to current flowing in its left secondary winding from top to bottom, which current tends to cause relay TO to be released. Current in the right-hand primary winding of relay TO from top to bottom tends to cause relay TO to be operated; but, the current in its secondary winding keeps the relay released. A steady current in the secondary winding of relay TO keeps this relay released; a steady current in the primary winding tends to cause relay TO to operate. With relay KG of FIG. 49 operated, resistance TO3–6 in FIG. 47 is shunted, thereby to provide a specified current in the primary winding of relay TO. With relay KG of FIG. 49 released, resistance TO3–6 in FIG. 47 is placed in series with the primary winding of relay TO, thereby reducing the current in the primary winding. Neither of these currents in the primary winding of relay TO will cause it to operate if enough secondary winding current exists to hold relay TO released. Whenever the secondary winding of relay TO is deenergized, condenser TO1–3 in FIG. 47 begins to acquire a charge by drawing charging current through the secondary winding of relay TO. This charging current keeps relay TO released until the charging current has reduced to a point where current which may be existing in the primary winding can cause relay TO to operate. With relay KG of FIG. 49 operated, relay TO can operate faster than when relay KG of FIG. 49 is released, due to the larger primary current in the first instance.

In FIG. 49, with respect to relay KG, with relay PK of FIG. 47 operated, the winding of relay KG carries full current. With relay PKH of FIG. 47 also operated, some of the current is shunted through the KG resistance but enough current is left in the winding of relay KG to keep it operated. Whenever relay PK of FIG. 47 is released, condenser KG of FIG. 49 begins to acquire charging current through the winding of relay KG alone or in parallel with resistance KG. If the winding of relay KG carries the charging current all by itself, relay KG will release slower than when resistance KG is carrying part of the charging current. Thus, placing resistance KG in parallel with the winding of relay KG in FIG. 49 makes relay KG have a relatively fast-release characteristic.

Figure 50:
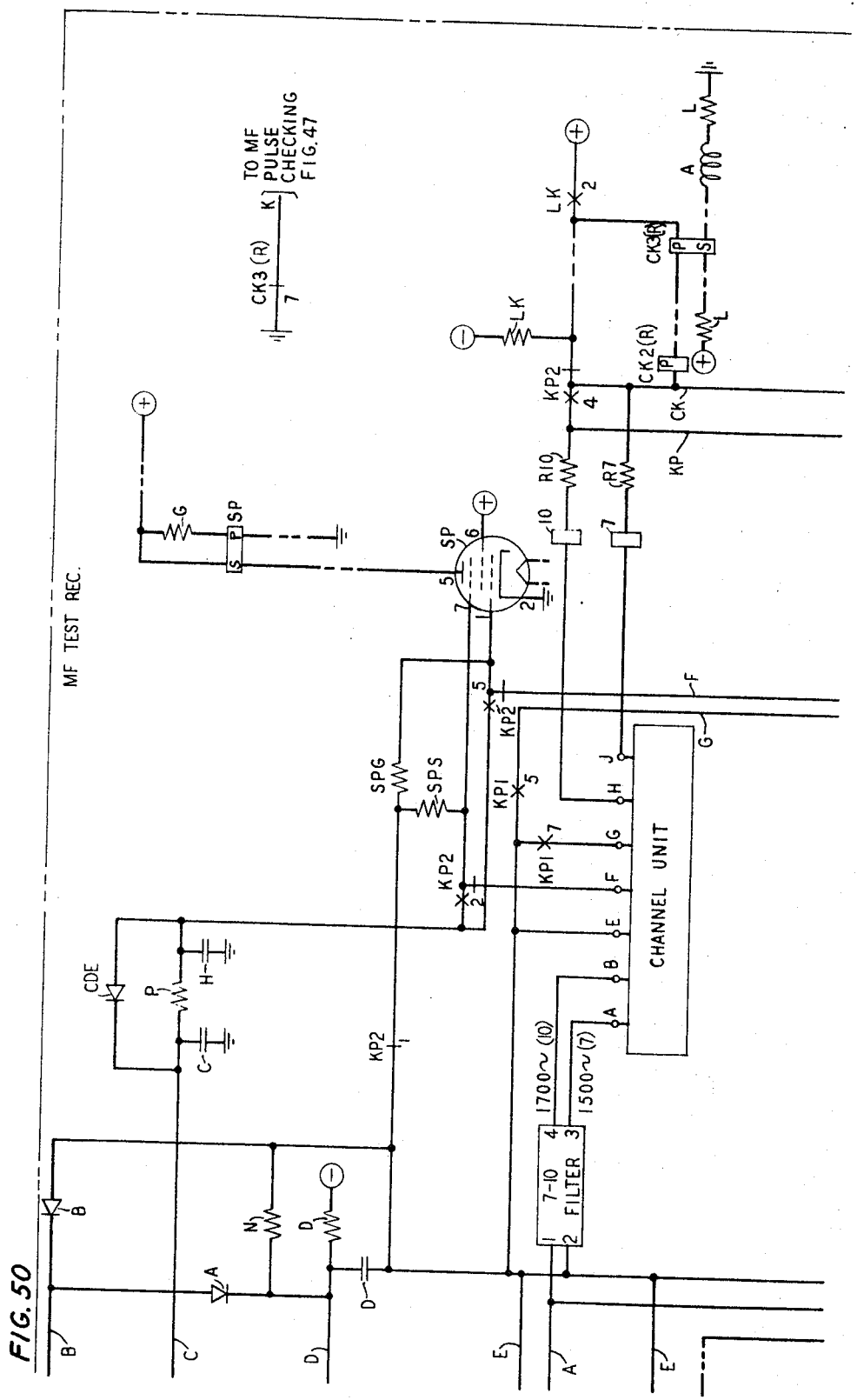
Figure 51:
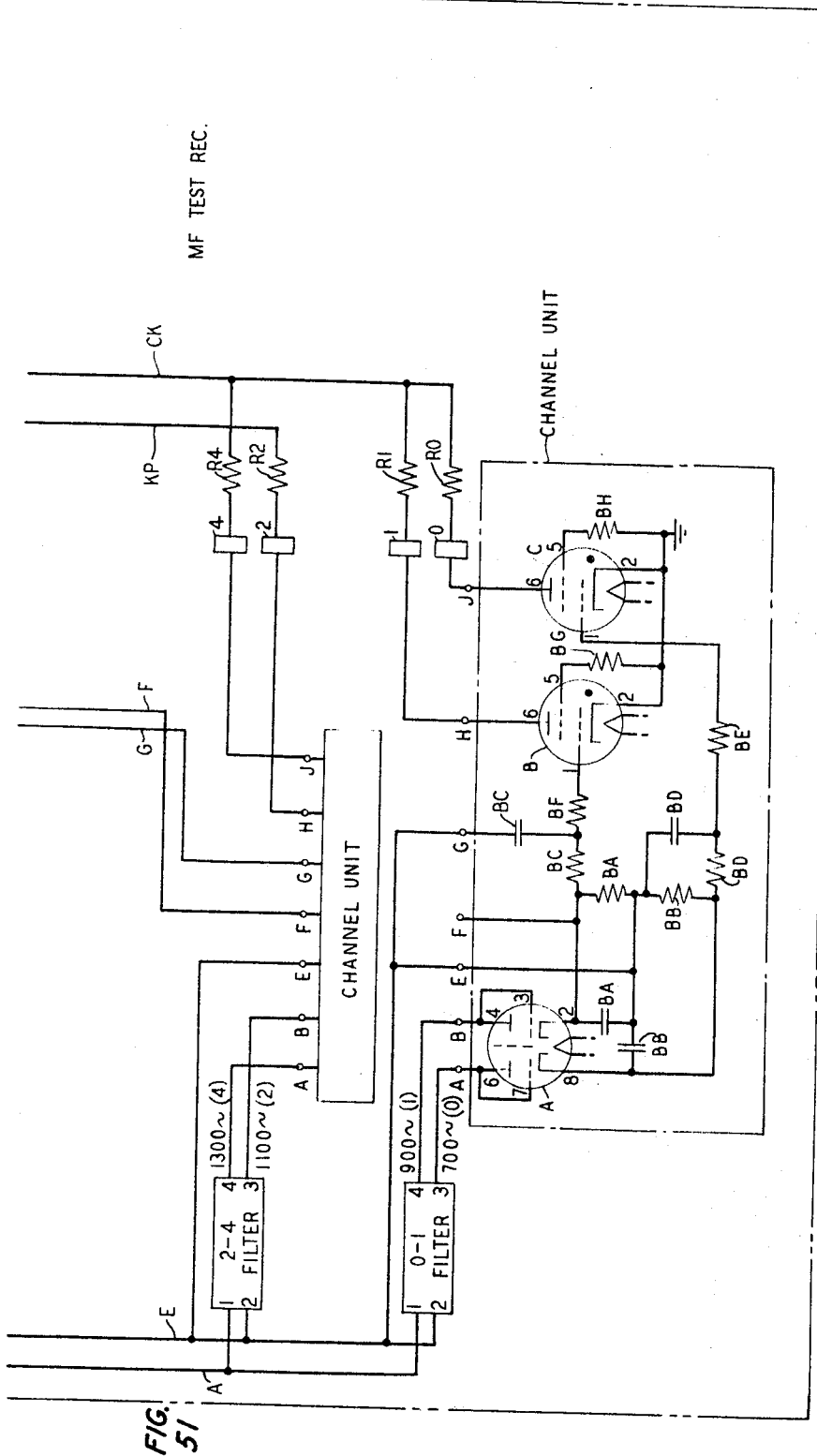

The multifrequency pulse receiving circuitry of FIGS. 49, 50 and 51 is essentially a circuit for translating signals consisting of various combinations of frequencies (sent two at a time as a pulse) into direct-current indications suitable for causing relay operations in the automatic test circuit. The multifrequency signals are alternating voltages across the fundamental tip and ring circuit (conductors FT and FR in FIG. 49) as received from the multifrequency tone supply in FIG. 7 of the register-outpulser. These signals are transmitted through the input elements of the receiving circuit in FIG. 49 through transformers T1 and T2. From the secondary of transformer T2 the signals are placed on the grids 1 of the electron tubes L1 and L2 in the volume limiter, which serves to provide adequate amplification for the operation of the desired frequency channels in the receiver but which also limits strong signals to such a value that they will not cause interfering signals in channels other than those for the two frequencies received.

The output of the volume limiter comprising tubes L1 and L2 in FIG. 49 supplies energy to three separate circuits. One output is over conductors A and E into FIGS. 50 and 51 to the input of the three filter circuits. Another output from the volume limiter of FIG. 49 is supplied to the input in FIG. 49 of the SP (signal present) filter. The third circuit receiving energy from the volume limiter in FIG. 49 is the bias control circuit in the upper right-hand corner of FIG. 49, the input of which is connected directly to the plate 5 of tube L1.

There are six channel circuits, one for each frequency. As has been mentioned previously in connection with multifrequency transmission from FIG. 7 of the register-outpulser, the respective frequencies of 700 cycles per second, 900, 1100, 1300, 1500 and 1700, represent the various signals of 0, 1, 2, 4, 7 and 10 in various combinations of two at a time to represent ten possible digital values from 0 to 9 and the so-called KP and ST pulse signals. Each channel circuit consists essentially of a filter, such as the ones shown in FIGS. 50 and 51, and one-half of an electron tube, such as tube A of FIG. 51, acting as a rectifier diode to rectify the alternating-current signal to a positive direct-current potential, a hot cathode thyratron tube such as tube B or C in FIG. 51, and a fast operating relay such as relays 0 through 10 of FIGS. 50 and 51, the winding of each of which is connected in the plate circuit of an associated thyratron tube. An alternating-current signal of sufficient amplitude from the filter, when rectified to overcome the negative potential from the bias producing circuit (as will be explained) on grid 1 of the associated thyratron tube, will cause that tube to fire, thereby operating the associated relay in its plate circuit.

Energy for operating the bias control circuit in the upper right hand part of FIG. 49 is taken directly from plate 5 of volume limiter tube L1. This circuit extends from there through capacitor AA, resistance AC, potentiometer BIAS, and thence to the junction point between resistors AD and AE which form a potential divider between negative battery and ground. The wiper of potentiometer BIAS connects to grid 7 of the electron tube BR which operates as an amplifier. The plate 6 of this BR tube is coupled to the diode voltage doubler circuitry consisting of capacitor AB in FIG. 49 and diodes A and B and capacitor D in FIG. 50. The grid 1 of each of the channel thyratrons, such as tubes B and C of FIG. 51, is connected to the common filter input conductor E in FIGS. 49, 50 and 51 through a resistor such as BA or BB in FIG. 51; and, this common filter input conductor E is in turn connected through resistor N in FIG. 50 to the fixed potentiometer formed by resistance D in FIG. 50 and resistance EF in FIG. 49 extending between negative battery and ground (see back contact 3 of relay CK2 in FIG. 49). The values of resistances D and EF are such that a potential of approximately negative 18 volts is normally supplied to this conductor E in FIGS. 50 and 51 when no incoming signal is present. If a signal is applied to the input terminals of the receiver, a small alternating voltage from plate 5 of the volume limiter L1 of FIG. 49 is connected to grid 7 of the tube BR in FIG. 49, is amplified therein, and passes to the voltage doubler circuit. The polarity of the diodes A and B in FIG. 50 is such that a negative potential is produced at the common filter terminal on conductor E, thereby adding to the negative 18 volt potential mentioned above. As the input signal is increased the value of negative bias on all thyratrons also increases, thus maintaining the margin of safety from operation of unwanted channel thyratrons.

The limiting action of the volume limiter of FIG. 49 is obtained by means of the control grid resistors and capacitors L1 and L2 which cause the grid bias to become more negative when the alternating current on the grids becomes large enough to cause them to draw grid current during the positive half cycles. When this condition is reached, the power output increases very slowly with further increases in the grid voltage. The actual point at which limiting occurs is controlled by the voltage on the screen grids 6 and on the cathodes 7, as well as by that on the control grids 1. The desired value for the screens is obtained from the variable potentiometer P. The potential in the cathodes is obtained from the voltage drop in resistance L3.

As previously described, the output of the volume limiting amplifier in FIG. 49 is connected to the common input terminals consisting of conductors A and E of the six channel filters which separate the signalling frequencies into channels 0 to 10 corresponding to the above-mentioned 6 frequency bands. Each one of the three filters shown in FIGS. 50 and 51 actually includes two filter circuits whereby an output will be produced on one or the other of the outputs 3 and 4 of these three filters depending upon which of the six frequencies involved is being detected. For instance, in FIG. 51 the 0–1 filter will provide an output of 700 cycles (signal 0) on its output terminal 3 to terminal A of the channel unit of FIG. 51 or an output of 900 cycles (signal 1) from its output 4 connected to terminal B of the channel unit. Likewise, in FIG. 51 1100 cycles will be supplied from output 3 of filter 2–4 into terminal B of its channel unit and an output of 1300 cycles (signal 4) will be supplied to terminal A of its channel unit. In FIG. 50 with respect to the 7–10 filter, 1500 cycles (signal 7) will be supplied to terminal A of its channel unit or 1700 cycles (signal 10) will be supplied to terminal B of its channel unit. The output of each channel filter, such as the 700 cycle output (signal 0) from filter 0–1 in FIG. 51 and connected to terminal A of the channel unit of the lower part of FIG. 51, is connected through one-half of an electron tube A operating as a diode rectifier, to a resistor BB shunted by a capacitor BB. Thus, a signal passing through the filter is rectified in the diode of tube A which is poled to produce a positive direct current potential, with accompanying voltage peaks which are bypassed by the capacitor BB. At the junction of the diode cathode 8 and the terminating resistor BB the potential resulting from the addition of the positive rectified signal and the negative potential in the bias producing circuit on conductor E is passed by either resistors BD and BE to thyratron C for the signal 0 frequency or through resistors BC and BF to grid 1 of thyratron B for the signal 1 frequency. A second set of bypass capacitors BC and BD is provided in the channel unit.

Prior to the reception of the so-called KP signal and the operation in FIG. 49 of relays KP1 and KP2, the junction points of the channel rectifier cathode and the channel terminating resistor BA (such as the lead connected to terminal F of the channel unit in FIG. 51 for signal frequencies 2 and 10), which means the conductor connected to terminal F of the channel unit associated with filter 2–4 in FIG. 51 and the conductor connected to terminal F of the channel unit of FIG. 50 associated with filter 7–10, are connected to the control grid 1 and suppressor grid 7 of the SP tube in FIG. 50 over back contacts 5 and 2 of relay KP2. Later, as will be described, the voltage resulting from the addition of the positive rectified KP frequencies and the negative voltage from the bias control circuit of FIG. 49 is applied both to the grids 1 of the respective channel thyratrons and to the control and suppressor grids 1 and 7 of the SP tube in FIG. 50. However, no action takes place in the thyratrons due to the condition of the plates because the resistances R2 in FIG. 51 and R10 in FIG. 50 are disconnected from positive plate voltage by virtue of the unoperated make contact 4 in FIG. 50 of relay KP2. However, certain operations take place in connection with the tube SP of FIG. 50 as will be explained hereinafter. The circuit of the bypass capacitor BC of FIG. 51, for instance, nearest the grid of the thyratron is open in the nonoperated condition of relay KP1 of FIG. 49 (see terminals G of the channel units of FIGS. 50 and 51 associated with signal frequencies 2 and 10 disconnected from the bias lead E by the open make contacts 5 and 7 of relay KP1 in FIG. 50). This thereby minimizes the time required for the release of relay SP in FIG. 50 as will be explained.

Each of the channel relays such as relays 0, 1, 2 and 4 of FIG. 51 and relays 7 and 10 of FIG. 50, with its winding connected in the plate circuit of the associated thyratron, such as the thyratrons B and C of FIG. 51, is of the fast-operating, fast-release type. In the digit reception condition, that is after reception and recognition of the KP signal as will be explained, operation of a channel relay connects ground in FIG. 49 to operate one of the relays MFK0 through MFK10 to register the reception of the particular frequency involved in the signal. As mentioned above, prior to the operation of relays KP1 and KP2 of FIG. 49, make contact 4 of relay KP2 in FIG. 50 opens the circuit between the windings of relays 2 and 10 of FIGS. 50 and 51 and the source of operating potential so that no operation of these two channel relays 2 and 10 can take place. Under this condition the other channel relay contacts are used as a third frequency guard in that this ground will be supplied in FIG. 49 over a make contact of one of these other relays and through break contact 7 of relay KP2 to discharge capacitor G and hold unoperated relay KP in FIG. 49. After reception of the KP signal, as will be described, the above conditions are removed and the operation of any channel relay will depend upon the firing of its associated thyratron.

With respect to the signal present circuit, the output of the volume limiter of FIG. 49 is connected as previously mentioned to three circuits. The input to the bias control circuit is connected to the plate of the tube L1; the secondary terminals of the output transformer T3 are connected to the common input terminals on conductors A and E to the six channel filters; and, the input terminals 1 and 2 of the SP filter in FIG. 49 are connected across resistance C in the pad element consisting of resistances A, B and C. The output of the SP filter is applied through transformer SP, the voltage output of which is applied to the grid terminal 3 of tube BR which functions as a rectifier. The output of this tube BR, a direct current potential taken from its cathode 2, is connected over conductor C into FIG. 50, and thence through resistance P to make contacts 2 and 5 of relay KP2 such that upon the operation of relay KP2 in FIG. 49, as will be explained, the output potential is supplied to the suppressor and control grids 7 and 1 of tube SP. Prior to and during the reception of the KP signal this tube BR is held nonconducting by a negative bias on its grid terminal 3 supplied from negative battery through a resistance U under control of break contact 1 of relay KP1.

In FIG. 50 capacitors C and H comprise a filter of which the H capacitor is selected to provide a signal recognition time of approximately 20 milliseconds. Diode CDE is so connected as to reduce the time constant of the P resistance-H capacitor combination at the end of a signal and thus reduce the shut-off time of tube SP, to in turn reduce the release time of the SP relay in FIG. 50. The cathode terminal 2 of tube BR is connected to resistances AA and AB forming a negative bias on grids 1 and 7 of tube SP at such time as relay KP2 in FIG. 49 becomes operated. This bias will be approximately minus 8 volts. The SP tube of FIG. 50 operates as a direct current amplifier having the secondary left-hand winding of relay SP in its plate circuit. As both of these tubes SP of FIG. 50 and BR of FIG. 49 operate on a threshold basis, the points at which relay SP of FIG. 50 will operate and release are less than about 1 decibel apart. Adjustment of the operating point by means of potentiometer SP of FIG. 49 allows the release of relay SP in FIG. 50 to take place when the input signal is reduced by approximately 1 decibel.

With the above brief outline of the nature of the operation of the multifrequency receiver circuitry of FIGS. 49, 50 and 51, a detailed description will now be provided below to show how this receiver detects the successive multifrequency signals as the register-outpulser of FIGS. 7 through 26 transmits the KP–0123–ST digits from FIG. 7 over the fundamental tip and ring loop (conductors FT and FR) extending into FIG. 42 and thence into FIG. 49 to the input of the volume limiter circuit of the multifrequency receiver.

A typical operation of the multifrequency receiver is as follows with respect to an assumed multifrequency pulse (digit of 1) containing the frequencies 700 cycles and 900 cycles (referred to as frequencies 0 and 1, respectively) at the volume limiter of FIG. 49. Frequency 0 is supplied to the output of transformer T3 in FIG. 49, thence through resistance A, over conductors A and E through FIG. 50 into FIG. 51, to the input of the 0–1 filter. The frequency 0 is provided at terminal A of the channel unit in FIG. 51, thereby causing conduction in the left-hand side of tube A, producing a rectified D-C potential on the junction of resistances BD and BB. In the meantime, in FIG. 49 frequency 0 is passed through the SP filter and transformer SP and applied to grid 3 of the tube BR (assuming that relays KP1 and KP2 of FIG. 49 have been operated under digital reception conditions), thereby producing at cathode 2 of tube BR a negative potential. This negative potential is applied over conductor C into FIG. 50, thence through resistance P, and over make contacts 2 and 5 of relay KP2 (after operated as will be explained later) to the control grid 1 and suppressor grid 7 of the SP tube, thereby causing the SP tube to conduct heavily and to operate relay SP in FIG. 50 on its left-hand secondary winding. The operation of relay SP in FIG. 50 indicates a "signal present" condition. Also, in the meantime, frequency 0 is transmitted from plate 5 of the limiter tube L1 in FIG. 49, through condenser AA, resistance AC, and the BIAS potentiometer to control grid 7 of the left-hand side of tube BR. The left-hand side of tube BR thereupon conducts current and transmits a signal to the voltage doubler circuit connected to its plate 6 to produce in FIG. 50 on conductor E a negative voltage which is added to the fixed negative bias already existing on conductor E, as previously described. The potential condition on conductor E is transmitted from FIG. 50 into FIG. 51 and thence to the junction of resistors BA and BB. The sum of the potentials on both sides of resistance BB in FIG. 51 is translated through resistances BD and BE to the control grid 1 of thyratron C. Thyratron C will thereupon fire and will cause the operation of relay 0 in its plate circuit, provided that operating potential is connected to conductor CK in FIG. 51 from the source thereof in FIG. 50, as will be explained. In a smiliar maner, the frequency 1 will cause conduction in the right-hand side of tube A in FIG. 51 and will cause thyratron B to fire, thereby to cause the operation of relay 1 in FIG. 51 under similar circumstances.

Before the multifrequency receiver circuitry can properly receive and detect digital multifrequency pulse transmission (such as the last four numericals 0123 of the called number and the final ST pulse), it is necessary for the multifrequency receiver circuitry to receive and respond to the so-called KP pulse consisting of a combination of frequencies 2 and 10. This KP pulse will be transmitted from the register-outpulser for a duration of approximately 100 milliseconds. Frequency 2 will be applied in FIG. 51 to terminal B of the channel unit associated with the 2–4 filter and frequency 10 will be applied to terminal B of the channel unit in FIG. 50 associated with the 7–10 filter. In these respective channel units these frequencies will be rectified in the right-hand sides of the respective tubes A in these channel units to produce direct-current potentials at the junctions of resistances BA and BC in these channel units. From the channel unit in FIG. 51, this direct-current potential is applied over terminal F, conductor F into FIG. 50, and thence over break contact 5 of relay KP2 to the control grid 1 of the tube SP; and, in FIG. 50, a similar direct-current potential is applied from terminal F of the channel unit, over break contact 2 of relay KP2 to the suppressor grid 7 of tube SP. Tube SP in FIG. 50 thereupon conducts heavily to cause the operation of relay SP in FIG. 50 due to the current flowing in its left-hand secondary winding. In the meantime, the multifrequency pulse consisting of frequencies 2 and 10 is applied to the signal present circuit from the output of the SP filter in FIG. 49 through transformer SP, and is impressed upon grid 3 of tube BR; however, the right-hand side of tube BR cannot respond to this signal because of the high negative bias on grid 3 thereof controlled by resistance U and back contact 1 of relay KP1 in FIG. 49. Also, the output from cathode 2 of tube BR in FIG. 49, extending over conductor C into FIG. 50 and through resistance P, is cut off from the suppressor and control grids 7 and 1 of tube SP by virtue of the open-make contacts 2 and 5 of relay KP2. Also in the meantime, the multifrequency pulse is transmitted from plate 5 of the L1 limiter tube in FIG. 49, through condenser AA, resistance AC, potentiometer BIAS, to the control grid 7 on the left-hand side of the BR tube. This causes the left-hand side of tube BR to conduct, thereby supplying current over its plate 6, through condenser AB and over conductor B into the voltage-doubler circuit in FIG. 50, where an additional negative bias is supplied to conductor E superimposed on the fixed negative bias supplied thereto as previously described. This voltage condition on conductor E is applied in FIGS. 50 and 51 to terminals E of the channel units associated with the 7–10 filter and the 2–4 filter and to the junction of the resistances BA and BB in these channel units. The sum of the D-C voltage conditions across resistances BA in these two channel units is thereupon impressed upon the control grid 1 of the corresponding channel unit B thyratrons, which normally would fire, but which cannot fire under the present circumstances because it will be noted that terminal H of the channel unit in FIG. 51 extending through the winding of relay 2 and resistance R2 over the conductor KP into FIG. 50 is, along with the resistance R10 connected through relay 10 to terminal H of the channel unit in FIG. 50, disconnected from the source of plate voltage by the open-make contact 4 of relay KP2. Therefore, neither of relays 2 in FIG. 51 and 10 in FIG. 50 operates under these circumstances.

The operation in FIG. 50 of the relay SP causes a number of relay operations to take place to prepare the multifrequency receiver and its control circuits of FIGS. 47 through 51 to be responsive to subsequent digital transmissions and also control the inpulse steering circuitry in FIGS. 35 and 36 of the automatic test circuit for checking these digital transmissions. In FIG. 49, upon the operation of relay SP of FIG. 50, a circuit is completed for causing the operation of relays LK and Q, this circuit extending from ground in FIG. 49, over make contact of relay SP, conductor Q, to negative battery through the winding of relay Q, which thereupon operates and extends over make contact 2 of relay KG, make contact 1 of relay PKL, and conductor L to negative battery through the winding of relay LK, which also operates. At the same time in FIG. 49 the opening of break contact 7 of relay SP removes ground from the right-hand side of the upper winding of relay KP, thereupon allowing relay KP to become operated after an interval of about 80 milliseconds upon the charging of condenser G in FIG. 49, as has been described previously. The operation in FIG. 49 of relay LK completes circuits in FIGS. 50 and 51 for supplying plate voltage to the thyratrons connected to the windings of relays 0, 1 and 4 in FIG. 51 and relay 7 of FIG. 50, this circuit extending from the positive source of direct-current voltage in FIG. 50, through make contact 2 of relay LK, over break contact 4 of relay KP2, to conductor CK in FIGS. 50 and 51, which in turn is connected to resistances R7 in FIG. 50 and R4, R1 and R0 in FIG. 51. This positive plate voltage in FIG. 50 also extends from the left-hand side of the make contact 2 of relay LK, through the upper primary winding of relay CK3(R) in series with the winding of relay CK2(R), to the same CK conductor for a purpose to be described later. Relays CK3(R) and CK2(R) in FIG. 50 do not operate because of the shunt across their windings over break contact 4 of relay KP2. If any one of the four channels 0, 1, 4 and 7 causes the operation of the corresponding channel relay in FIGS. 50 and 51, this will cause ground in FIG. 49 to be extended over make contact 2 thereof, and through break contact 7 of relay KP2, to ground the right-hand side of the upper winding of relay KP and the top electrode of relay G, thereby keeping relay KP in a released condition. However, as will be assumed, if none of these other channel relays 0, 1, 4 and 7 operates in FIGS. 50 and 51, as should be the case under proper signal conditions, relay KP of FIG. 49 will be allowed to operate after its slow-operate interval of time.

The operation in FIG. 49 of relay Q closes a locking circuit in FIG. 47 for relay PKH over make contact 2 of relay PKH and make contact 1 of relay Q. Also in FIG. 47, the opening of break contact 7 of relay Q removes ground from the junction of resistances T07 and T01, thereby allowing capacitor T01-3 in FIG. 47 to begin to acquire a charge through the left-hand secondary winding of relay T0. As previously described, relay T0 of FIG. 47 will thereupon operate after a slow-operate interval of time of approximately 44 milliseconds. Upon the operation in FIG. 47 of relay T0, relay T0K of FIG. 47 operates in a circuit extending from ground in FIG. 50, over break contact 7 of relay CK3(R), conductor K into FIG. 47, thence over make contact 10 of relay MFC, make contact 7 of relay T0, make contact 4 of relay PKH, to negative battery through the winding of relay T0K. Relay T0K, in operating, locks over its own make contact 2 to ground over make contact 1 of relay MFC. In the inpulse steering circuitry of FIGS. 35 and 36, upon the operation of relay T0K of FIG. 47, a circuit is completed for causing the operation of the fourth insteering relay IS4 of FIG. 36, this circuit extending from ground in FIG. 35, over make contact 6 of relay T0K, break contact 10 of relay UL, make contact 5 of relay MFS, break contacts 11 of relays ARS, BRS and CRS, make contact 11 of relay DRS, break contacts 9 of relays SER and SFR, thence over break contacts 2 of relays DL1 and DL2, conductor ISE into FIG. 36, thence over make contact 2 of relay DL3 (operated as previously described to call for the deletion of the first three digits 243 of the called number 243–0123), thence over break contact 5 of relay IS4, to negative battery through the winding thereof. Relay IS4 operates and locks over its own make contact 5 and thence over the chain of break contacts 6 of relays IS5 through IS11, break contact 8 of relay STF, break contact 6 of relay IPC, break contact 6 of relay TDT2, make contact 11 of relay B1, to ground over make contact 20 of relay ON. Relay DRS of FIG. 35 remains operated in a circuit extending from the right-hand side of its winding, over its own make contact 5, the chain of break contacts 6 of relays ERS, FRS, IS1, IS2 and IS3, conductor ISB into FIG. 36, thence over make contact 6 of relay IS4, conductor ISC into FIG. 35, and over make contact 5 of relay MFS to the operating ground previously described. Eventually relay KP in FIG. 49 operates and no further action takes place until the end of the multifrequency KP pulse.

At the end of the KP pulse, tube SP of FIG. 50 will shut off, thereby releasing relay SP of FIG. 50, to in turn finish the preparation of the circuits for receiving digital MF pulsing. Upon the release in FIG. 50 of relay SP, relays Q and LK in FIG. 50 release. The release of relay Q causes the release in FIG. 47 of relay T0 by again grounding the junction between resistors T01 and T07 to cause steady current flow in the left-hand secondary winding of relay T0. In FIG. 49, upon the release of relay SP of FIG. 50, with relay KP operated, a circuit is completed for causing the operation of relays KP1 and KP2 extending from ground in FIG. 49, over break contact 7 of relay SP, make contact 7 of relay KP, break contact 1 of relay KP1, in parallel through the windings of relays KP1 and KP2, and thence to negative battery over make contact 2 of relay BAT. Relays KP1 and KP2 operate in this circuit and lock to ground on the right-hand sides of their windings under control of make contact 1 of relay KP1. Upon the operation in FIG. 49 of relay KP1, the slow-operate relay UL of FIG. 49 is energized in a circuit extending from ground on the right-hand sides of the windings of relay KP1 and KP2, through make contact 8 of relay T0K, break contact 6 of relay UL, resistance UL, and to negative battery through the winding of relay UL. The slow-operate characteristic of relay UL delays the operation of this relay sufficiently long to allow relay T0 of FIG. 47 to release to prevent the operation of relay LBD in FIG. 47. Eventually relay UL of FIG. 49 operates and in doing so locks over its own make contact 6 to ground over make contact 4 of relay BAT. In FIG. 35, the opening of break contact 10 of relay UL when this relay operates, causes the release in FIG. 35 of steering relay DRS, the release of which in turn causes the release in FIG. 39 of relays MR2 and MR7 (operated in accordance with the KP pulse in the DR digit position). Relays MR4 and MR7 in FIG. 39 immediately become operated under control of make contacts of insteering relay IS4 of FIG. 36 in accordance with the setting of the D called digit switch D in FIG. 39 (the 0 of the four numericals 0123 in the called number 243–0123). In addition, in FIG. 35 the operation of relay UL places the control of the advance of the inpulse steering circuitry of FIGS. 35 and 36 under control of relays PK of FIG. 47 and KG of FIG. 49.

The previously-described circuit operations prepare the multifrequency circuits in FIGS. 47 through 51 of the automatic test circuit for the reception of the rest of the digital MF pulsing comprising the digits 0123–ST as will be transmitted on a multifrequency basis from the register-outpulser. The bypass condensers BC in the channel units of FIGS. 50 and 51 associated with the 7–10 and 2–4 filters (see condenser BC in the channel unit associated with filter 0–1 in FIG. 51) are connected to the conductor E in FIGS. 50 and 51, terminal G of the channel unit in FIG. 51 extending over conductor G into FIG. 50, and thence over make contact 5 of relay KP1 to conductor E, terminal G of the channel unit in FIG. 50 being likewise connected to conductor E over make contact 7 of relay KP1. In FIG. 49, the operation of relay KP1 extends grounds over its make contact 4 to make contacts 1 of all of the channel relays 0 through 10 to prepare FIG. 49 for causing the operation of pairs of the relays MFK0 through MFK10 upon the reception of MF digital pulses. In FIG. 50, the control grid 1 and the suppressor grid 7 of the SP tube are connected over respective make contacts 5 and 2 of relay KP2 to the output of the filter at the right-hand end of resistance P, which in turn is controlled over conductor C by the cathode 2 of tube BR in FIG. 49. In FIG. 51, the right-hand side of resistance R2 is extended over conductor KP into FIG. 50 to join up with the right-hand side of resistance R10, thereby to extend over make contact 4 of relay KP2, through the windings of relays CK2(R) and CK3(R), to make contact 2 of relay LK, thereby allowing the operation of relay LK of FIG. 49 to apply plate potential to all six of the channel relays and their corresponding thyratrons. The previous shunt existing around the windings of relays CK2(R) and CK3(R) in FIG. 50 is removed by the opening of break contact 4 of relay KP2 in FIG. 50. Also in FIG. 49, the opening of break contact 7 of relay KP2 removes make contacts 2 of the six channel relays from connection with the upper electrode of condenser G, thereby precluding the operation of any of these channel relays from subsequently canceling the proper operation of relay KP in FIG. 49 under the reception conditions of MF digital transmission. Lastly, in FIG. 49 the opening of break contact 1 of relay KP1 removes from the control grid 3 of the right-hand side of tube BR the high negative bias supplied through resistance U.

When the two-frequency pulse representing the first digit of 0 is received, it traverses the various circuit elements of the multifrequency receiver of FIGS. 49, 50 and 51, as above described, and becomes a control voltage at the grids 1 of the corresponding thyratron tubes B and C of the corresponding channel units of FIGS. 50 and 51. This voltage, as previously described, is the addition of three voltages: (1) a positive rectified signal is produced from the channel filter and rectifier tube A combination and appears on the cathode 2 or 8 of tube A in the corresponding channel unit; (2) a fixed negative bias is applied to conductor E in FIGS. 49, 50 and 51, as previously described, and appears on terminals E of the respective channel units; and, (3) a negative potential is produced on conductor E controlled by the incoming signal amplitude. In the digit reception condition the "signal present" channel is made effective from the cathode 2 of tube BR in FIG. 49, over conductor C into FIG. 50, and thence through resistance P to the control and suppressor grids 1 and 7 of the signal present tube SP. The rectified signal applied over conductor C to the control and suppressor grids 1 and 7 of the SP tube causes conduction in this tube to cause the operation in FIG. 50 of the signal present relay SP.

With relay KG of FIG. 49 operated, with relays PK and PKH of FIG. 47 operated, and with relay T0 of FIG. 47 released, when the multifrequency digit signal arrives, relay SP of FIG. 50 is caused to operate. Relay SP, in operating, completes a circuit in FIG. 49 for causing the operation of relays Q and LK, this circuit extending from ground in FIG. 49, over make contact 7 of relay SP, thence to negative battery through the winding of relay Q, and over make contacts 2 and 1 of respective relays KG and PKL to negative battery through the winding of relay LK. Relay Q, in operating, closes a locking circuit in FIG. 47 over its make contact 1 to hold operated relay PKH; and, at its break contact 7 in FIG. 47, the operation of relay Q opens the secondary winding of relay T0, thereby to start the timing operation with respect to relay T0. Relay T0 will not operate if the circuits are operating properly within the slow-operate time of T0, as will be mentioned below. The operation of relay LK in FIG. 49 completes circuits in FIGS. 50 and 51 for causing the operation of relay CK2(R) in series with the two channel relays 4 of FIG. 51 and 7 of FIG. 50 in accordance with the digit 0 represented by frequencies 4 and 7. Thyratrons C in the channel units of FIGS. 50 and 51 cause the operation of relays 7 and 4 through their respective resistances R7 and R4, thence through the windings of relays CK2(R) and CK3(R), to positive plate potential through make contact 2 of relay LK. Relays 4 of FIG. 51 and 7 of FIG. 50 operate in this circuit in series with relay CK2(R), which also operates. Relay CK2(R) operates if at least two of the channel relays operate in series therewith; whereas, if more than two of the channel relays operate in this circuit, relay CK3(R) will also operate to indicate a trouble condition. It will be assumed that relay CK2(R) operates and relay CK3(R) does not operate. In FIG. 49, upon the operation of relay CK2(R), ground is removed by the opening of break contact 3 of relay CK2(R) from the left-hand side of resistance EF, thereby changing the fixed bias on conductor E in FIGS. 50 and 51 from approximately −18 volts to approximately −48 volts, thereby to prevent the operation of any other channel thyratrons due to transients. Also in FIG. 49, ground extends over make contact 3 of relay CK2 to hold operated relays Q and LK in FIG. 49.

In the meantime, upon the operation in FIGS. 50 and 51 of the channel relays 7 and 4, circuits are completed in FIG. 49 for causing the operation of the multifrequency check relays MFK4 and MFK7 in circuits extending from ground, over make contact 4 of relay KP1, and thence over make contacts 1 of relays 4 and 7 to battery through the windings of these two check relays, which thereupon operate. Upon the operation of the check relays MFK4 and MFK7 of FIG. 49, a check circuit is completed in FIG. 47 for causing the release in FIG. 47 of relay PK by applying ground to the junction of resistors PK1 and PK2 to cause relay PK to release by shunting it down. This circuit extends in FIG. 47 from ground, over make contact 1 of relay MFC, thence over make contacts 5 of relays MFK4 and MFK7 (operated in FIG. 49 in accordance with the received multifrequency digit of 0), thence over make contacts 7 of relays MR4 and MR7 (operated in FIG. 39 in accordance with the setting of the D digit switch), thence over break contact 6 of relay MR10, break contacts 1 of relays MR0, MR1 and MR2, thence over make contacts 1 of relays MR4 and MR7, break contact 4 of relay MFK10, break contact 10 of relay MFK0, break contacts 7 of relays MFK1 and MFK2, thence over make contact 6 of relay MFK4, make contact 7 of relay MFK7, and break contact 3 of relay STF to the junction point of resistances PK1 and PK2. Relay PK is thereby released by having its winding shunted by this ground condition. The release of relay PK in FIG. 47 completes a circuit for operating the matching relay M in FIG. 38, this circuit extending from ground in FIG. 47 over make contact 9 of relay MFC, break contact 5 of relay PK, conductor PK2 extending into FIG. 38, thence over make contacts 6 and 3 of relays Q and MFS, thence over a contact network (not shown) through one of the operated steering relays of FIGS. 35 and 36, thence to negative battery through the winding of relay M. Relay M, in operating, prevents an indication being given of a mismatch failure.

Upon the release in FIG. 47 of relay PK, relay KG of FIG. 49 is released. The release of relay KG changes the timing of the T0 relay of FIG. 47, causes the operation in FIG. 36 of the next steering relay IS5, and causes the release in FIG. 49 of relay LK. In FIG. 47, the release of relay KG places resistance T03-6 in series with the primary winding of the T0 relay, thereby to cause relay T0 to have a longer timing interval (longer than a digit signal of approximately 50 milliseconds but shorter than the so-called KP pulse of 100 milliseconds). Although relay LK of FIG. 49 is released upon the release of relay KG in FIG. 49, relay Q in FIG. 49 remains operated until such time as relay SP of FIG. 50 is released. The circuit for operating the steering relay IS5 of FIG. 36 extends from ground in FIG. 47, over make contact 9 of relay MFC, break contact 5 of relay PK, conductor PK2 extending into FIG. 35, thence over break contact 7 of relay KG, make contact 10 of relay UL, make contact 5 of relay MFS, thence through the chain of break contacts 11 of relays ARS through IS2, thence over conductor ISA into FIG. 36, over break contact 11 of relay IS3, make contact 11 of relay IS4, break contact 11 of relay 4DG, break contact 5 of relay IS5, to negative battery through the winding of relay IS5. Relay IS5 operates and locks over its own make contact 5, thence through the chain of back contacts of the succeeding steering relays to off-normal ground, as above described. Relay IS4 remains locked over its own make contact 5, make contact 6 of relay IS5, and thence over conductor ISC into FIG. 35 to ground on the circuit above described for causing the operation of relay IS5.

Upon the release in FIG. 49 of relay LK, relay CK2(R) of FIG. 50, as well as the channel relays 4 and 7 of FIGS. 51 and 50 and the checking relays MFK4 and MFK7 of FIG. 49, are released.

Eventually the multifrequency signal will cease, whereupon relay SP of FIG. 50 will release, thereby in turn causing the release in FIG. 49 of relay Q. If the multifrequency signal is of the correct pulse length, relay Q of FIG. 49 will be released and the check relays MFK4 and MFK7 of FIG. 49 will be released before relay T0 of FIG. 47 can operate. The release of relay Q of FIG. 49 causes the release in FIG. 38 of the matching relay M and the release in FIG. 47 of relay PKH. Upon the release of the checking relays of FIG. 49 and the release of relay PKH in FIG. 47, relay PK of FIG. 47 is reoperated in a circuit extending from ground in FIG. 47, over make contact 9 of relay MFC, make contact 8 of relay PKL, break contact 8 of relay PKH, through the winding of relay PK, and thence through diode PK and resistance PK1, to resistance battery supplied at the upper end of resistance PK2. Relay PK operates and locks over its own make contact 1 to ground under control of make contact 9 of relay MFC. The operation of relay PK in FIG. 47 causes the release in FIG. 36 of the previously operated steering relay IS4, the release of which causes the release in FIG. 39 of the memory relays MR4 and MR7. Since steering relay IS5 of FIG. 36 now remains operated alone, memory relays MR0 and MR1 are immediately reoperated in FIG. 39 in accordance with the setting of the switch E in FIG. 39 corresponding to the digit of 0. As described above, in FIG. 47, relay KG in FIG. 49 reoperates, to in turn cause the reoperation in FIG. 47 of relay PKH.

The above-described circuit details incident to the reception and checking of the first multifrequency digit pulse of 0 leave the circuitry the same as it was prior to this multifrequency pulse. However, the circuits have been arranged now to receive and check the next digit of 1 of the four called numericals 0123 of the called number 243–0123. The next three digits 123 are received and checked in the same manner and it is considered unnecessary to repeat the details of these operations.

During the reception and checking of the last numerical digit 3, the circuits will be arranged for checking the so-called ST pulse (frequencies 7 and 10) which is transmitted as an indication that multifrequency pulsing is completed. When the multifrequency pulse representing digit 3 (frequencies 1 and 2) is received, relay SP of FIG. 50 will reoperate, to in turn cause the reoperation in FIG. 49 of relays Q and LK, as above described. Also, it will be apparent that relay CK2(R) of FIG. 50 operates in series with the two channel relays 1 and 2 of FIG. 51, the operation of which in turn causes checking relays MFK1 and MFK2 of FIG. 49 to be operated. This in turn causes the release in FIG. 47 of relay PK, the operation of the matching relay M in FIG. 38, and the release in FIG. 49 of relay KG. Upon the release of relay KG, a circuit is completed for causing the operation in FIG. 36 of the relay STF, this circuit extending from ground on conductor ISA in FIG. 36, through back contacts 11 of relays IS3 through IS6, make contact 11 of relay IS7, make contact 10 of relay 7DG, thence over make contact 2 of relay MFS, and break contact 5 of relay STF, to negative battery through the winding of relay STF, which thereupon operates and locks over its own make contact 5 and break contact 6 of relay IPC to off-normal ground. The release in FIG. 49 of relay KG causes the release of relay LK, which in turn causes the release in FIGS. 50 and 51 of relay CK2(R), the channel relays 1 and 2 of FIG. 49, and the checking relays MFK1 and MFK2 of FIG. 49. When the multifrequency signal ceases, relay SP of FIG. 50 will release, to in turn cause the release in FIG. 49 of relay Q. Relay Q, in releasing, causes the release of the memory relay M of FIG. 38 and the release in FIG. 47 of relay PKH, which in turn will cause the reoperation in FIG. 47 of relay PK. Relay PK, in operating, releases relay IS7 in FIG. 36, which in turn causes the release in FIG. 39 of the memory relays MR1 and MR2. Also, upon the operation in FIG. 47 of relay PK, relay KG of FIG. 49 reoperates, to in turn cause the reoperation in FIG. 47 of relay PKH. Upon the release in FIG. 36 of relay IS7, memory relays MR7 and MR10 of FIG. 39 operates in accordance with the frequencies 7 and 10 in the so-called ST pulse, this circuit extending from ground in FIG. 39, over make contacts 7 and 9 of relay STF, thence over the chain of back contacts of the steering relays IS11 through ARS, thereby to cause the operation of memory relays MR7 and MR10 in FIG. 39 to prepare the checking circuits for checking the ST pulse. The operation of relay STF of FIG. 36, at its transfer contacts 3 in FIG. 47, removes relay PK from the pulse checking circuitry and arranges the circuitry of relay STK in FIG. 47 so that relay STK will check for a proper ST pulse, as will be described below.

When the ST pulse (frequencies 7 and 10) arrives, the signal present relay SP of FIG. 50 reoperates, to in turn reoperate relays Q and LK in FIG. 49. Relay LK, in operating, causes the operation of relay CK2(R) in FIG. 50 in series with the two channel relays 7 and 10 of FIG. 50. When these two channel relays 7 and 10 operate, check relays MFK7 and MFK10 of FIG. 49 are also operated, to in turn complete the checking circuit for operating relay STK of FIG. 47. The circuit for operating relay STK in FIG. 47 extends from ground in FIG. 47, over make contact 1 of relay MFC, make contact 4 of relay STF, make contact 6 of relay MR10, break contact 2 of relay MR1, break contact 3 of relay MR2, break contact 1 of relay MR4, make contact 1 of relay MR7, thence over make contact 4 of relay MFK10, break contact 11 of relay MFK0, break contacts 8 of relays MFK1 and MFK2, break contact 6 of relay MFK4, make contact 7 of relay MFK7, thence over make contact 3 of relay STF, make contact 12 of relay MFK10, and over break contact 6 of relay STK to negative battery through the winding of relay STK. Relay STK operates and locks over its own make contact 6 to off-normal ground under control of make contact 1 of relay MFC. Upon the operation in FIG. 47 of relay STK, relay PK is shunted down by ground extending over make contact 4 of relay STK and break contact 2 of relay IPC to the junction of resistances PK1 and PK2. Again, upon the release in FIG. 47 of relay PK, the matching relay M of FIG. 38 reoperates, this time locking from the right-hand side of its winding, through resistance MH to ground over make contact 8 of relay STK. Relay PK of FIG. 47, in releasing, also releases relay KG in FIG. 49, which in turn causes the release in FIG. 49 of relay LK, the release of which, as above described, causes the release in FIG. 50 of relays CK2(R) and of the channel relays 7 and 10. The release of the channel relays 7 and 10 of FIG. 50 causes the release in FIG. 49 of the checking relays MFK7 and MFK10. Relay Q of FIG. 49 remains operated until such time as relay SP of FIG. 50 releases, indicating that the signal is no longer present. In the meantime, upon the release in FIG. 49 of relay KG, a circuit is completed in FIG. 36 for causing the operation of the inpulsing-complete relay IPC, this circuit extending from ground on conductor ISA in FIG. 36, through the chain of back contacts 11 of steering relays IS3 through IS11, thence over make contact 11 of relay STF, and break contact 5 of relay IPC to negative battery through the winding of relay IPC. Relay IPC operates and locks over its own make contact 5 to off-normal ground, and in operating completes a circuit in FIG. 42 through its own make contact 4 and make contact 9 of relay M to hold operated relay A.

When the multifrequency ST pulse ceases, relay SP of FIG. 50 will release, to in turn cause the releast in FIG. 49 of relay Q, to in turn cause the release in FIG. 47 of relay PKH. The release of relay PKH allows relay PK in FIG. 47 to reoperate, to in turn cause the release in FIG. 36 of relay STF. Again, upon the operation of relay PK in FIG. 47, relay KG of FIG. 49 reoperates to in turn cause the reoperation in FIG. 47 of relay PKH.

With the operation in FIG. 47 of relays MFS, PKH and STK, the operation in FIG. 38 of relay M, the operation in FIG. 36 of relay IPC, and with relay UL of FIG. 49 operated, circuits are completed for initiating the release of the test connection in view of the fact that all of the outpulsing functions of the register-outpulser have been properly checked by the automatic test circuit. The description of this release operation is the subject matter of the next and last main section of this detailed description.

*Release of register-outpulser*

As previously described with respect to FIG. 21 of the register-outpulser, upon the operation of relay ST1 in FIG. 21 and the subsequent release of relay ST following the transmission of all multifrequency data to the automatic test circuit, a circuit is completed for causing the operation in FIG. 34 of the automatic test circuit of the release relay RL as an indication to the automatic test circuit that the register-outpulser has finished its switching functions. This circuit extends from ground in FIG. 21, over make contact 17 of relay ON2, break contact 12 of relay ST, front contact 2 of relay ST1, make contact 4 of relay TDR, make contact 20 of relay RT2, conductor RL1 extending into FIG. 34, thence over make contact 12 of relay RT, break contact 6 of relay RL, to negative battery through the winding of relay RL, which thereupon operates and locks over its own make contact 6 to ground over the parallel circuits consisting of break contact 6 of relay CT and make contact 8 of relay ON1. Upon the operation in FIG. 34 of relay RL, relay TP(T) in FIG. 43 is held operated by ground on conductor TC extending thereto from the register-outpulser circuit of FIG. 8 under control of make contact 1 of relay RT1 and break contact 2 of relay RL. Relay ON of FIG. 8 is also held operated under control of break contact 2 of relay RL of FIG. 21.

Upon completion of all of the checking functions in the automatic test circuit, as above described with relays MFS, PKH, and STK operated in FIG. 47, with relay M operated in FIG. 38, with relay IPC operated in FIG. 36, and with relay UL operated in FIG. 49, circuits are completed for causing the operation in FIG. 21 of the register-outpulser release relay RL. This circuit extends from ground in FIG. 34, over make contact 5 of relay RL, make contact 11 of relay TB(T), thence over make contacts 10 of relays STG0 and SG3A, thence over make contact 2 of relay TDR, make contact 2 of relay UL, make contacts 6, 11 and 10 of respective relays PKH, STK, and MFS, thence over make contacts 9 and 10 of respective relays IPC and M, thence over conductor RL into FIG. 21, and over make contact 1 of relay RT3 to negative battery through the winding of relay RL. Relay RL, in operating, completes a circuit in shunt of its left-hand winding to provide itself with a slow-releasing characteristic. Upon the operation of the register-outpulser release relay RL of FIG. 21, the off-normal relay ON of FIG. 8 is released and relay TP(T) of FIG. 43 is released. Upon the release of the off-normal relay ON of FIG. 8, off-normal relay ON1 of FIG. 8 releases, to in turn release relay ON2 of FIG. 8.

Upon the release in FIG. 43 of relay TP(T), relay TB(T) in FIG. 43 is also released, thereby opening the operating circuit for the register-outpulser release relay RL of FIG. 21 to permit this relay to release after an interval of time determined by its slow-release characteristic. Eventually relay RL of FIG. 21 will release, to in turn cause the release in FIG. 8 of relays L2 and MB. Upon the release in FIG. 8 of relay MB, a circuit is completed for causing the reoperation in FIG. 43 of relay RP and the reoperation in FIG. 34 of relay RI. Relay RP of FIG. 43 is operated in a circuit extending from ground in FIG. 8, over break contact 7 of relay MB, conductor RPA extending into FIG. 31, thence over the closed crosspoint, over make contact 11 of relay XP0, make contact 3 of relay CK1, conductor RP into FIG. 43, thence over make contact 9 of relay RL, make contact 3 of relay DP, break contact 8 of relay CT, to negative battery through the winding of the slow-release relay RP. Relay RI of FIG. 34 is reoperated in a circuit extending from ground in FIG. 8, over break contact 5 of relay MB, make contact 5 of relay RT1, conductor RA into FIG. 34, thence through break contacts 7 and 11 of respective relays BY and CT, to negative battery through the primary winding of relay RI. Relay RI, in operating, completes a locking circuit for itself in FIG. 34 over its own make contact 5 to ground over break contact 3 of relay TB(T) and make contact 8 of relay RT, and short-circuits its own secondary winding thereby to provide itself with a slow-releasing characteristic.

With the operation in FIG. 34 of relays RL and RI, the operation in FIG. 31 of relay DP, and the reoperation in FIG. 43 of relay RP, a circuit is completed for causing the operation of the completion-of-test relay CT in FIG. 34. This circuit extends from ground in FIG. 34, over make contacts 1, 10, 1 and 1 of respective relays DP, RP, RI and RL to negative battery through the upper primary winding of relay CT. Relay CT, in operating, locks over its own make contact 1 to ground under control of the parallel make contacts 5, 10, 3 and 12 of respective relays RT, B, RI and RP, and short-circuits its own secondary winding to provide itself with a slow-releasing characteristic. The operation of relay CT in FIG. 34 causes the release in FIG. 43 of relay ON, the release of which causes the release of relay ON1, to in turn release relay ON2. In FIG. 34, upon the release of relay ON2 of FIG. 43, and assuming that the start key ST has previously been released, relay ST of FIG. 34 will release, thereby to complete a circuit for operating the return-to-normal relay RN in FIG. 34, assuming that the RN key has been operated. This circuit extends from ground in FIG. 34, over break contact 2 of the ST key, break contact 7 of relay SI, make contact 2 of the RN key, to negative battery through the winding of relay RN. Relay RN, in operating, causes the operation in FIG. 34 over an obvious circuit of relay RN1 and completes a circuit for causing the operation in FIG. 43 of the end-of-test relay ET, the latter circuit extending from ground in FIG. 34, over over make contact 6 of relay RN, conductor ET extending into FIG. 43, and thence to negative battery through the winding of relay ET, which thereupon operates. The operation of relay ET in FIG. 43 causes the release in FIG. 42 of the hold magnet(s) HM, the release of which in turn causes the crosspoints in FIG. 31 to release. Upon release of the crosspoint connection in FIG. 31, relay RT1 of FIG. 8 is released to in turn cause the release in FIG. 43 of relay RT, the release of which causes the release in FIG. 8 of relays RT2 and RT3. Also, by this time all of the locking circuits for relay CT of FIG. 34 will have been opened thereby allowing relay CT to release after an interval of time determined by its slow-releasing characteristic.

With the release in FIG. 43 of relays ON, ON1, and ON2, the operation in FIG. 34 of relays RN and RN1, the operation in FIG. 43 of relay ET, the operation and subsequent release in FIG. 34 of relay CT, and the release in FIG. 8 of relays RT1, RT2, and RT3, the entire automatic test circuit of FIGS. 27 through 51 is returned to normal with the exception that relays RN and RN1 of FIG. 34 remain operated as does relay ET of FIG. 43.

With the release in FIG. 8 of the off-normal relays ON, ON1, and ON2, the operation and subsequent release in FIG. 21 of the release relay RL, with the disconnection from the automatic test circuit of the control leads by the release in FIG. 8 of relays RT1, RT2, and RT3, and with the opening of the crosspoint connections in FIG. 31, the entire register-outpulser circuitry of FIGS. 7 through 26 is returned to normal.

When the return-to-normal key RN in FIG. 34 is released, relay RN in FIG. 34 releases to in turn cause the release in FIG. 43 of relay ET, the release of which in turn causes relay RN1 of FIG. 34 to release, thereby returning the automatic test circuit completely to normal.

It is to be understood that the above described arrangement is illustrative of the application of the principles of the invention. Numerous other arrangements may be devised by those skilled in the art without departing from the spirit and scope of the invention.

What is claimed is:

1. A testing circuit for testing register-senders in a switching system wherein a register-sender is arranged when seized to register address data transmitted thereto and is automatically effective incident to address data registration (1) to derive a set of switching data from at least a portion of said address data, (2) to register said derived set of switching data, and (3) upon registration of a complete set of switching data to perform switching control functions in accordance with said registered switching data, said testing circuit comprising:
  (A) means settable to establish test address data and a correct set of switching data pertinent thereto;
  (B) means for seizing a register-sender for test purposes and for transmitting thereto said test address data;
  (C) and, means controlled by said seizing means and by said settable means for preventing said register-sender from performing said switching control functions unless said registered complete set of switching data corresponds to said correct set thereof.

2. The invention defined in claim 1 wherein said preventing means comprises:
  (A) means controlled by said seizing means for precluding said register-sender from performing said switching control functions upon registration of said complete set of switching data;
  (B) and, means controlled by said settable means for causing said register-sender to perform said switching control functions only provided said registered complete set of switching data corresponds to said correct set thereof.

3. The invention defined in claim 2 wherein said causing means comprises:
  (A) means controlled by said settable means upon registration of said complete set of switching data in said register-sender for comparing said registered complete set with said correct set;
  (B) and, means controlled by said comparing means for allowing said register-sender to perform said switching control functions only provided said compared sets of switching data correspond.

4. The invention defined in claim 3 wherein:
  (A) said register-sender includes a plurality of primary conductors selectively energized by the switching data registering means of said register-sender according to said registered complete set of switching data;
  (B) and, said comparing means comprises
    (1) a plurality of secondary conductors selectively energized by said settable means according to said established correct set of switching data,
    (2) and circuit means for ascertaining whether or not the energized primary conductors match the energized secondary conductors.

5. The invention defined in claim 4 wherein said circuit means comprises:
  (A) a check circuit connected to said secondary conductors and connectable to said primary conductors;
  (B) said check circuit controlled jointly by said primary and secondary conductors when connected thereto for checking whether or not energized primary conductors match energized secondary conductors;
  (C) and, means controlled upon registration of said complete set of switching data in said register-sender for connecting said check circuit to said primary conductors.

6. The invention defined in claim 5 wherein:
  (A) said settable means comprises switch means manually settable to establish said correct set of switching data;
  (B) said check circuit comprises
    (1) check registers selectively controlled according to said energized primary conductors,
    (2) contacts controlled by said check registers,
    (3) and contacts controlled by said switch means;
  (C) and, said allowing means is controlled by the contacts of said check registers and of said switch means.

7. A testing circuit for testing register-senders in a switching system wherein a register-sender is arranged when seized to register address data transmitted thereto and is automatically effective incident to address data registration (1) to connect with a translator, (2) to supply the connected translator with at least a portion of said address data, (3) to receive from the connected translator and to register a set of switching data translated from said address data, (4) to regularly release from the connected translator upon registration of a complete set of switching data, and (5) upon release from the connected translator to perform switching control functions in accordance with said registered switching data, said testing circuit comprising:
  (A) means settable to establish test address data and a correct set of switching data pertinent thereto;
  (B) means for seizing a register-sender for test purposes and for transmitting thereto said test address data;
  (C) and, means controlled by said seizing means and by said settable means for preventing the regular release of said register-sender from the connected translator unless said registered complete set of switching data corresponds to said correct set thereof.

8. The invention defined in claim 7 wherein said preventing means comprises:
  (A) means controlled by said seizing means for precluding the regular release of said register-sender from the connected translator upon registration of said complete set of switching data;
  (B) and, means controlled by said settable means for causing the release of said register-sender from the connected translator only provided said registered complete set of switching data corresponds to said correct set thereof.

9. The invention defined in claim 8 wherein said causing means comprises:
   (A) means controlled by said settable means upon registration of said complete set of switching data in said register-sender for comparing said registered complete set with said correct set;
   (B) and, means controlled by said comparing means for releasing said register-sender from the connected translator only provided said compared sets of switching data correspond.

10. The invention defined in claim 9 wherein:
    (A) said register-sender includes a plurality of primary conductors selectively energized by the switching data registering means of said register-sender according to said registered complete set of switching data;
    (B) and, said comparing means comprises
        (1) a plurality of secondary conductors selectively energized by said settable means according to said established correct set of switching data,
        (2) and circuit means for ascertaining whether or not the energized primary conductors match the energized secondary conductors.

11. The invention defined in claim 10 wherein said circuit means comprises:
    (A) a check circuit connected to said secondary conductors and connectable to said primary conductors;
    (B) said check circuit being controlled jointly by said primary and secondary conductors when connected thereto for checking whether or not energized primary conductors match energized secondary conductors;
    (C) and, means controlled upon registration of said complete set of switching data in said register-sender for connecting said check circuit to said primary conductors.

12. The invention defined in claim 11 wherein
    (A) a release signal transmission circuit normally exists between a register-sender and a connected translator whereby a regular release is effected by the transmission over said circuit from the connected translator and to the register-sender of a release signal;
    (B) said precluding means splits said transmission circuit and connects to said testing circuit the respective split ends thereof;
    (C) said connecting means is controlled responsive to a release signal transmitted from said connected translator to the translator end of said split connection;
    (D) and, said releasing means is controlled to apply a release signal to the register-sender of said split connection.

13. The invention defined in claim 12 wherein:
    (A) said settable means comprises switch means manually settable to establish said correct set of switching data;
    (B) said check circuit comprises
        (1) check registers selectively controlled according to said energized primary conductors,
        (2) contacts controlled by said check registers,
        (3) and contacts controlled by said switch means;
    (C) and, said releasing means is controlled by the contacts of said check registers and of said switch means to apply said release signal.

References Cited
UNITED STATES PATENTS 3,059,067  10/1962  Gibson.

KATHLEEN H. CLAFFY, *Primary Examiner.*

ARTHUR A. McGILL, *Assistant Examiner.*